United States Patent
Kline et al.

(10) Patent No.: US 10,332,166 B2
(45) Date of Patent: Jun. 25, 2019

(54) SYSTEM AND METHOD FOR A MULTI-PARTY DYNAMIC BARTERING NETWORK

(71) Applicant: Have Need, Inc., Los Angeles, CA (US)

(72) Inventors: Josh C. Kline, Los Angeles, CA (US); Jason Brahms, Studio City, CA (US)

(73) Assignee: Have Need, Inc., Los Angeles, CA (US)

( * ) Notice: Subject to any disclaimer, the term of this patent is extended or adjusted under 35 U.S.C. 154(b) by 861 days.

(21) Appl. No.: 14/815,846

(22) Filed: Jul. 31, 2015

(65) Prior Publication Data

US 2016/0034989 A1     Feb. 4, 2016

Related U.S. Application Data

(60) Provisional application No. 62/032,467, filed on Aug. 1, 2014.

(51) Int. Cl.
| | | |
|---|---|---|
| *G06Q 30/00* | (2012.01) | |
| *G06Q 30/06* | (2012.01) | |
| *H04L 29/08* | (2006.01) | |
| *G06Q 50/00* | (2012.01) | |

(52) U.S. Cl.
CPC ......... *G06Q 30/0605* (2013.01); *G06Q 50/01* (2013.01); *H04L 67/306* (2013.01)

(58) Field of Classification Search
CPC ... G06Q 30/0605; G06Q 50/01; H04L 67/306
See application file for complete search history.

(56) References Cited

U.S. PATENT DOCUMENTS

| | | | |
|---|---|---|---|
| 2007/0088652 A1* | 4/2007 | Firmage | G06Q 30/0603 705/37 |
| 2007/0244769 A1* | 10/2007 | Boesel | G06Q 30/06 705/26.1 |
| 2010/0161597 A1 | 6/2010 | Bocheck | |
| 2013/0304765 A1 | 11/2013 | Failelson et al. | |
| 2014/0032376 A1 | 1/2014 | Tyagi | |

FOREIGN PATENT DOCUMENTS

WO     WO99/27476     6/1999

OTHER PUBLICATIONS https://web.archive.org/web/20110204123532/http://www.barterquest.com/home/article/faq (Year: 2011) (Year: 2011).*

* cited by examiner

*Primary Examiner* — Matthew E Zimmerman
(74) *Attorney, Agent, or Firm* — Seed Intellectual Property Law Group LLP

(57) ABSTRACT

A method is disclosed of generating a computer-based, multi-party dynamic bartering network. The method includes: receiving, at a computer server, user supply information and user demand information from multiple parties over a computer network; generating multi-party barter loop options, using one or more processors, in response to a search request by a searching user, by analyzing the user supply information and user demand information; proposing multi-party barter loop options to the searching user over the computer network; receiving confirmation of the searching user joining a multi-party barter loop from the proposed multi-party barter loop options; and facilitating execution of the multi-party barter loop.

20 Claims, 140 Drawing Sheets

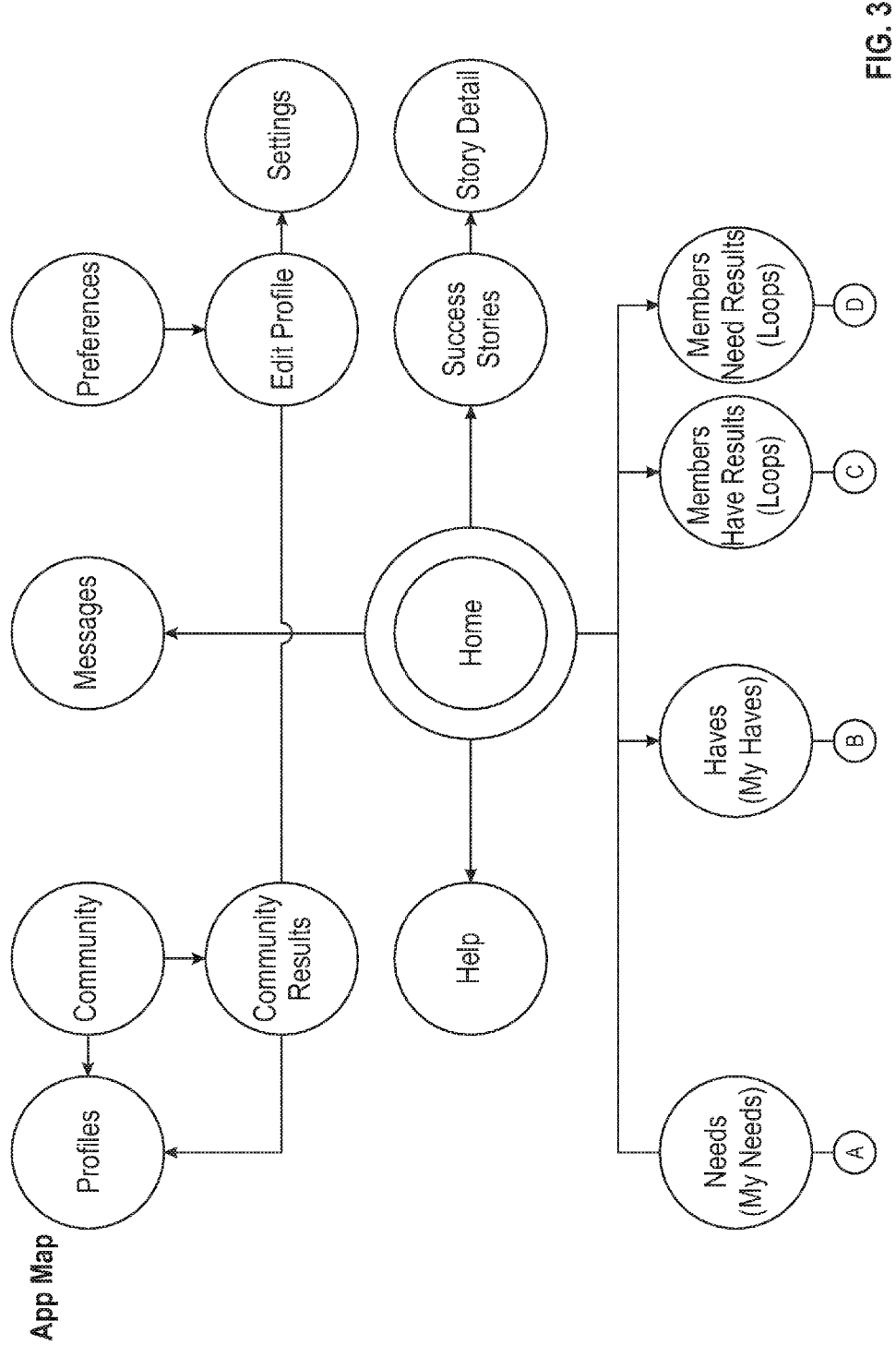

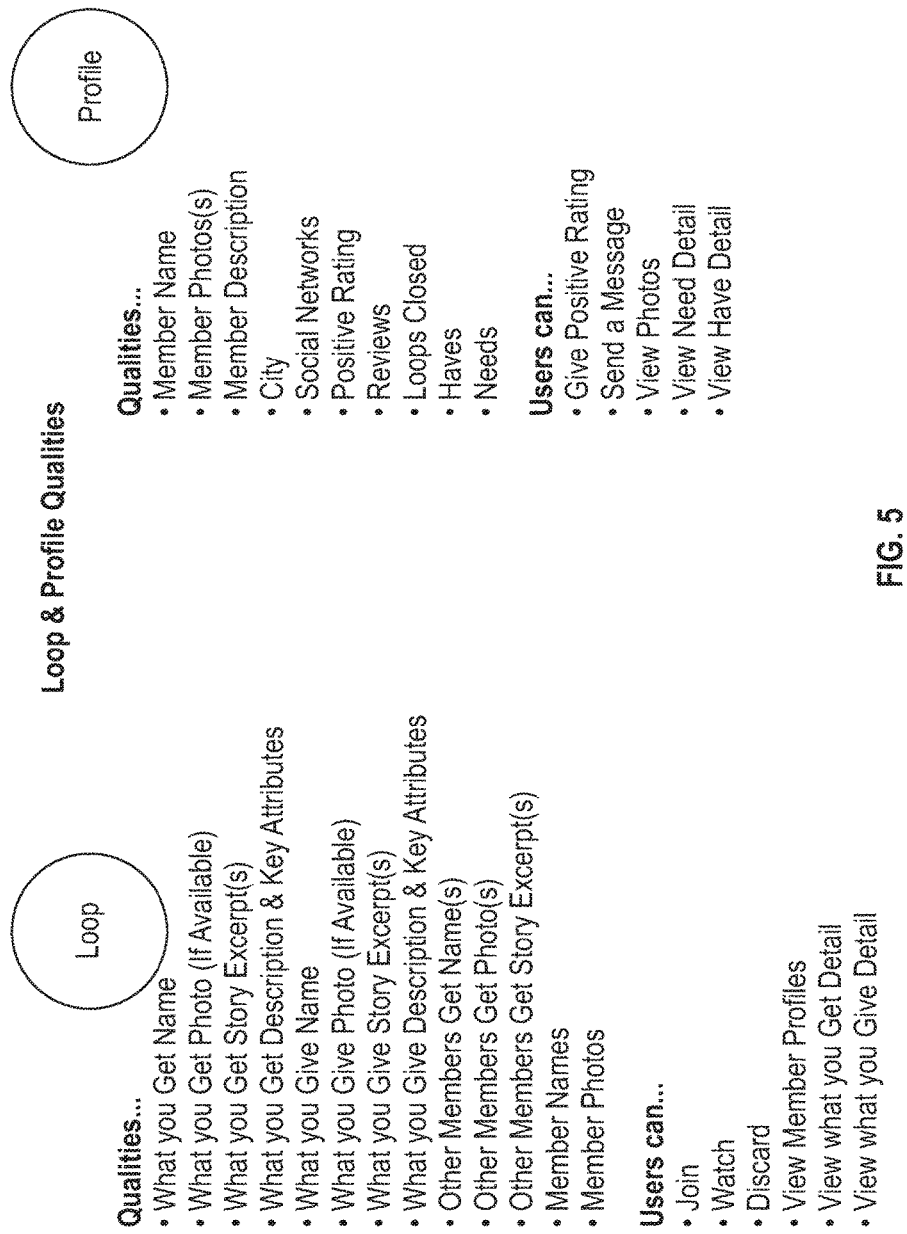

Loop & Profile Qualities

Loop

Qualities...
- What you Get Name
- What you Get Photo (If Available)
- What you Get Story Excerpt(s)
- What you Get Description & Key Attributes
- What you Give Name
- What you Give Photo (If Available)
- What you Give Story Excerpt(s)
- What you Give Description & Key Attributes
- Other Members Get Name(s)
- Other Members Get Photo(s)
- Other Members Get Story Excerpt(s)
- Member Names
- Member Photos

Users can...
- Join
- Watch
- Discard
- View Member Profiles
- View what you Get Detail
- View what you Give Detail

Profile

Qualities...
- Member Name
- Member Photos(s)
- Member Description
- City
- Social Networks
- Positive Rating
- Reviews
- Loops Closed
- Haves
- Needs

Users can...
- Give Positive Rating
- Send a Message
- View Photos
- View Need Detail
- View Have Detail

FIG. 5

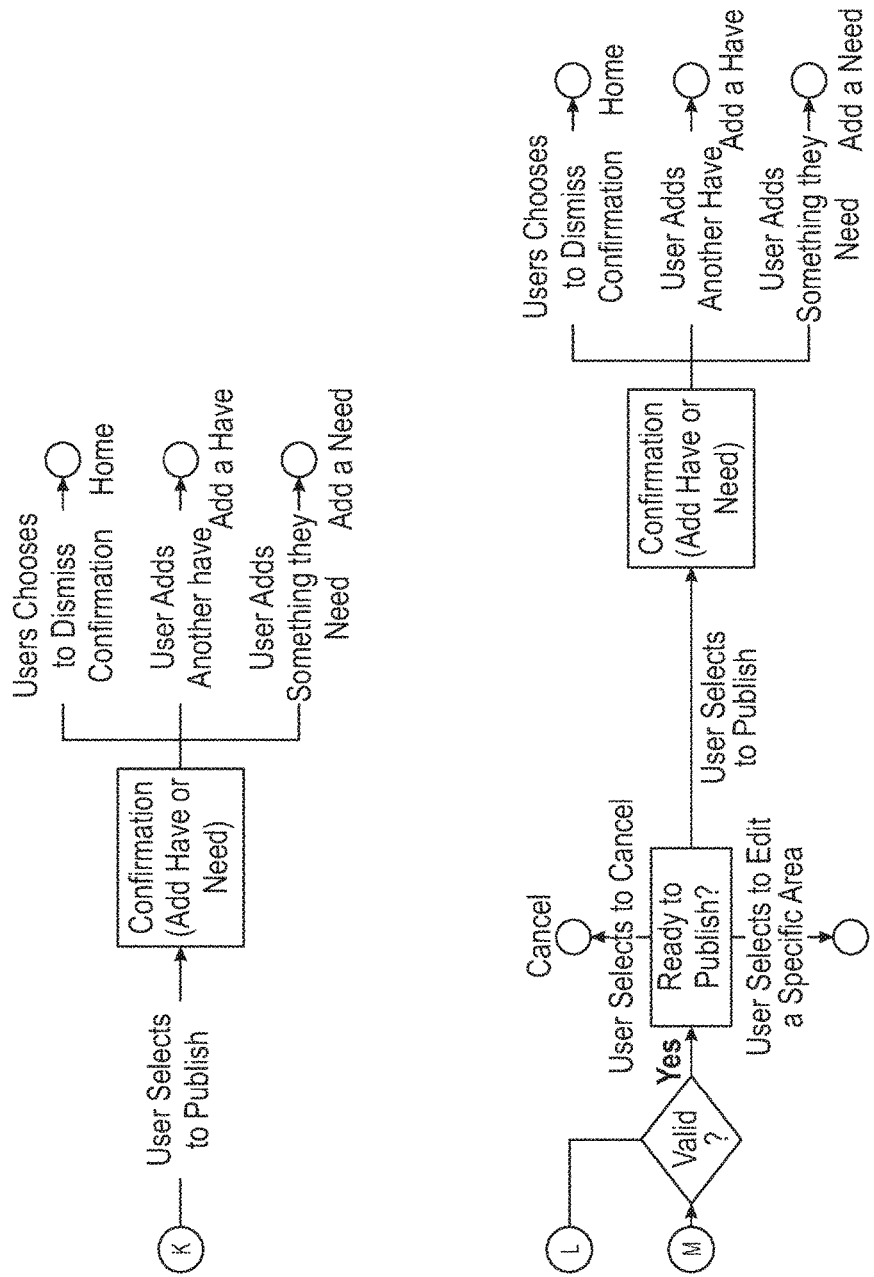

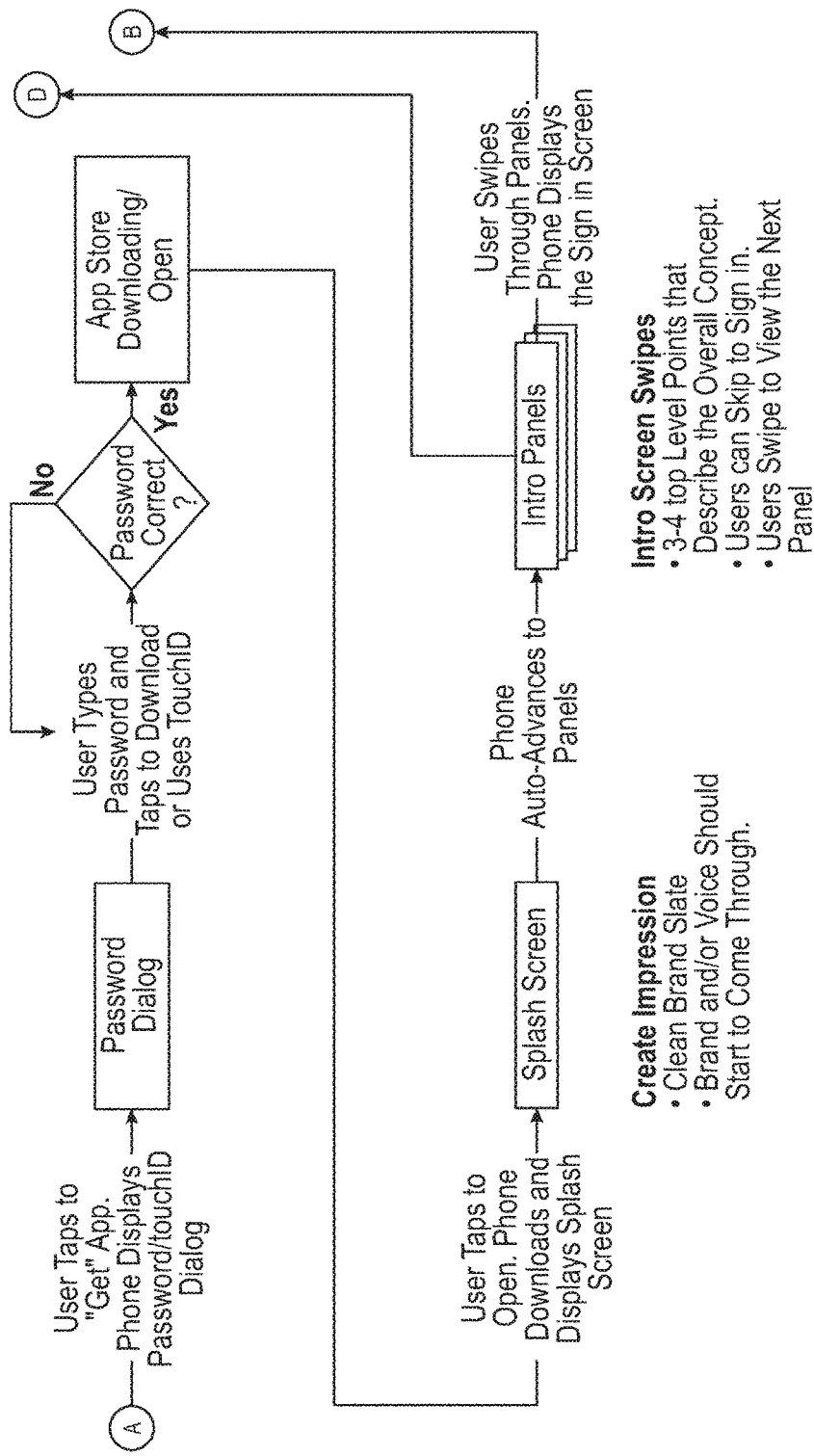

[Logo]

Add a motto

Just a quick one-liner to help others get to know you

Skip					Done

FIG. 23

| Cancel | Finish & Preview |
|---|---|

What do you have?

| XBox One Special Edition |
|---|

What kind of thing is it?

| Game Sys| |
|---|
| Category ▼ |
| Subcategory |
| Subcategory |
| Category ▼ |
| Category ▼ |
| Category ▼ |
| Category ▼ |
| Category ▼ |

FIG. 31

Cancel                    Finish & Preview

What do you have?

| XBox One |

What kind of thing is it?

| Video Game System |

Add your item description

| |

Provide a photo

[photo placeholder]

(Change Photo)

(Add More Photos)

How many do you have?

[1 ▼]  [✓] Items can be traded separately

What is the condition of the item?

[Choose condition ▼]

FIG. 35

Cancel Finish & Preview

What do you have?

Gourmet Chef Services - for 10

What kind of thing is it?

Chef Service

☑ Save service to my profile
☐ Make this service continuously available

How would you rate your skill level?

Select skill level ▼

FIG. 38

Cancel  Finish & Preview

What do you have?

Gourmet Chef Services - for 10

What kind of thing is it?

Chef Service

☑ Save service to my profile
☐ Make this service continuously available

How would you rate your skill level?

Professional ▼

Describe your service in detail

Add your description here...
Be as specific as possible to help other users find your service.

FIG. 39

Cancel  Finish & Preview

What do you have?

[ Gourmet Chef Services - for 10 ]

What kind of thing is it?

[ Chef Service ]

☑ Save service to my profile
☐ Make this service continuously available

How would you rate your skill level?

[ Professional ▼ ]

Describe your service in detail

[                    ]

What is your service area?

[ Within 20 miles ▼ ]

FIG. 40

Cancel            Finish & Preview

What do you have?

Gourmet Chef Services - for 10

What kind of thing is it?

Chef Service

☑ Save service to my profile
☐ Make this service continuously available

How would you rate your skill level?

Professional ▼

Describe your service in detail

What is your service area?

Within 20 miles ▼

Provide a photo

Take Photo    Choose Photo

FIG. 41

Cancel Finish & Preview

What do you have?

| Gourmet Chef Services - for 10 |

What kind of thing is it?

| Chef Service |

☑ Save service to my profile

How many hours will you perform the service?

[3 ▾] hours

How would you rate your skill level?

[Professional ▾]

Describe your service in detail (enter detailed description of service being offered)

What is your service area?

[Within 20 miles ▾]

Cancel                    Finish & Preview

What do you need?

XBox One

What kind of thing is it?

Video Game System

Describe what you need

Add your description here...
Be as specific as possible to help others understand what you need.

FIG. 49

Cancel                    Finish & Preview

What do you need?

XBox One

What kind of thing is it?

Video Game System

Describe what you need (enter detailed description of what you need)

Provide a photo (Optional)

Take Photo            Choose Photo

FIG. 50

| Cancel | Finish & Preview |

What do you need?

Gourmet Chef Services - for 10

What kind of thing is it?

Chef Service

Describe what you need in detail

Add your description here...
Be as specific as possible to help other users understand your need and evaluate whether they can provide the service

FIG. 55

Cancel                                    Finish & Preview

What do you need?

| Gourmet Chef Services - for 10 |

What kind of thing is it?

| Chef Service |

Describe what you need in detail

| (enter detailed description of your need here) |

Where do you need the service?

| Oakland, CA |

FIG. 56

Cancel                              Finish & Preview

What do you need?

Gourmet Chef Services - for 10

What kind of thing is it?

Chef Service

Describe what you need in detail

(enter detailed description of your need here)

Where do you need the service?

Oakland, CA

Provide a photo (Optional)

Take Photo     Choose Photo

In a few words, let others know what you need it (optional)

You can make it serious or funny...

That's it! You're ready to preview.

FIG. 57

| Cancel | Edit | Publish |

Your need is not yet published. Please review and publish your need!

[picture of Room to paint]

image  image  image

Painting Services in or near Oakland, CA for a springtime spruce up (enter detailed description of your need here)

Needed by

Jason  # clsd  80% 👍  20% 👎

FIG. 58

Cancel                    Save & Update

What do you have?

Gourmet Chef Services - for 10

What kind of thing is it?

Chef Service describe what you need in detail

(enter detailed description of have here)

Where do you need the service?

Oakland, CA

Provide a photo (Optional)

Take Photo        Choose Photo

**In a few words, let others know
what you need (optional)**

You can make it serious or funny...

FIG. 67

Cancel                                    Save

Shipping Address

We just need to get your shipping address so others no where to send items. This information will only be provided to other members when a loop closed as part of shipping instructions.

Street Address

City

State

ZIP Code

Contact Phone

More information needed about
Painting Services

John Smith wrote                    mm/dd/yy
(message about offered painting service
displayed here)

You wrote                           mm/dd/yy
(response to message about offered painting
service displayed here)

John Smith wrote           New!   mm/dd/yy
Thanks!

Write a reply

Add your description here...
Be as specific as possible to help others
understand what you need.

Send

FIG. 96

THE SOLUTION

The Multi-Party Dynamic Bartering Network is the platform that connects all of the disparate dots to bring scale and efficiency to the barter process.

Individual connections are called Threads.

A complete set of Threads allowing for a successful transaction for all participants is called a Loop.

SYSTEM AND METHOD FOR A MULTI-PARTY DYNAMIC BARTERING NETWORK

RELATED APPLICATIONS

This application claims the benefit of U.S. Provisional Patent Application Ser. No. 62/032,467, filed Aug. 1, 2014, which is hereby incorporated herein by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD

This description generally relates to systems and methods for a computer-based, multi-party dynamic bartering network.

BACKGROUND

In modern society, we all have things that we do not need, and we all want things that we do not have. There is a desire to facilitate a better functioning society across all socio-economic strata and geographical locations, not dependent on one's access to capital but based on the relative value of one's belongings or ability to provide services. In this regard, there is a continuing need in the industry for a system and/or method to bring people and communities together to get what they need.

Traditional barter models are fraught with many problems. For example, a simple barter model involves two parties that each give and receive. A problem with this model is the requirement for the presence of a double coincidence of wants between only two parties. In another example, a three party barter model is employed which uses three parties, where A gives to B, B gives to C, and C gives to A. A problem with this model is the requirement for the presence of a multiple coincidence of wants. Accordingly, this model is difficult to implement in actual practice.

SUMMARY

Briefly, and in general terms, a method is disclosed of generating multiple simultaneous multi-party barter options for a user in a multi-party dynamic bartering network system. The method includes: storing a plurality of user profiles in one or more non-transitory memory storage devices, each user profile including (1) supply information regarding items, services, or items and services that the user owns and is willing to offer as part of an exchange, (2) demand information regarding items, services, or items and services that the user would like to acquire in an exchange, or (3) a combination of supply information and demand information; analyzing the supply information and demand information in the plurality of user profiles for instances of coincidence between the supply information and demand information, wherein at least one instance of coincidence includes three or more parties that form a multi-party barter loop; generating two or more multi-party barter loop options from the plurality of user profiles, via one or more processors, in response to a search request by a searching user, wherein there is an equal number of connections as there are parties in a multi-party barter loop; proposing two or more multi-party barter loop options to the searching user over the computer network for the searching user to join, wherein at least one of the proposed multi-party barter loop options includes all of the connections needed to complete the multi-party barter loop upon the searching user joining the multi-party barter loop; receiving confirmation from the searching user over the computer network that the searching user selected a multi-party barter loop from among the two or more multi-party barter loop options; determining if the joining by the searching user of the selected multi-party barter loop is sufficient to complete the multi-party barter loop or if additional parties are required to complete the multi-party barter loop; if additional parties are required to complete the multi-party barter, proposing the multi-party barter loop to one or more additional parties over the computer network; and if additional parties are not required to complete the multi-party barter loop, facilitating execution of the multi-party barter loop.

In an aspect of one embodiment, at least one of the proposed multi-party barter loop options does not include all of the connections needed to complete the multi-party barter loop upon the searching user joining the multi-party barter loop, but wherein the system generates virtual connections needed to complete the multi-party barter loop in addition to the searching user joining the multi-party barter loop. In this embodiment, the system enables the searching user to select more than one proposed multi-party barter loop that is not complete but rather includes virtual connections, from the proposed multi-party barter loop options. Continuing, in this embodiment, the first incomplete multi-party barter loop that subsequently becomes complete after searching user joins the more than one incomplete multi-party barter loops is the loop that secures the searching user's connection, and wherein the searching user's connection is removed from the other incomplete multi-party barter loops that the searching user joined.

In another aspect of one embodiment, at least one of the multi-party barter loops includes five or more parties. In still another aspect, the system enables the searching user to select to watch multi-party barter loops that the searching user may or may not later join. In yet another aspect, the system enables the searching user to select to filter the proposed two or more multi-party barter loop options using various criteria. In one embodiment, the system enables the searching user to view information about other users in proposed multi-party barter loop options to assist the searching user to select a proposed multi-party barter loop to join. In still another aspect, the system enables the searching user to view information about other users in proposed multi-party barter loop options for a linked social media network.

In another embodiment, a method is disclosed of generating multiple simultaneous multi-party barter options for a user in a multi-party dynamic bartering network system. The method includes: storing a plurality of user profiles in one or more non-transitory memory storage devices, each user profile including (1) supply information regarding items, services, or items and services that the user owns and is willing to offer as part of an exchange, (2) demand information regarding items, services, or items and services that the user would like to acquire in an exchange, or (3) a combination of supply information and demand information; analyzing the supply information and demand information in the plurality of user profiles for instances of coincidence between the supply information and demand information, wherein at least one instance of coincidence includes three or more parties that form a multi-party barter loop; generating two or more multi-party barter loop options from the plurality of user profiles, via one or more processors, in response to a search request by a searching user, wherein there is an equal number of connections as there are parties in a multi-party barter loop; proposing two or more multi-party barter loop options to the searching user over the computer network for the searching user to join, wherein at least one of the proposed multi-party barter loop options does not include all of the connections needed to complete the multi-party barter loop upon the searching user joining the multi-party barter loop, but wherein the system generates virtual connections needed to complete the multi-party barter loop in addition to the searching user joining the multi-party barter loop; receiving confirmation from the searching user over the computer network that the searching user selected a multi-party barter loop from among the two or more multi-party barter loop options; determining if the joining by the searching user of the selected multi-party barter loop is sufficient to complete the multi-party barter loop or if additional parties are required to complete the multi-party barter loop; if additional parties are required to complete the multi-party barter, proposing the multi-party barter loop to one or more additional parties over the computer network; and if additional parties are not required to complete the multi-party barter loop, facilitating execution of the multi-party barter loop.

In one embodiment, the system enables the searching user to select more than one proposed multi-party barter loop that is not complete but rather includes virtual connections, from the proposed multi-party barter loop options. Continuing, in this embodiment, the first incomplete multi-party barter loop that subsequently becomes complete after searching user joins the more than one incomplete multi-party barter loops is the loop that secures the searching user's connection, and wherein the searching user's connection is removed from the other incomplete multi-party barter loops that the searching user joined.

In one aspect of the method, the proposing of two or more multi-party barter loop options to the searching user over the computer network for the searching user to join uses the user's smartphone, tablet, or computer device. In another aspect of the method, the receiving of confirmation from the searching user over the computer network that the searching user selected a multi-party barter loop from among the two or more multi-party barter loop options uses a user's smartphone, tablet, or computer device.

In still another embodiment, a method is disclosed of generating multi-party barter options for a user in a multi-party dynamic bartering network system. The method includes: storing a plurality of user profiles in one or more non-transitory memory storage devices, each user profile including (1) supply information regarding items, services, or items and services that the user owns and is willing to offer as part of an exchange, (2) demand information regarding items, services, or items and services that the user would like to acquire in an exchange, or (3) a combination of supply information and demand information; analyzing the supply information and demand information in the plurality of user profiles for instances of coincidence between the supply information and demand information that form multi-party barter loops; generating one or more multi-party barter loop options from the plurality of user profiles, via one or more processors, in response to a search request by a searching user; proposing one or more multi-party barter loop options to the searching user over the computer network for the searching user to join; receiving confirmation from the searching user over the computer network that the searching user selected a multi-party barter loop; determining if the joining by the searching user of the selected multi-party barter loop is sufficient to complete the multi-party barter loop or if additional parties are required to complete the multi-party barter loop; if additional parties are required to complete the multi-party barter, proposing the selected multi-party barter loop to one or more additional parties over the computer network; and if additional parties are not required to complete the multi-party barter loop, facilitating execution of the multi-party barter loop.

Features and advantages will become apparent from the following detailed description, taken in conjunction with the accompanying drawings, which illustrate by way of example, the features of the various embodiments.

BRIEF DESCRIPTION OF THE DRAWINGS

The accompanying drawings, which are included as part of the present specification, illustrate various embodiments and together with the general description given above and the detailed description of the various embodiments given below serve to explain and teach the principles described herein.

FIG. 5 illustrates Loop and Profile qualities of the multi-party dynamic bartering network.

FIG. 23 illustrates a User Add Motto page in the multi-party dynamic bartering network.

FIG. 31 illustrates a User Add Have Item page (with an Item category selection "Browse All" prompt) in the multi-party dynamic bartering network.

FIG. 35 illustrates a User Add Have Item page (with an Item condition selection prompt) in the multi-party dynamic bartering network.

FIG. 38 illustrates a User Add Have Service page (with a service level selection prompt) in the multi-party dynamic bartering network.

FIG. 39 illustrates a User Add Have Service page (with a service description prompt) in the multi-party dynamic bartering network.

FIG. 40 illustrates a User Add Have Service page (with a service area prompt) in the multi-party dynamic bartering network.

FIG. 41 illustrates a User Add Have Service page (with a service photo prompt) in the multi-party dynamic bartering network.

FIG. 49 illustrates a User Needs page (with an item description prompt) in the multi-party dynamic bartering network.

FIG. 50 illustrates a User Needs page (with a photo addition prompt) in the multi-party dynamic bartering network.

FIG. 55 illustrates a Needs Preview page (with a service description prompt) in the multi-party dynamic bartering network.

FIG. 56 illustrates a Needs Preview page (with a service location prompt) in the multi-party dynamic bartering network.

FIG. 57 illustrates a Needs Preview page (with a photo addition prompt) in the multi-party dynamic bartering network.

FIG. 58 illustrates a Needs Preview Final Review page (with a detailed description prompt) in the multi-party dynamic bartering network.

FIG. 67 illustrates an Edit Need page in the multi-party dynamic bartering network.

FIG. 81 illustrates a Shipping Address Request page in the multi-party dynamic bartering network.

FIG. 96 illustrates a User Messages details page in the multi-party dynamic bartering network.

Figure 1:
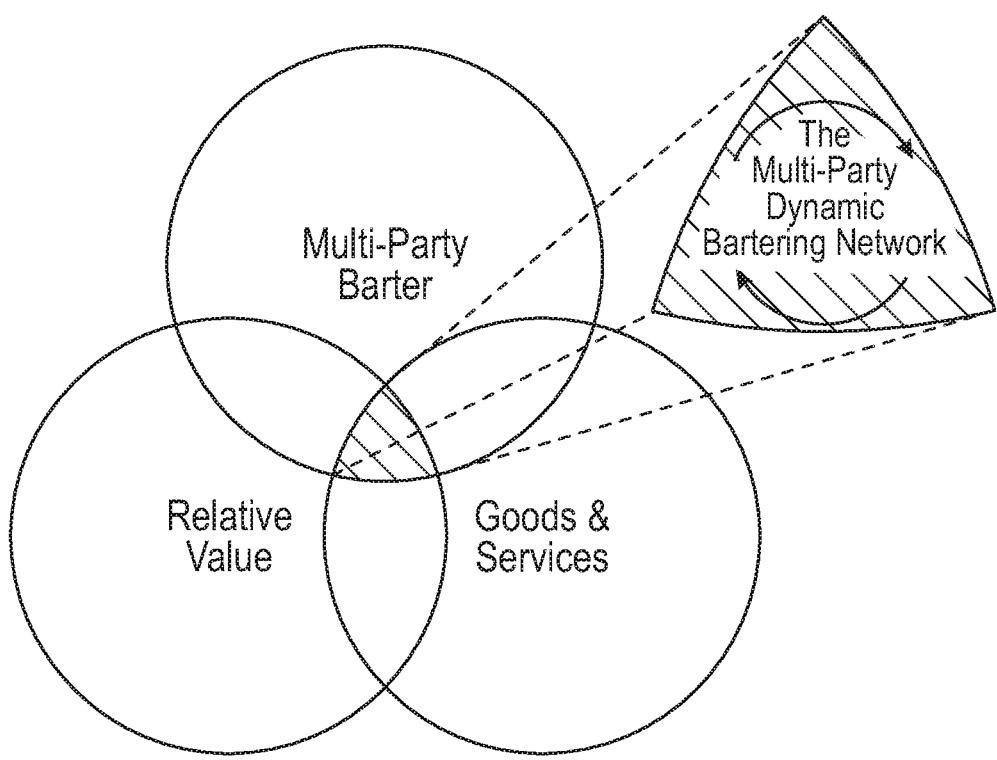
FIG. 1 illustrates a venue diagram depicting an embodiment of an intelligent, multi-party bartering network.

The figures are not necessarily drawn to scale and elements of similar structures or functions are generally represented by like reference numerals for illustrative purposes throughout the figures. The figures or text shows examples of possible implementations of the computer-based, Multi-party dynamic bartering network, however the teachings are applicable to other implementations without deviating from the present disclosure. The figures are only intended to facilitate the description of the various embodiments described herein. The figures do not describe every aspect of the teachings disclosed herein and do not limit the scope of the claims.

DETAILED DESCRIPTION

Each of the features and teachings disclosed herein can be utilized separately or in conjunction with other features and teachings to provide a system and method of implementing a computer-based, multi-party dynamic bartering network. Representative examples utilizing many of these additional features and teachings, both separately and in combination, are described in further detail with reference to the attached figures. This detailed description is merely intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particular representative examples of the present teachings.

In the description below, for purposes of explanation only, specific nomenclature is set forth to provide a thorough understanding of the present disclosure. However, it will be apparent to one skilled in the art that these specific details are not required to practice the teachings of the present disclosure.

Some portions of the detailed descriptions herein are presented in terms of algorithms and symbolic representations of operations on data bits within a computer memory. These algorithmic descriptions and representations are used by those skilled in the data processing arts to effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms presented herein are not inherently related to any particular computer or other apparatus. Various general-purpose systems, computer servers, or personal computers may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of an original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

In the following description, certain specific details are set forth in order to provide a thorough understanding of various disclosed embodiments. However, one skilled in the relevant art will recognize that embodiments may be practiced without one or more of these specific details, or with other methods, components, materials, and the like. In other instances, well-known structures associated with servers, networks, displays, media handling, computers and/or processor/control systems have not been shown or described in detail to avoid unnecessarily obscuring descriptions of the embodiments.

Unless otherwise indicated, the functions described herein may be performed by executable code and instructions stored in a computer readable medium and running on one or more processor-based systems. However, state machines and/or hardwired electronic circuits may also be utilized. Further, with respect to the example processes described herein, not all of the process states need to be reached, nor do the states have to be performed in the illustrated order. Further, certain process states that are illustrated as being serially performed may be performed in parallel.

Similarly, unless expressly stated to the otherwise, while certain embodiments may refer to a Personal Computer ("PC") system or data device, other computer or electronic systems may be used as well, such as, without limitation, an interactive television, a network-enabled personal digital assistant ("PDA"), a network game console, a networked entertainment device, a smart phone (e.g., with an operating system and on which a user may install applications) and the like.

In addition, while certain user inputs or gestures are described as being provided via phone key-presses, data entry via a keyboard, or by clicking a computer mouse or button, optionally, user inputs may be provided using other techniques, such as by voice or otherwise. The example screen layouts, appearance, and terminology as depicted and described herein, are intended to be illustrative and exemplary, and in no way limit the scope of the invention as claimed.

The terms, "for example," "e.g.," "in one/another aspect," "in one/another scenario," "in one/another version," "in some configurations" "in some implementations," "preferably," "usually," "typically," "may," and "optionally," as used herein, are intended to be used to introduce non-limiting embodiments. Unless expressly stated otherwise, while certain references are made to certain example system components or services, other components and services may be used as well and/or the example components may be combined into fewer components and/or divided into further components. The terms, "member" and "user," are used interchangeably. Members and users are subscribed to or enrolled in a network service or network of users.

FIG. 1 illustrates a venue diagram depicting an embodiment of a multi-party dynamic bartering network, showing the intersection of (1) a multi-party barter (where each party has an item or service with which to barter in a competitive, real-time environment, (2) using the relative value of the barter item or service as determined by the bartering parties, (3) in which both items or services may be used as consideration for the multi-party barter. The computer-based, multi-party dynamic bartering network described herein is a many-to-many online exchange for goods and services. This service is useful across all segments of society, offering amplified benefits to those who are underprivileged or otherwise lack access to traditional currency. Beyond economic impact, the computer-based, multi-party dynamic bartering network is driven by in sustainability and conscious capitalism.

In some embodiments of the multi-party bartering network, six, eight, ten, or twelve party intelligent bartering networks are created. The number of possible give/receive combinations increases dramatically in these embodiments with higher numbers of bartering parties within the multi-party bartering network. The presently disclosed multi-party bartering network intelligently matches multiple "Haves" and "Needs." The system can scale to massive sized computer-based, multi-party dynamic bartering networks.

Some simple examples are provided below.

EXAMPLE 1

A gardener's lawn mower breaks down and he needs to work to feed his family. A man has a lawnmower he never uses sitting in his garage, and a son failing high school French. A woman who speaks fluent French has a mess of a lawn.

EXAMPLE 2

A Nigerian goat farmer has a broken water pump and more goats he can sustain. A mechanic can't afford school books for his children. A man whose children have graduated school needs more food to feed his family.

EXAMPLE 3

A handyman who has a young daughter needs childcare help so he can work. A childcare facility needs help saving the info off their old computer and setting up a new one. A computer repairman needs a new refrigerator. A family downsizes, moves into a smaller home and no longer needs their big refrigerator, but needs roof repair.

In one embodiment of the multi-party bartering network, a computer platform is implemented that connects all of the disparate parties to bring scale and efficiency to the barter process. Individual "give/receive" connections may be referred to as "threads." A complete set of threads that allows for a successful transaction for all participants is called a "loop."

In some embodiments of the multi-party bartering network, a multi-party matching system matches as many threads as necessary to close a Loop. Multiple Loops may be available for any set of threads, allowing a user to select which Loop to accept. Continuing, in some embodiments, users may have access to multiple filtering mechanisms, including User (i.e., trading partner) ratings based on site activity history, and dynamic tailoring of Loops to their preferences (e.g., connected via 3rd party networks, distance, willingness to ship, number of threads in Loop, and the like). The system is dynamic in that just a few threads can close a loop between disparate users in real-time or a loop in the multi-party bartering network can expand to include large numbers of threads (and thus large numbers of users) as necessary in order to close the loop in real-time without geographical restriction (unless geographical restrictions are requested by one or more of the user initiating the threads). This type of dynamic scalability is not possible using simple human face-to-face bartering.

By using the multi-party matching system of the multi-party bartering network, users can search for "Needs" and try to match with their own "Haves" in order to close a Loop, and vice versa. In some embodiments, users can review a curated feed of open Loops (the "Need Feed™") and offer to fulfil Needs via their own Haves, or by the charitable act of purchasing a Need via affiliate vendors such as Amazon. Threads and Loops can be published to Twitter, Facebook, LinkedIn and Pinterest in order to attract more Users and transactions.

The multi-party bartering network platform is the first of its kind in its ability to match the Haves and Needs of a virtually unlimited number of parties, for both goods and services, while establishing relative value for those goods and services on a global scale. To date, other entities have mainly focused on one-to-one barter systems, and even those that have offered many-to-many matching have done so with a limited number of participants (3-4) and have only matched specific goods (e.g. kids clothes, DVDs, etc.). The presently disclosed computer based, multi-party dynamic bartering network uses complex, multi-party interactions that require significant computer processing, data analysis, and matching algorithms which were not capable of being performed prior to the current generation of computer technology, and are certainty unable to be performed by hand calculation.

One embodiment of the multi-party dynamic bartering network employs a method that includes generating a plurality of multi-party barter loop options for a user. In one such embodiment, the method includes storing a plurality of user profiles in one or more non-transitory memory storage devices. Each user profile may include supply information (User "Haves") regarding items, services, or items and services that the user owns and is willing to offer as part of an exchange. Each user profile may also include demand information (User "Needs") regarding items, services, or items and services that the user would like to acquire in an exchange. Some user profiles contain both user supply information and user demand information. In another aspect of some embodiment, each user profile contains a list of multi-party barter loops that the user is watching and/or has that the user has joined.

In another aspect of the multi-party dynamic bartering network, the supply information and demand information in the plurality of user profiles is analysed for instances of coincidence between the supply information and demand information. Instances of coincidence (between the supply information and demand information of the users) form multi-party barter loops. There are an equal number of connections as there are parties in a multi-party barter loop. The multi-party dynamic bartering network generates numerous multi-party barter loop options from the plurality of user profiles, via one or more processors, in response to a search request by a searching user. In other embodiments, a user does not have to perform a search, but rather may simply view a continuous stream of "Haves" and/or "Needs" that have been posted by other users of the system (e.g., the "Need Feed").

In one embodiment of the multi-party dynamic bartering network, a User enters one "Have" (supply information) and numerous "Need" (demand information) multi-party barter loop options are proposed to the searching user over the computer network for the searching user to join in return. In another embodiment of the multi-party dynamic bartering network, a User enters one "Need" (demand information) and numerous "Have" (supply information) multi-party barter loop options are proposed to the searching user over the computer network for the searching user to join in return. In some embodiments, Loops may have as few as two Users in a completed Loop. In another embodiment of the multi-party dynamic bartering network, a User enters one "Have" (supply information) and receives one "Need" (demand information) multi-party barter loop in return. In still another embodiment of the multi-party dynamic bartering network, a User enters one "Need" (supply information) and receive one "Have" (demand information) multi-party barter loop in return.

In another aspect of the multi-party dynamic bartering network, numerous multi-party barter loop options are proposed to the searching user over the computer network for the searching user to join. The proposed multi-party barter loop options may include loops in which all of the connections needed to complete the multi-party barter loop have been made upon the searching user joining the multi-party barter loop.

In still another aspect, the proposed multi-party barter loop options may include loops in which all of the connections needed to complete the multi-party barter loop have not been made upon the searching user joining the multi-party barter loop (an "Open Loop" or incomplete Loop). In such an embodiment that includes Open Loops in the proposed multi-party barter loop options, the system generates the virtual connections needed to complete the multi-party barter loop in addition to the searching user joining the multi-party barter loop. In this embodiment, the system enables the searching user to select more than one proposed multi-party barter loop that is not complete but rather includes virtual connections, from the proposed multi-party barter loop options. Continuing, in this embodiment, the first incomplete multi-party barter loop that subsequently becomes complete after searching user joins the more than one incomplete multi-party barter loops is the loop that secures the searching user's connection. Correspondingly, the searching user's connection is removed from the other incomplete multi-party barter loops that the searching user joined (unless the user's connection was a service that could be repeatedly performed).

In another aspect of the multi-party dynamic bartering network, confirmation from the searching user is received over the computer network that the searching user has selected a multi-party barter loop from among the numerous multi-party barter loop options. The multi-party dynamic bartering network then determines if the joining by the searching user of the selected multi-party barter loop is sufficient to complete the multi-party barter loop or if additional parties are required to complete the multi-party barter loop. If additional parties are required to complete the multi-party barter, then the system proposes the multi-party barter loop to one or more additional parties over the computer network (and turn the virtual connection into an actual connection. Conversely, if additional parties are not required to complete the multi-party barter loop, then the system facilitates execution of the multi-party barter loop.

Figure 2:
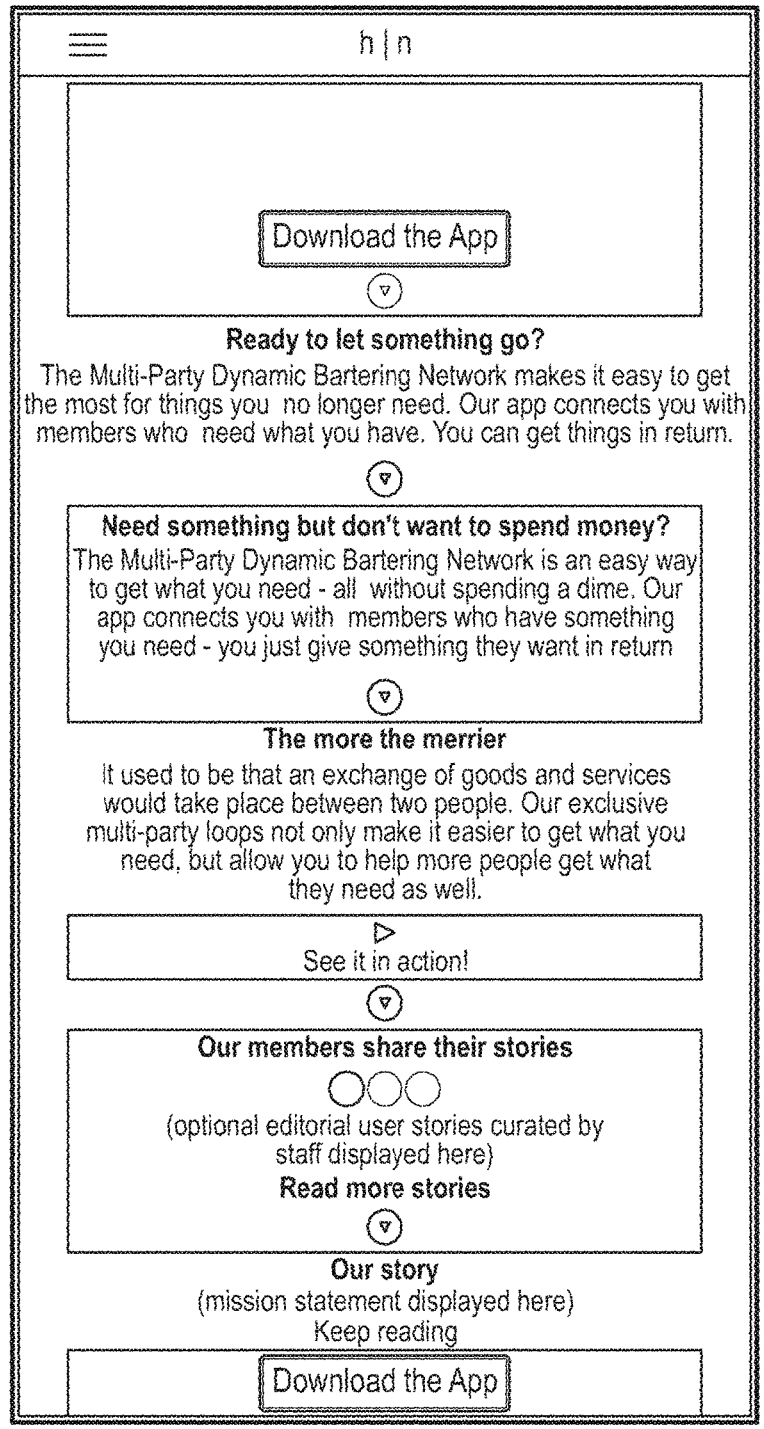
FIG. 2 illustrates an Instructional page to non-members of the multi-party dynamic bartering network.

FIG. 2 presents an Instructional page to non-members of the multi-party dynamic bartering network. The multi-party dynamic bartering network enables members to let something go that they no longer need and receive compensation for that good or services in the form of another good or services that the member now needs or wants in a cashless exchange using the relative value of the good and/or services being exchanged. The multi-party dynamic bartering network is scalable to enable large numbers of people to participate in the exchanges to create multi-party bartering connections that are not possible without the multi-party dynamic bartering network.

Figure 3:
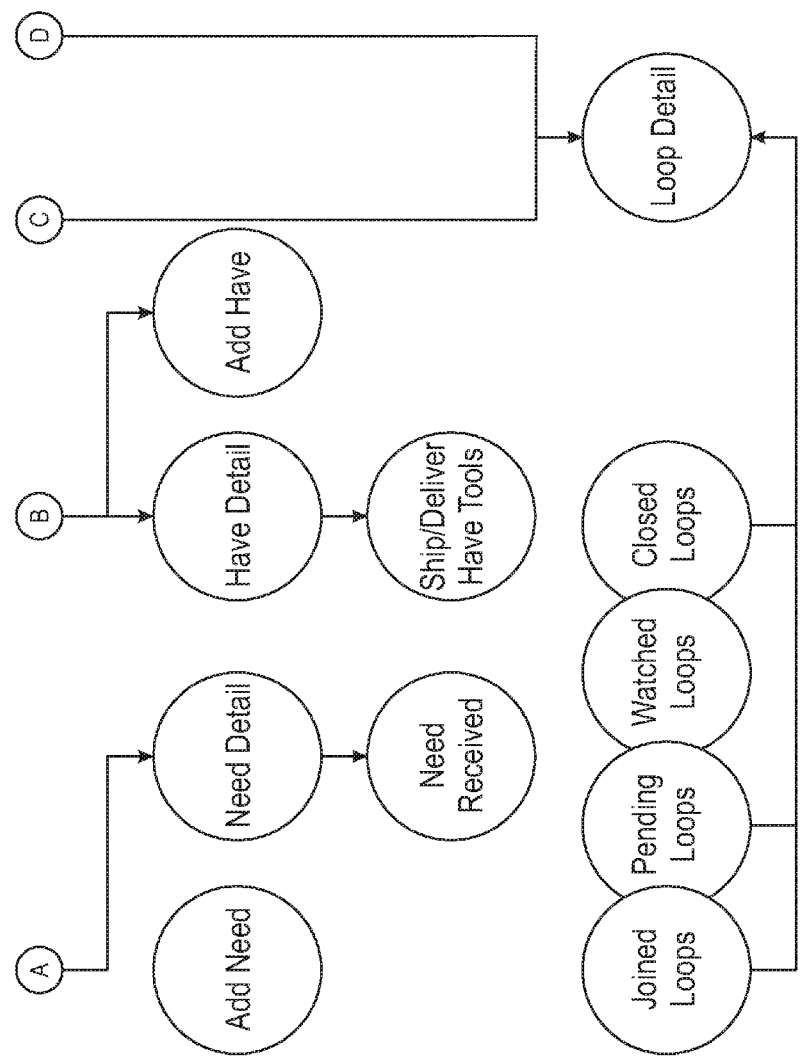
FIG. 3 illustrates an application design layout of the multi-party dynamic bartering network.
Figure 4:
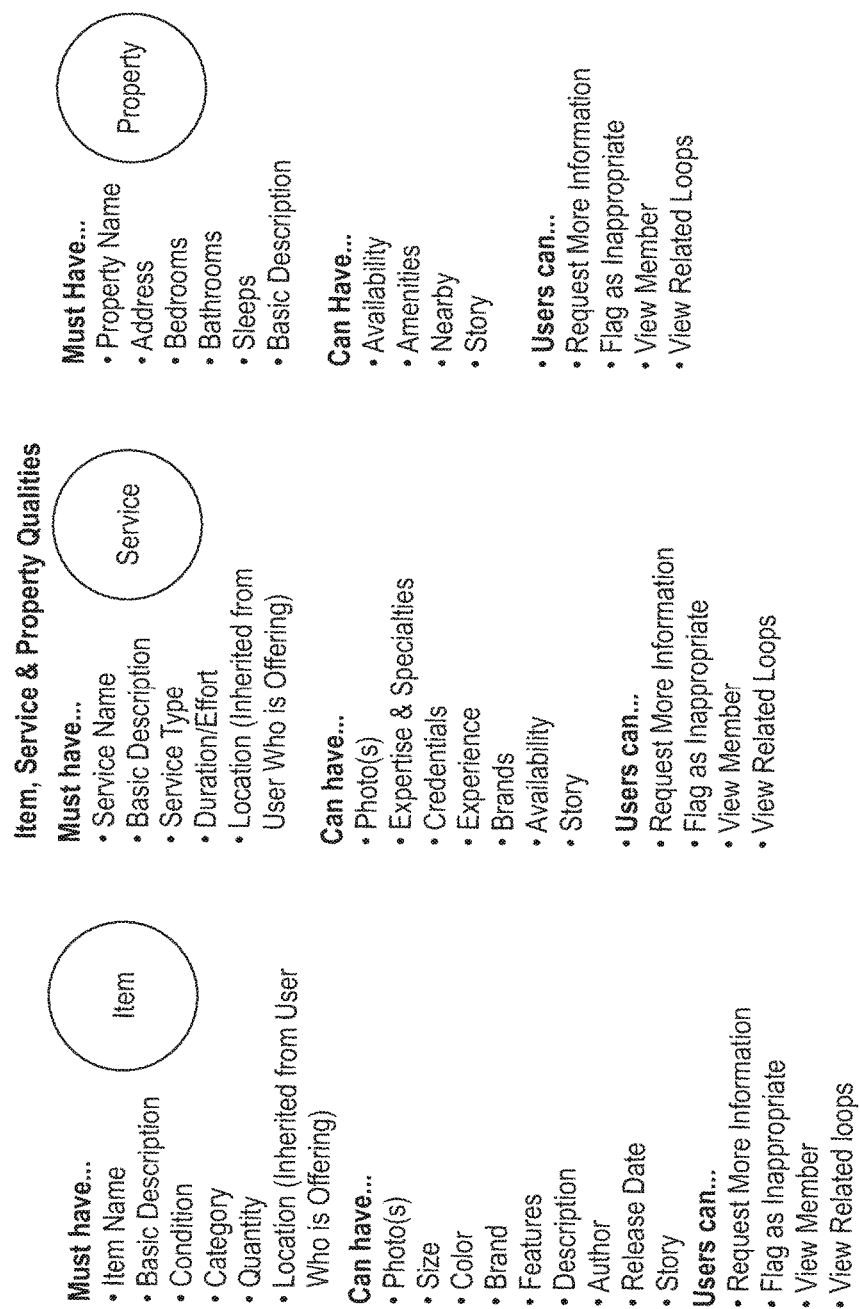
FIG. 4 illustrates Item, Service, and Property qualities of the multi-party dynamic bartering network.

In FIG. 3, an application design layout of the multi-party dynamic bartering network is illustrated. The design layout includes member Haves, member Needs, member Have Result Loops, member Need Result Loops, joined Loops, pending Loops, watched Loops, closed Loops, member profiles, member preferences, community information, messaging information, and the like. Referring now to FIG. 4, Item, Service, and Property qualities of the multi-party dynamic bartering network are illustrated. Items listed in the system have an item name, basic description, condition, category, quantity, location (inherited from use who is offering). Services listed in the system have a service name, basic description, service type, duration/effort, location (inherited from user who is offering). Property listed in the system (in which the bartering party may stay instead of renting a hotel or guest house) have a property name, address, bedrooms, bathrooms, sleeps, basic description. Other information is also sometimes provided as shown in FIG. 4. Additionally, user's may request more information, flag an entry as inappropriate, view member information, and view related loops.

Referring now to FIG. 5, Loop and Profile qualities of one embodiment of the multi-party dynamic bartering network are illustrated. In one embodiment of the multi-party dynamic bartering network, loops have the following qualities, (1) what you get name, (2) what you get photo (if available), (3) what you get story excerpt(s), (4) what you get description & key attributes, (5) what you give name, (6) what you give photo (if available), (7) what you give story excerpt(s), (8) what you give description & key attributes, (9) other members get name(s), (10) other members get photo(s), (11) other members get story excerpt(s), (12) member names, and (13) member photos. Users in the multi-party dynamic bartering network may Join Loops, Watch Loops, Discard Loops, View Member Profiles, View what you Get Detail, and/or View what you Give Detail. Continuing, in one embodiment of the multi-party dynamic bartering network, member profiles have the qualities of (1) member name, (2) member photos(s), (3) member description, (4) city, (5) social networks, (6) positive rating, (7) reviews, (8) loops closed, (9) haves, and (10) needs. Users in the multi-party dynamic bartering network may give rating (positive or negative), send a message, view photos, view need details, and/or view have details.

Figure 6:
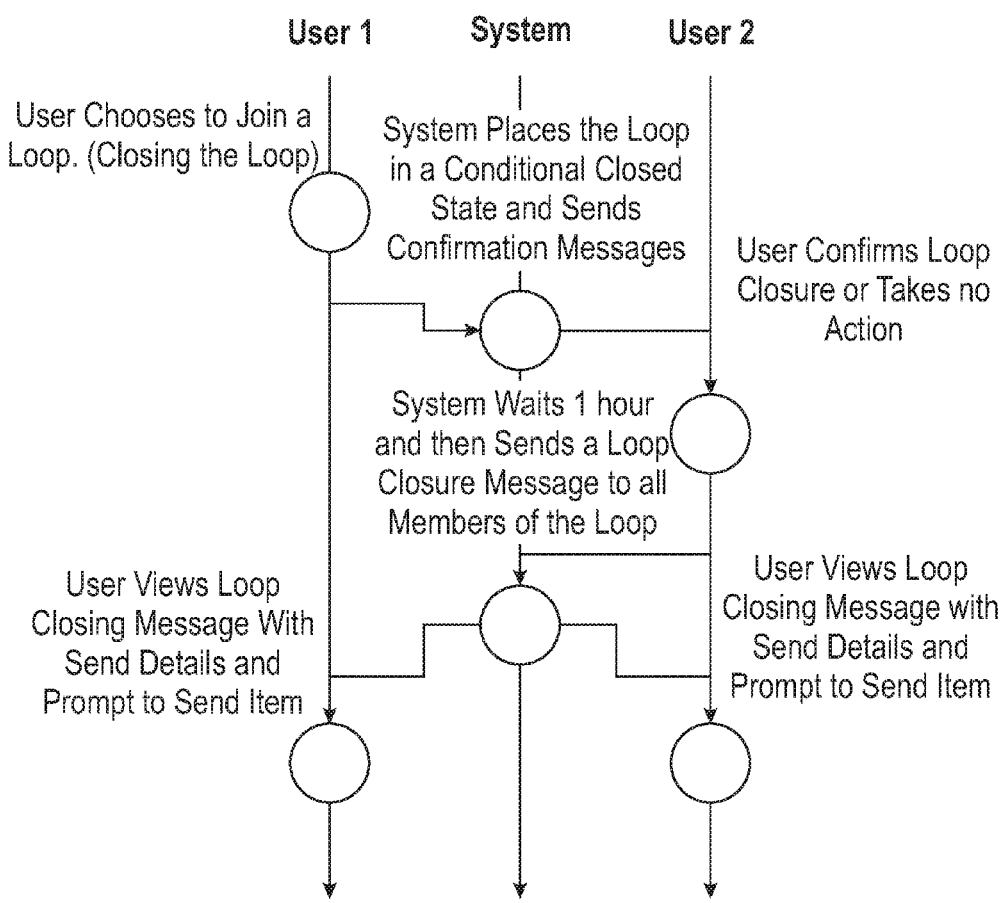
FIG. 6 illustrates a Loop Closing Diagram in the multi-party dynamic bartering network.

FIG. 6 presents a diagram showing the steps of a loop closing in one embodiment of the multi-party dynamic bartering network. First, "User 1" chooses to join a loop, thus, closing the loop. Next, the system places the loop in a conditional closed state and sends confirmation messages. Continuing, "User 2" confirms the loop closure or takes no action. The system then waits a period of time (e.g., an hour) after which the system sends a loop closure message to all members of the loop. Both User 1 and User 2 then view the loop closing message with send details, and finally prompt to send the item.

Figure 7:
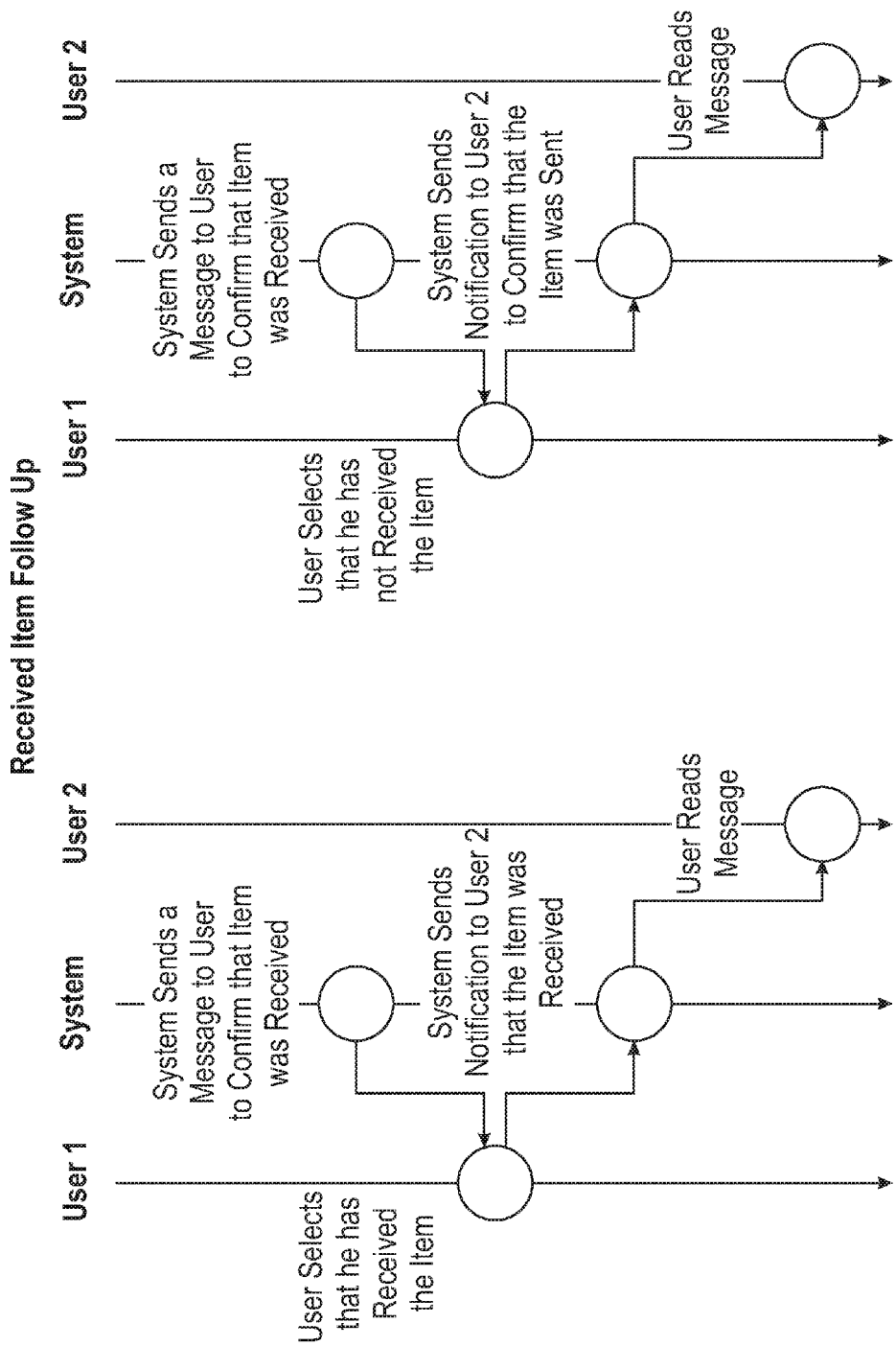
FIG. 7 illustrates a Received Item Follow-Up Diagram in the multi-party dynamic bartering network.

Referring now to FIG. 7, a Received Item Follow-Up Diagram in one embodiment of the multi-party dynamic bartering network is illustrated. As shown in FIG. 7, first User 1 selects that he has received the item. Next, the system (i.e., multi-party dynamic bartering network) sends a message to User 1 to confirm that he received the item. The system also sends a notification to User 2 that the item was received. User 2 then receives and reads this message. If the items was not received, the same process is carried out except that the message sent is that the item was not received.

Figure 8:
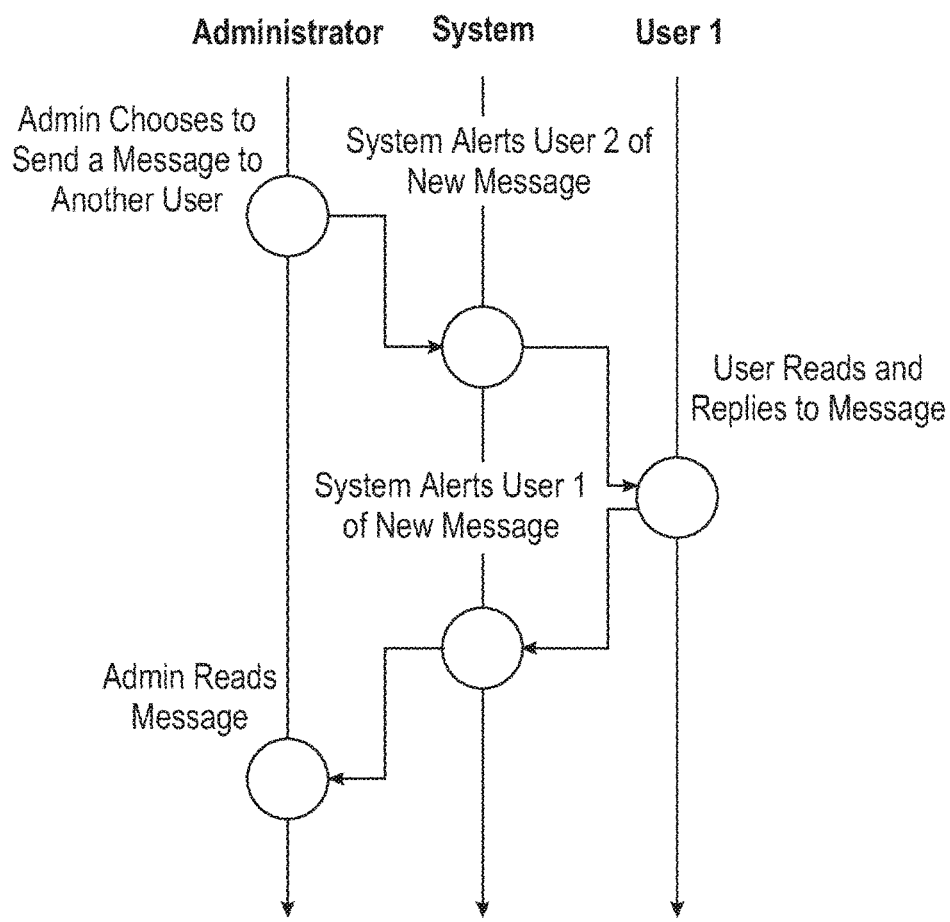
FIG. 8 illustrates a Send & Receive Messages w/Admin Diagram in the multi-party dynamic bartering network.
Figure 9:
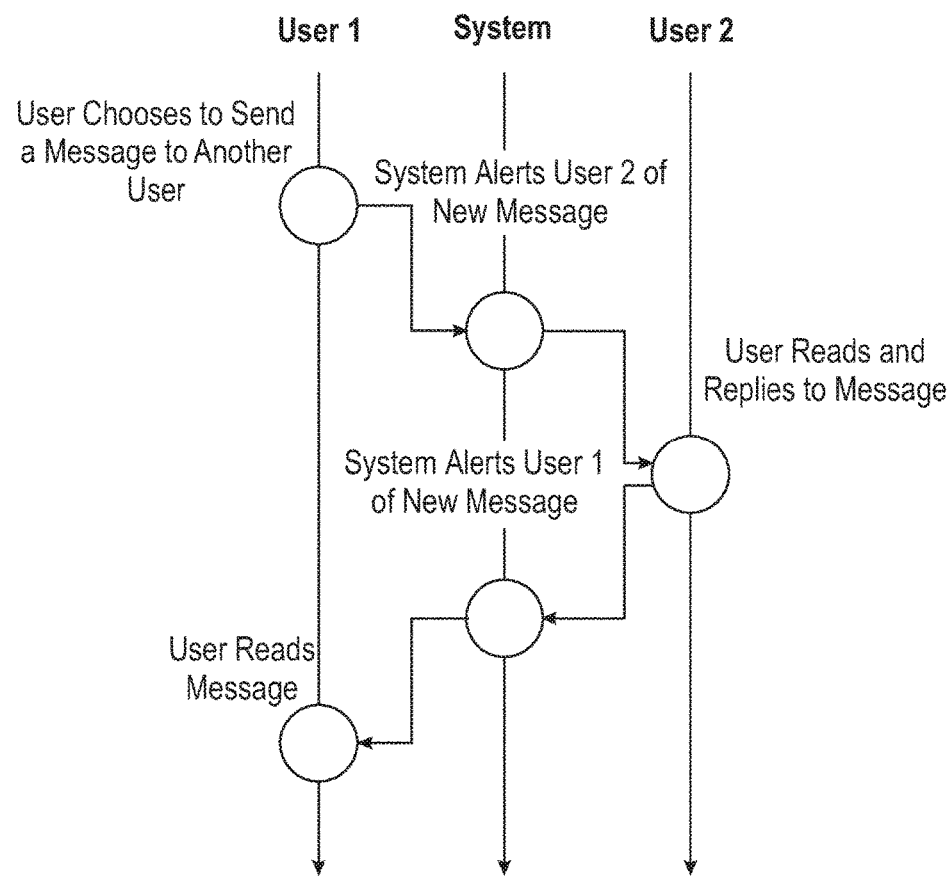
FIG. 9 illustrates a Send & Receive Messages w/Member Diagram in the multi-party dynamic bartering network.
Figure 10:
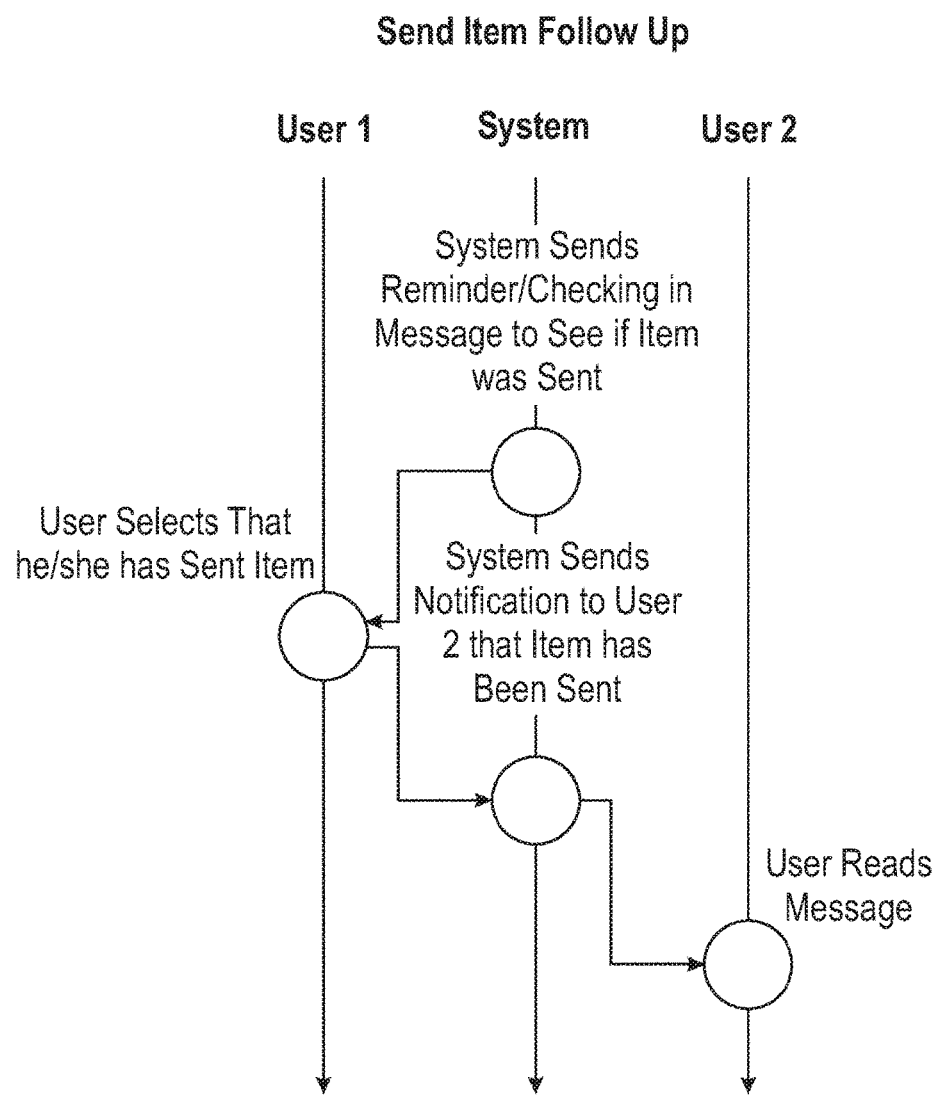
FIG. 10 illustrates a Send Item Follow-Up Diagram in the multi-party dynamic bartering network.

FIG. 8 illustrates a diagram that presents how messages are sent and received with an administrator in one embodiment of the multi-party dynamic bartering network. FIG. 9 illustrates a diagram that present how messages are sent and received with another member in the multi-party dynamic bartering network. Referring now to FIG. 10, this diagram illustrates how a follow-up message may be transmitted to confirm that an item has been sent using the multi-party dynamic bartering network.

Figure 11:
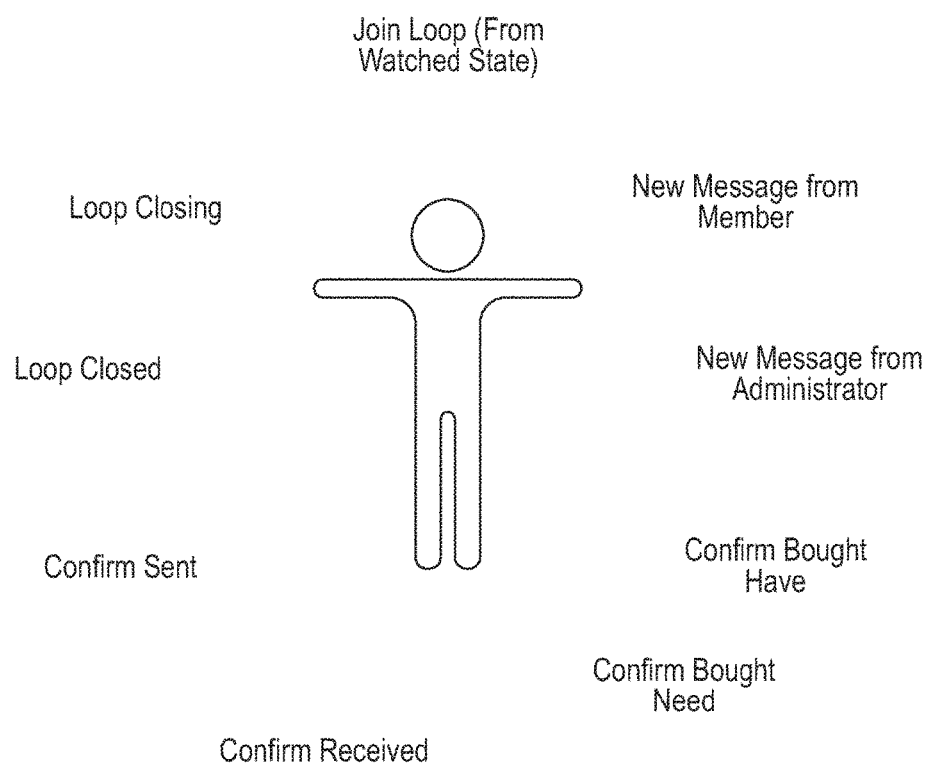
FIG. 11 illustrates a Types of Message Diagram in the multi-party dynamic bartering network.

Referring now to FIG. 11, the types of messages used in one embodiment of the multi-party dynamic bartering network as shown. These message types include joining a loop (from a watched state), loop closing, loop closed, confirm sent, confirm received, confirm bought Need, confirm bought Have, new message from administrator, and new message from a member.

Figure 12:
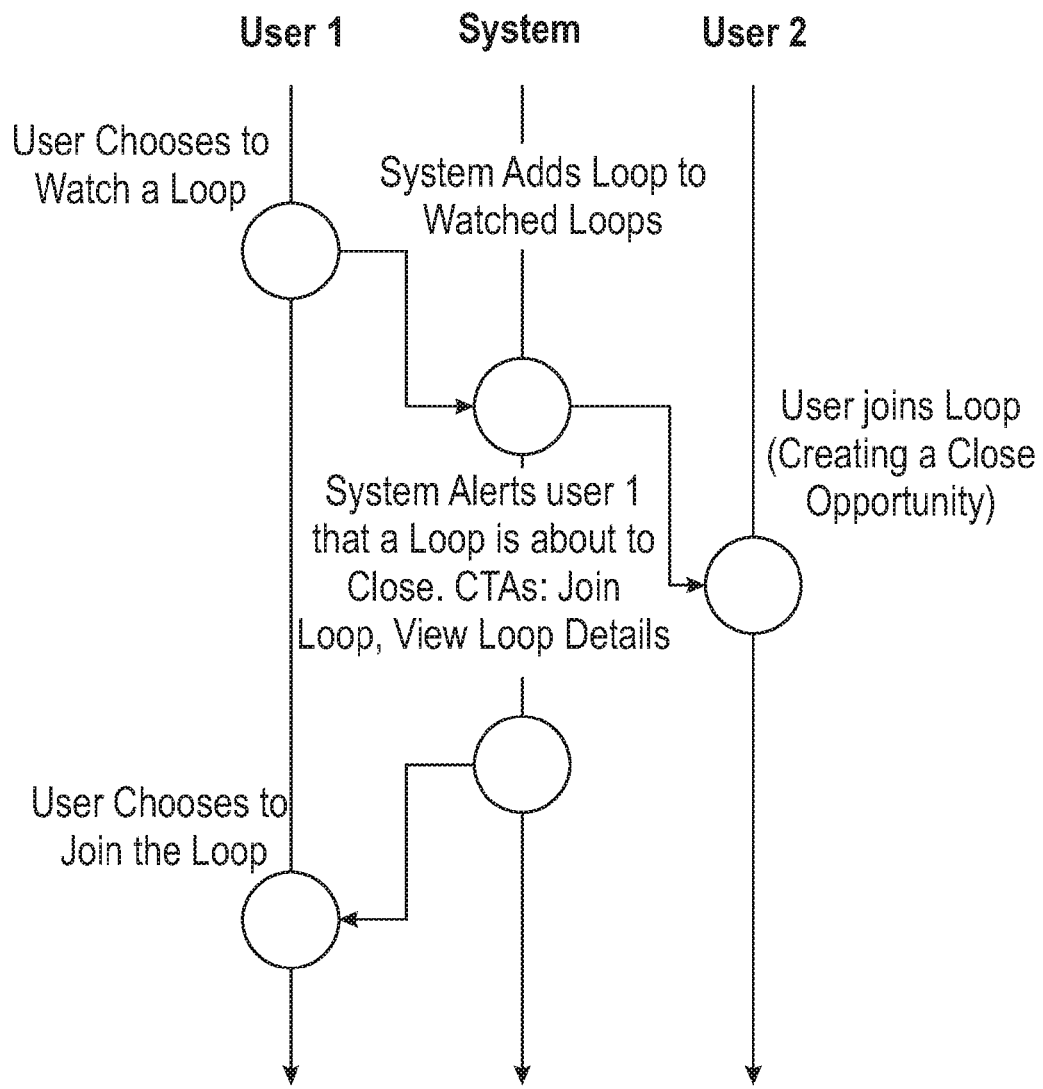
FIG. 12 illustrates a Watch Loop Diagram in the multi-party dynamic bartering network.

In FIG. 12, the steps associated with watching a loop in one embodiment of the multi-party dynamic bartering network are illustrated. These steps include: User 1 choosing to watch a loop; the system adding the loop to User 1's watched loops; the system alerting User 1 that the loop is about to close, prompting User 1 to join the loop, or view loop details; User 1 joining the loop; and User 2, User 3, and/or User 4 joining the loop (creating a loop closing opportunity).

Figure 13:
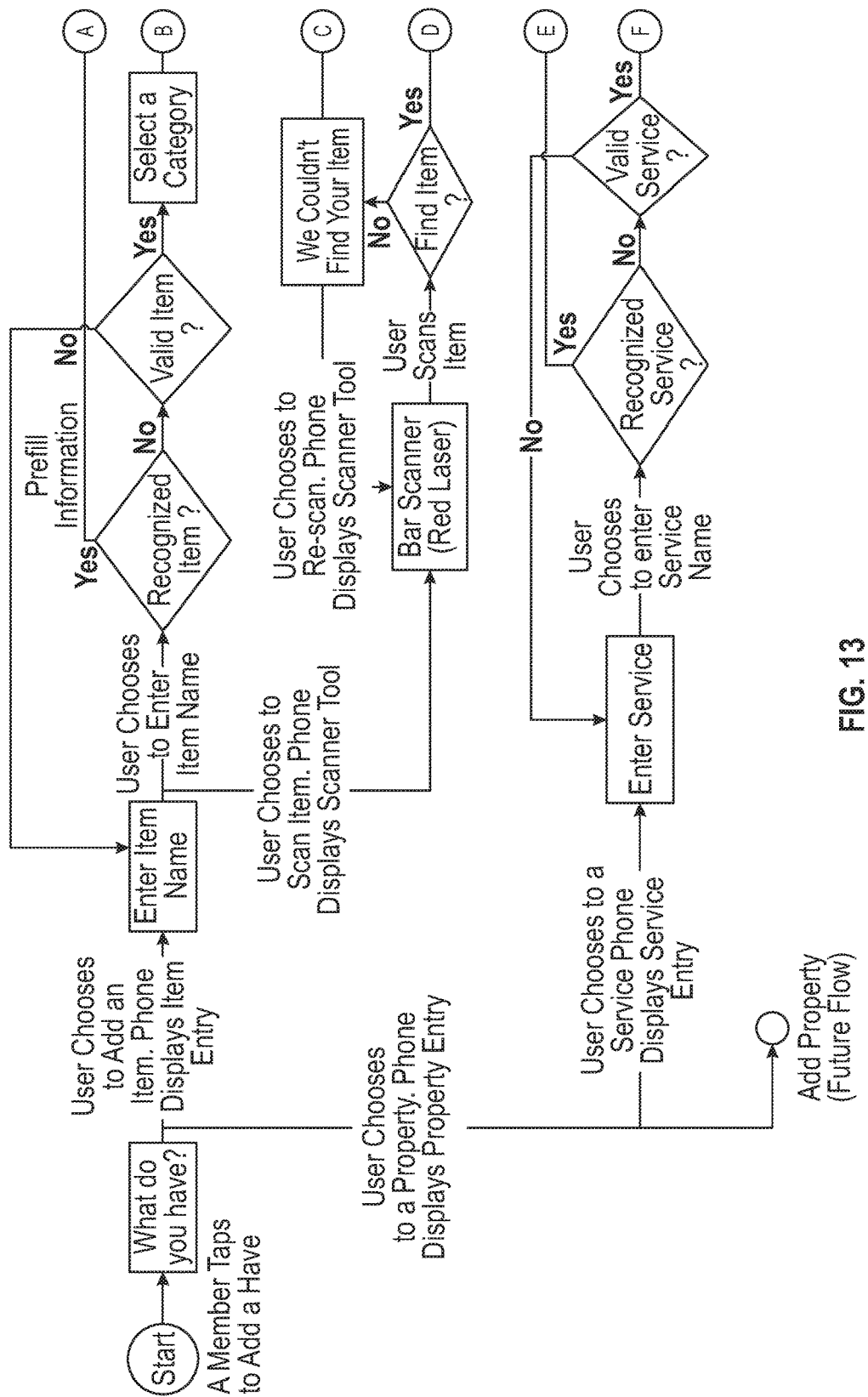
FIG. 13 illustrates a New Member Add Have Diagram in the multi-party dynamic bartering network.
Figure 13:
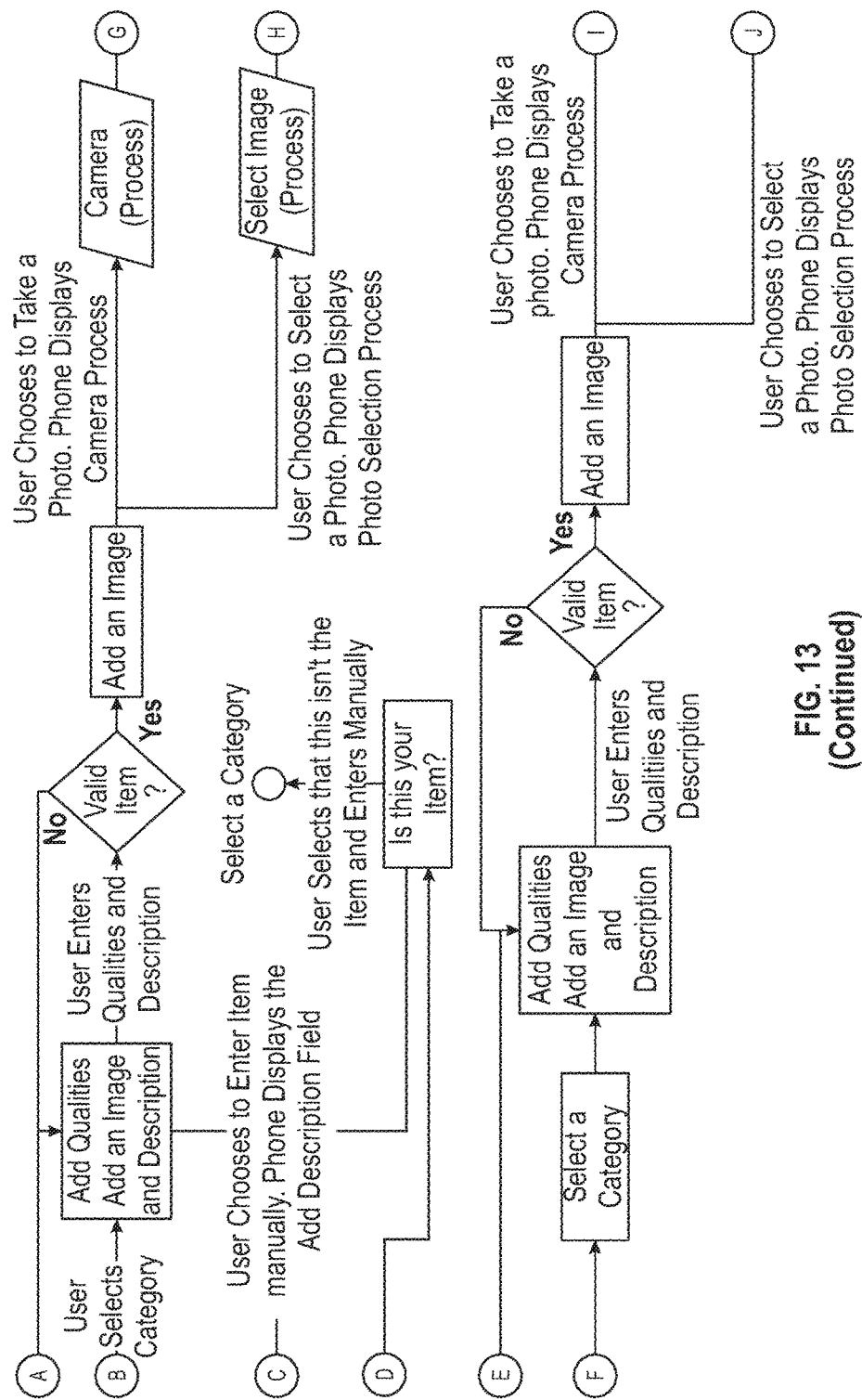
Figure 13:
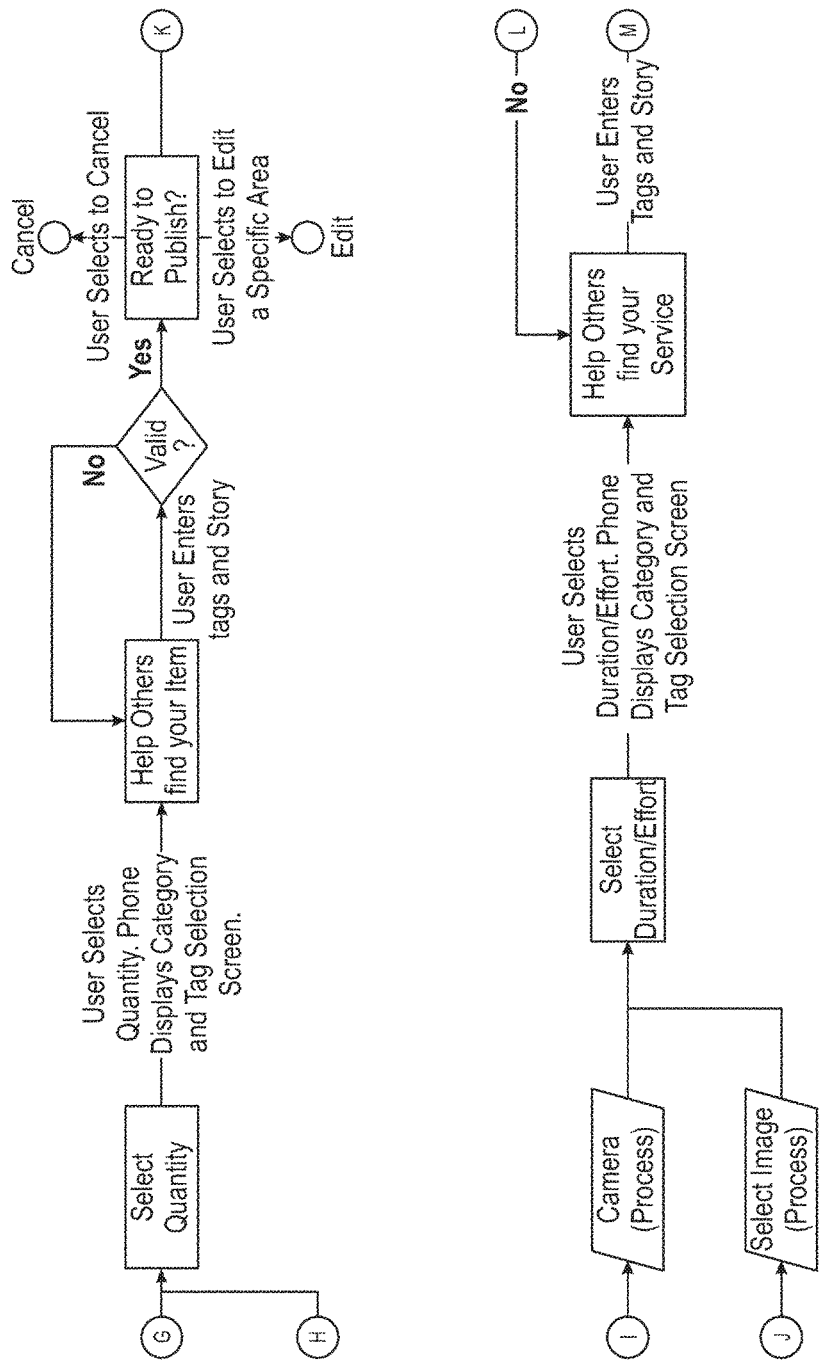

As shown in FIG. 13, a New Member Add Have Diagram in one embodiment of the multi-party dynamic bartering network is illustrated. In this logic diagram, a member begins the process of adding a "User Have." The User selects between adding a Have for (1) an item, (2) a property, or (3) a service. In a first scenario, the User chooses to Add an Item by entering the name of the item. The User may also choose to scan the Item by using the scanner tool of a smart phone to scan a UPC code, QR code, or other code. Continuing, the User may select a category for the Item and add qualities, an Image, and a description in response to prompts by the system. The User may also select a quantity for the Item in response to a prompt by the system. The display screen of the device (e.g., smart phone, tablet, or other computer) then displays a category and tag selection screen to help others find the User's Item. Next, the User is presented with a final preview and review screen, and is then presented with the option to publish the "Have" for the Item. The User goes through a similar procedure if he is adding a Have for a property or a service (with minor modifications as shown in FIG. 13).

Figure 14:
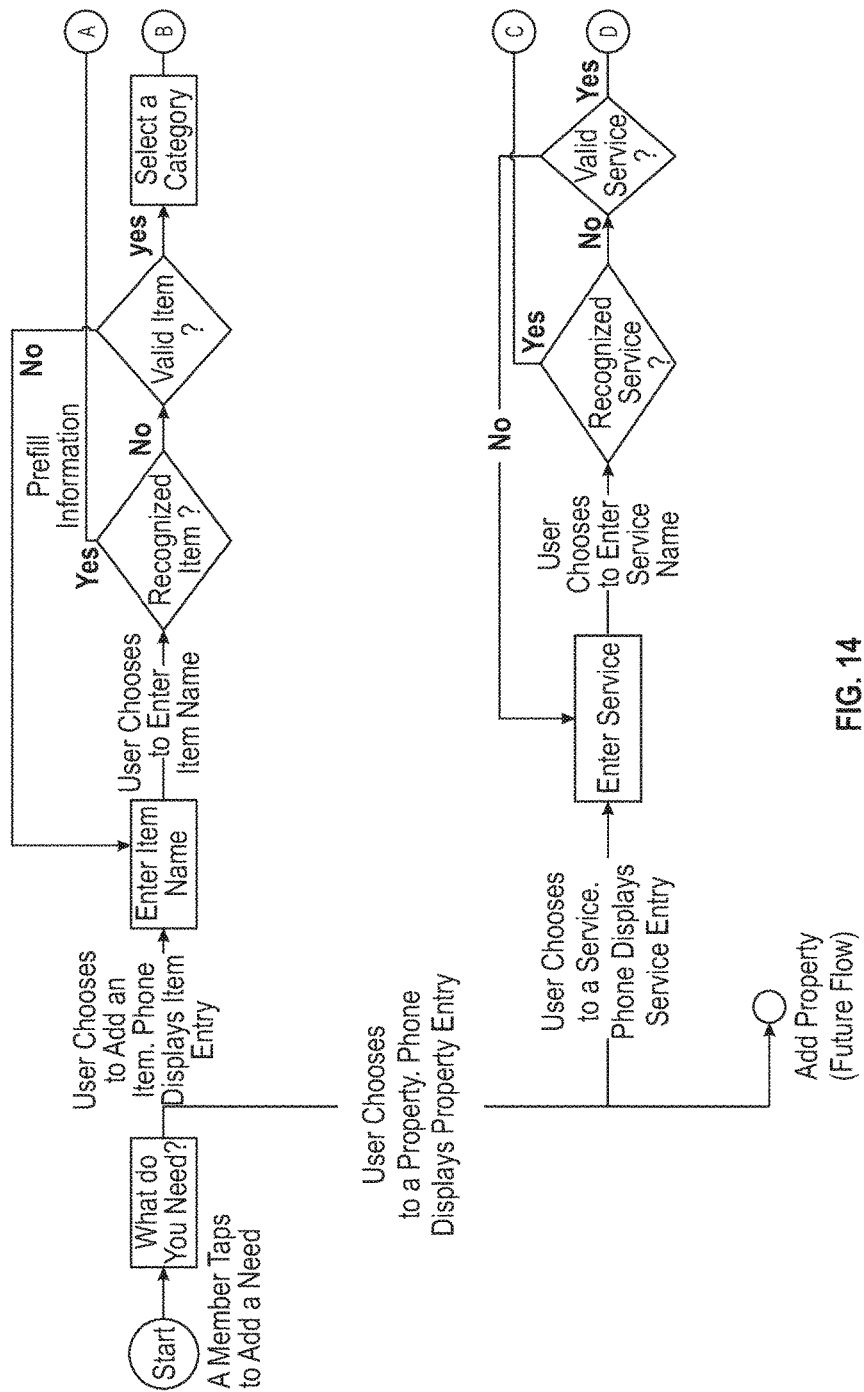
FIG. 14 illustrates a New Member Add Need Diagram in the multi-party dynamic bartering network.
Figure 14:
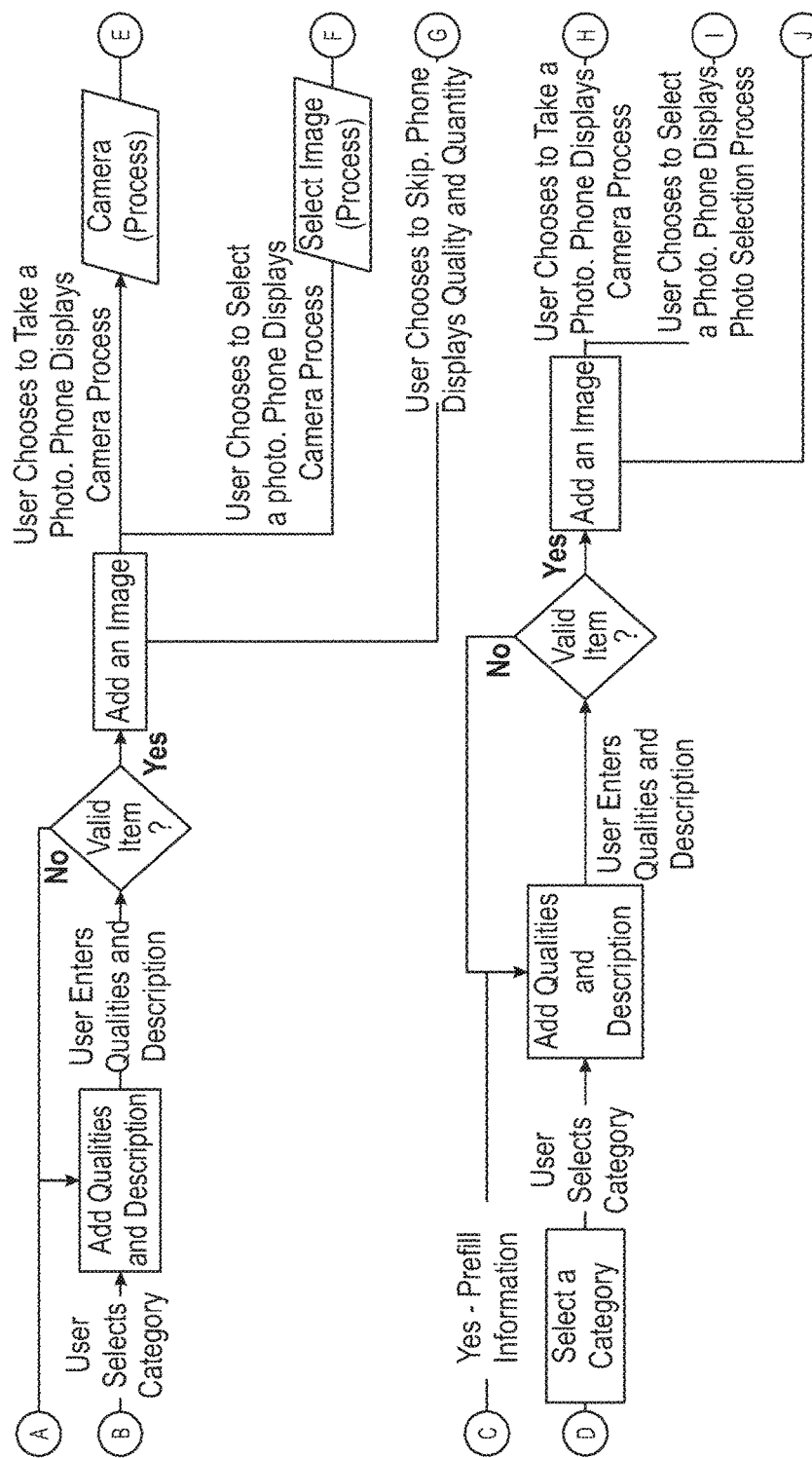
Figure 14:
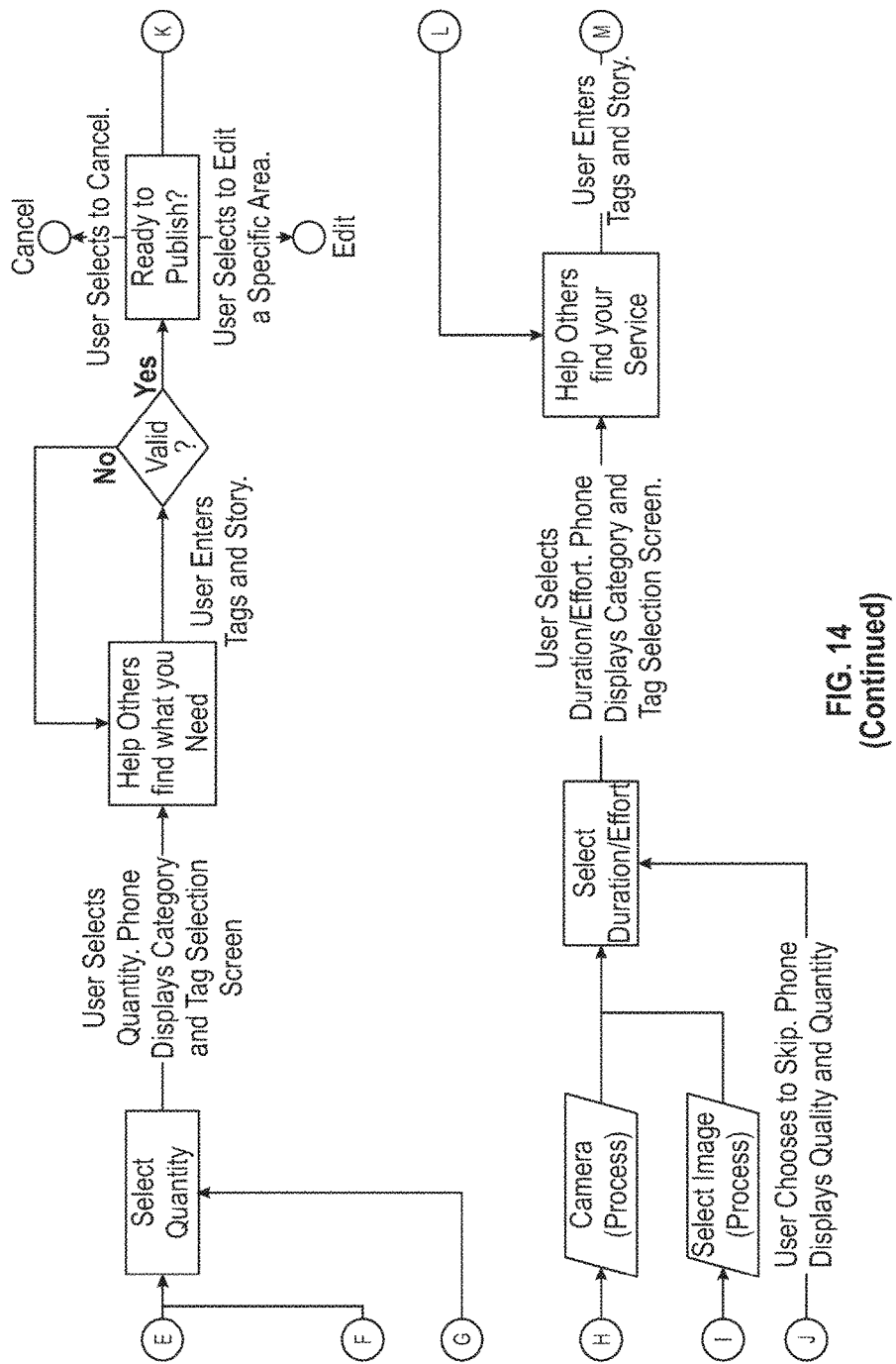
Figure 14:
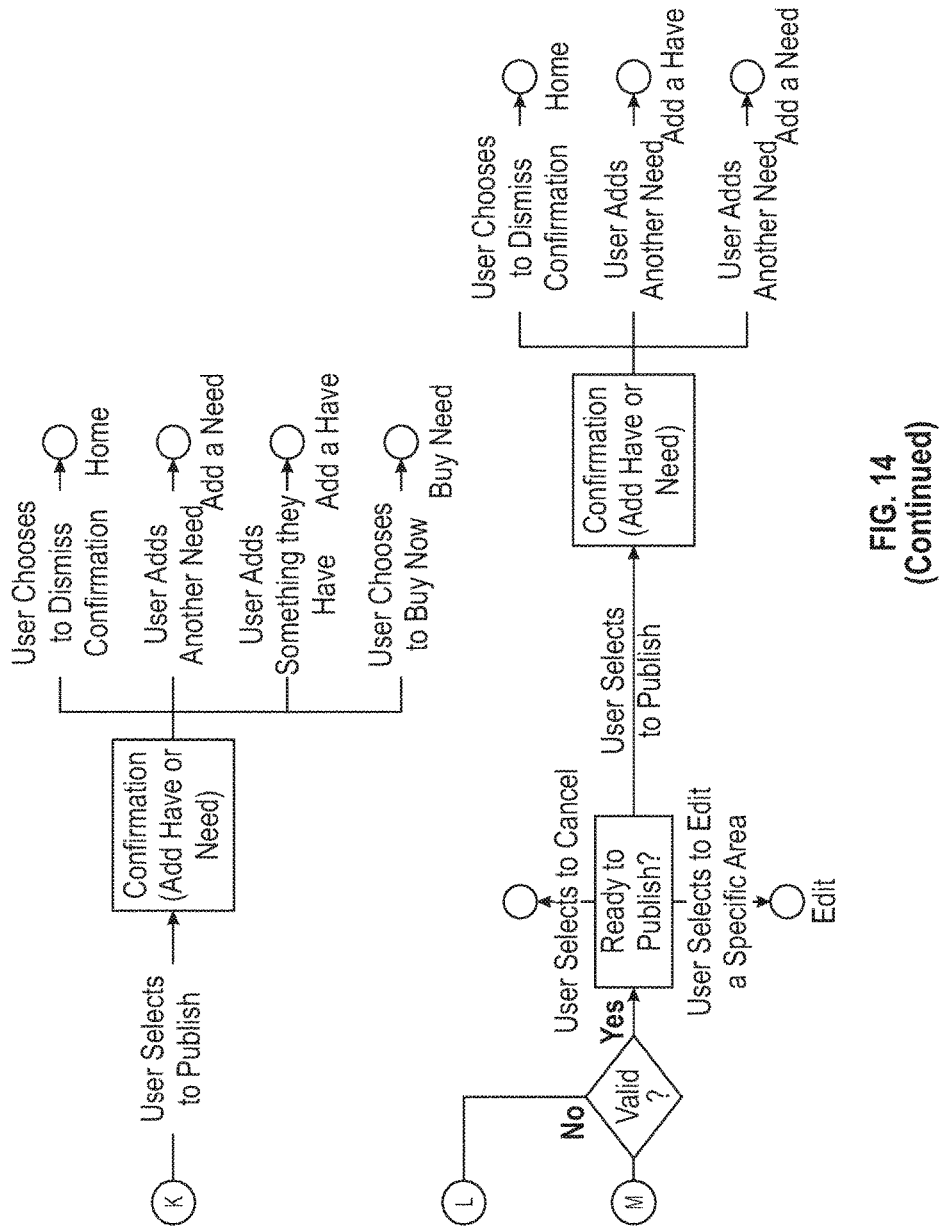

Referring now to FIG. 14, a New Member Add Need Diagram in one embodiment of the multi-party dynamic bartering network is illustrated. In this logic diagram, a member begins the process of adding a "User Need." The User goes through a similar procedure for adding a "Need" as the procedure described above for adding a "Have" (with minor modifications as shown in FIG. 14).

Figure 15:
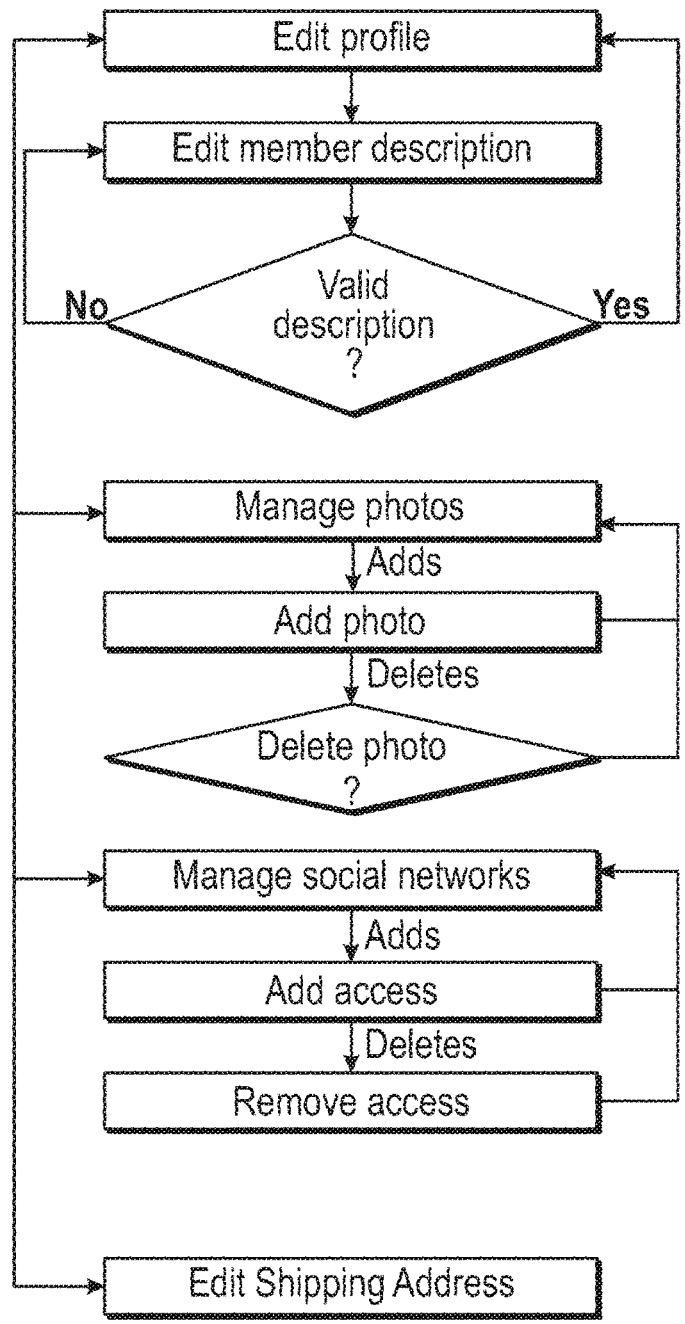
FIG. 15 illustrates a Member Edit Profile Diagram in the multi-party dynamic bartering network.

FIG. 15 displays a Member Edit Profile Diagram in one embodiment of the multi-party dynamic bartering network. This edit profile logic diagram demonstrates how a User may edit the User description, manage photos, manage the affiliates with social networks, and edit shipping addresses.

Figure 16:
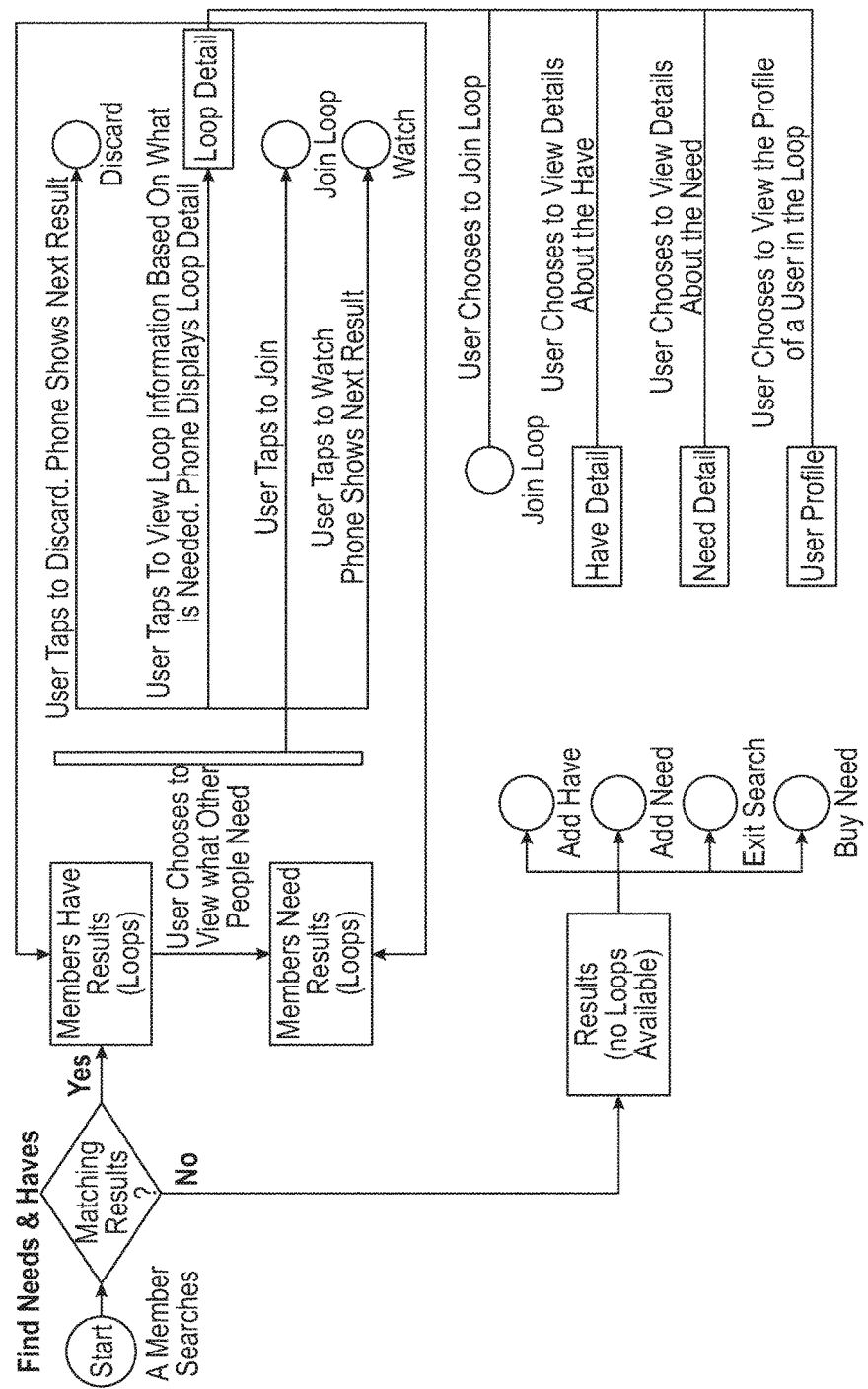
FIG. 16 illustrates a Member Find Needs & Haves Diagram in the multi-party dynamic bartering network.

As shown in FIG. 16, a Member Find Needs & Haves Diagram in one embodiment of the multi-party dynamic bartering network illustrates how a member searches for Haves and Needs. In this logic diagram, when a member begins the process of searching for a Haves and/or Needs, either receives matching results (i.e., member matches for the searched Haves and/or Needs) or no matching results (i.e., no member matches for the searched Haves and/or Needs). The member matches for the searched Haves and/or Needs are presented as "Loops." The User can then select to view Loop information based on what is needed by the User for each Loop in the search results. Additionally, the User can select to (1) watch a Loop, (2) discard a Loop, or (3) join a Loop. Each open Loop (i.e., non-closed Loop that still requires one or more threads to close) may contain one or more threads (and associated other Users). The searching User may choose to view the User Profiles of the other Users associated with the threads to determine which Loop, if any, the searching User wishes to join. If the searching User decides to watch a Loop, the user may then later choose to join the Loop or discard the Loop. In one embodiment, the User may select to discard the Loop with a finger slide in one direction or choose to join the Loop with a finger slide in the other direction.

Figure 17:
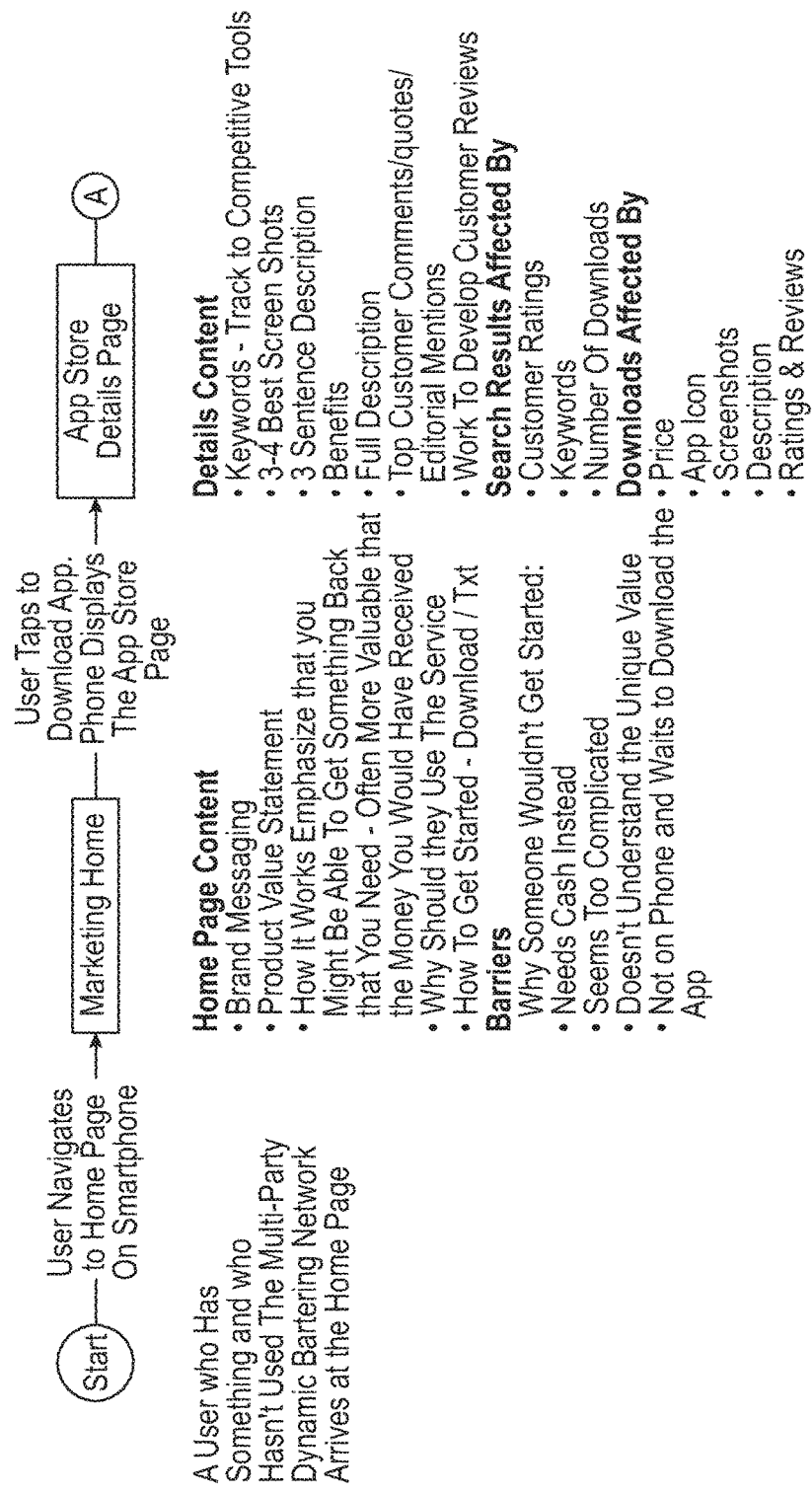
FIG. 17 illustrates a New User Has Something Diagram in the multi-party dynamic bartering network.
Figure 17:
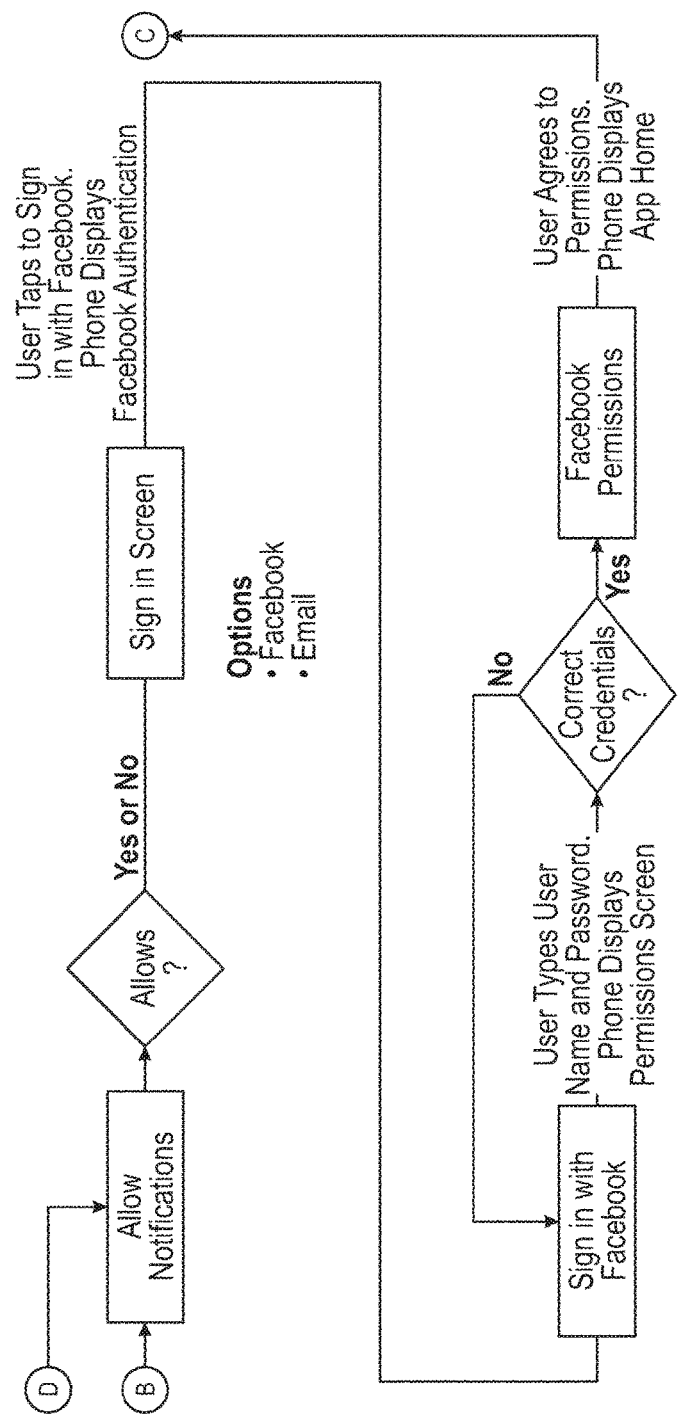
Figure 17:
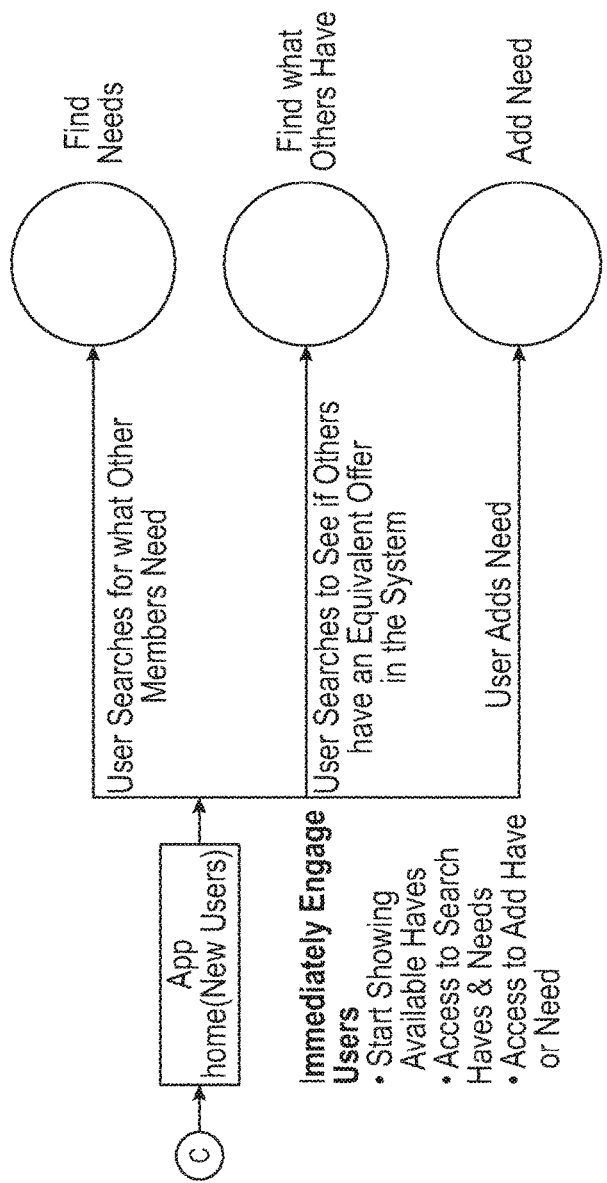

FIG. 17 illustrates a logic diagram for a new user who "has something" (to barter) in one embodiment of the multi-party dynamic bartering network. This logic diagram shows the process that an individual who is not a member/user of the multi-party dynamic bartering network goes through to join and use the network. First, the non-member navigates to a homepage of the multi-party dynamic bartering network using a smartphone, tablet, or other computer (each of which contain one or more processors and memory containing software that is executed thereon). Next, the non-member selects the application to download and the smartphone then displays the App Store page. The individual then selects the application and the smartphone displays a password/touch ID dialog prompt. The individual then provides the password/touch ID. If this information is accepted as correct then the application downloads from the App Store and opens on the now User's phone. The User's phone displays an initial splash screen and then auto-advances to introduction panels that explain the multi-party dynamic bartering network to the new User.

Figure 19:
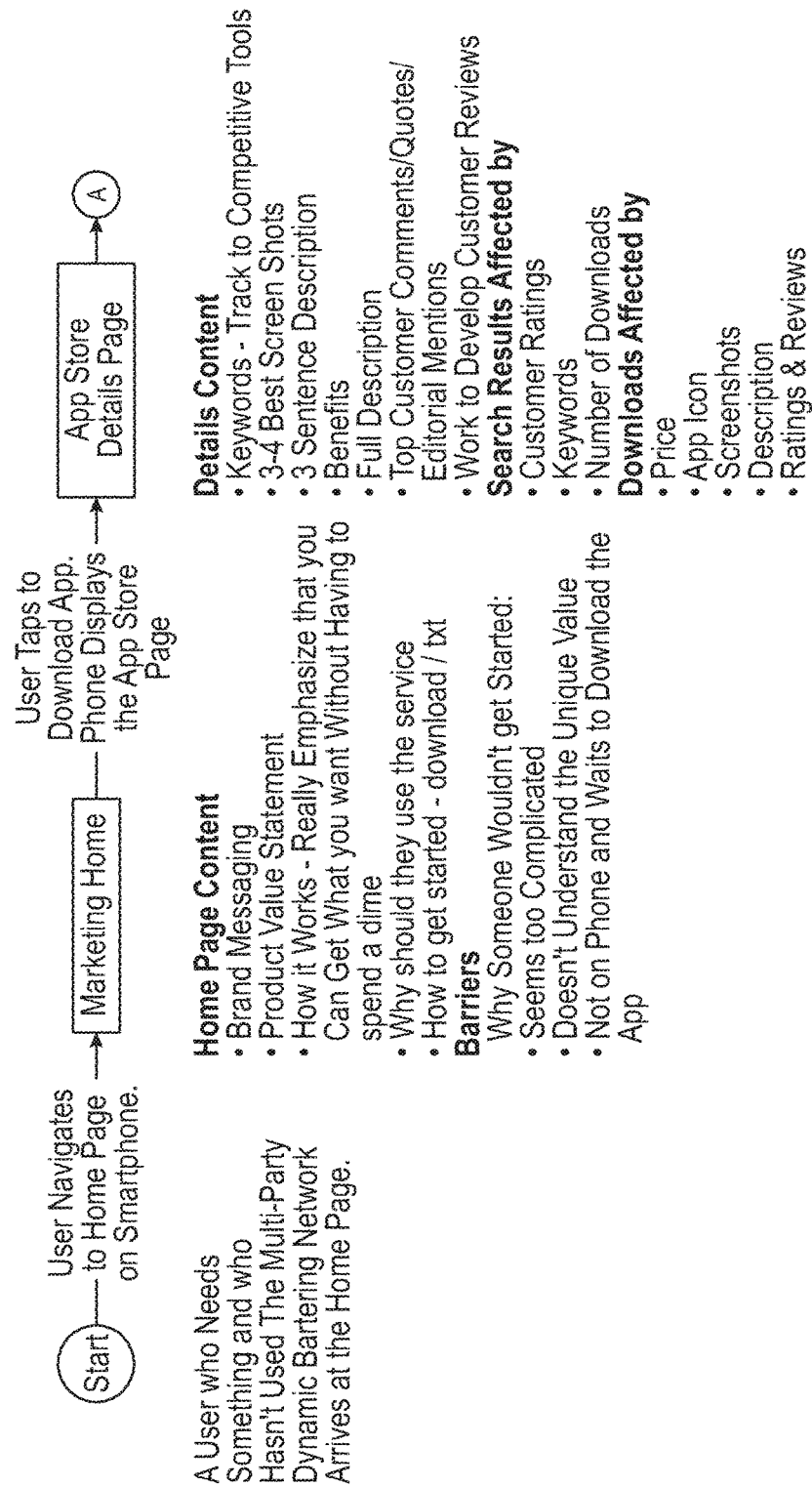
FIG. 19 illustrates a New User Has Something Diagram in the multi-party dynamic bartering network
Figure 19:
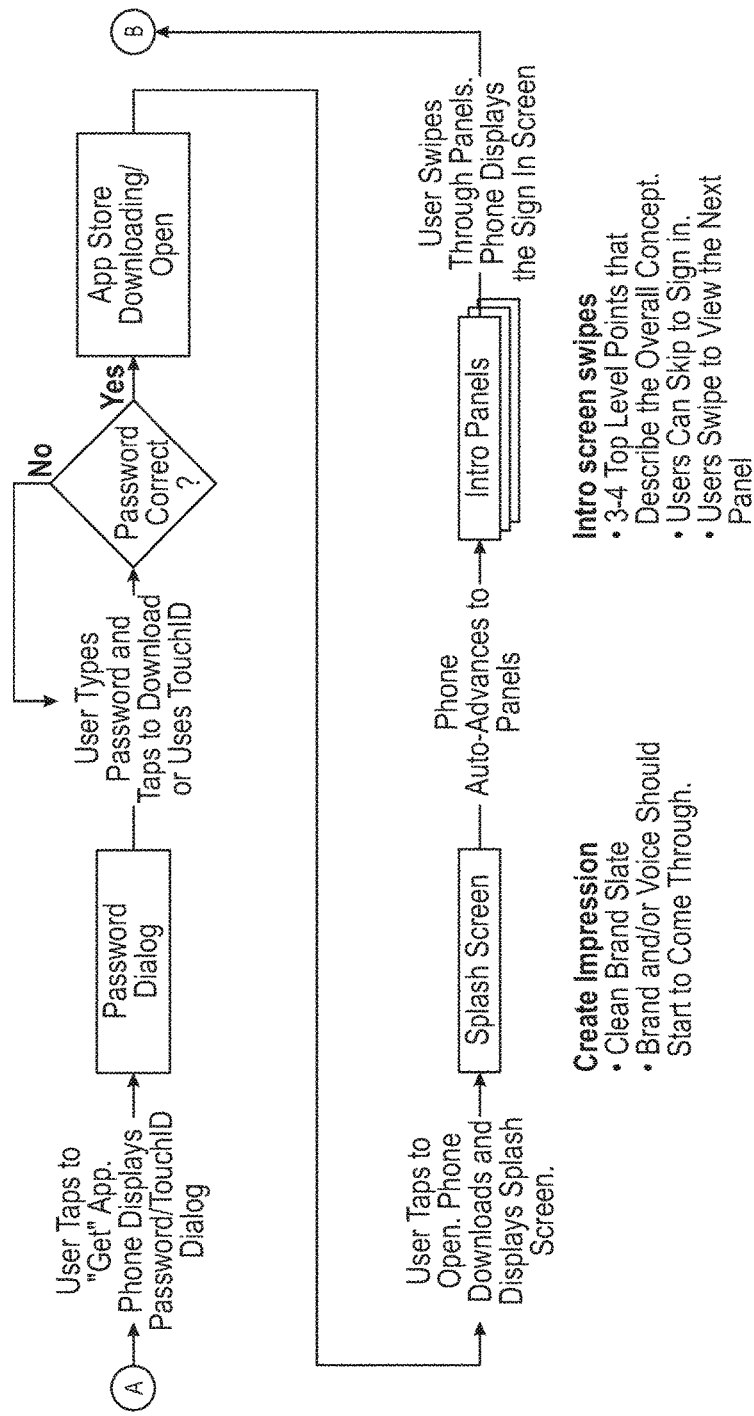
Figure 19:
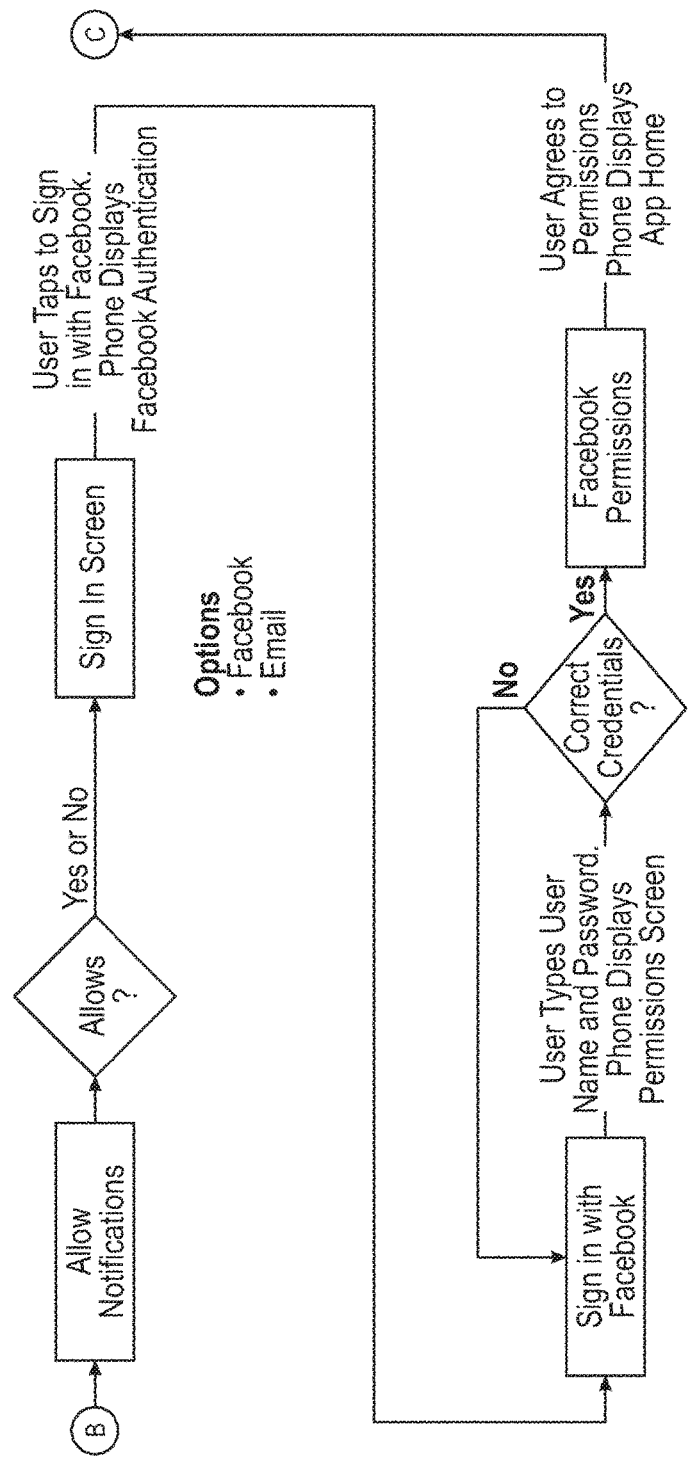
Figure 19:
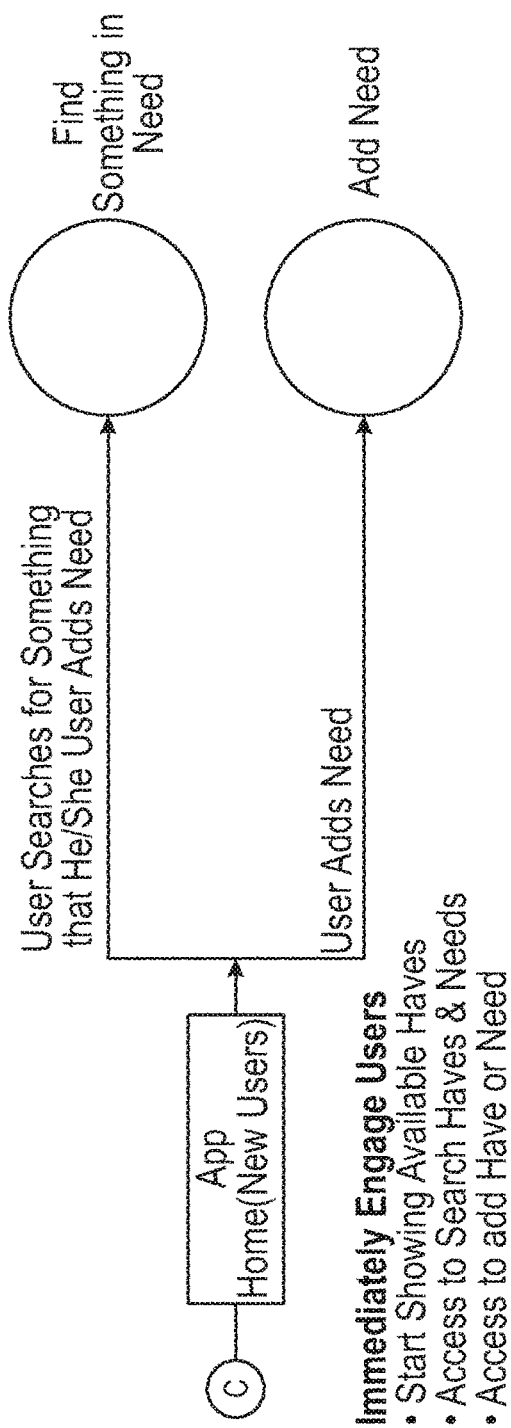

Continuing, in this logic diagram the User swipes through the panels and then the application on the phone displays a sign-in screen. In one embodiment, the individual is prompted to allow notifications and then proceeds to a sign-in screen. The User is able to create his or her own user name and password or use the sign-in protocol from a social media account (e.g., Facebook, Google, or the like). The User then authenticates itself with one of the above-described methods using the proper permissions and/or credentials. The application then displays a home page for New Users where the New User is able to immediately engage other Users (e.g., start entering available "Haves," start entering "Needs," start searching "Haves" and "Needs," and start watching, joining, and/or viewing details for Loops (for which the New User can enter as a "Thread"). User can also search for what other members need or search to see if other users have an equivalent offer in the system. Referring now to FIG. 19, a logic diagram for a new user who "needs something" is shown in the multi-party dynamic bartering network. The new user who "needs something" goes through a similar procedure to that described above for adding new user who "has something" to barter.

Figure 18:
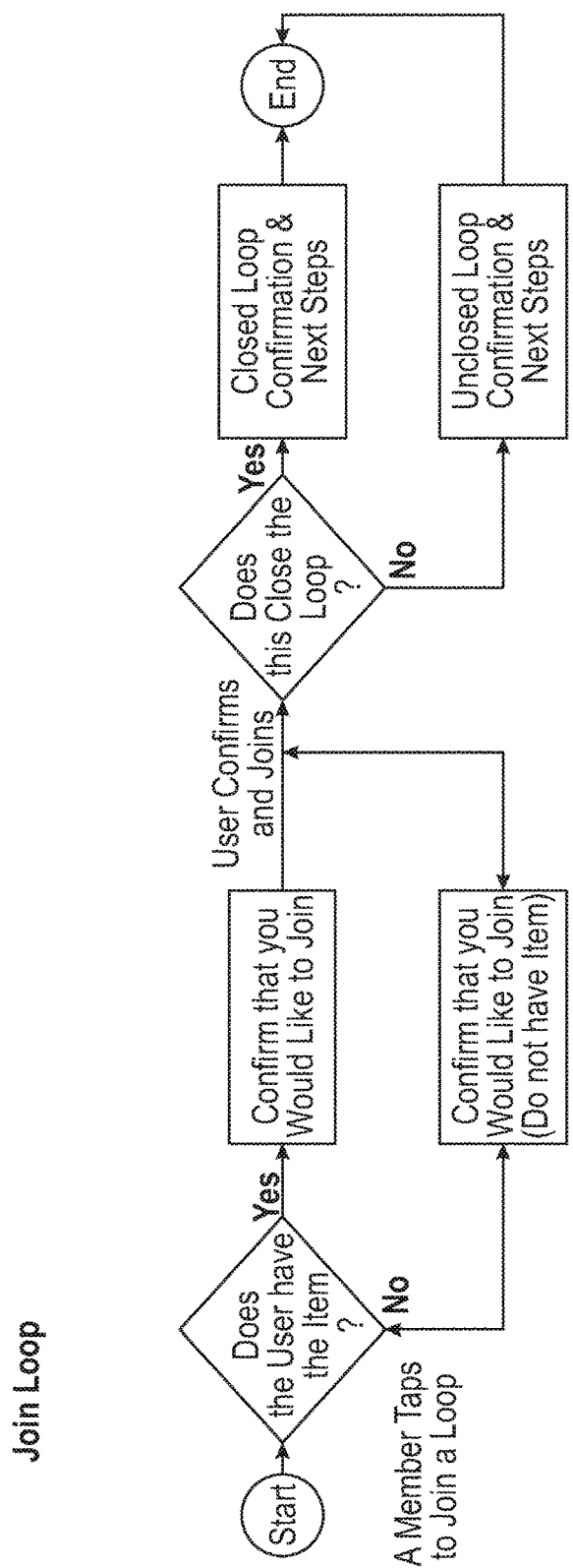
FIG. 18 illustrates a Join Loop Diagram in the multi-party dynamic bartering network.

FIG. 18 shows a logic diagram for Joining a Loop in one embodiment of the multi-party dynamic bartering network. In this embodiment, a User selects to Join a Loop. Either the User confirms that he/she has the Item requested in Loop or the User confirms that he/she does not have the Item requested in Loop. The multi-party dynamic bartering network then determines if the Loop has been closed. If the User entering the Loop confirmed that he/she has the Item requested in Loop, then the Loop will close and confirmation (as well as instructions for the next steps) will be sent to the members in the closed Loop. However, if the User entering the Loop confirmed that he/she does not have the Item requested in Loop, then the Loop will not close. Again, confirmation of the Loop not closing (as well as instructions for the next steps) will be sent to the members in the unclosed Loop.

Figure 20:
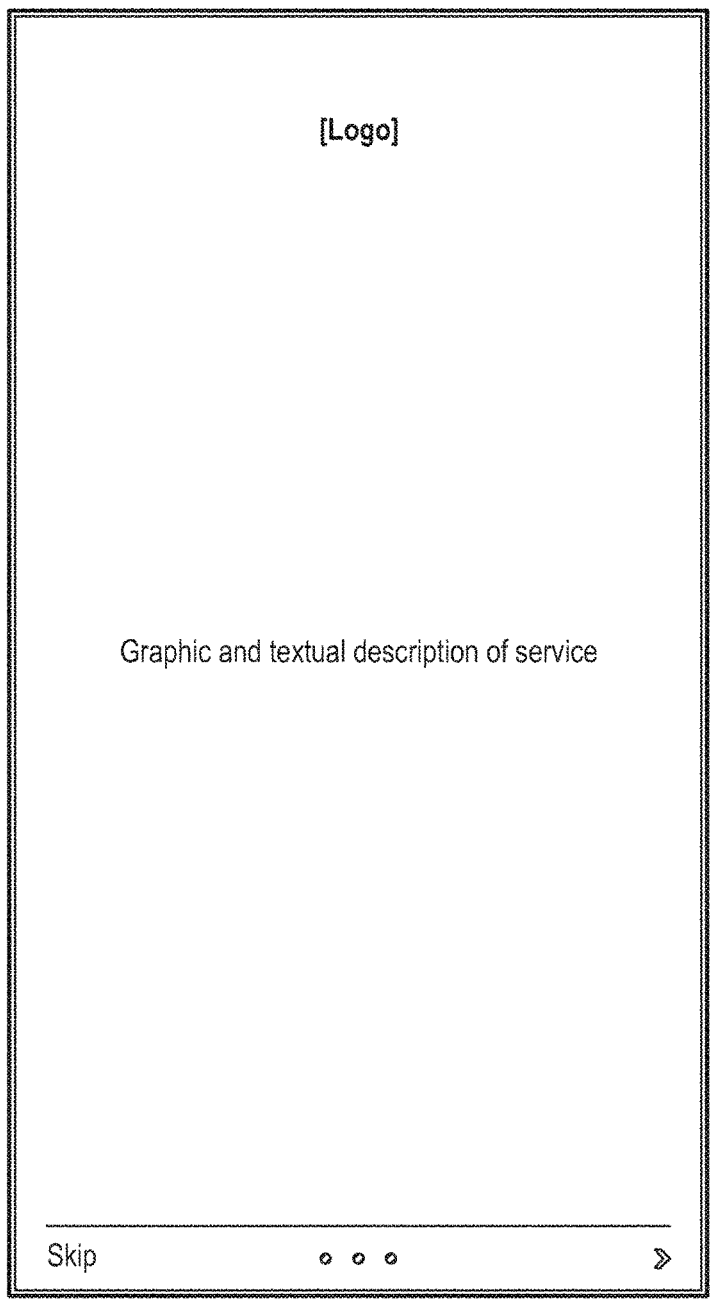
FIG. 20 illustrates an Introduction page with a graphical and textual description of the multi-party dynamic bartering network.
Figure 21:
FIG. 21 illustrates a User Facebook sign-in security page in the multi-party dynamic bartering network.
Figure 22:
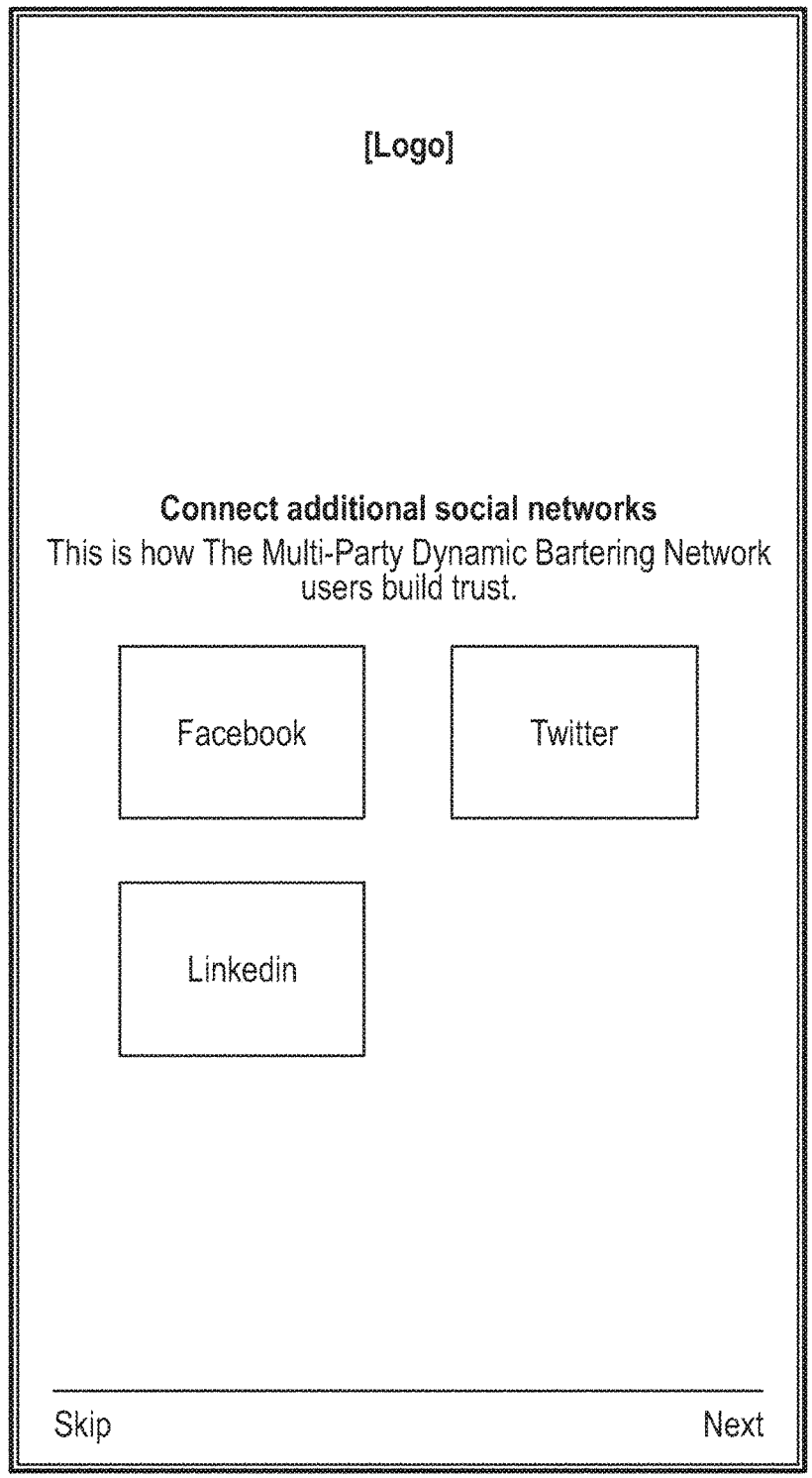
FIG. 22 illustrates a User Add Social Network page in the multi-party dynamic bartering network.

Referring now to FIG. 20, an introduction page with a graphical and textual description of the multi-party dynamic bartering network is illustrated. In some embodiments, this is the New User home page described above. FIG. 21 shows the user Facebook sign-in security page in the multi-party dynamic bartering network, as described above. As shown in FIG. 22, a User Social Network page in the multi-party dynamic bartering network enables a User to connect additional social networks (e.g., Facebook, LinkedIn, Twitter, and the like) as a method of building trust between Users since they are able to learn more about the people with whom they are potentially bartering in the multi-party dynamic bartering network. Continuing, FIG. 23 shows a User Add Motto page in the multi-party dynamic bartering network that enables a User to add a motto that helps other Users become familiar with the new User.

Figure 24:
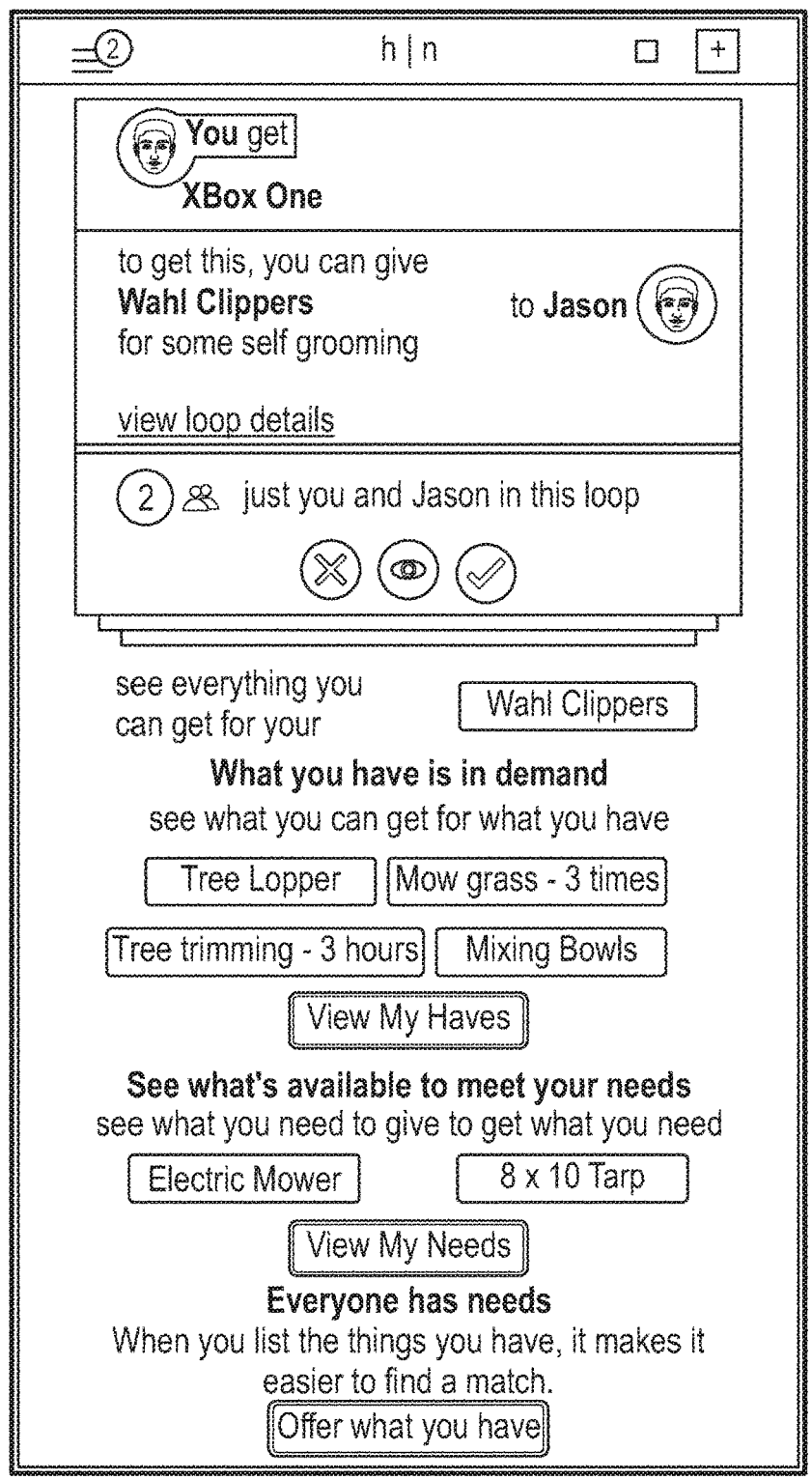
FIG. 24 illustrates a User Home page (with a smaller loop) in the multi-party dynamic bartering network.
Figure 25:
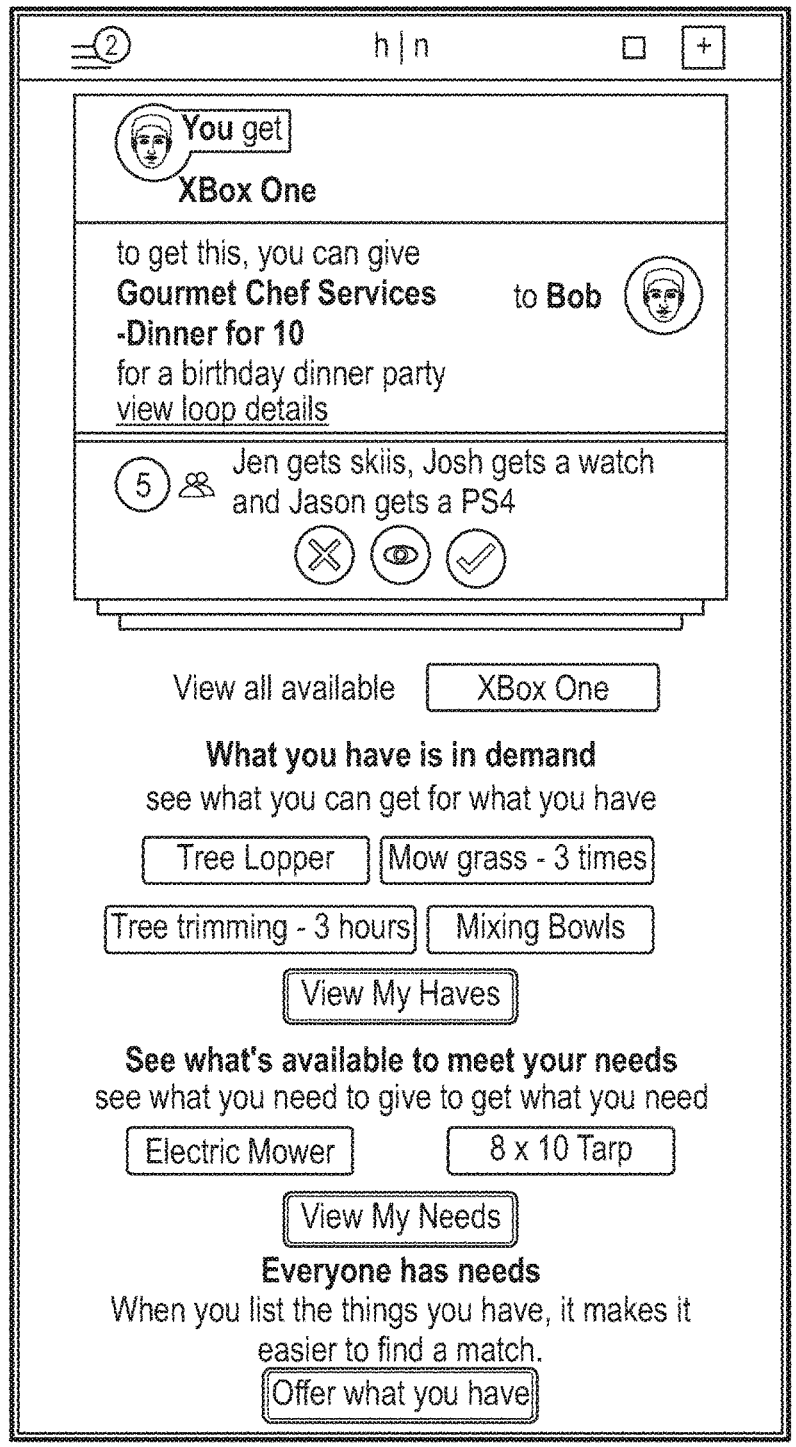
FIG. 25 illustrates a User Home page (with a larger loop) in the multi-party dynamic bartering network.

In one embodiment shown in FIG. 24, a User Home page in one embodiment of the multi-party dynamic bartering network may have a small number of "threads," and thus, a smaller Loop. In another embodiment FIG. 25, a User Home page in the multi-party dynamic bartering network may have a larger number of "threads," (five) and thus, a larger Loop. The User Home page shows the "Haves" of the User, the "Needs" of the User, demands in the system for what the User "has," and what is available in the system to meet the User's "Needs." FIGS. 24 and 25 also show the Loop(s) that the User is currently in, as well as enabling the User to select to decline, watch, or confirm the Loop. The User Home page also provides a link to view Loop details.

Figure 26:
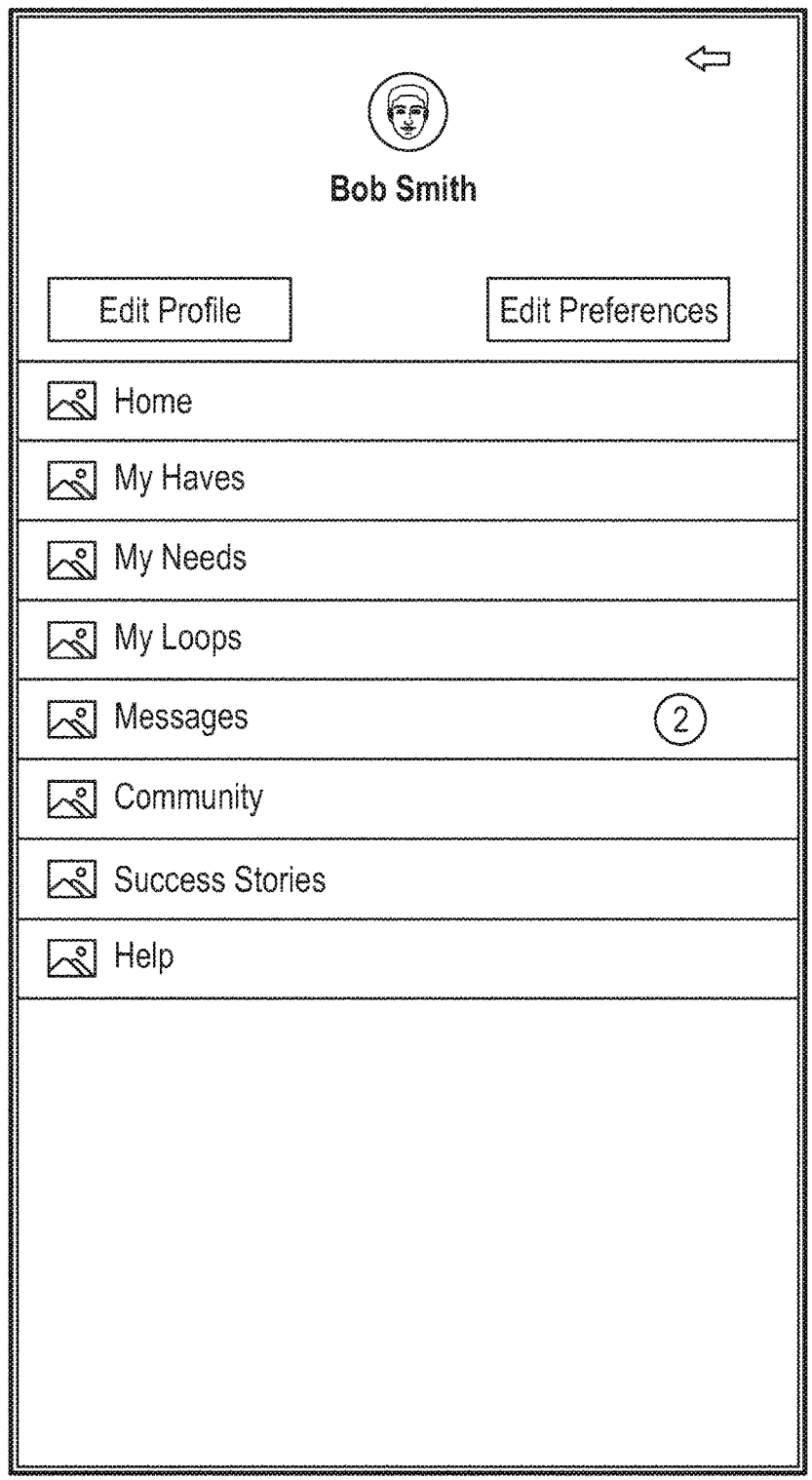
FIG. 26 illustrates a Navigation Menu page (with User Profile) in the multi-party dynamic bartering network.
Figure 27:
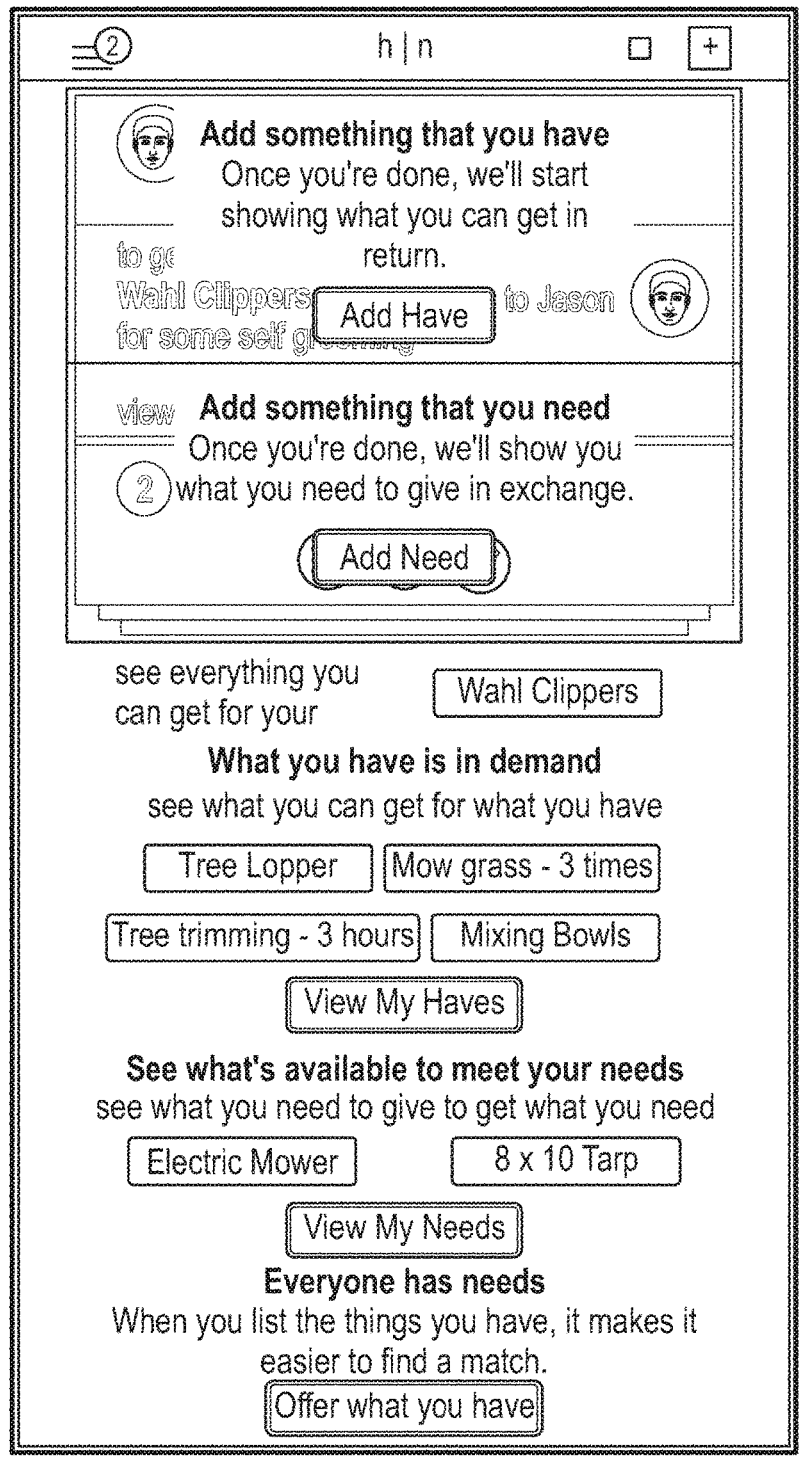
FIG. 27 illustrates a User Have Need Overlay page in the multi-party dynamic bartering network.

Referring now to FIG. 26, a Navigation Menu page with a User Profile is shown for one embodiment of the multi-party dynamic bartering network. The User Profile shows various selectable parameters for the User including "My Haves," "My Needs," "My Loops," Messages, and Community. FIG. 27 shows a User Have Need overlay page in the multi-party dynamic bartering network.

Figure 28:
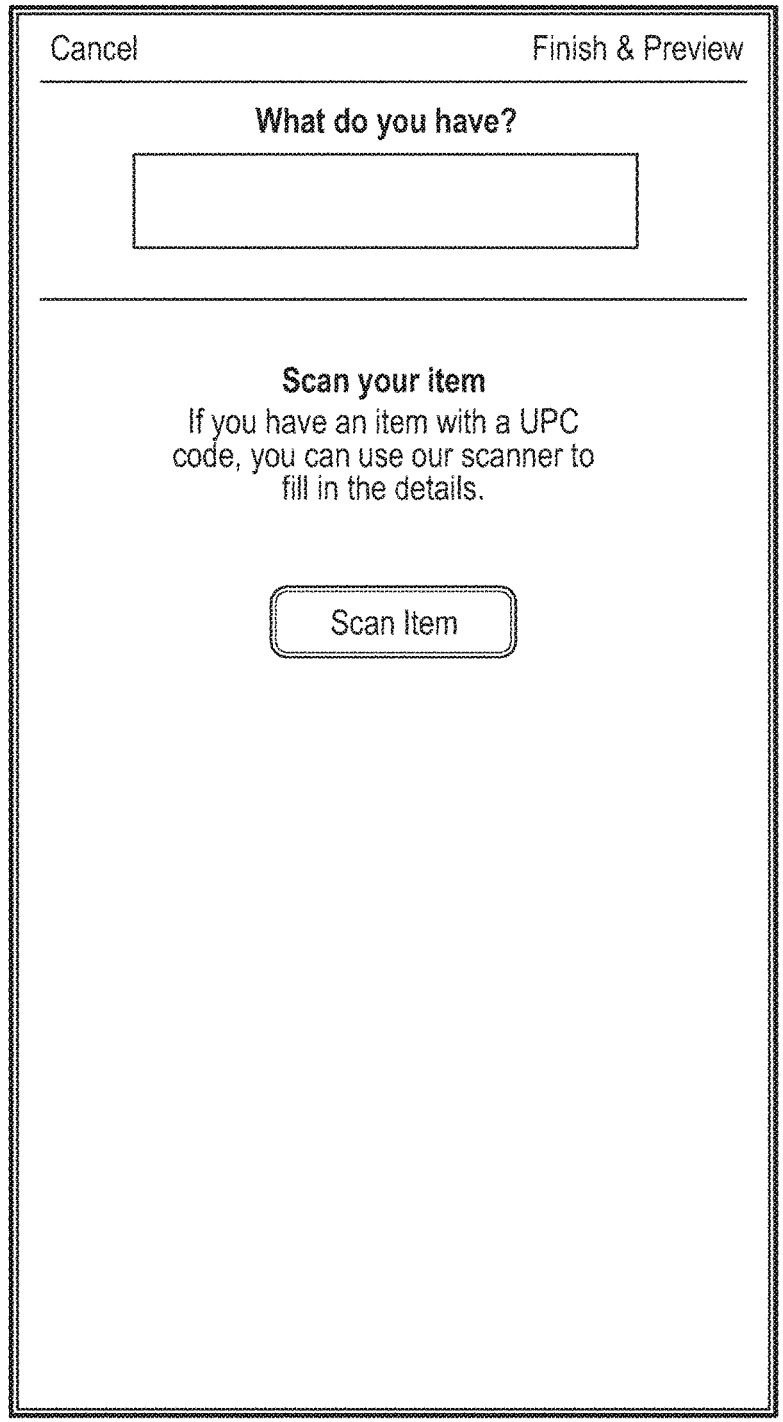
FIG. 28 illustrates a User Add Have Item page (with UPC code prompt) in the multi-party dynamic bartering network.
Figure 29:
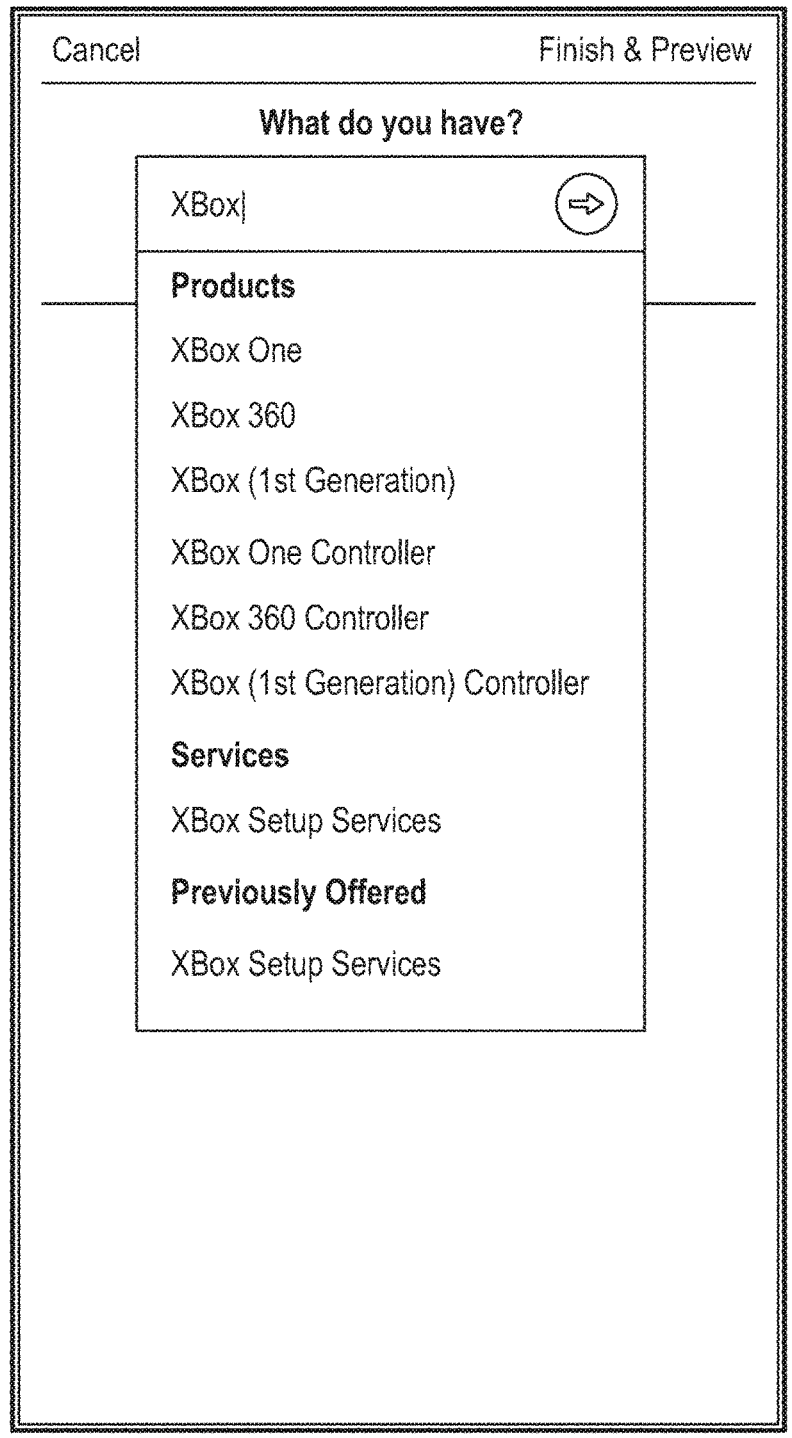
FIG. 29 illustrates a User Add Have Item page (with an Item category selection Auto-fill feature) in the multi-party dynamic bartering network.
Figure 30:
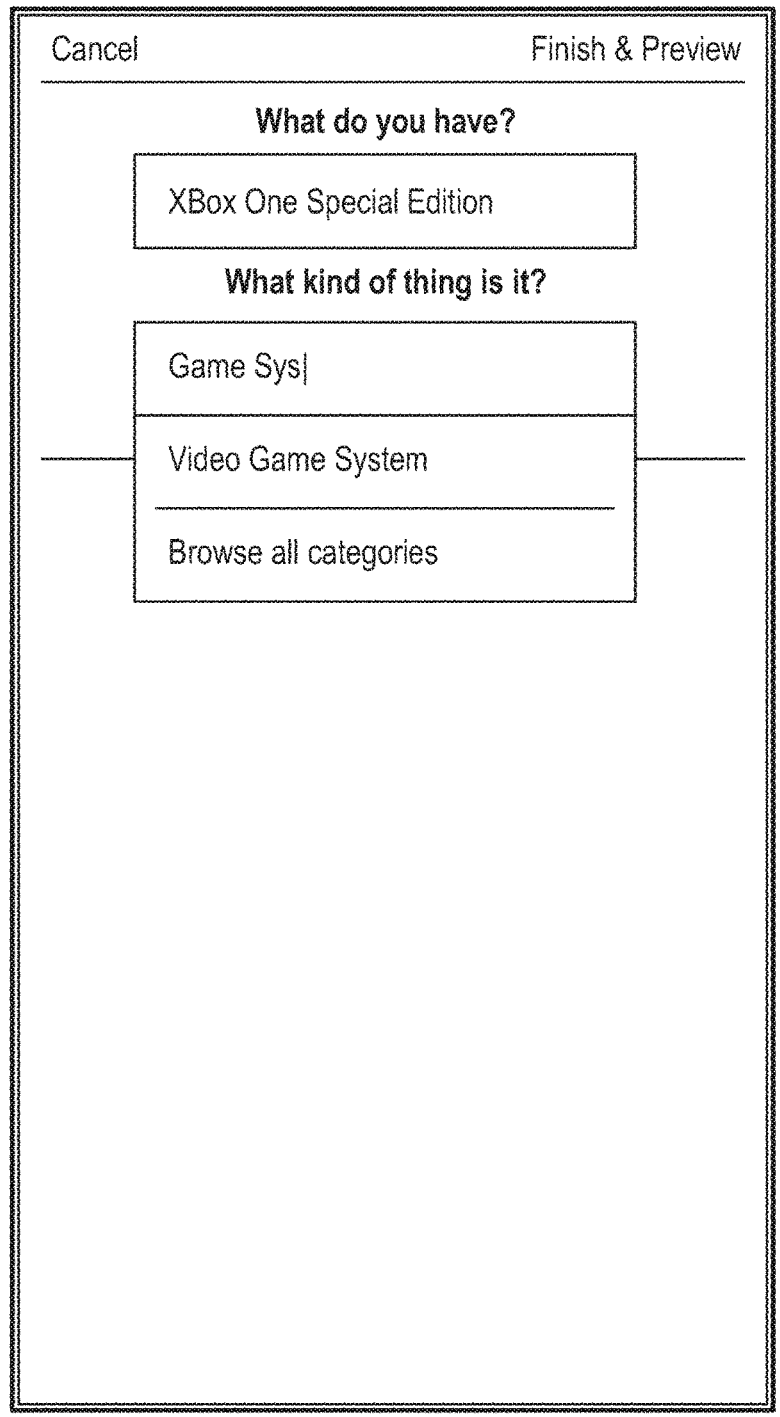
FIG. 30 illustrates a User Add Have Item page (with an Item category selection prompt) in the multi-party dynamic bartering network.

In one embodiment shown in FIG. 28, a User Add Have Item page (with UPC code prompt) is shown for one embodiment of the multi-party dynamic bartering network. From this page the User may choose to scan an Item by using the scanner tool of a smart phone to scan a UPC code, as described above with respect to FIG. 13. A User may add a "Have" item using an Item category selection Auto-fill feature in the multi-party dynamic bartering network (See FIG. 29). A User may also add a "Have" item using an Item category selection prompt (or a browse all prompt) in the multi-party dynamic bartering network (See FIGS. 30 and 31).

Figure 32:
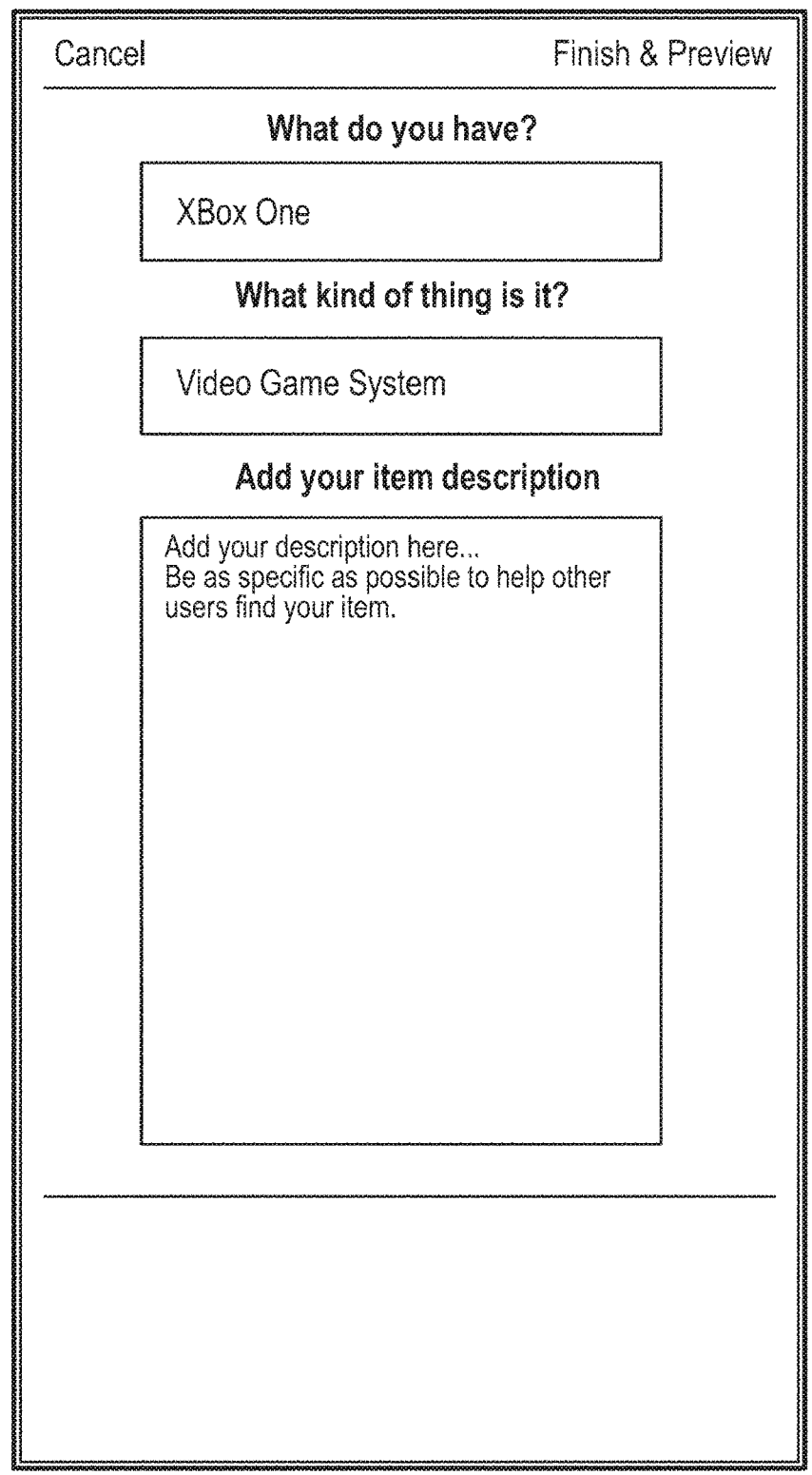
FIG. 32 illustrates a User Add Have Item page (with an Item description prompt) in the multi-party dynamic bartering network.
Figure 33:
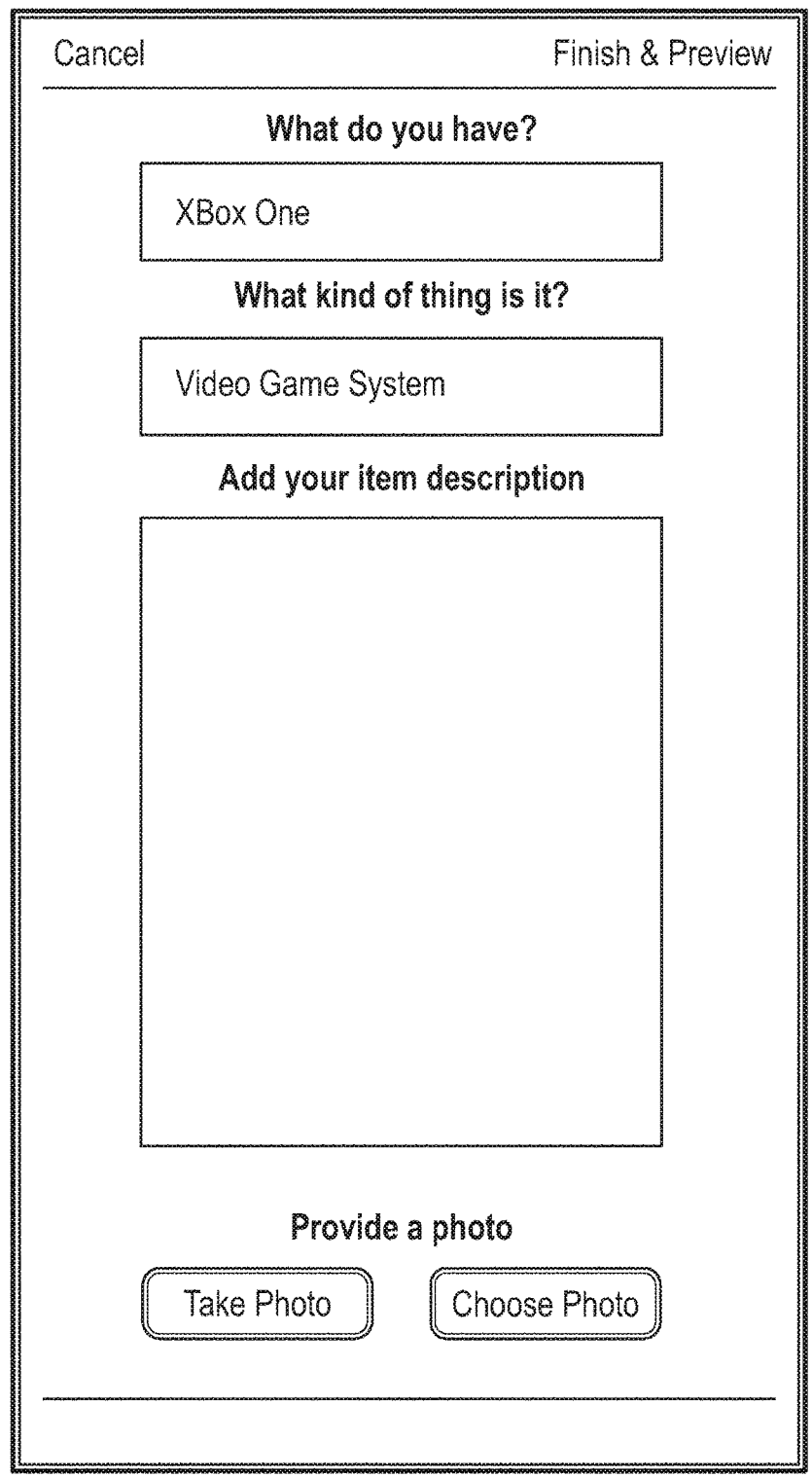
FIG. 33 illustrates a User Add Have Item page (with an item photo prompt) in the multi-party dynamic bartering network.
Figure 34:
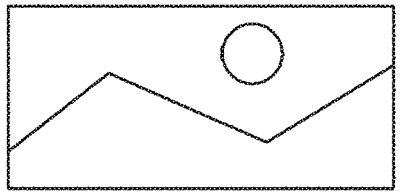
FIG. 34 illustrates a User Add Have Item page (with an Item quantity selection prompt) in the multi-party dynamic bartering network.
Figure 36:
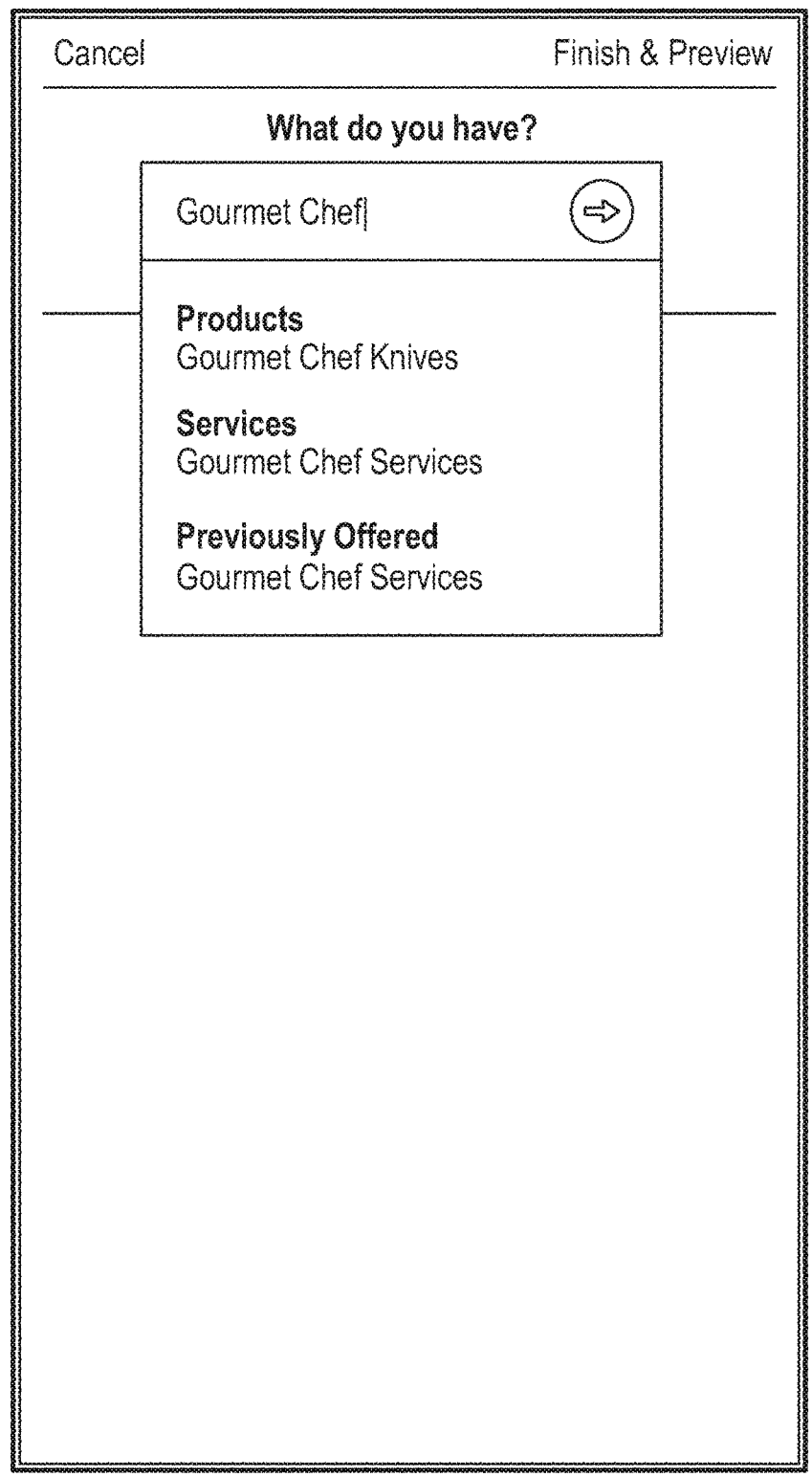
FIG. 36 illustrates a User Add Have Service page (with a service category selection Auto-fill feature) in the multi-party dynamic bartering network.
Figure 37:
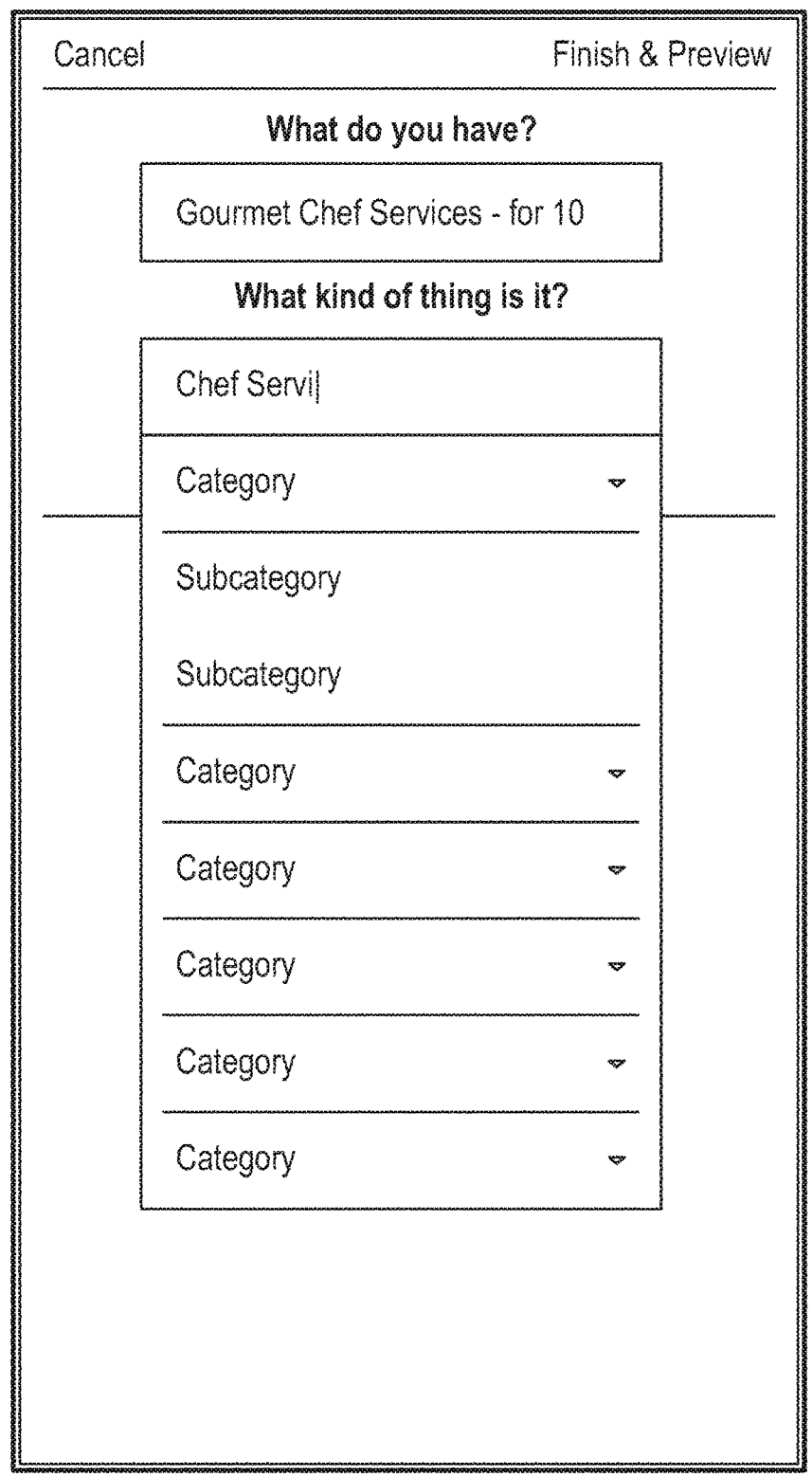
FIG. 37 illustrates a User Add Have Service page (with a service category selection "Browse All" prompt) in the multi-party dynamic bartering network.
Figure 42:
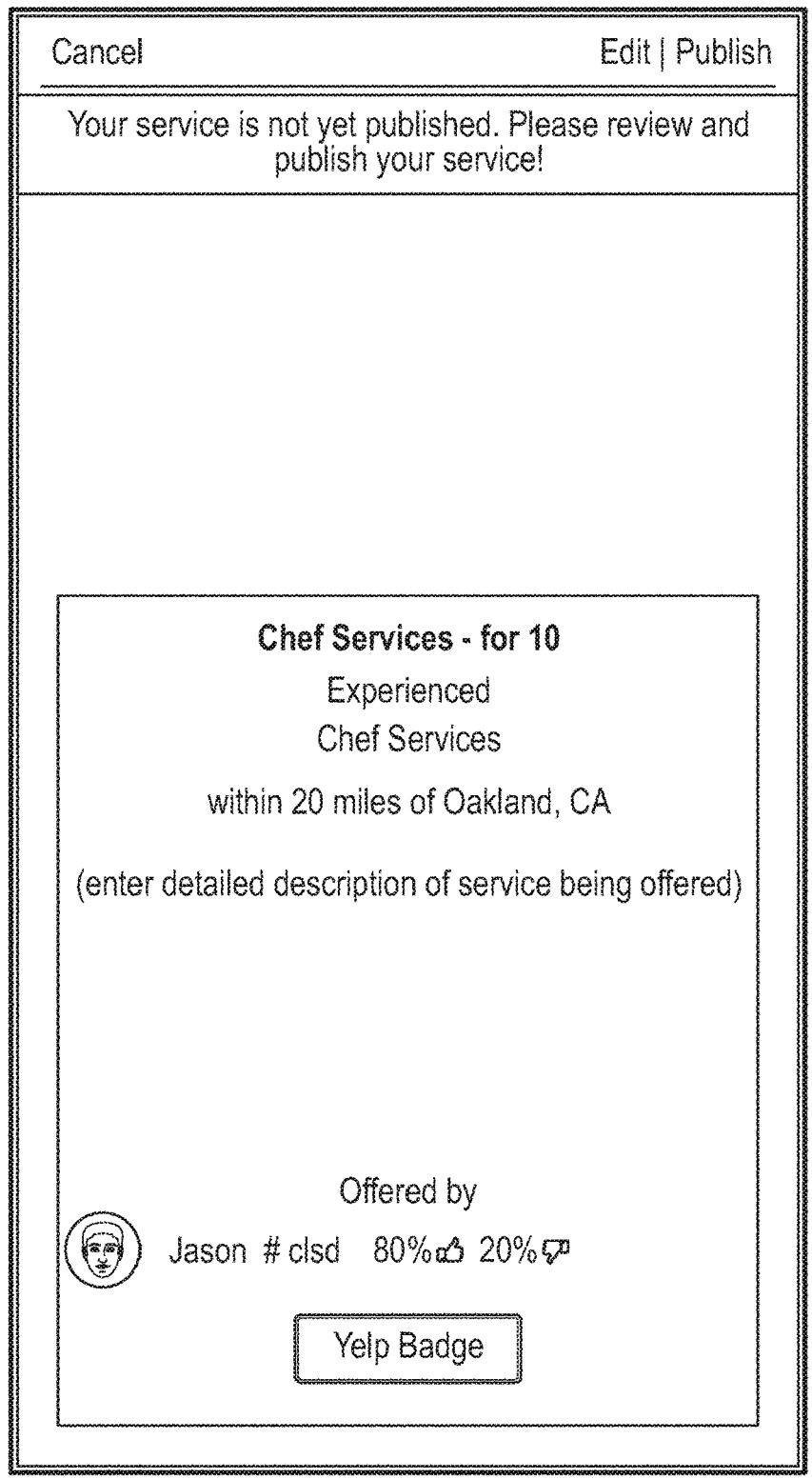
FIG. 42 illustrates a User Add Have Service Preview page (with a detailed description prompt) in the multi-party dynamic bartering network.

In an embodiment of the multi-party dynamic bartering network shown in FIG. 32, a User Add Have Item page is shown with an Item description prompt. An Item photo prompt may also be included in some embodiments (See FIG. 33). In another aspect, an Item quantity selection prompt is also included in the multi-party dynamic bartering network (See FIG. 34). Continuing, FIG. 35 shows a User Add Have Item page with an Item condition selection prompt in the multi-party dynamic bartering network.

Figure 43:
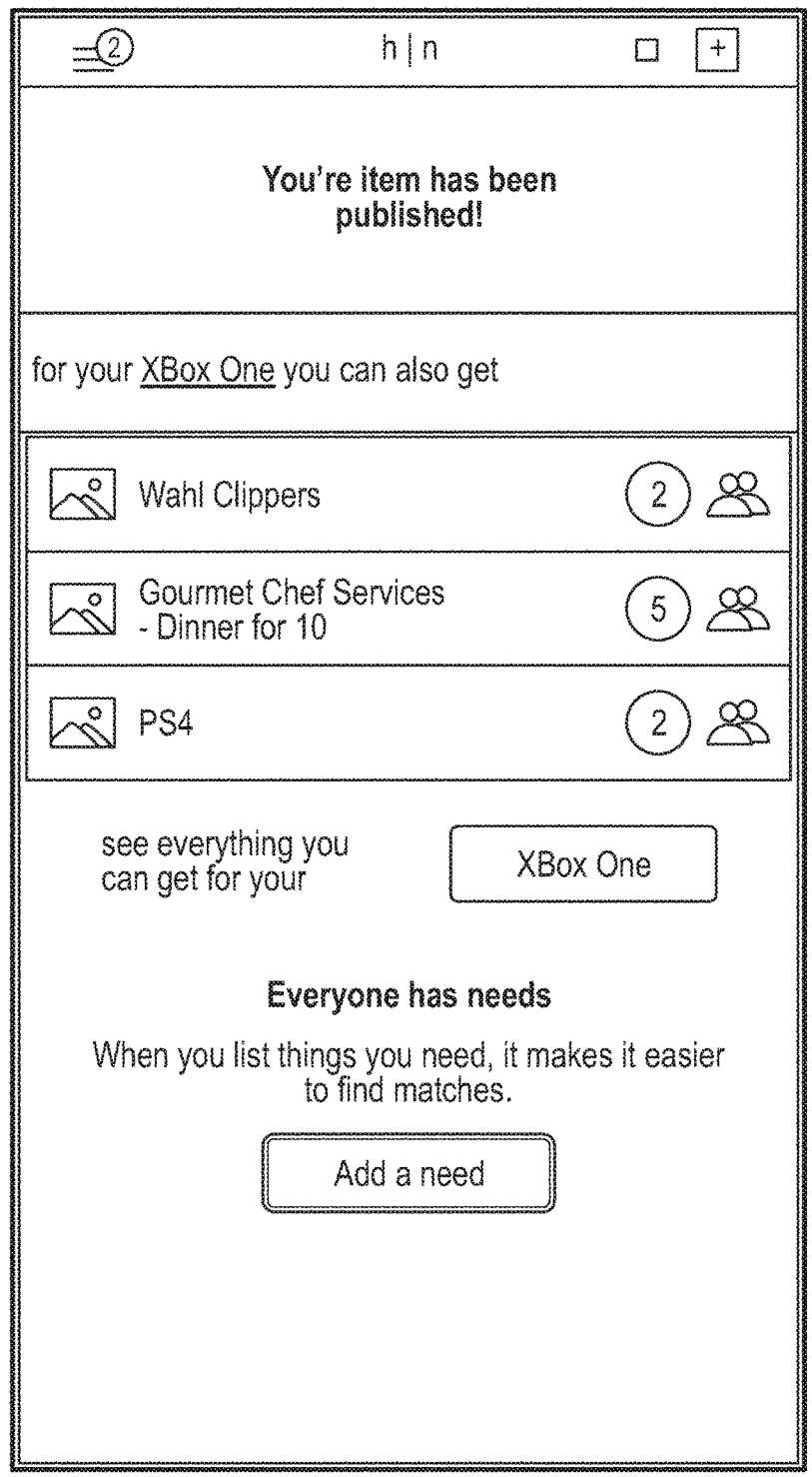
FIG. 43 illustrates a User Add Have Service Confirmation page in the multi-party dynamic bartering network.
Figure 44:
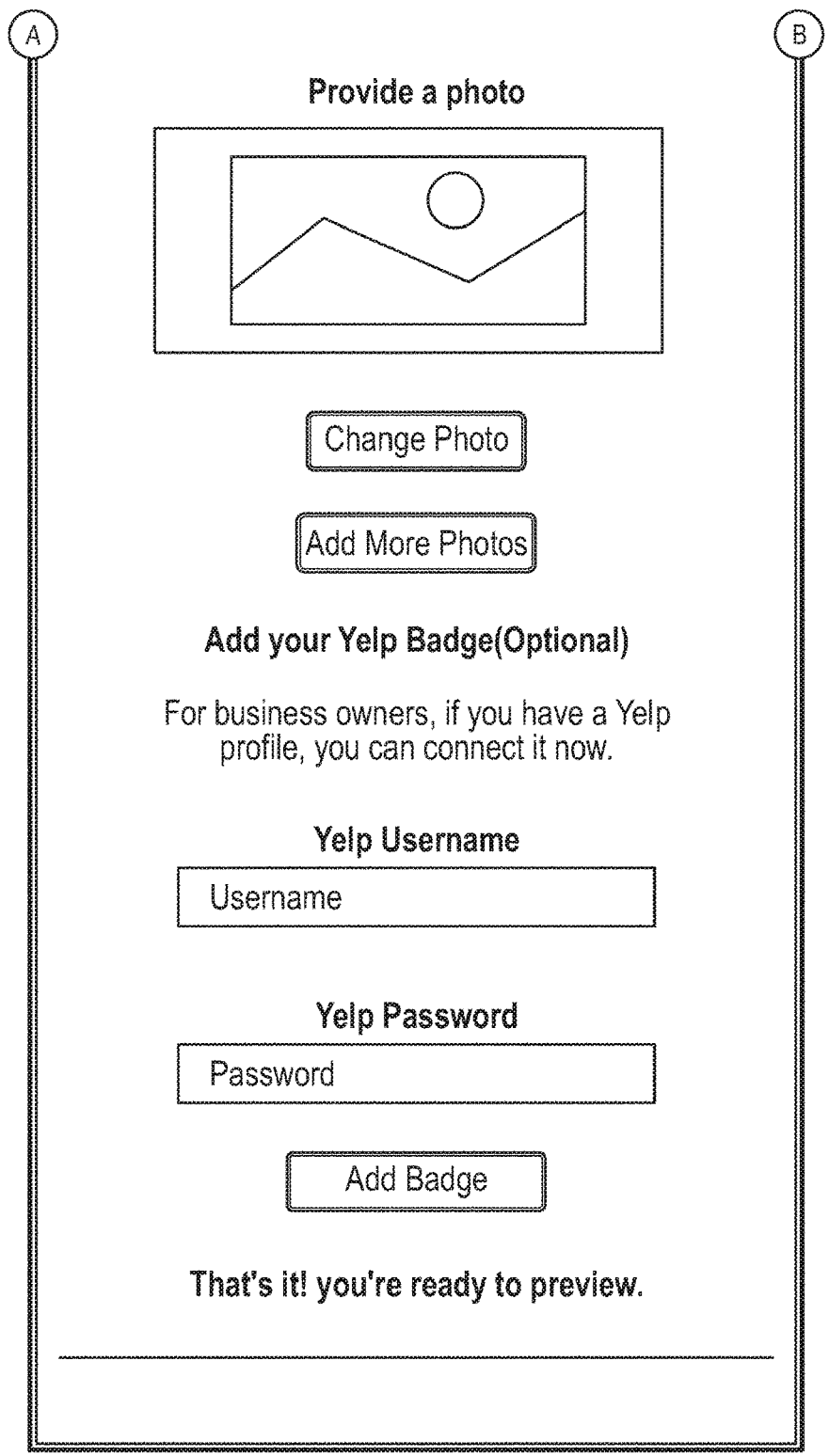
FIG. 44 illustrates a User Add Have Service page (with Yelp rating prompt) in the multi-party dynamic bartering network.
Figure 45:
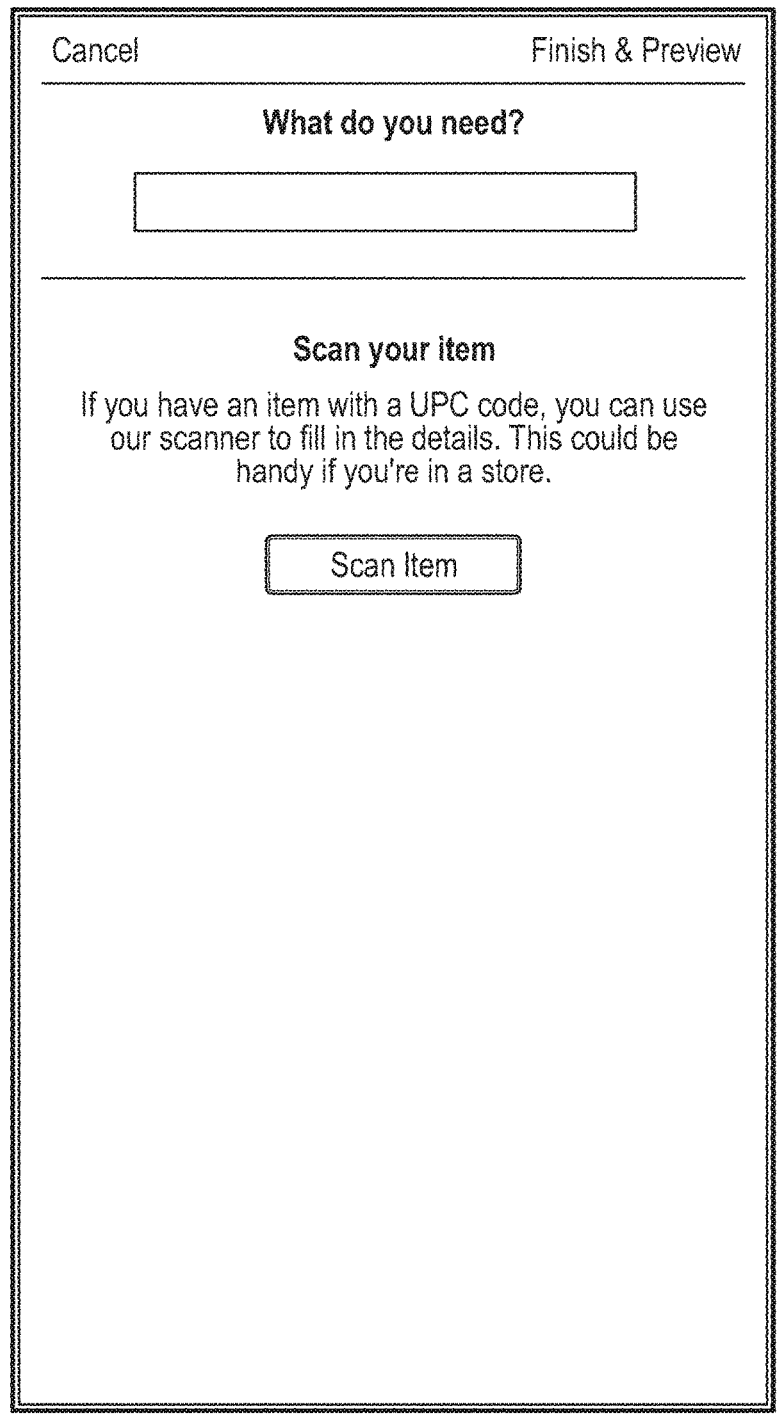
FIG. 45 illustrates a User Add Need page (with UPC code prompt) in the multi-party dynamic bartering network.
Figure 46:
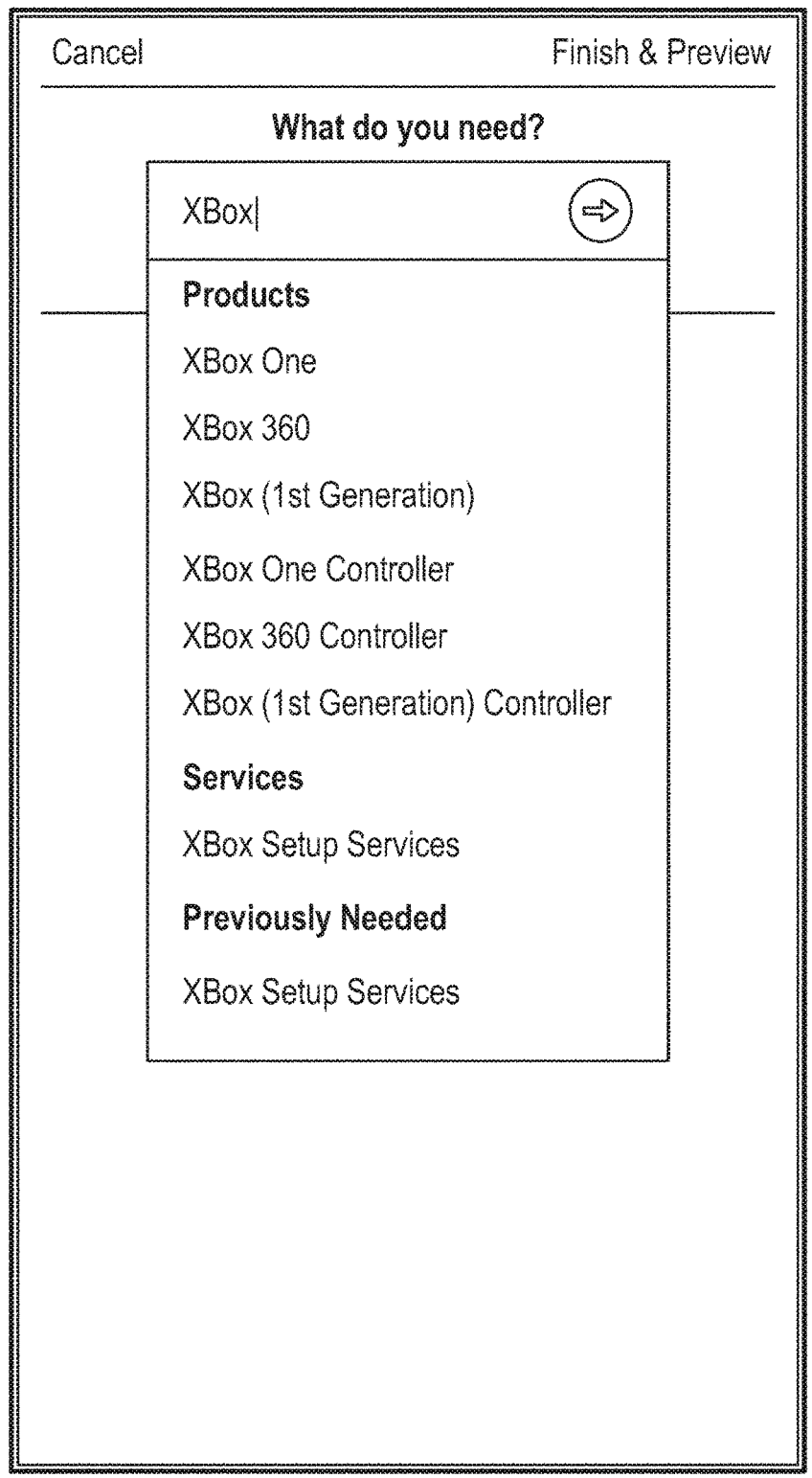
FIG. 46 illustrates a User Add Need page (with an item category Auto-fill feature) in the multi-party dynamic bartering network.
Figure 47:
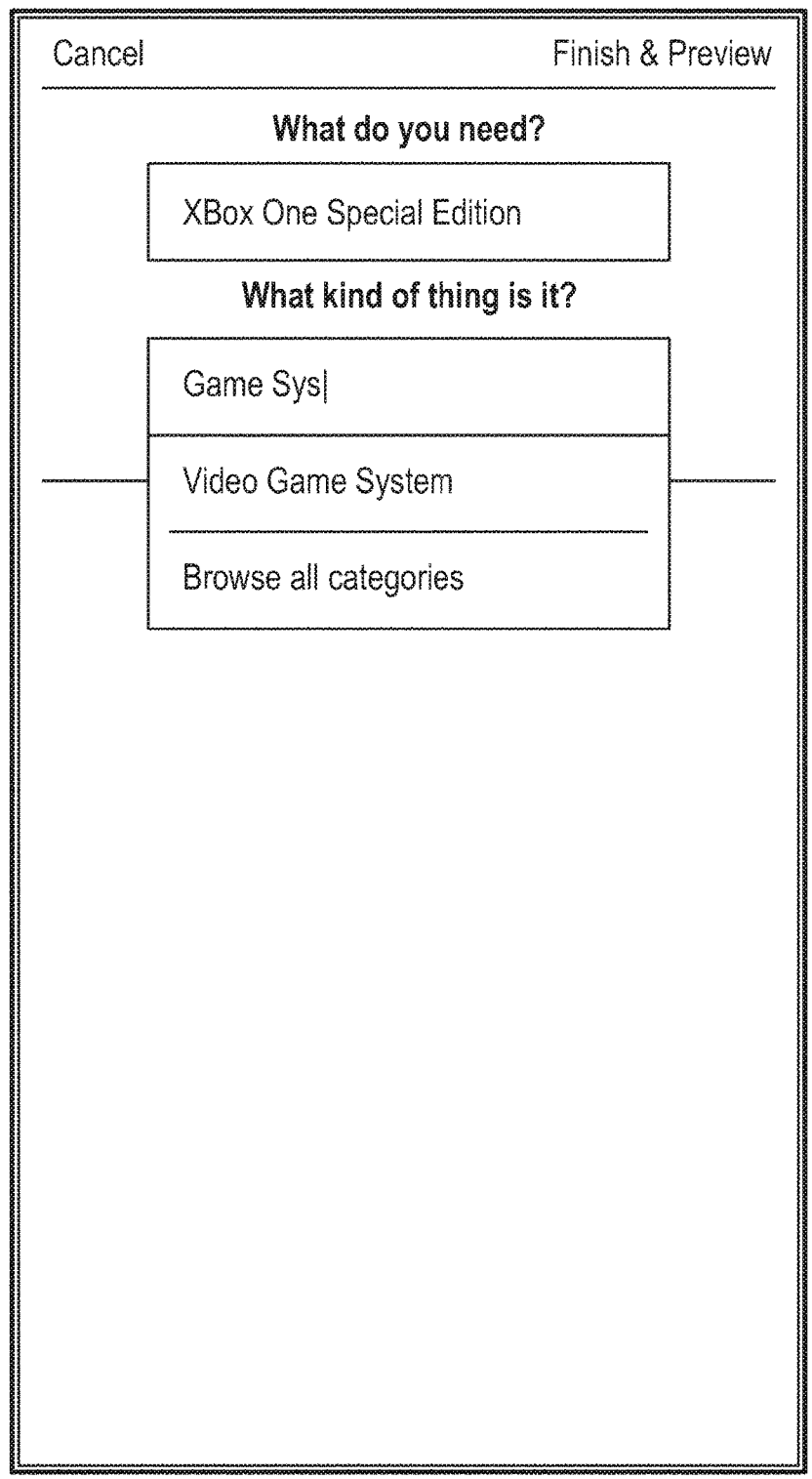
FIG. 47 illustrates a User Add Need page (with an item category prompt) in the multi-party dynamic bartering network.
Figure 48:
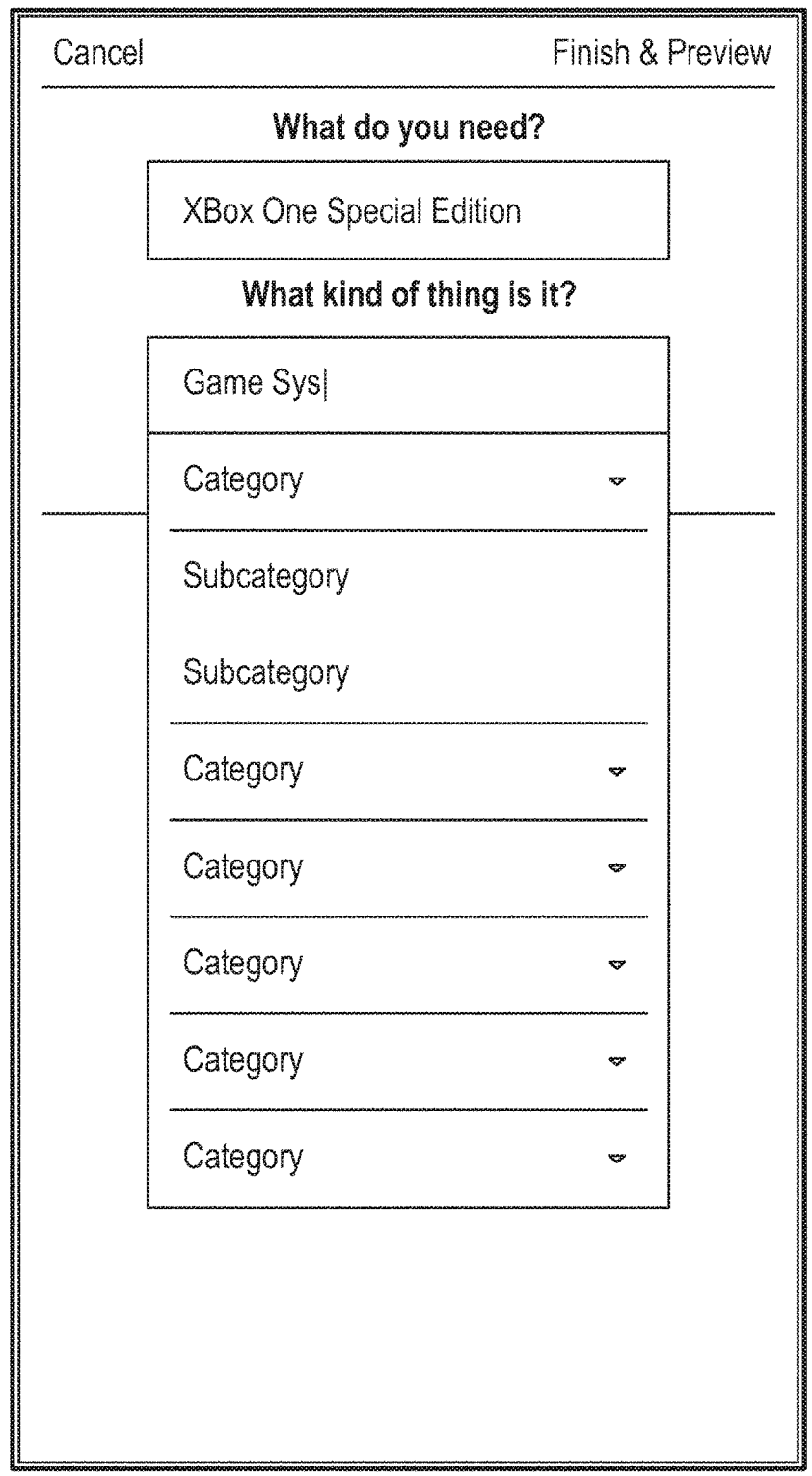
FIG. 48 illustrates a User Needs page (with an item category "Browse All" prompt) in the multi-party dynamic bartering network.
Figure 51:
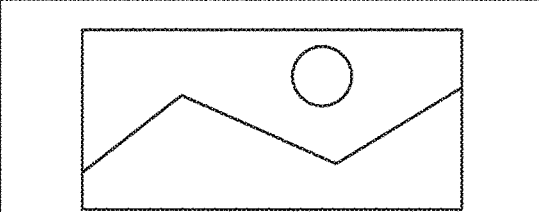
FIG. 51 illustrates a Needs Preview page (with an "Item Quantity selection" prompt) in the multi-party dynamic bartering network.

Referring now to FIGS. 36-42, User Add Have Service pages are shown in one embodiment of the multi-party dynamic bartering network with (1) a service category selection Auto-fill feature, (2) a service category selection "Browse All" prompt, (3) a service skill level selection prompt, (4) a service description prompt, (5) a service area prompt, (6) a service photo prompt, and (7) a detailed description prompt. FIG. 43 illustrates a User Add Have Service confirmation page in the multi-party dynamic bartering network. FIG. 44 illustrates User Add Have Service page with Yelp rating prompt connection in the multi-party dynamic bartering network.

Figure 52:
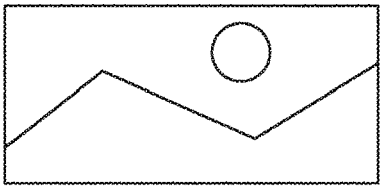
FIG. 52 illustrates a Needs Preview page (with a "Why you need it" prompt) in the multi-party dynamic bartering network.
Figure 53:
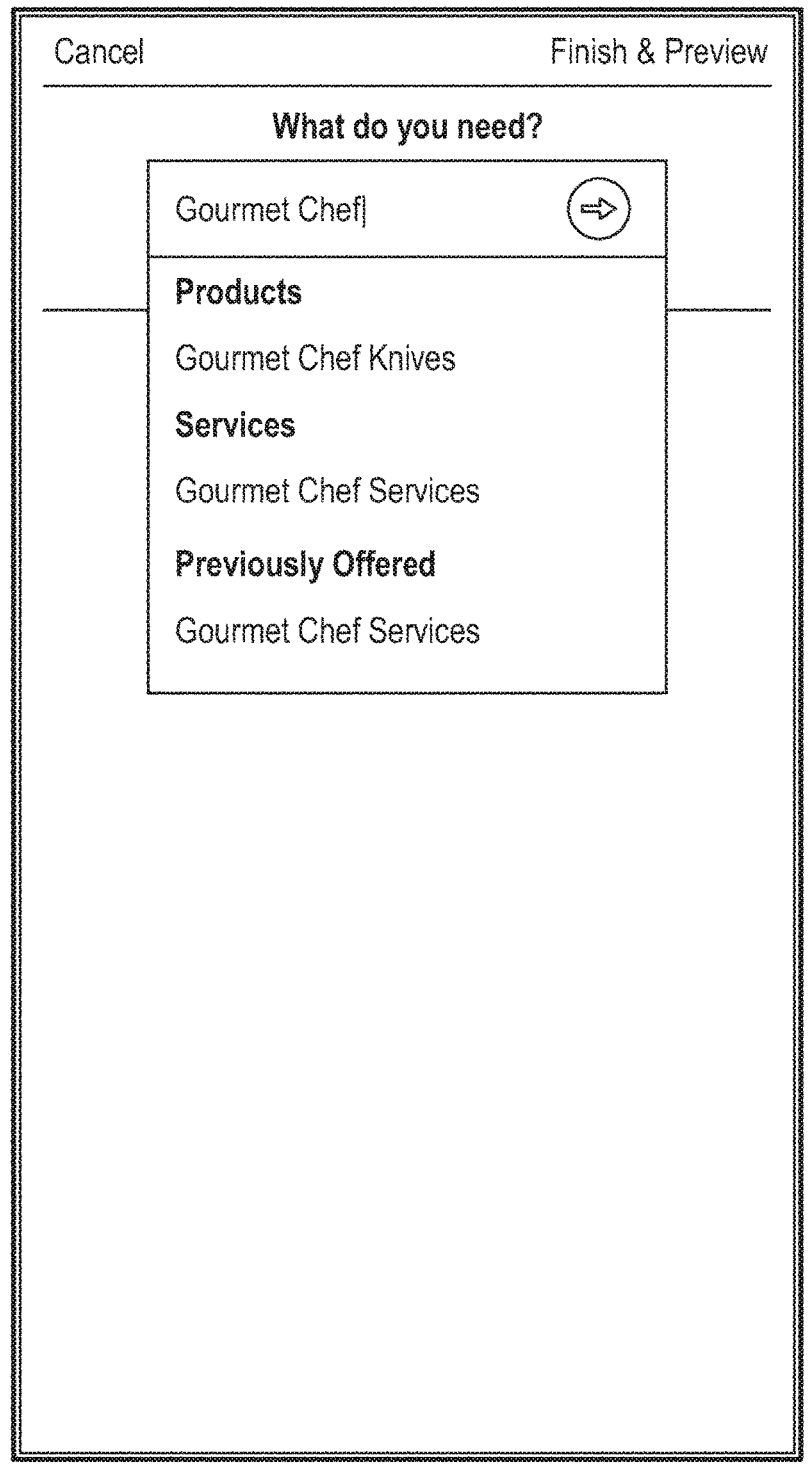
FIG. 53 illustrates a Needs Preview page (with an Add Need Service Auto-fill feature) in the multi-party dynamic bartering network.
Figure 54:
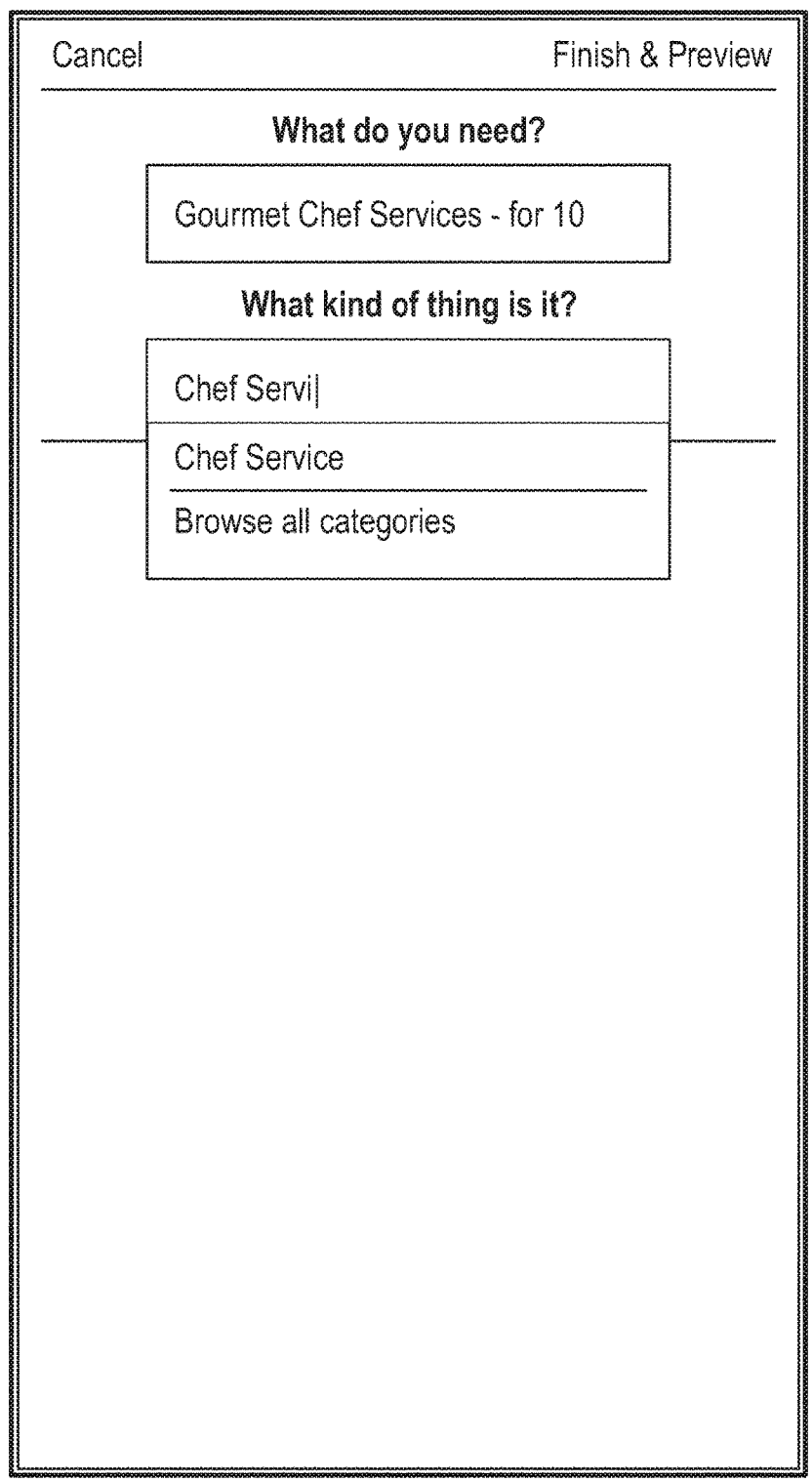
FIG. 54 illustrates a Needs Preview page (with a service category prompt) in the multi-party dynamic bartering network.
Figure 59:
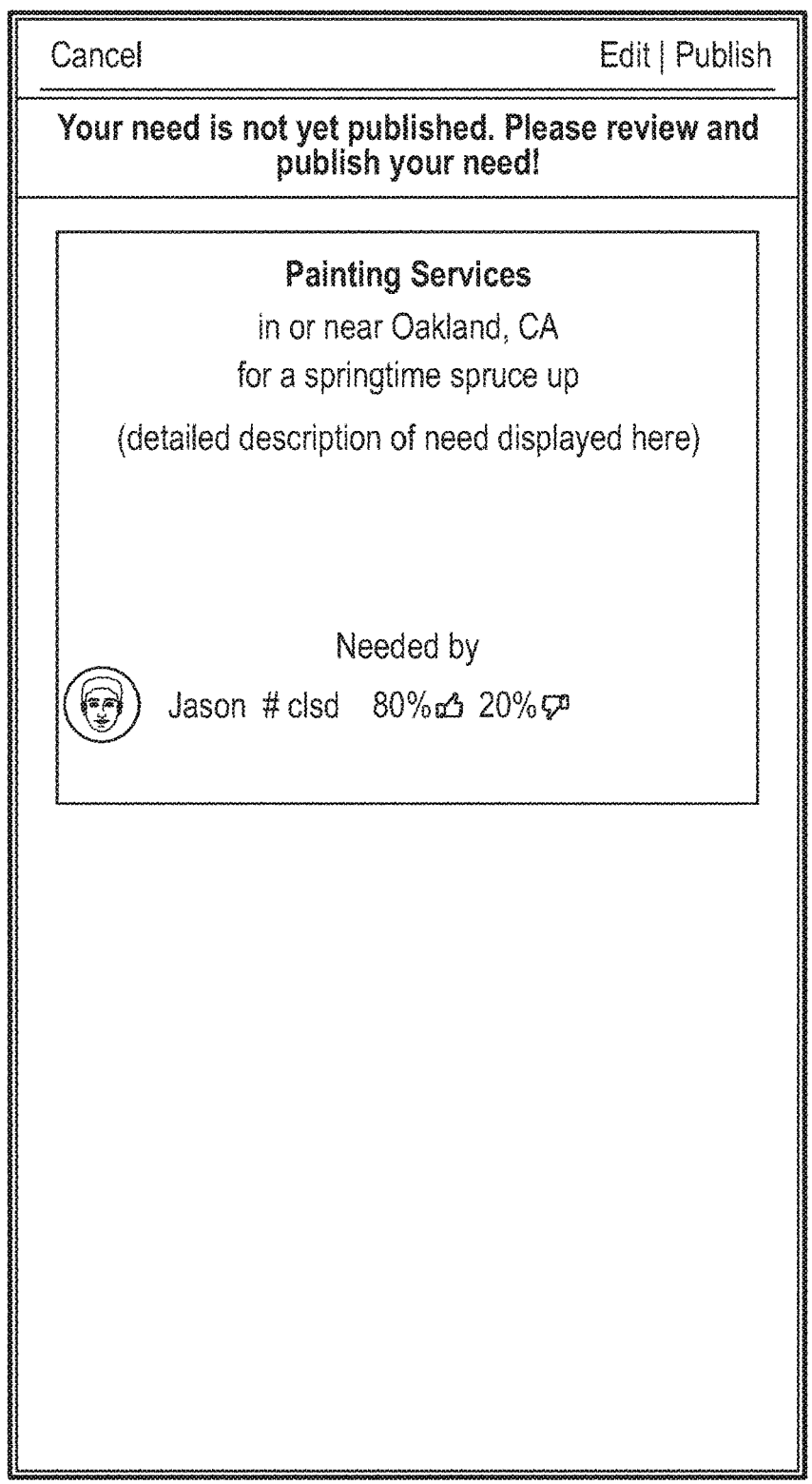
FIG. 59 illustrates a Simple Needs Preview page in the multi-party dynamic bartering network.

Referring now to FIGS. 45-52, User Add Need Item pages are shown in one embodiment of the multi-party dynamic bartering network with (1) a UPC code prompt, (2) an item category Auto-fill feature, (3) an item category prompt, (4) an item category "Browse All" prompt, (5) an item description prompt, (6) a photo addition prompt, and (7) an "Item Quantity selection" prompt. FIG. 52 shows a Needs Preview page with a "Why you need it" prompt in the multi-party dynamic bartering network.

Figure 60:
FIG. 60 illustrates a User's Add Need Confirmation page in the multi-party dynamic bartering network.

Referring now to FIGS. 53-59, User Add Need Service pages are shown in one embodiment of the multi-party dynamic bartering network with (1) an Add Need Service Auto-fill feature, (2) a service category prompt, (3) a service description prompt, (4) a service location prompt, (5) a photo addition prompt, (6) a detailed description prompt, and (7) a preview prompt. FIG. 60 shows a User's Add Need Confirmation page in the multi-party dynamic bartering network.

Figure 61:
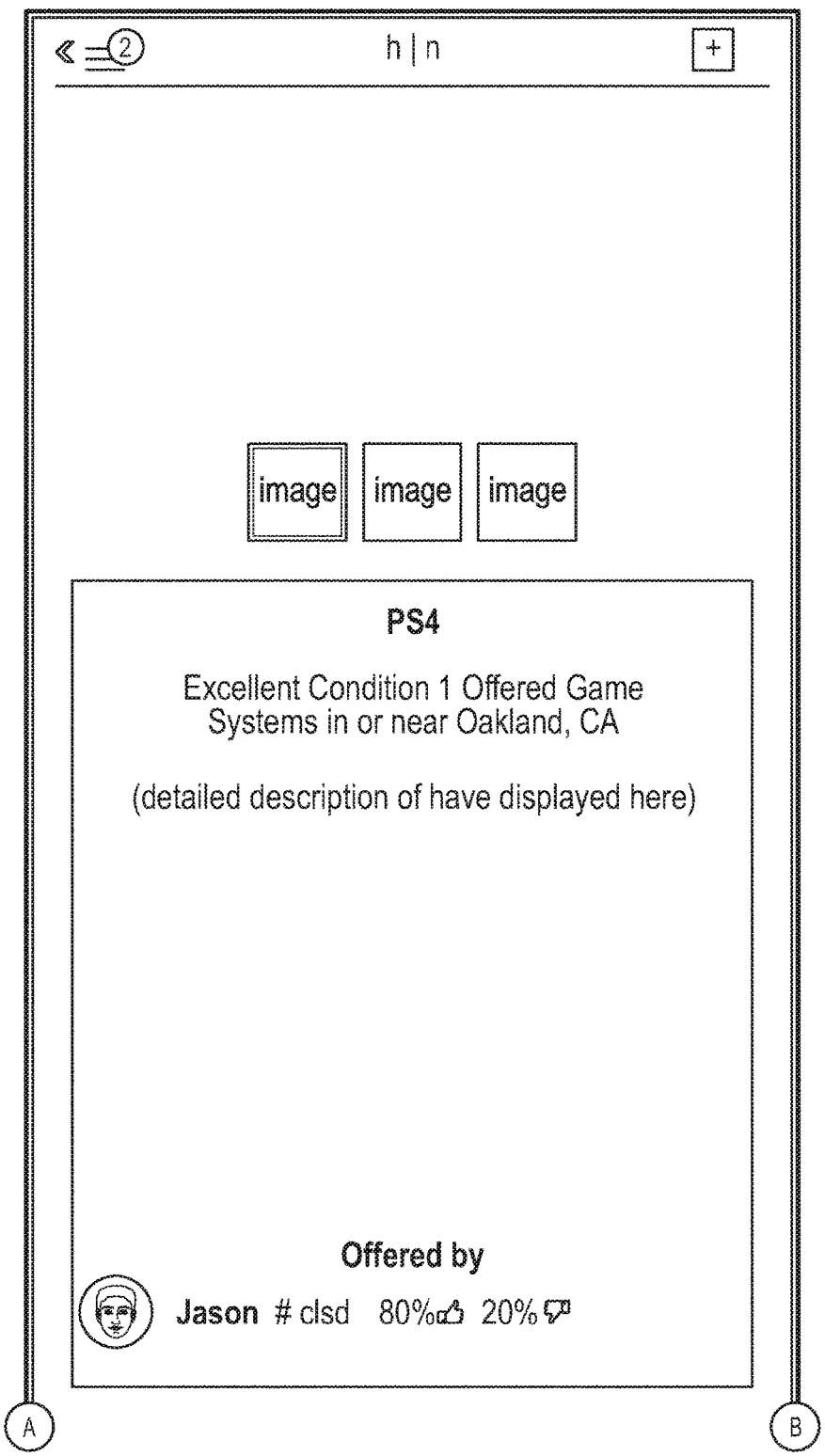
FIG. 61 illustrates a User's My Have Detail page in the multi-party dynamic bartering network.
Figure 61:
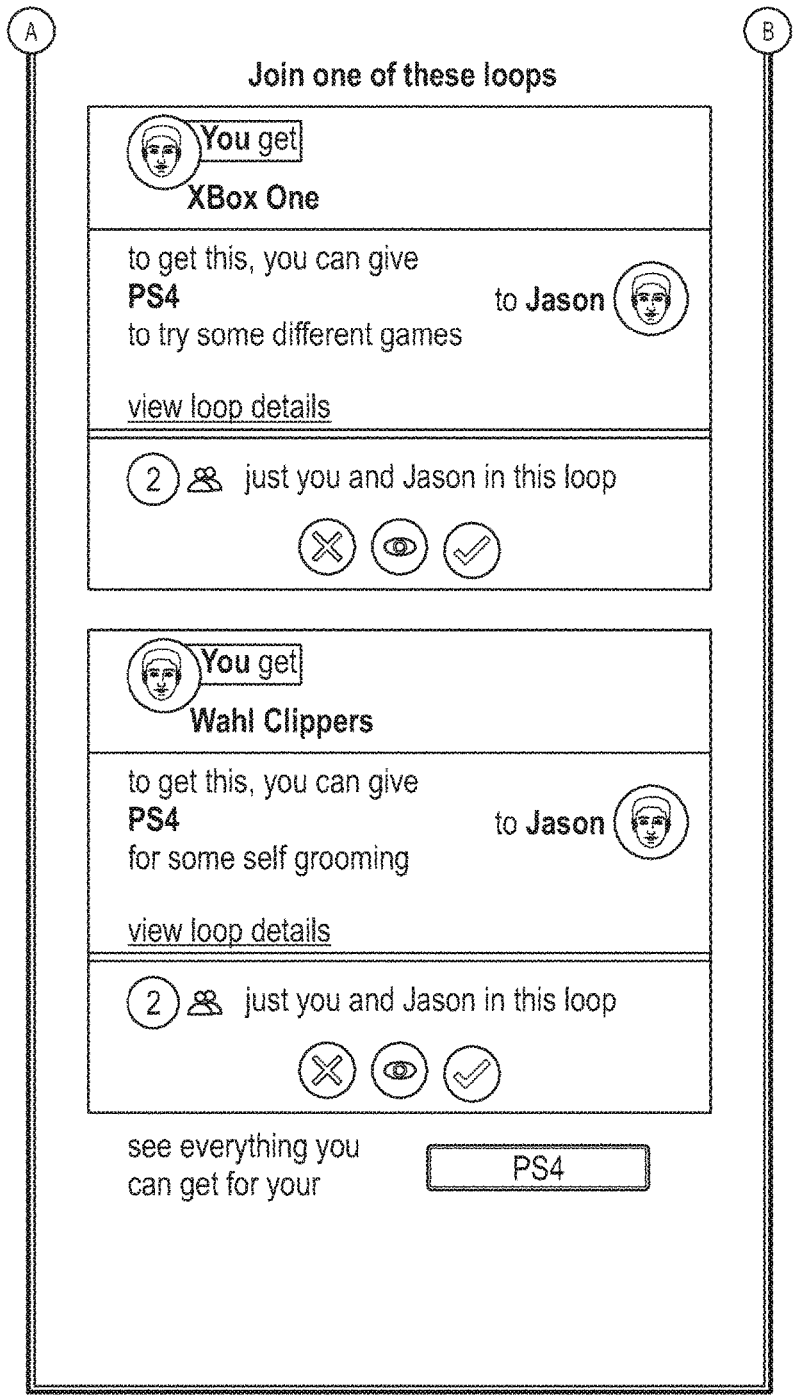
Figure 62:
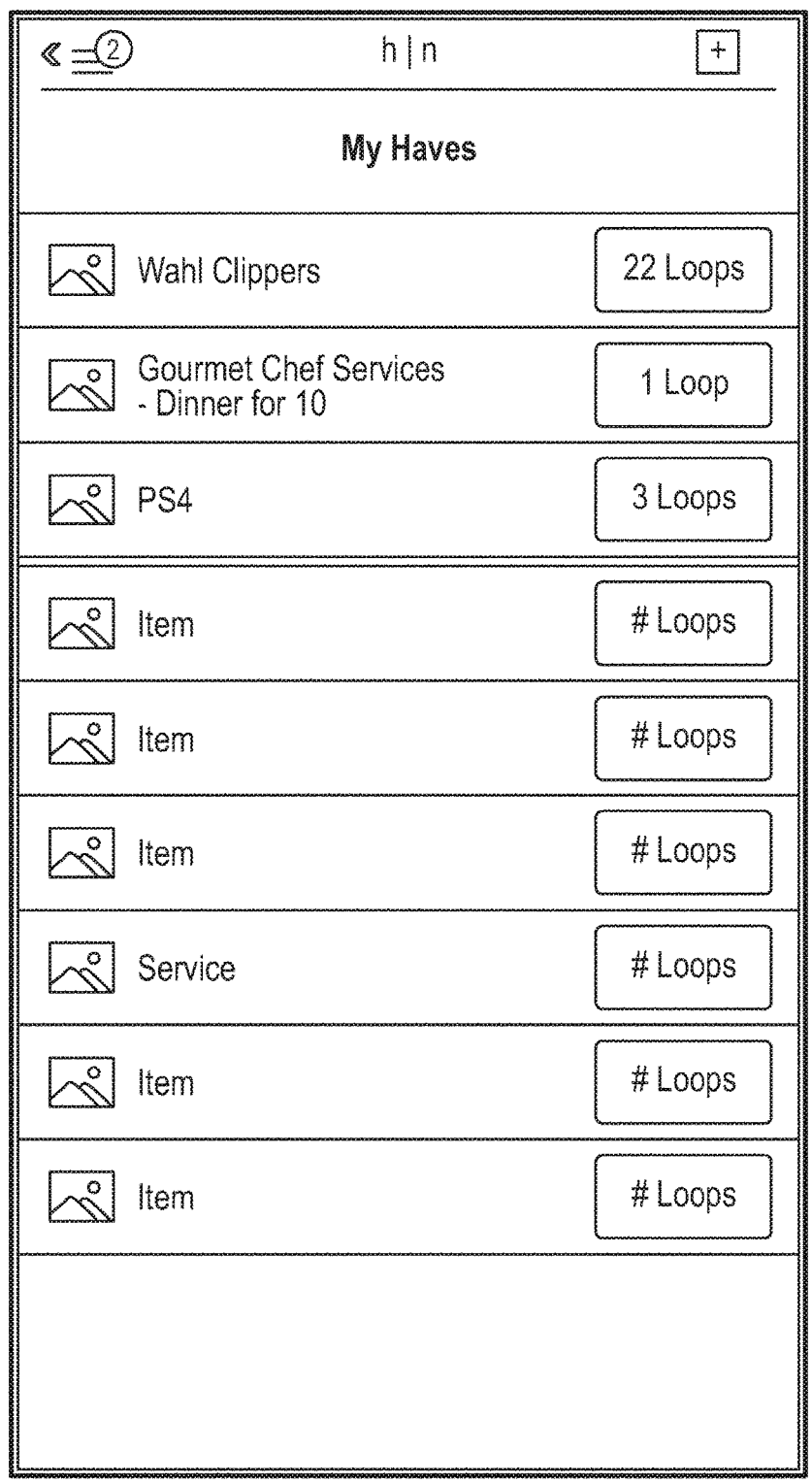
FIG. 62 illustrates a User's My Haves page (showing Loop options for My Haves) in the multi-party dynamic bartering network.
Figure 63:
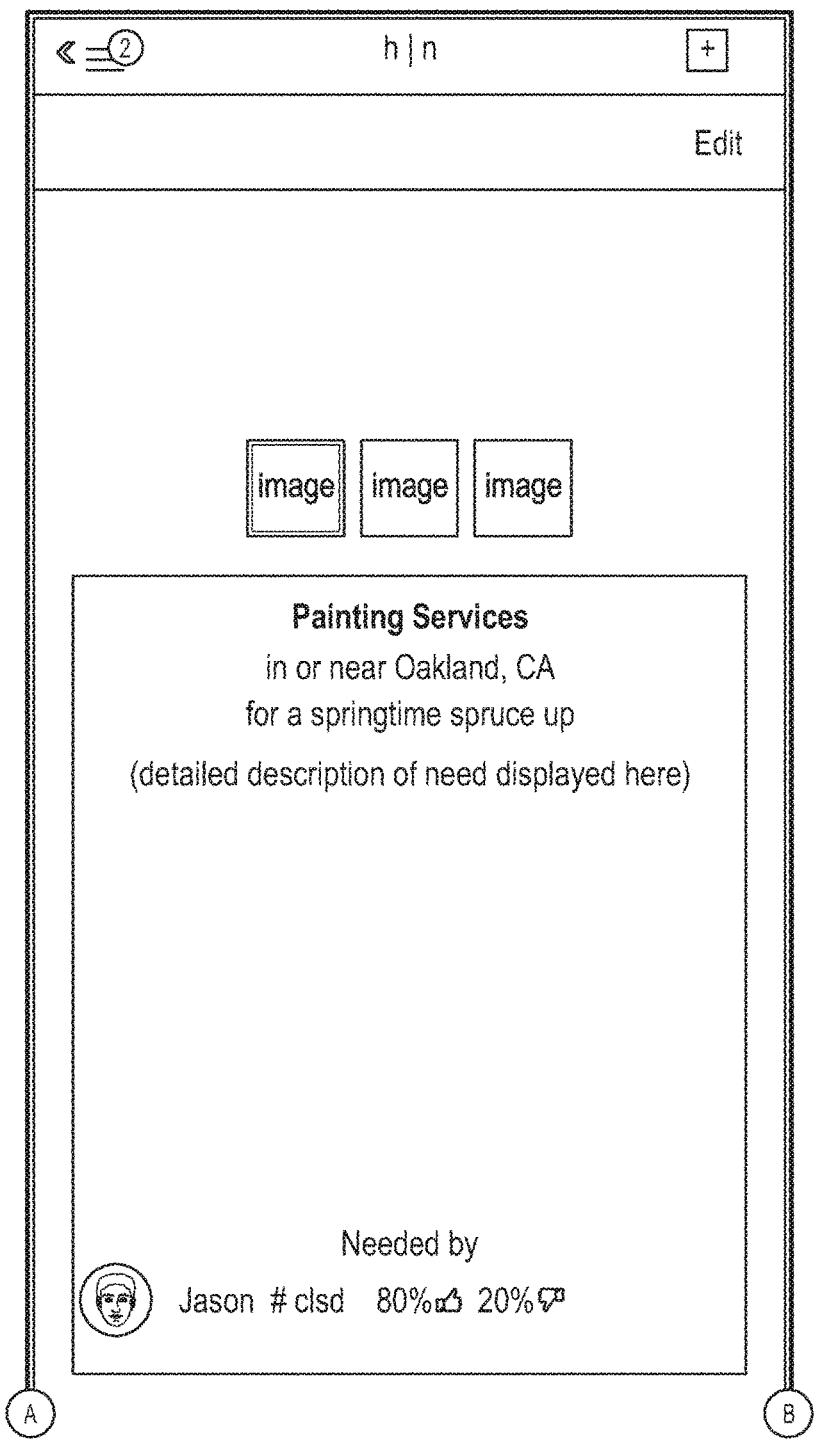
FIG. 63 illustrates a User's My Need Detail page in the multi-party dynamic bartering network.
Figure 63:
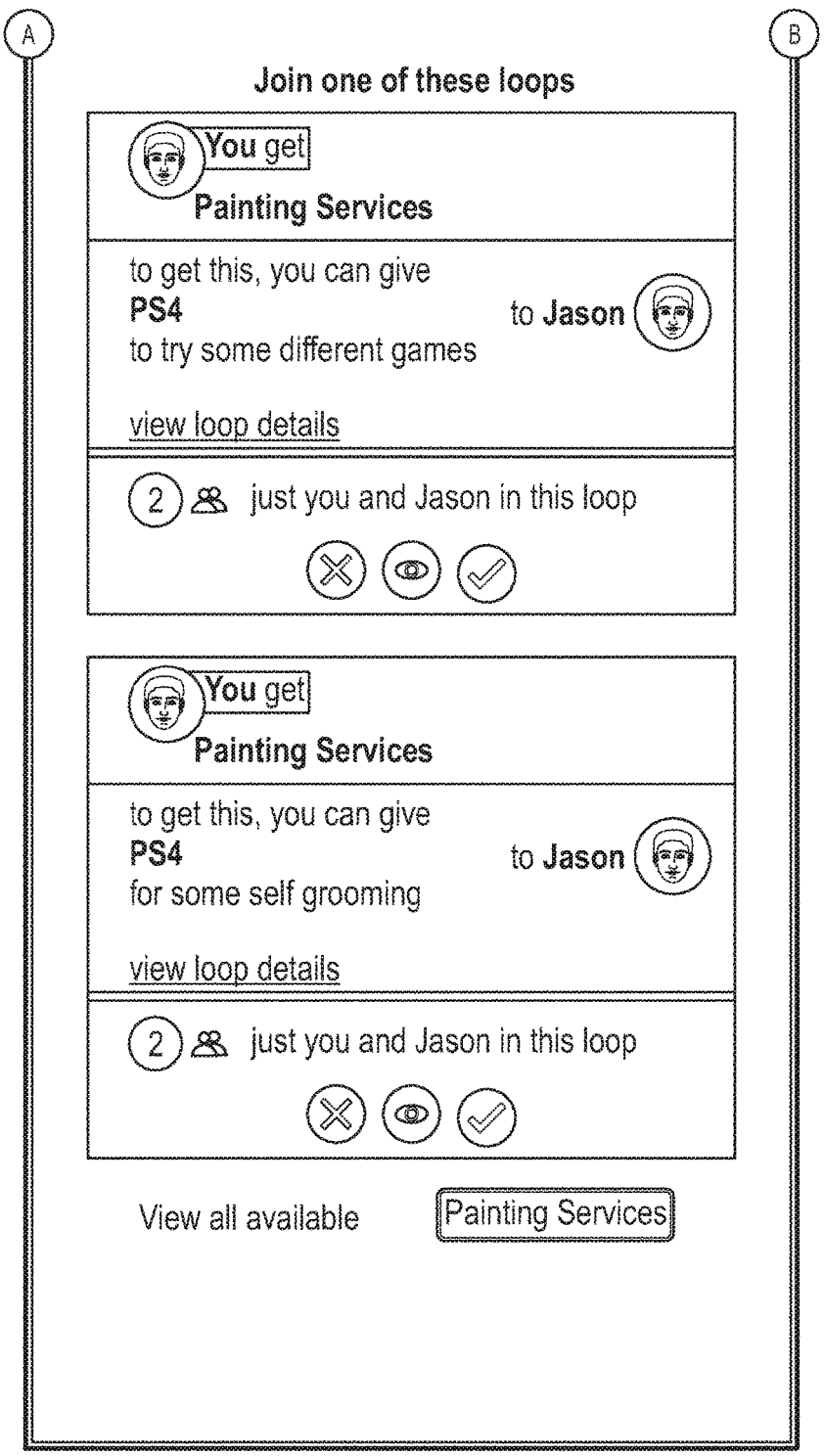
Figure 64:
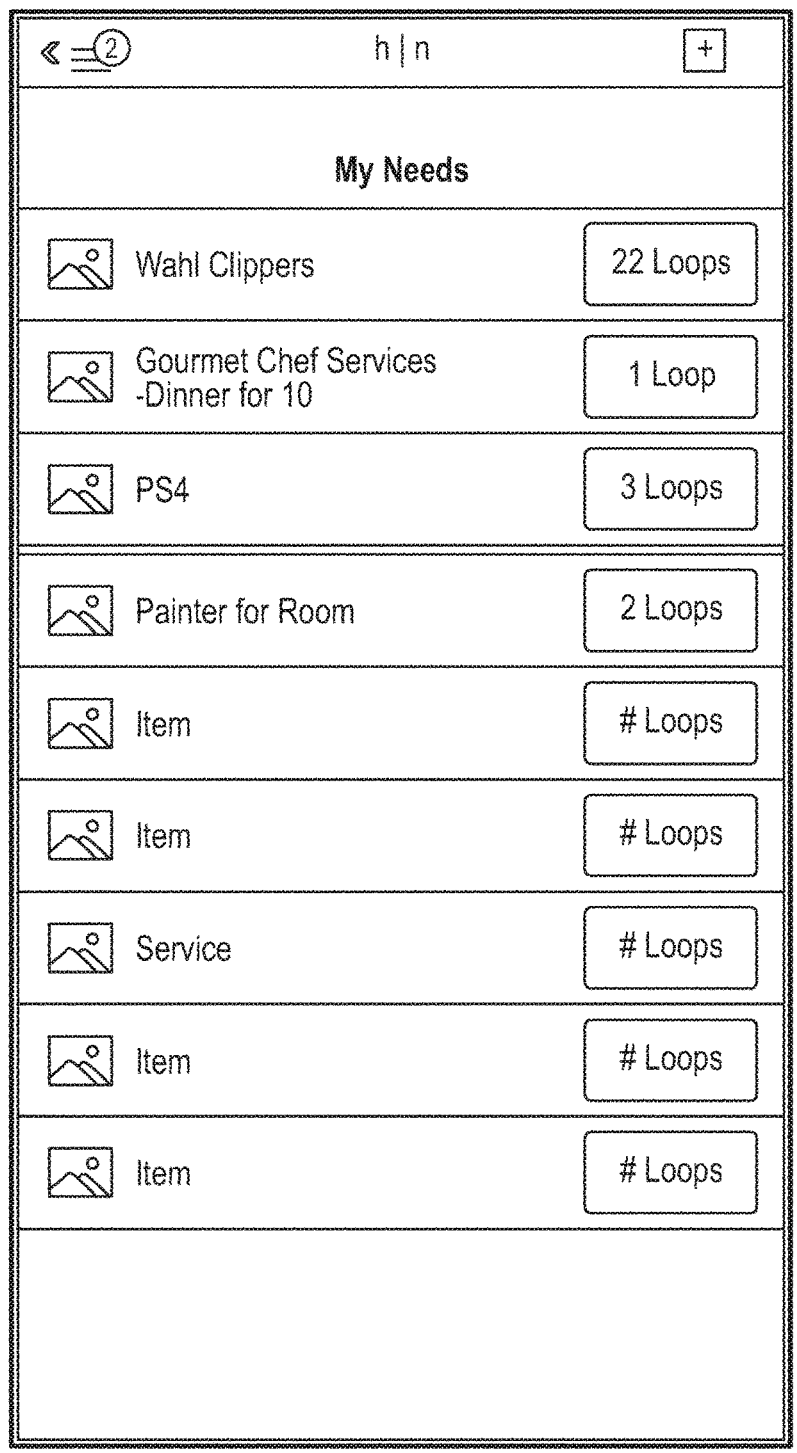
FIG. 64 illustrates a User's My Needs page (showing Loop options for My Needs) in the multi-party dynamic bartering network.

FIG. 61 shows a User's My Have Detail page in one embodiment of the multi-party dynamic bartering network. This page presents the User with different options of Loops to join based upon the User's "Haves," as well as details about the Loops. Continuing, FIG. 62 presents a User's My Haves page that show a lists of the User's "Haves" as well as the number of Loop options each "Have" (but no Loop details). Conversely, FIG. 63 shows a User's My Need Detail page in the multi-party dynamic bartering network. This page presents the User with different options of Loops to join based upon the User's "Needs," as well as details about the Loops. Continuing, FIG. 64 presents a User's My Needs page that show a lists of the User's "Needs" as well as the number of Loop options each "Need" (but no Loop details).

Figure 65:
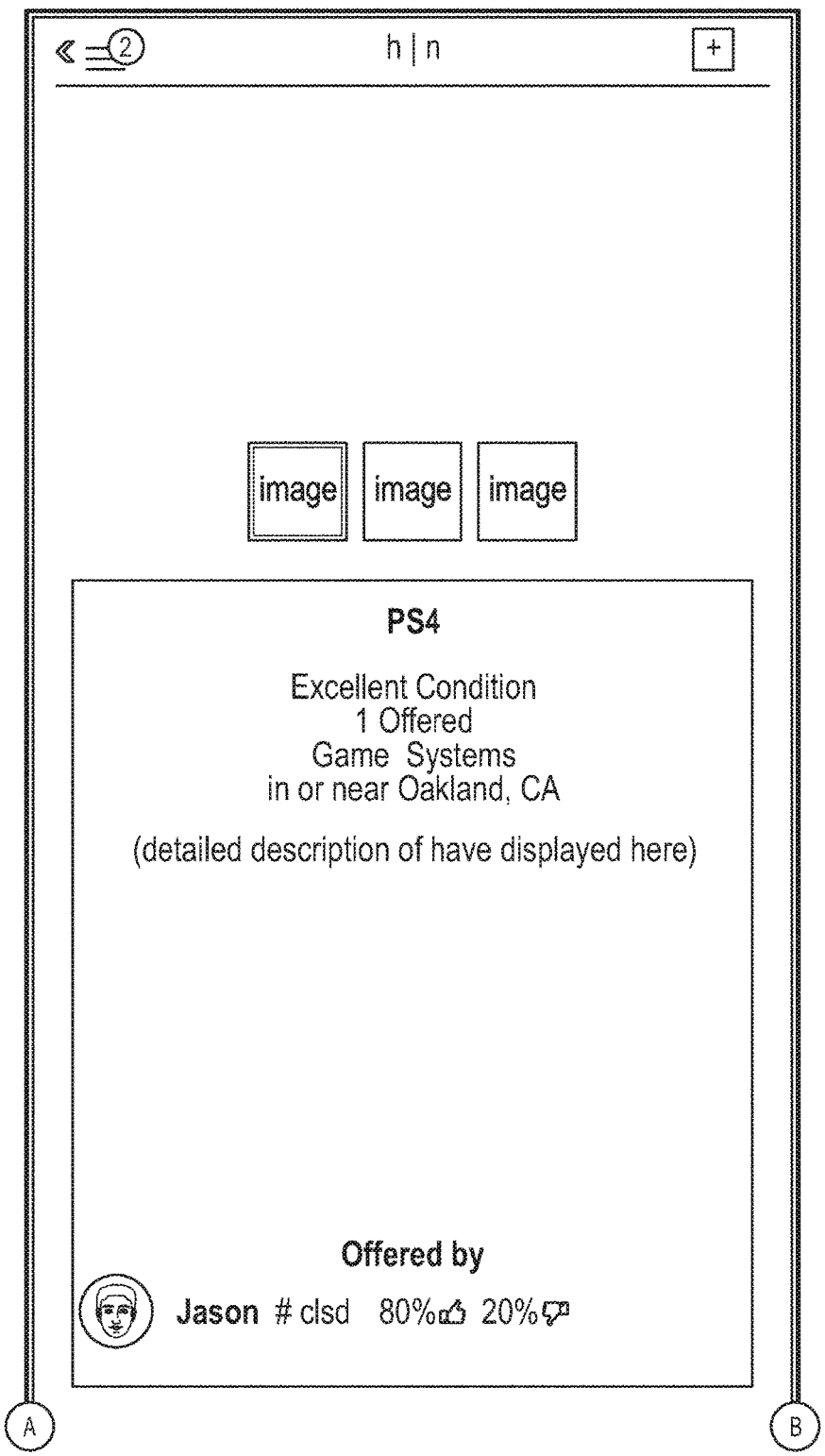
FIG. 65 illustrates a Need Detail page for other Users in the multi-party dynamic bartering network.
Figure 65:
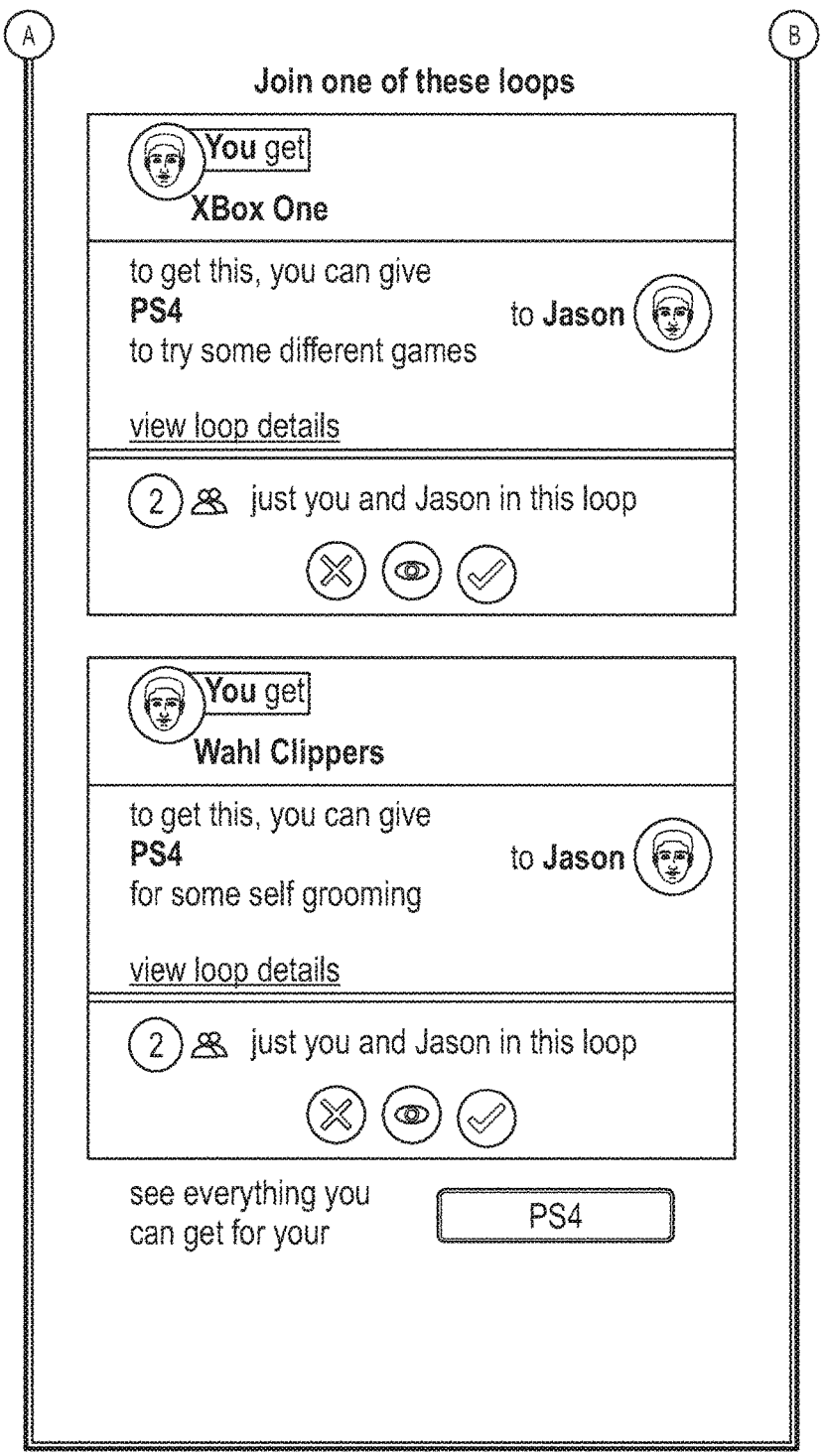
Figure 66:
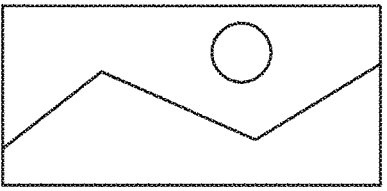
FIG. 66 illustrates an Edit Have page in the multi-party dynamic bartering network.
Figure 68:
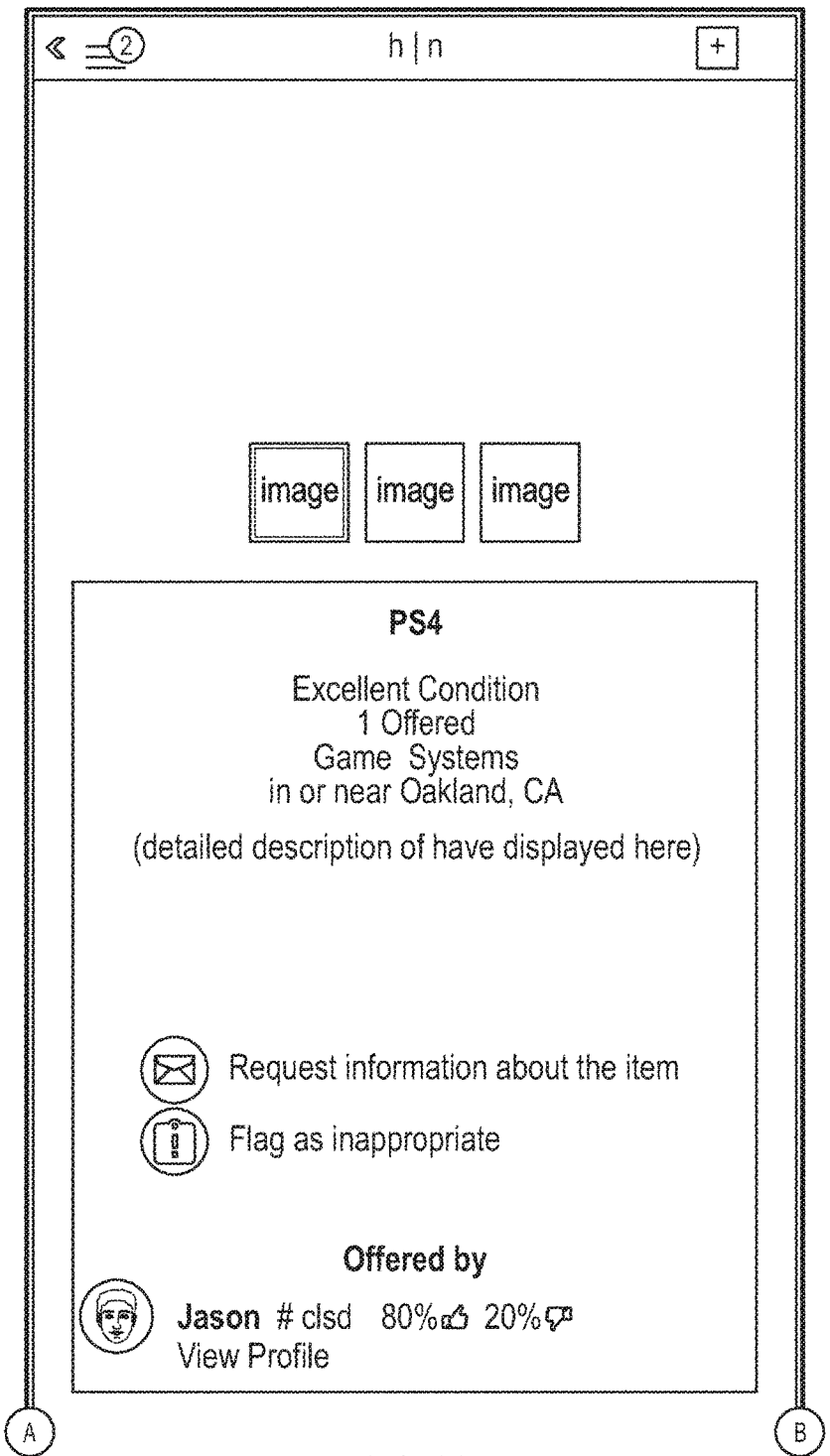
FIG. 68 illustrates Have Detail page for other Users in the multi-party dynamic bartering network.
Figure 68:
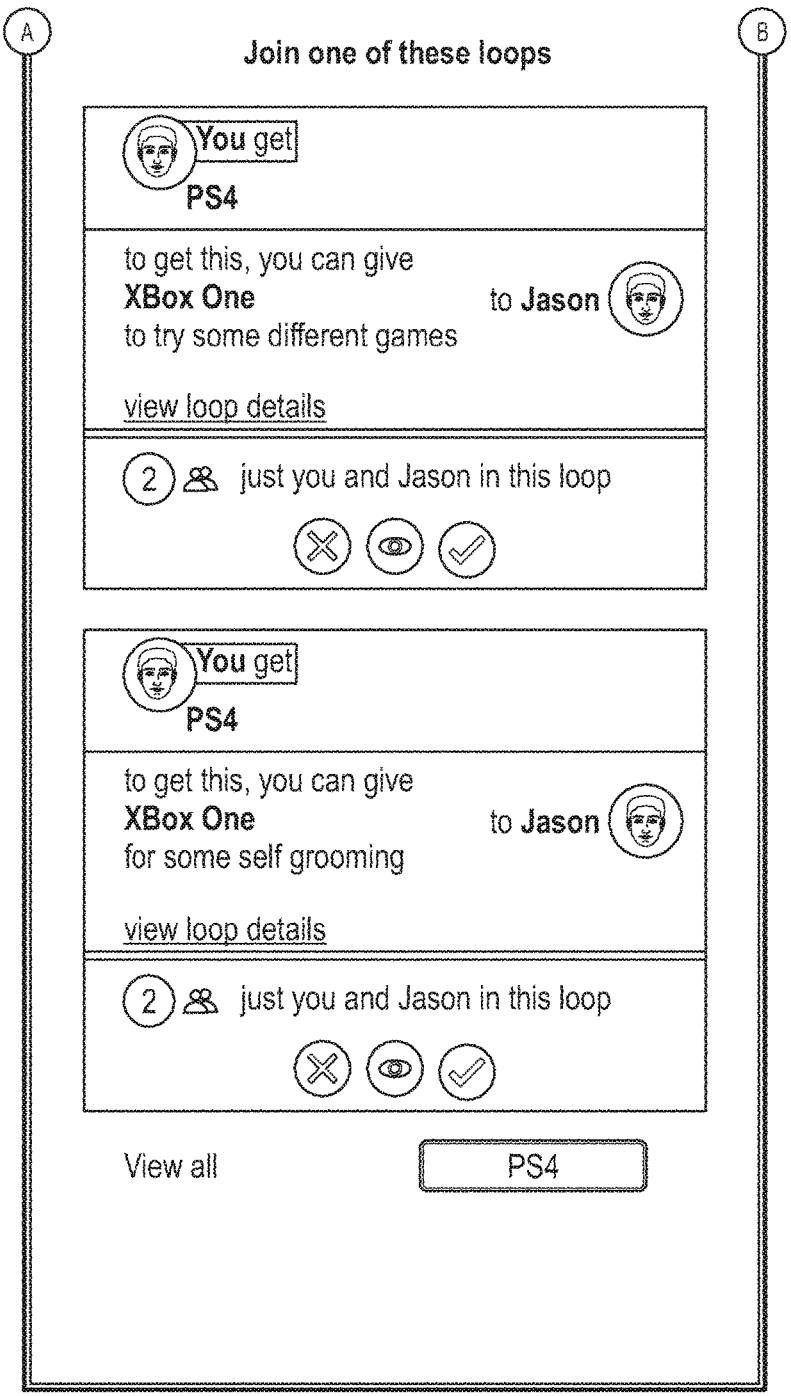

Referring now to FIG. 65, a Need Detail page for other Users in one embodiment of the multi-party dynamic bartering network is shown. Details of the Loops that the User has the option to join are shown on this page. FIG. 68 shows a Have Detail page for other Users in the multi-party dynamic bartering network. Details of the Loops that the User has the option to join are shown on this page. FIG. 66 shows an Edit Have page in the multi-party dynamic bartering network, while FIG. 67 shows an Edit Need page in the multi-party dynamic bartering network. In some embodiments, details of your Haves and Needs can be edited on these pages.

Figure 69:
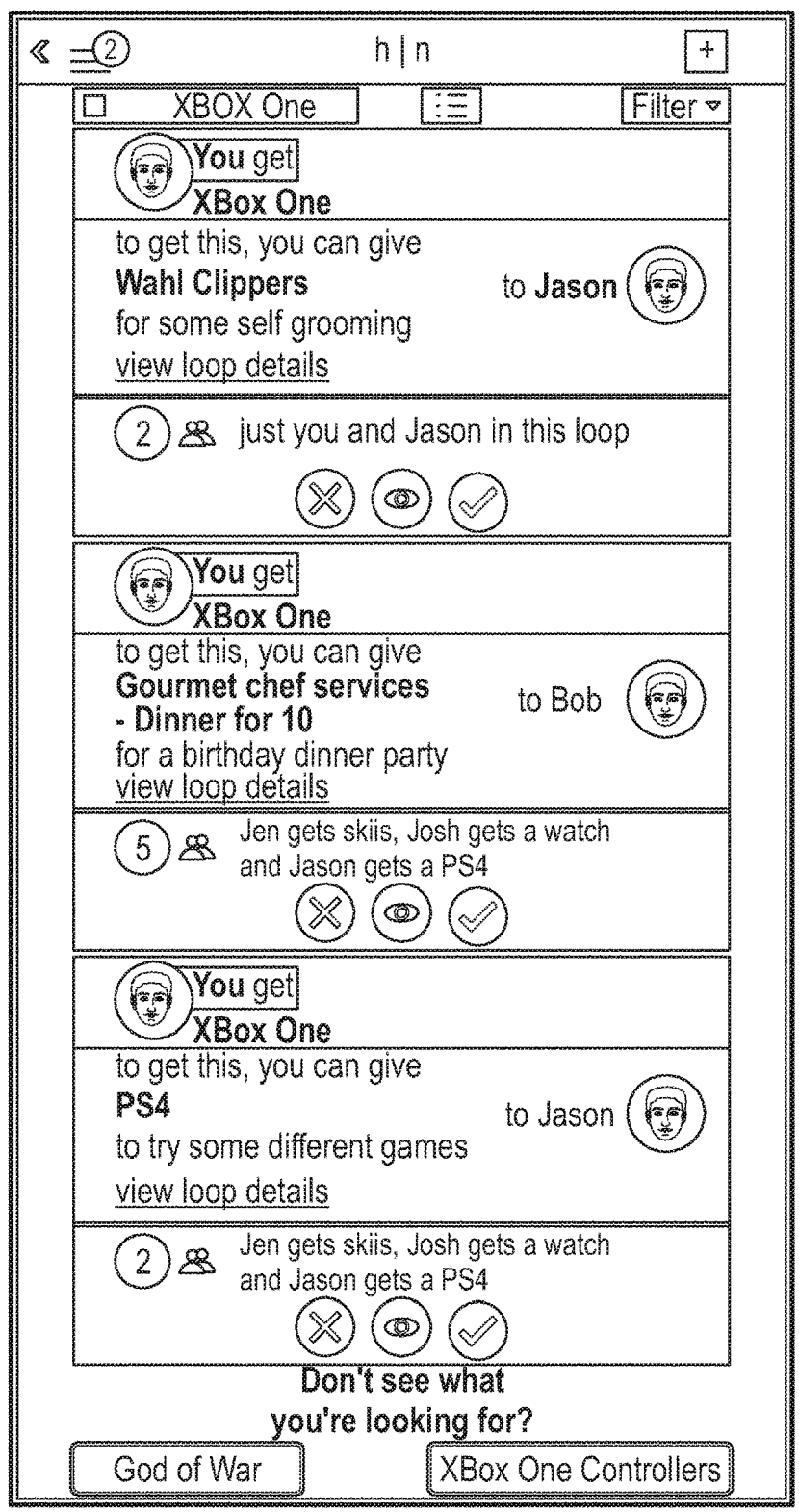
FIG. 69 illustrates a Loop Search Results (Member Haves) page in the multi-party dynamic bartering network.
Figure 70:
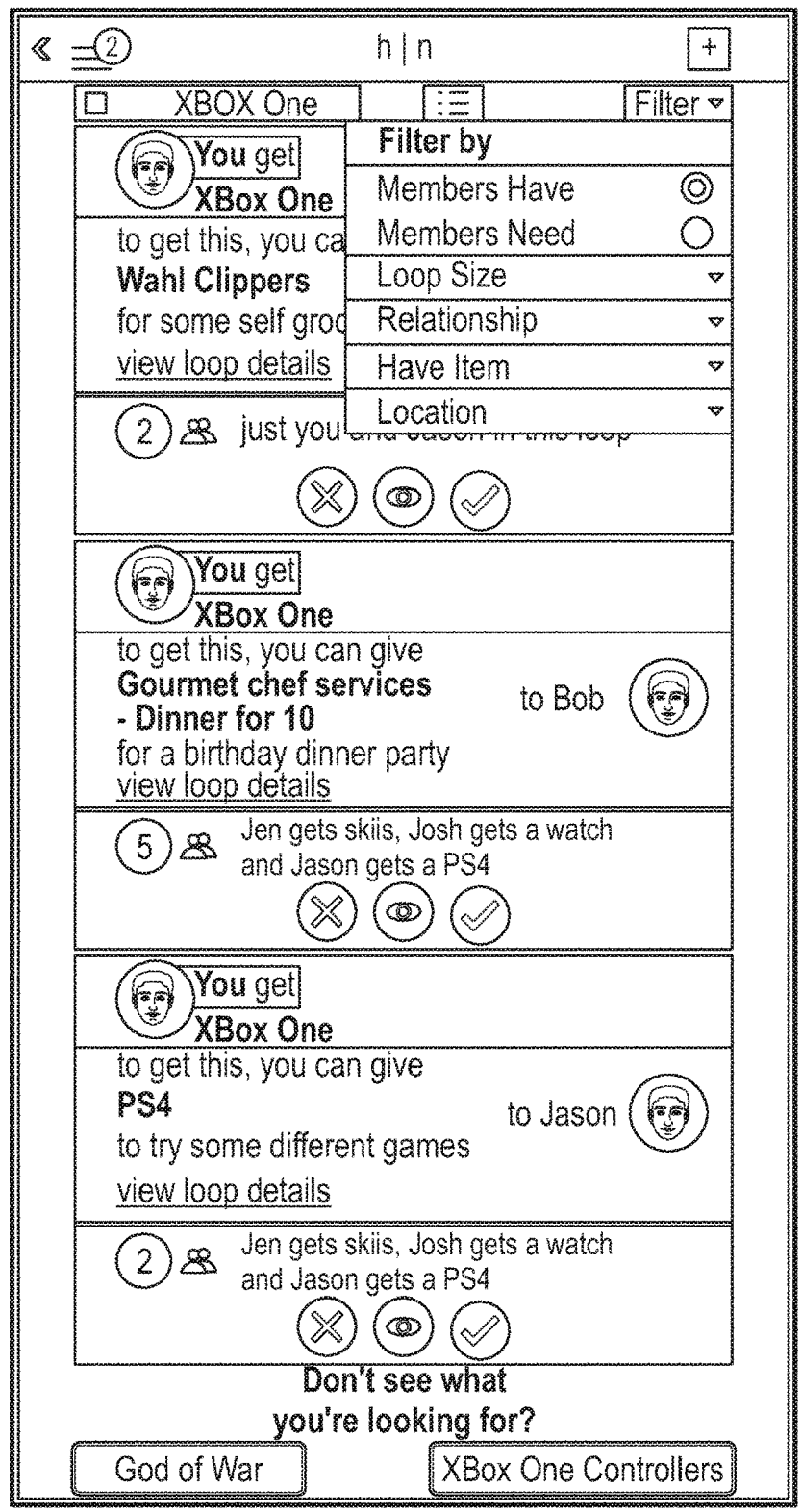
FIG. 70 illustrates a Loop Search Filters page in the multi-party dynamic bartering network.
Figure 71:
FIG. 71 illustrates a Loop Search Results (Alternative view) page in the multi-party dynamic bartering network.
Figure 72:
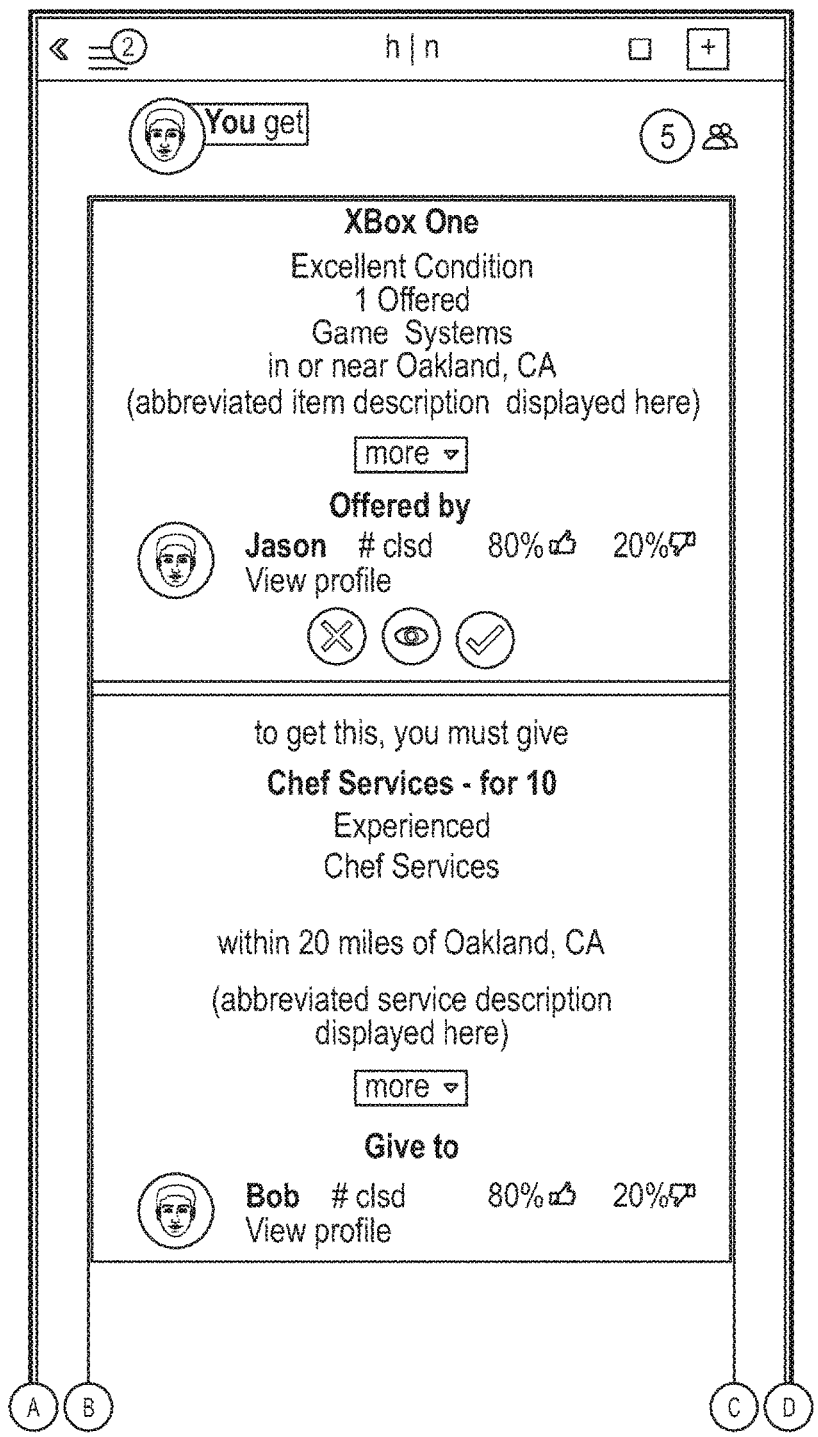
FIG. 72 illustrates a Loop Detail page in the multi-party dynamic bartering network.
Figure 72:
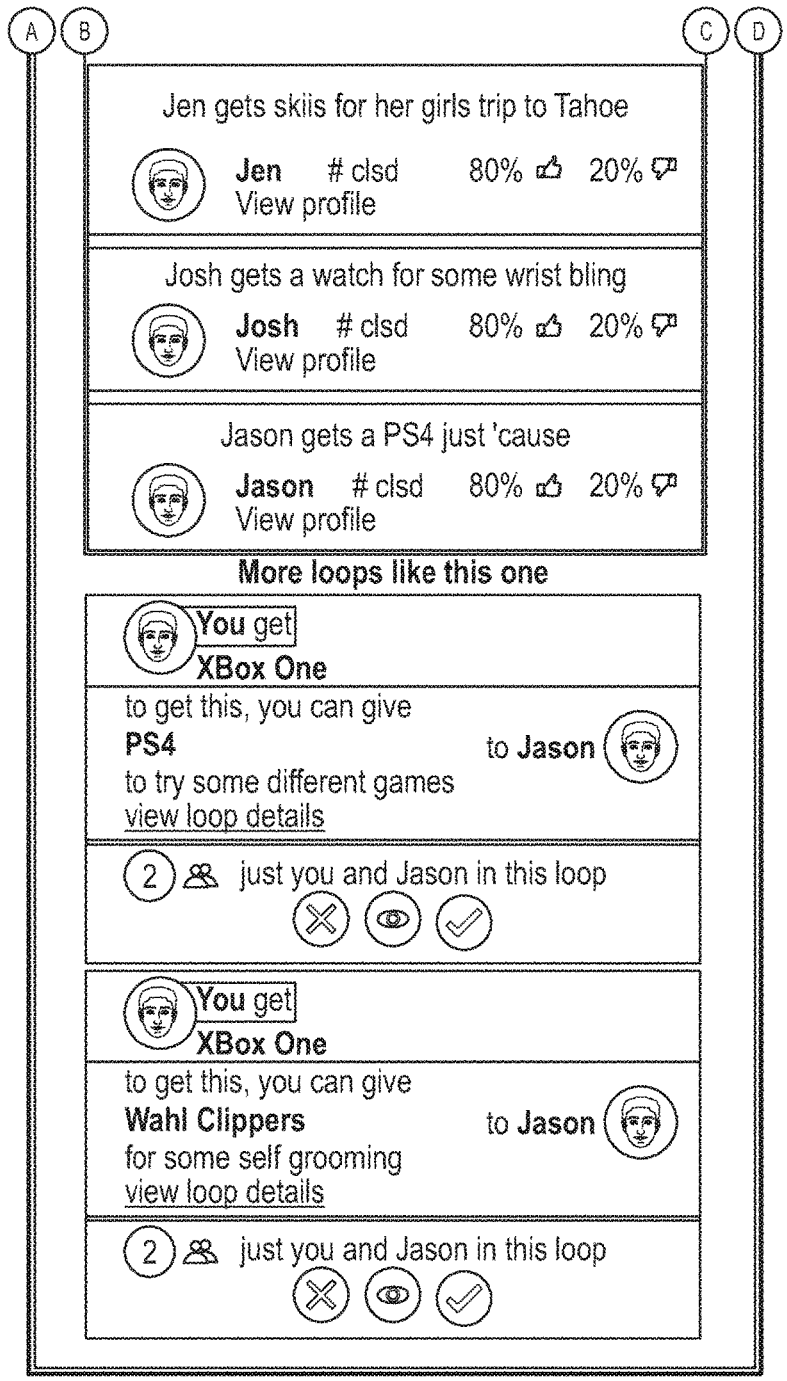
Figure 73:
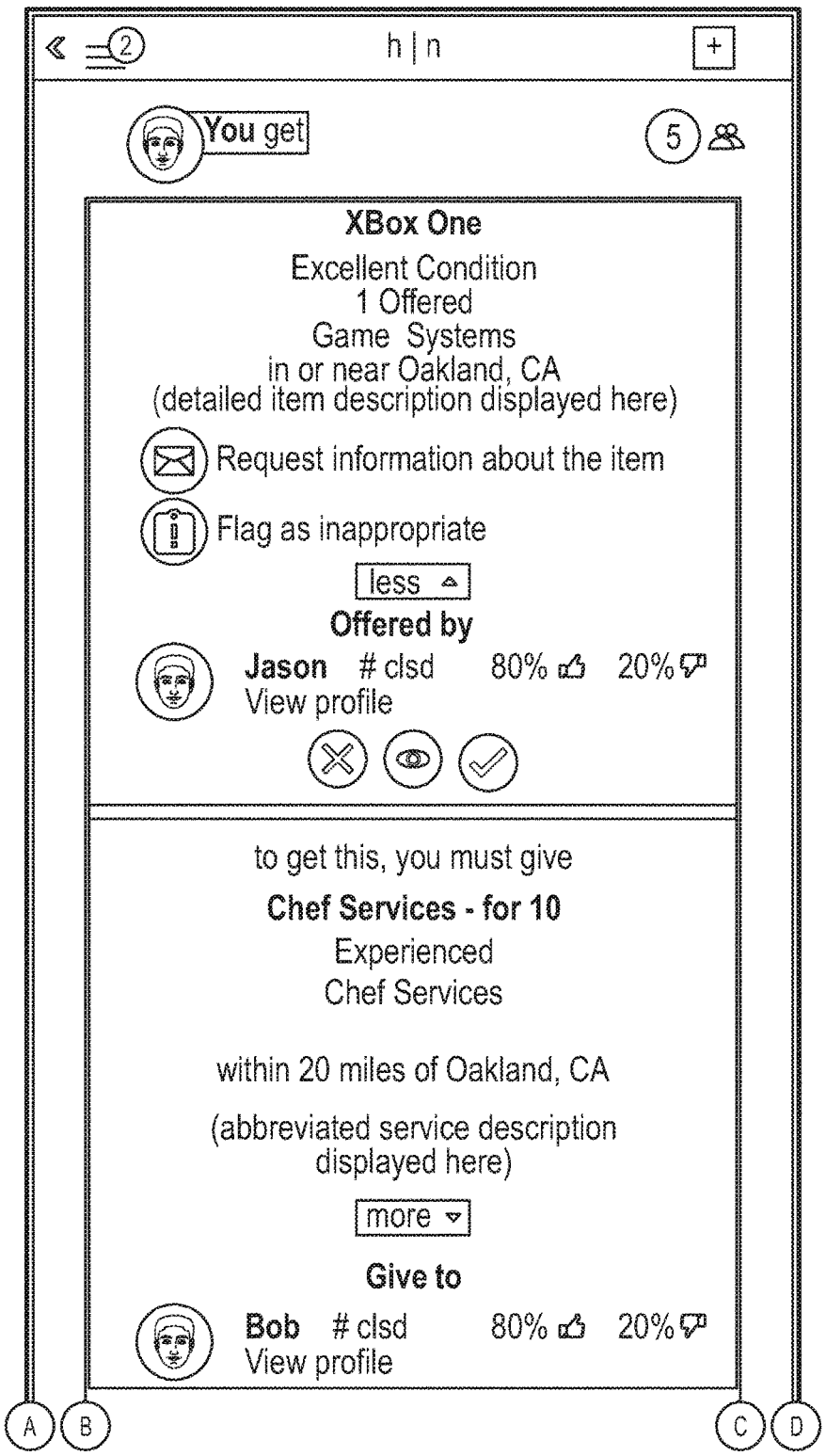
FIG. 73 illustrates a Loop Expanded Detail page in the multi-party dynamic bartering network.
Figure 73:
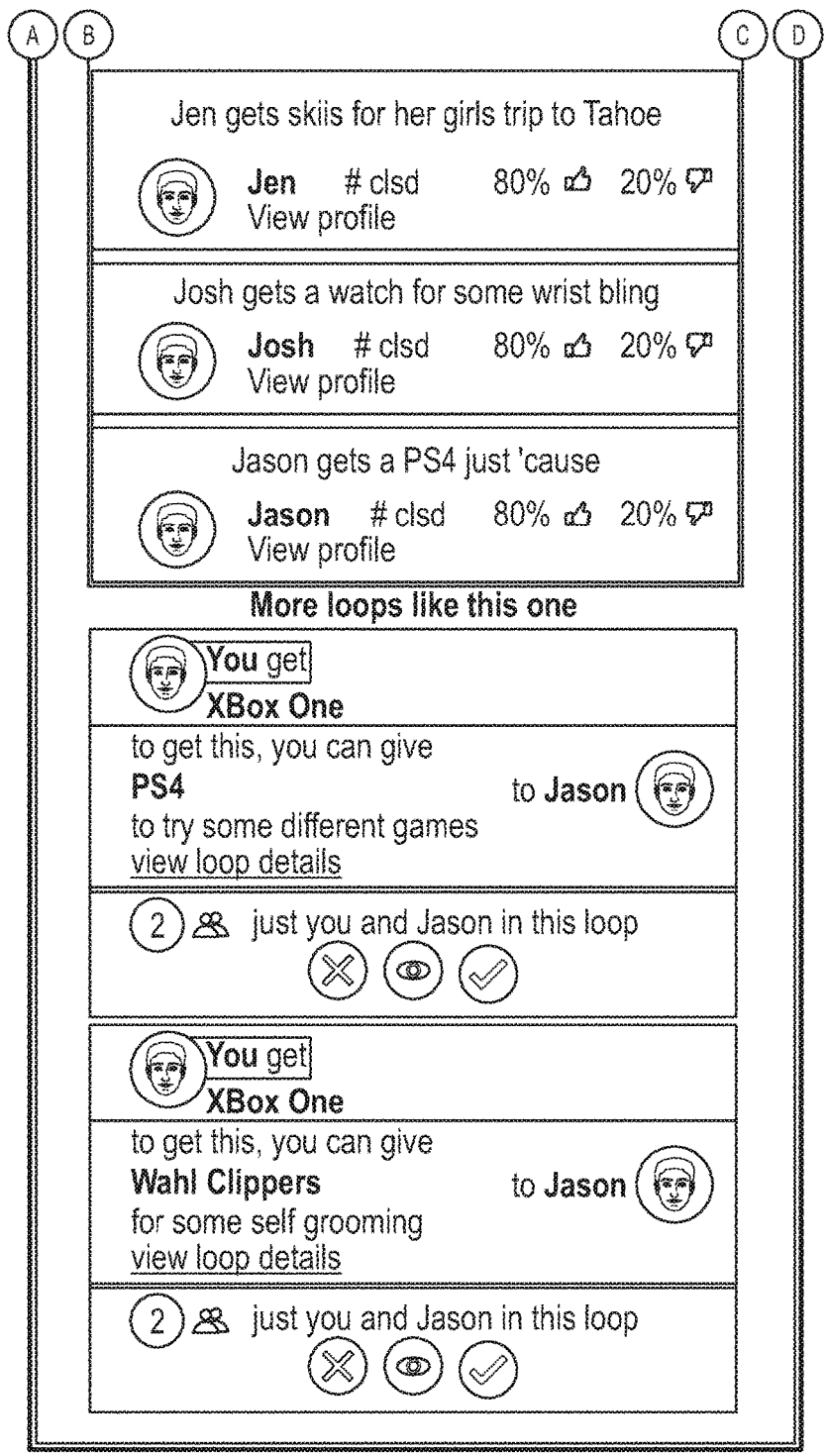
Figure 74:
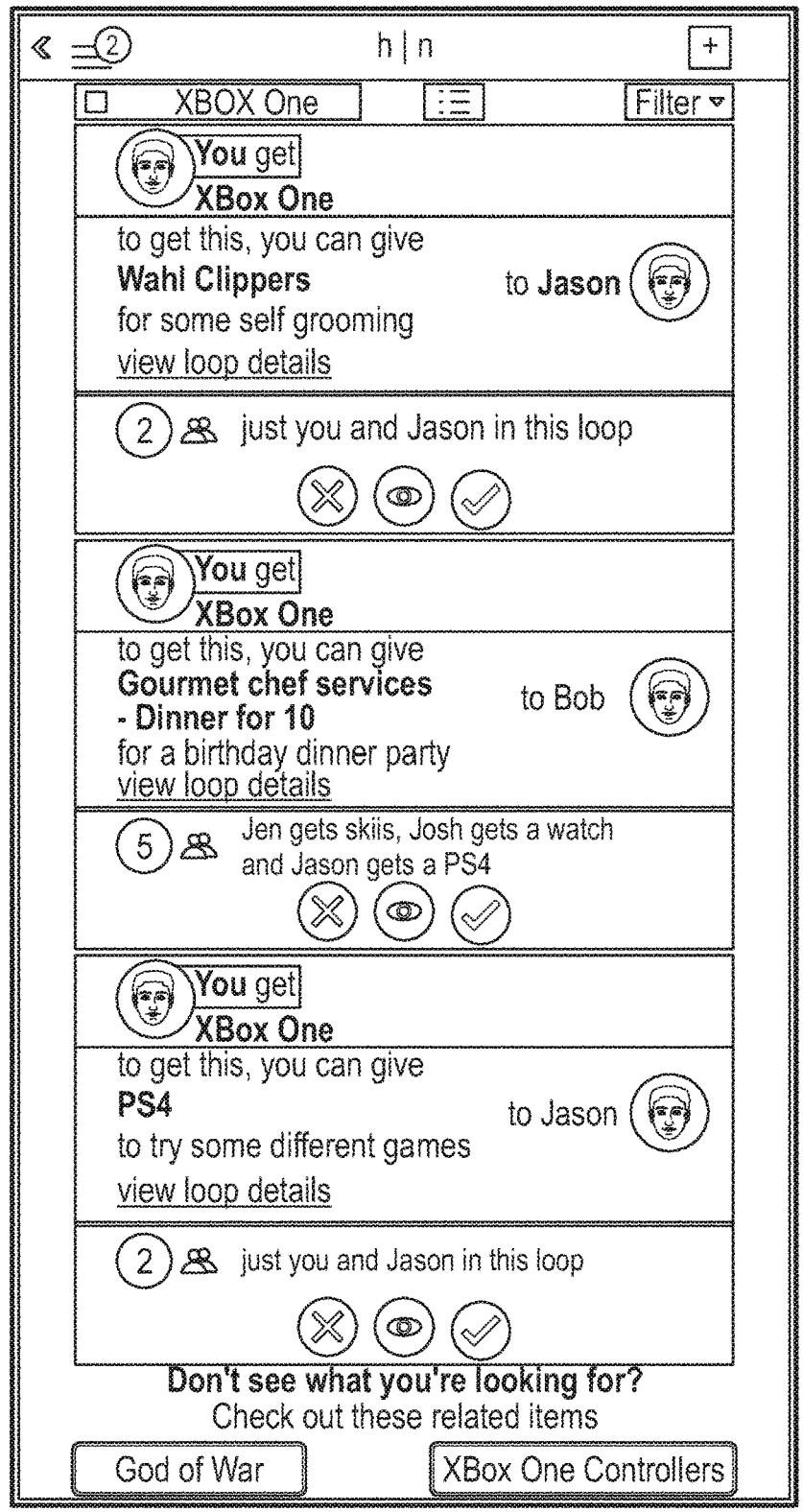
FIG. 74 illustrates an Expanded State page in the multi-party dynamic bartering network.

Referring now to FIG. 69, a Loop Search Results page of Member "Haves" in the multi-party dynamic bartering network is illustrated. Specifically, this page shows multiple Loops that were returned as search results that the searching User can compare and then choose to watch, join, or decline. Continuing, FIG. 70 shows how the Loop Search Results page of FIG. 69 may be filtered using Loop Search Filters such as Loop size, relationship, Have Item, Location, and the like. FIG. 71 shows an alternative view of the Loop Search Results page in the multi-party dynamic bartering network that shows less information about the Loop than the search results page of FIG. 69. FIG. 72 shows a Loop Detail page in one embodiment of the multi-party dynamic bartering network, while FIG. 73 shows a Loop Expanded Detail page in another embodiment of the multi-party dynamic bartering network. Continuing, FIG. 74 shows an expanded state page in one embodiment of the multi-party dynamic bartering network.

Figure 75:
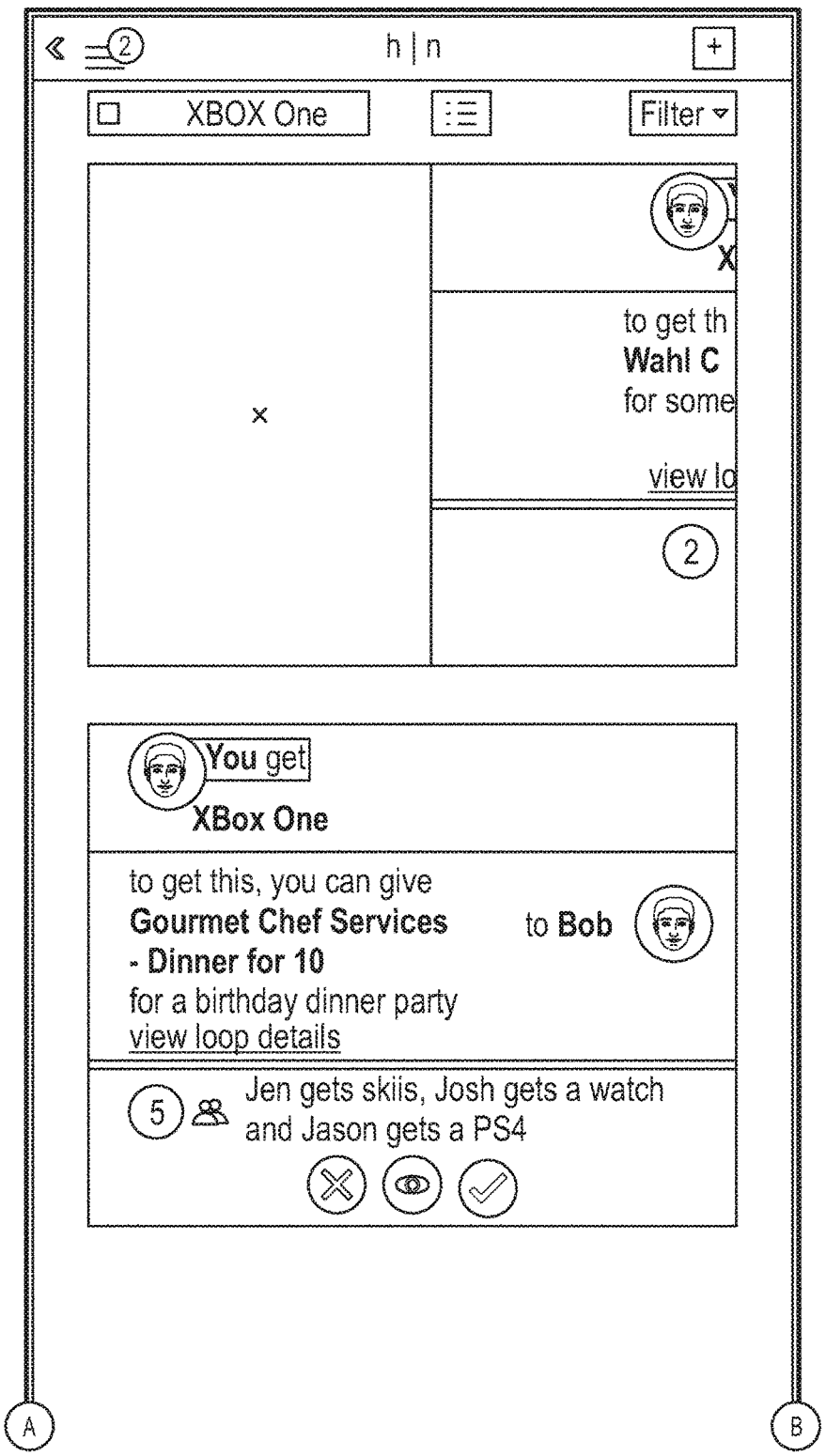
FIG. 75 illustrates a "Slide to Decline Loop" Card page in the multi-party dynamic bartering network.
Figure 75:
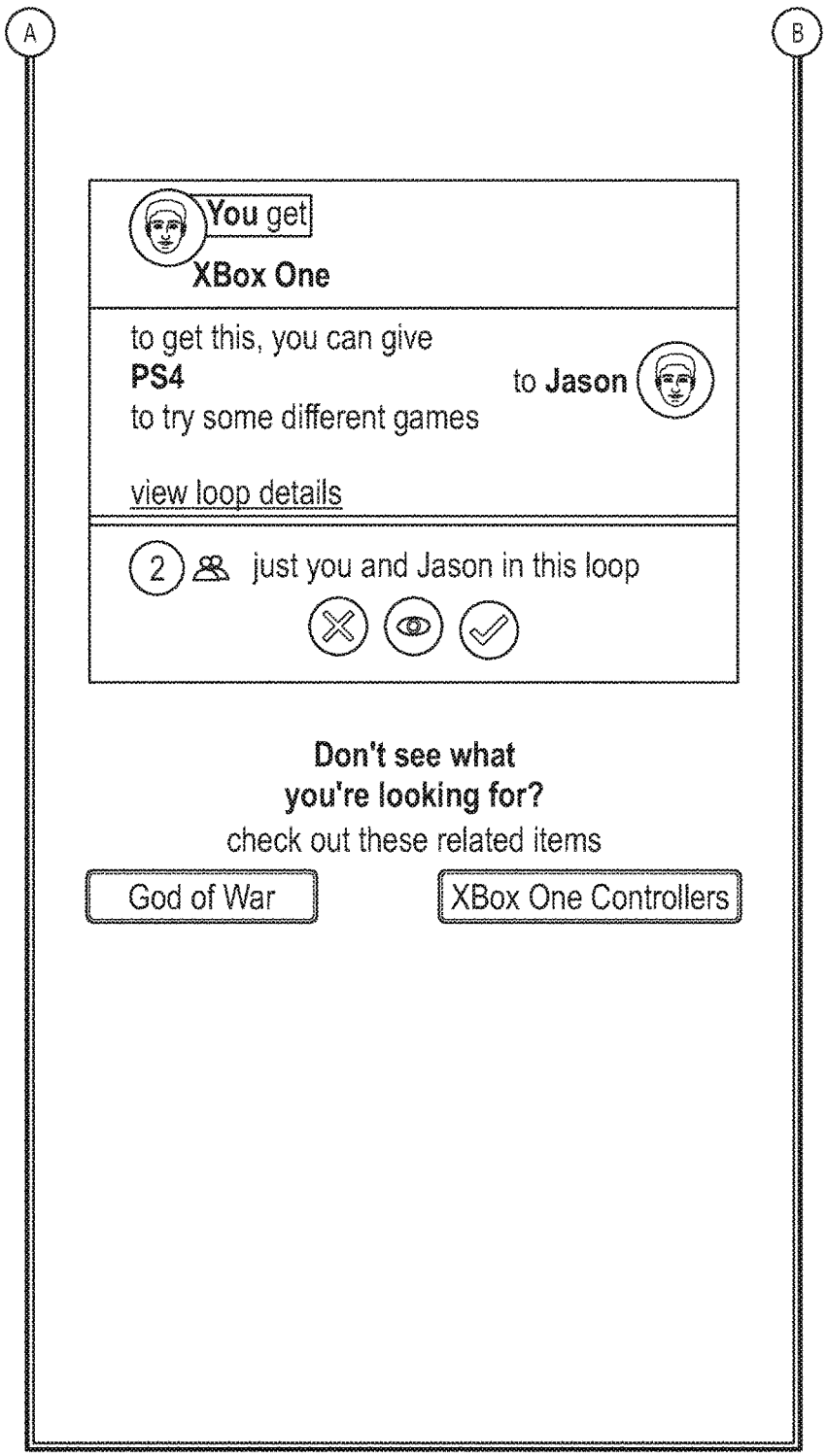
Figure 76:
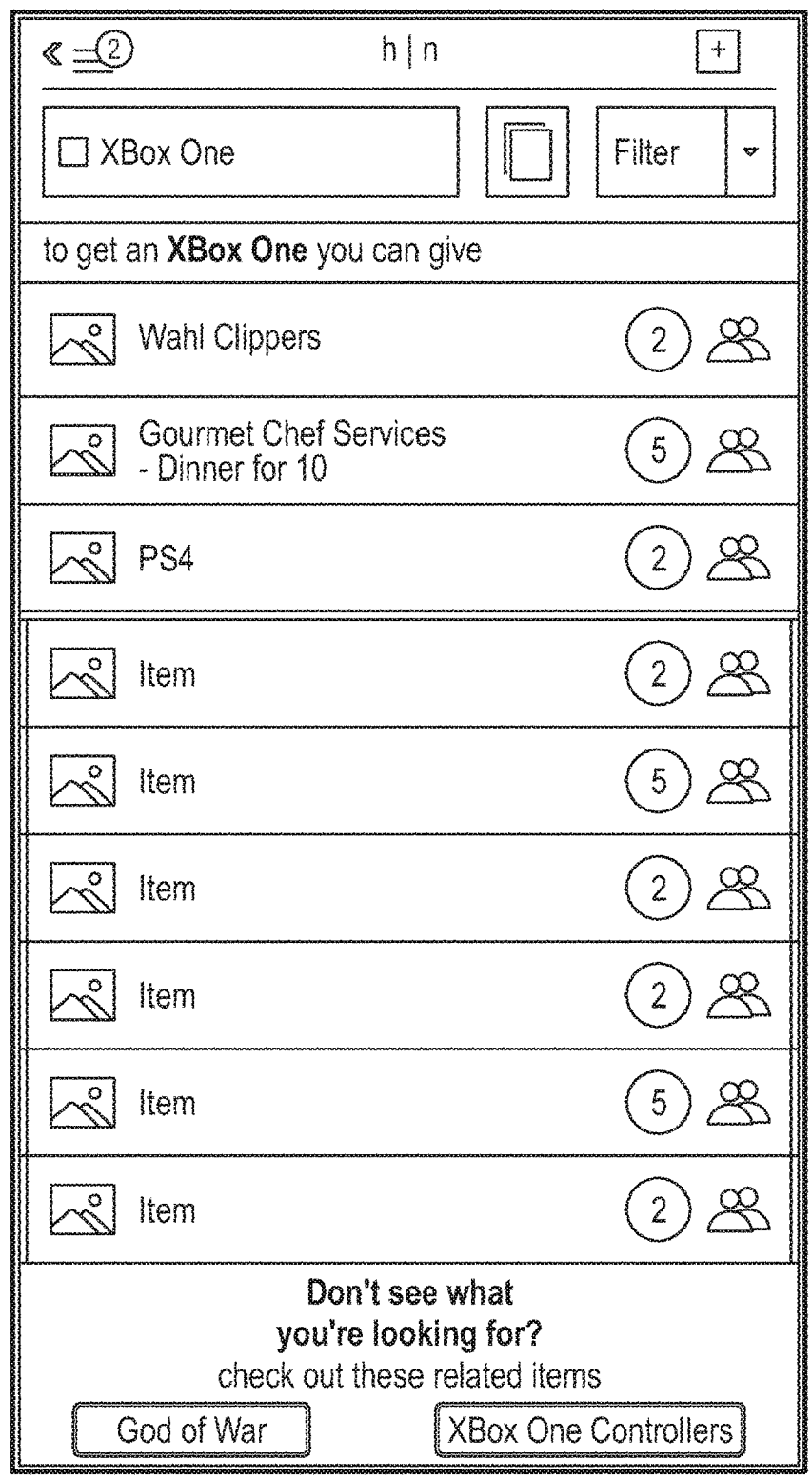
FIG. 76 illustrates a Minimized State page in the multi-party dynamic bartering network.
Figure 77:
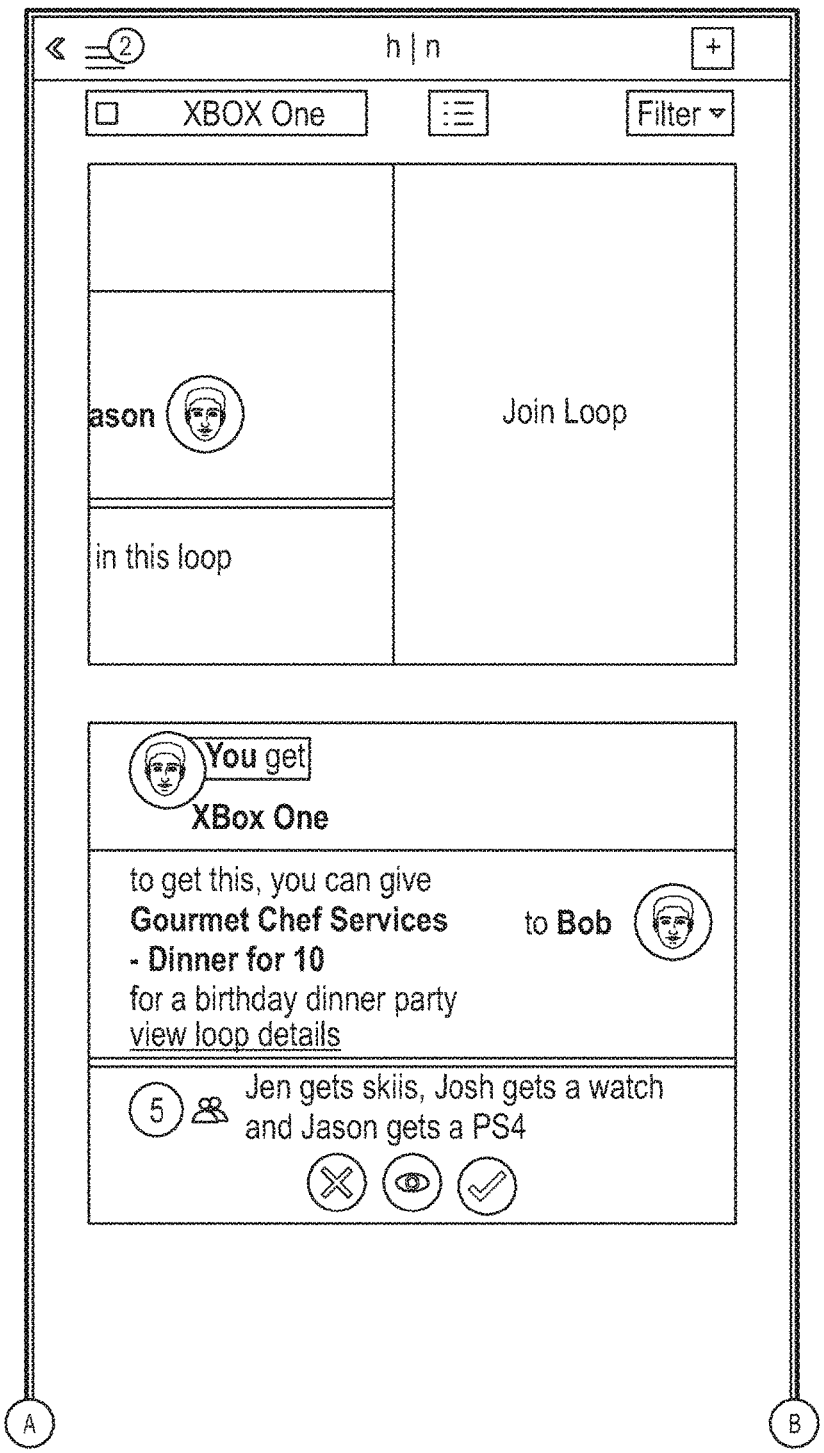
FIG. 77 illustrates a "Slide to Join Loop" Card page in the multi-party dynamic bartering network.
Figure 77:
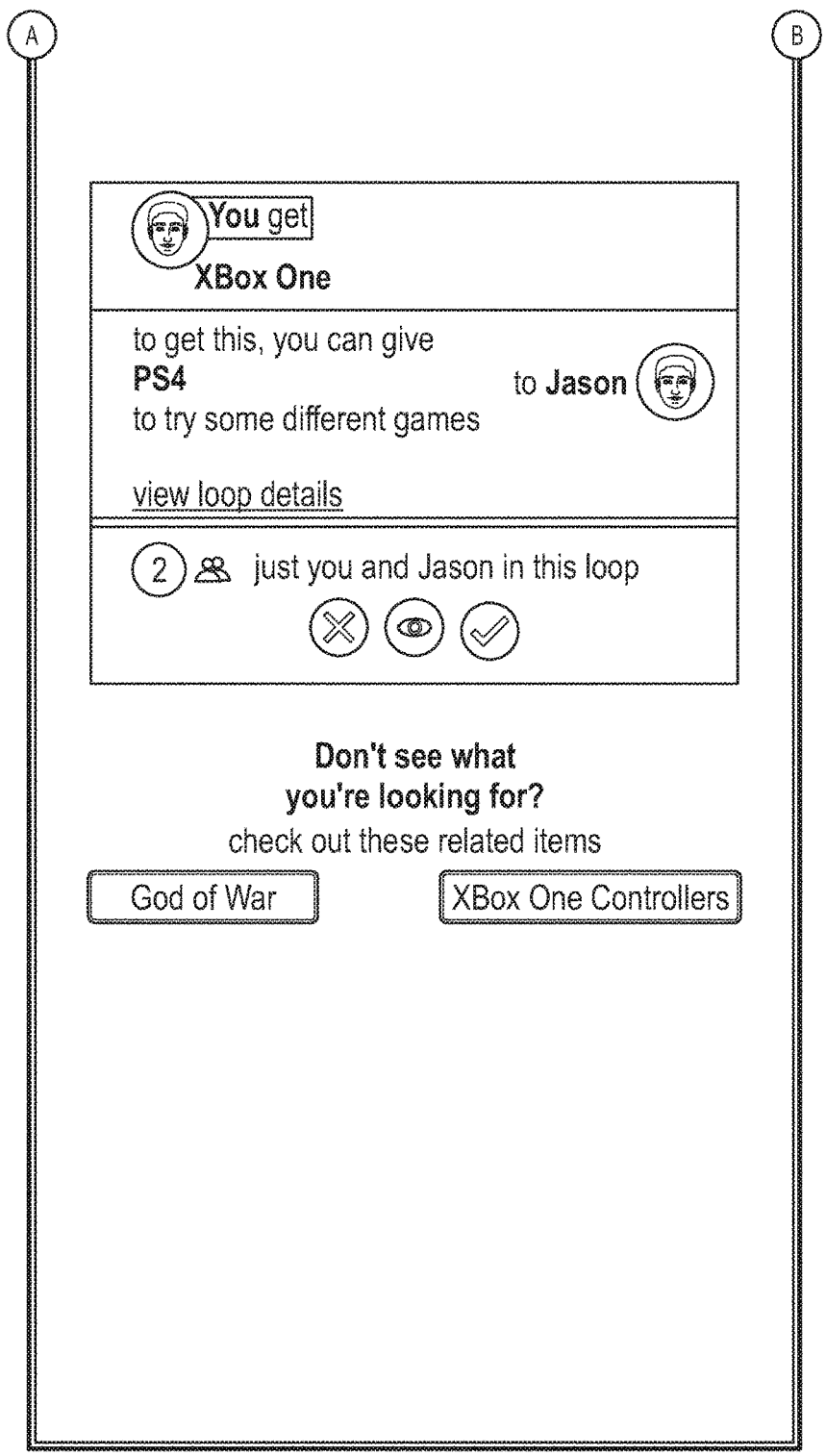
Figure 78:
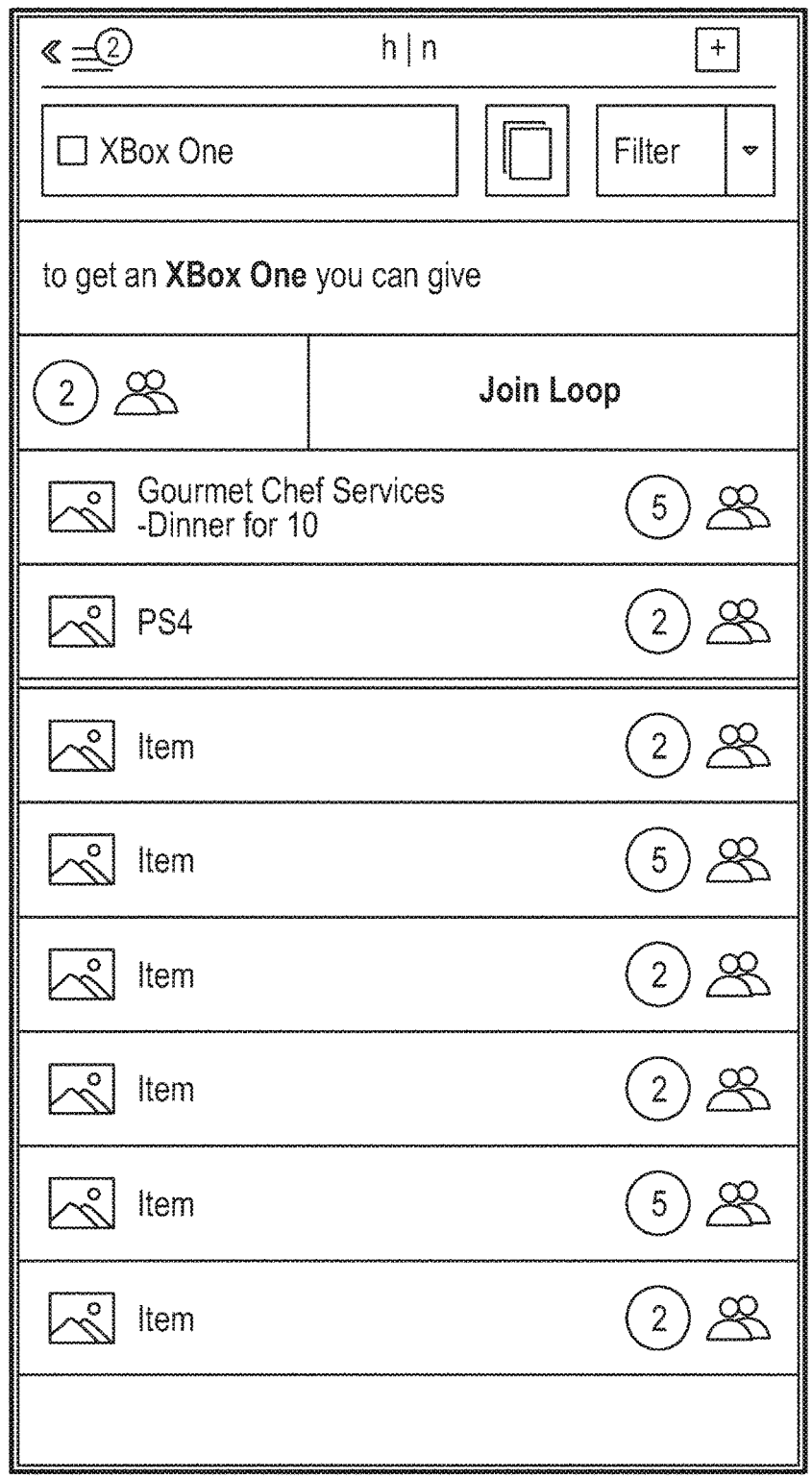
FIG. 78 illustrates a "Slide to Join Loop" page in the multi-party dynamic bartering network.
Figure 79:
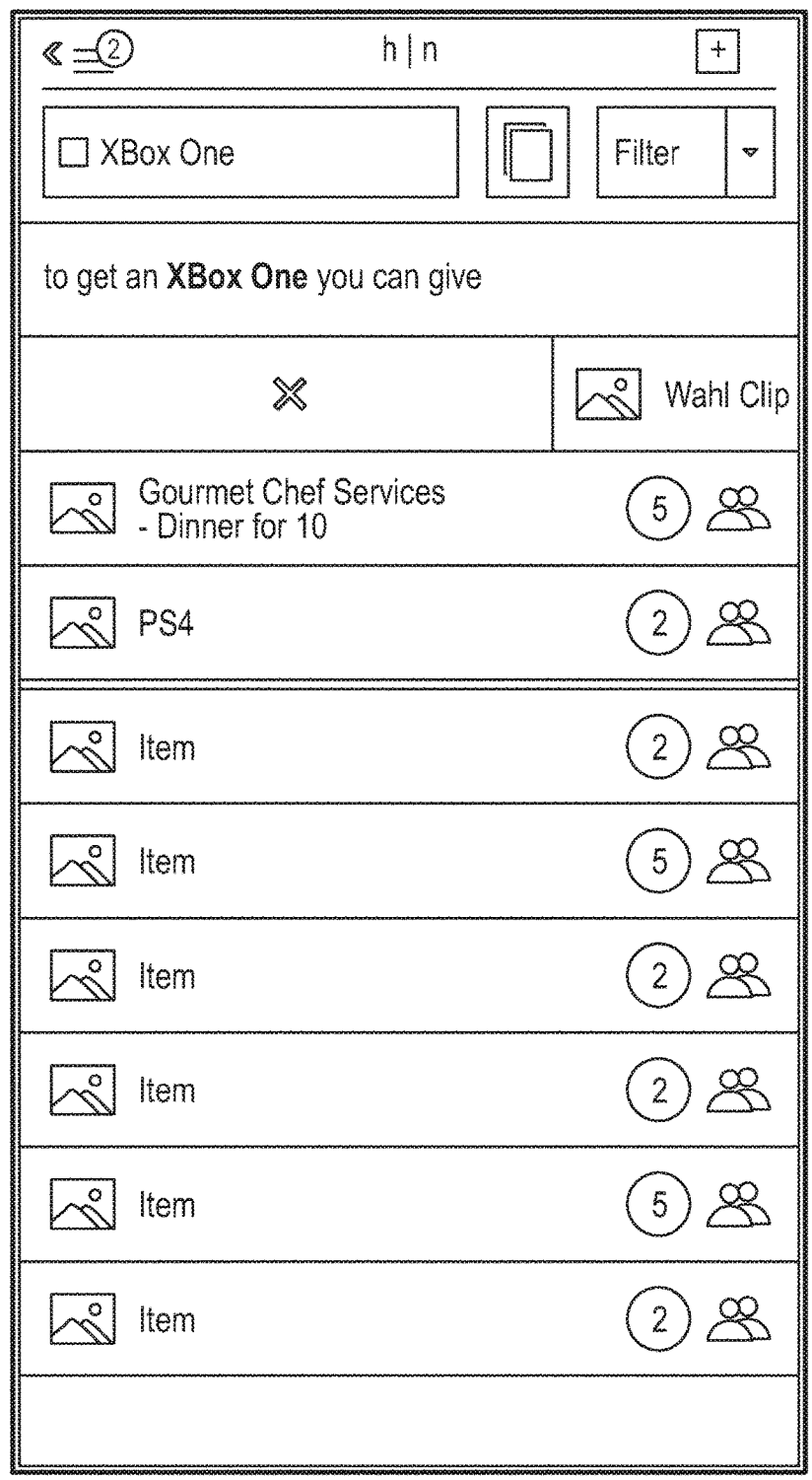
FIG. 79 illustrates a "Slide to Decline Loop" page in the multi-party dynamic bartering network.

Referring now to FIGS. 75-79, different techniques for joining and/or declining a Loop are shown. FIG. 75 shows a "Slide to Decline Loop" Card page (i.e., the User "swipes" to the right), FIG. 76 shows a Minimized State page, FIG. 77 shows a "Slide to Join Loop" Card page (i.e., the User "swipes" to the left), FIG. 78 shows a "Slide to Join Loop" page (i.e., the User "swipes" to the left), and FIG. 79 shows a "Slide to Decline Loop" page (i.e., the User "swipes" to the right) in some embodiments of the multi-party dynamic bartering network.

Figure 80:
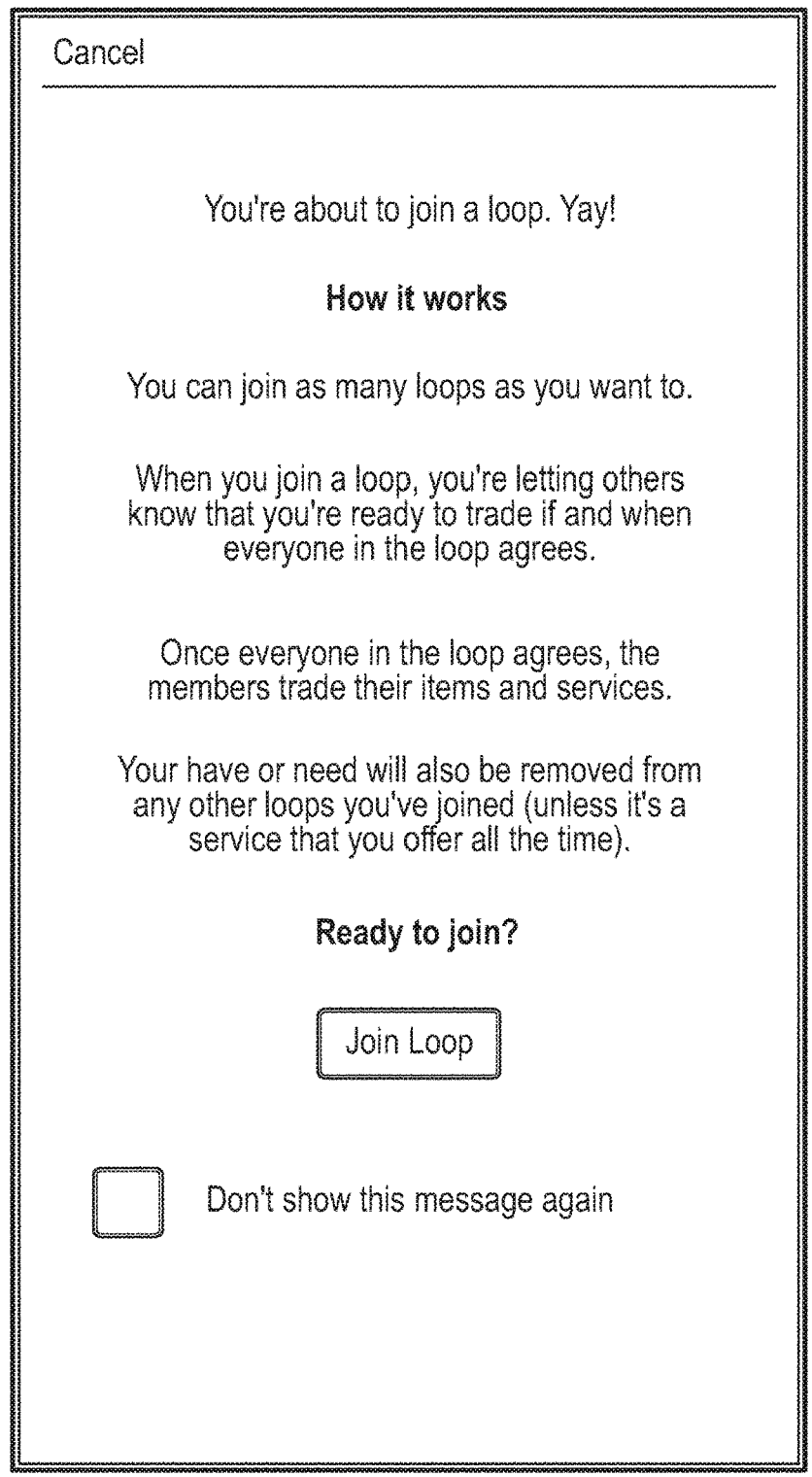
FIG. 80 illustrates a Join Loop Message page (with Loop Instructions) in the multi-party dynamic bartering network.

Referring now to FIG. 80, a Join Loop Message page with Loop Instructions is presented according to one embodiment of the multi-party dynamic bartering network. For example, these instructions may state "You can join as many loops as you want. When you join a loop, you're letting others know that you're ready to trade if and when everyone in the loop agrees. Once everyone in the loop agrees, the members trade their items and services. Your have or need will also be removed from any other loops you've joined (unless it's a service that you offer all the time)." The Join Loop Message page also includes a link to join the Loop.

Figure 82:
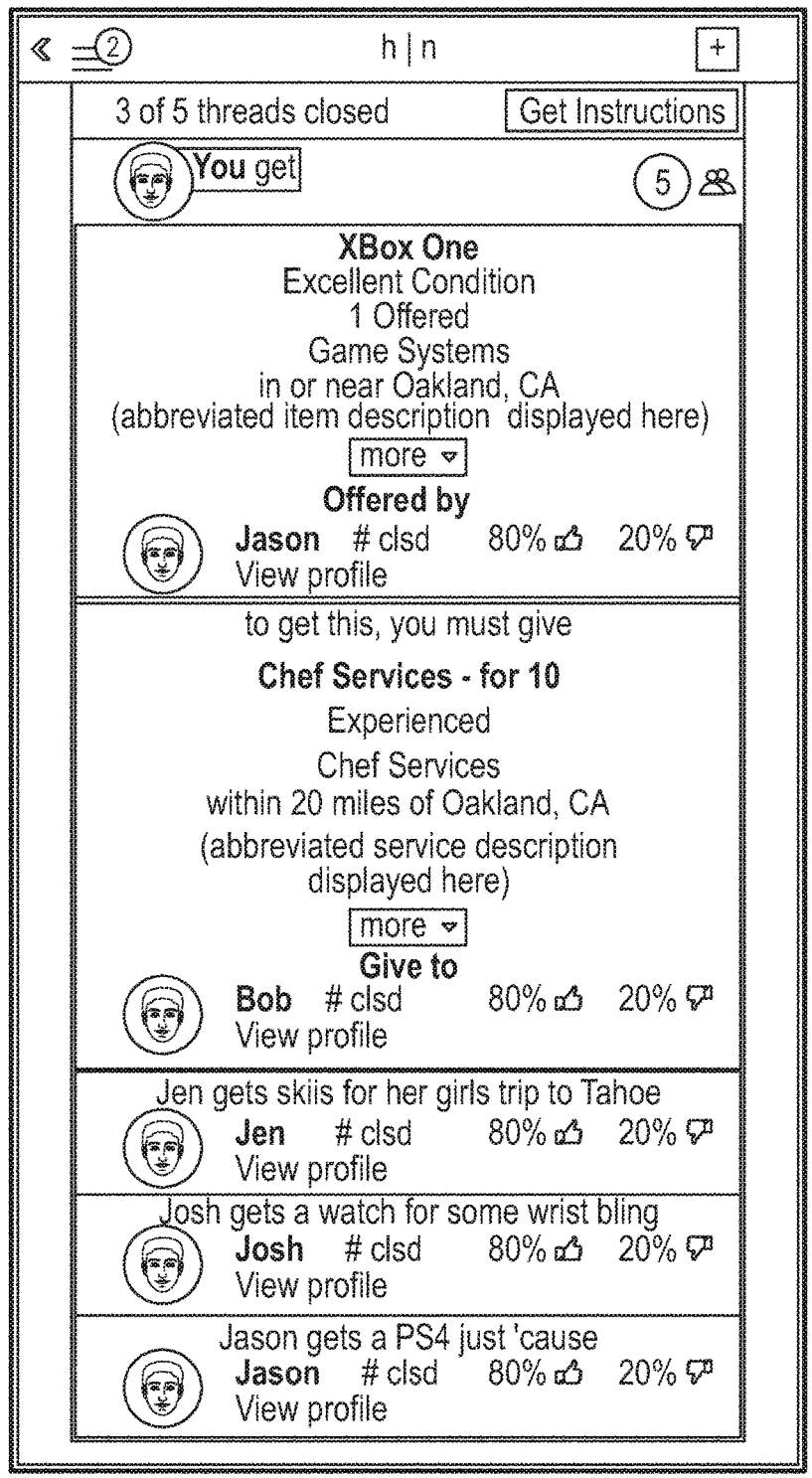
FIG. 82 illustrates a User's Pending Loop Details page in the multi-party dynamic bartering network.
Figure 83:
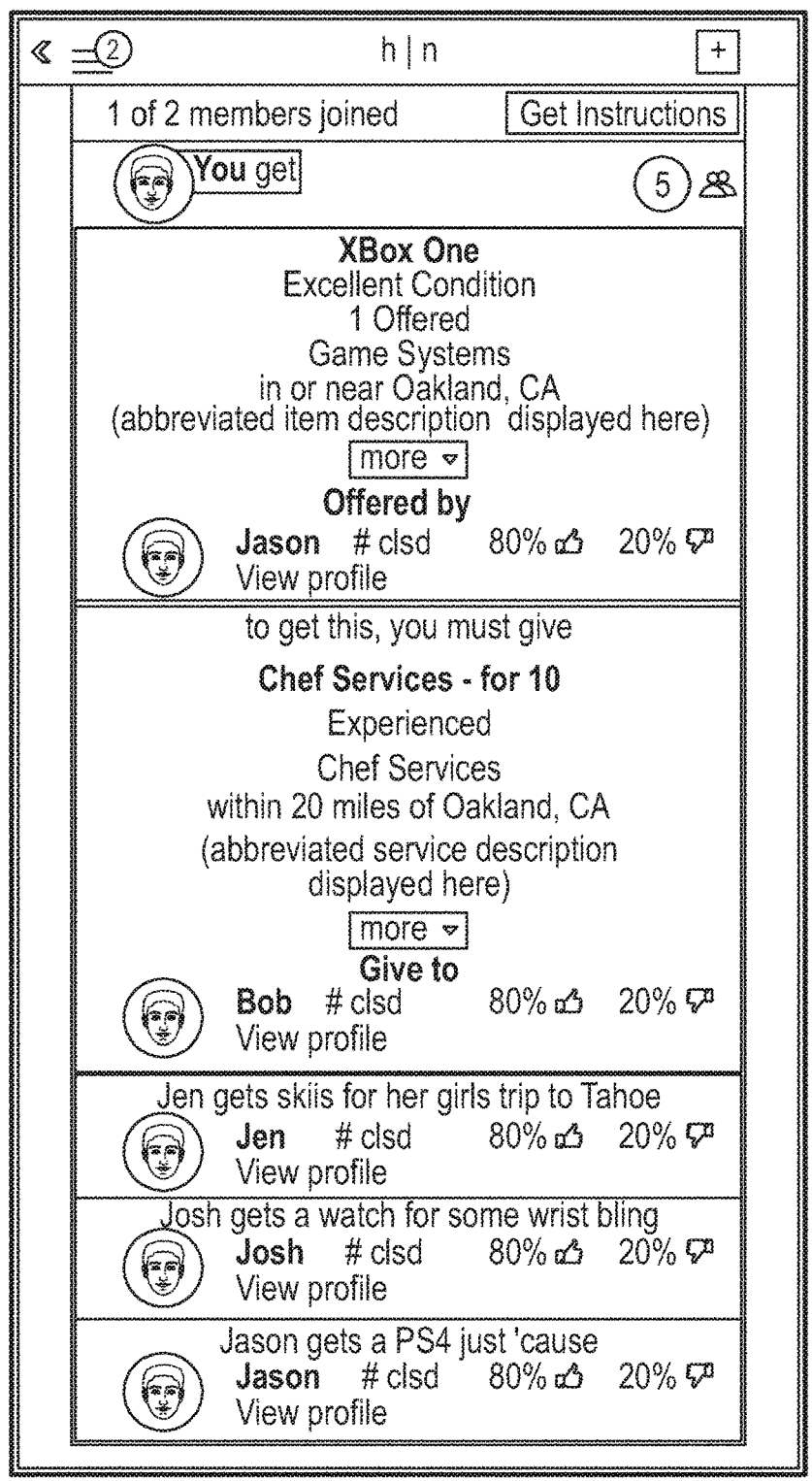
FIG. 83 illustrates a User's Joined Loop Details page in the multi-party dynamic bartering network.
Figure 84:
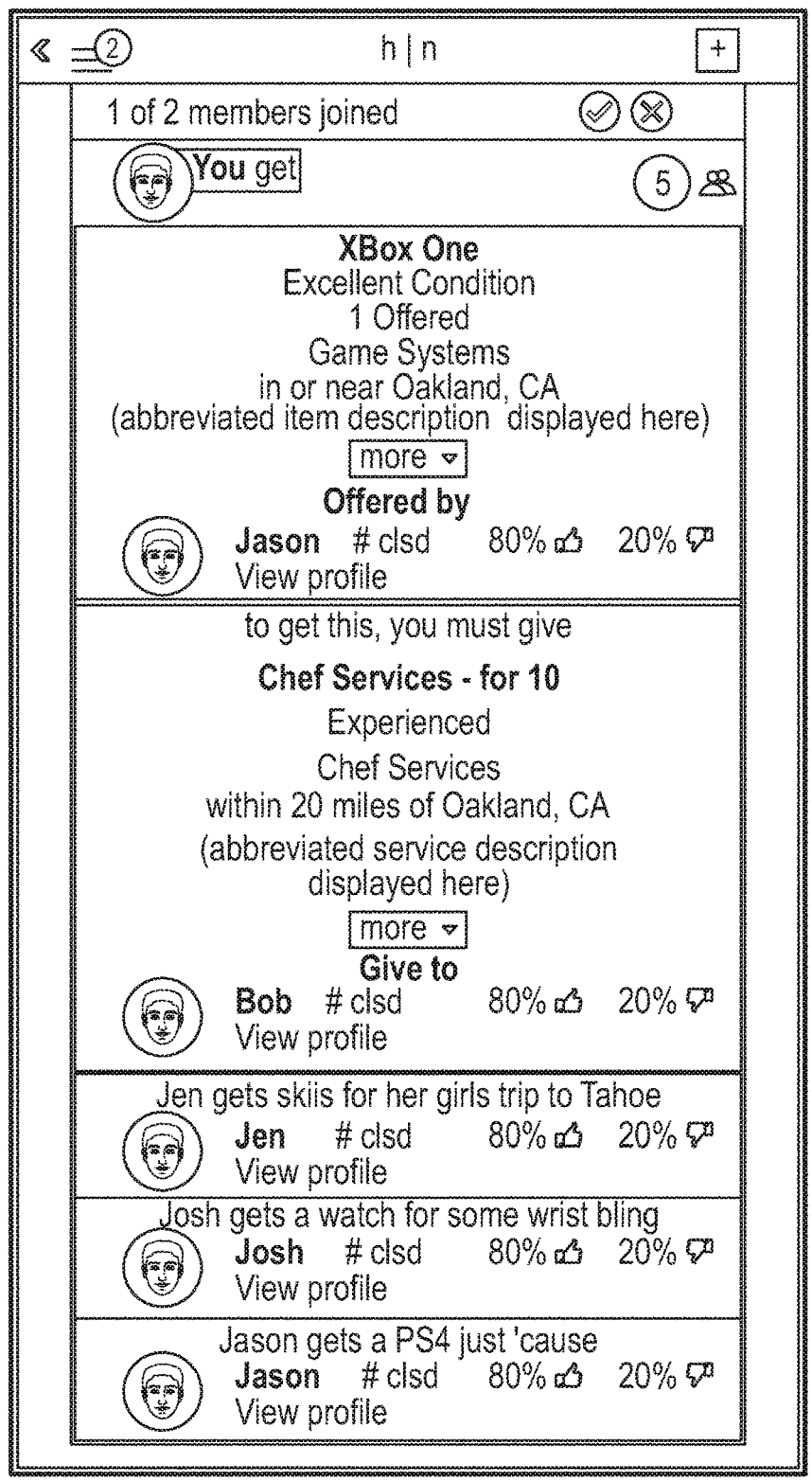
FIG. 84 illustrates a User's Watched Loop Details page in the multi-party dynamic bartering network.
Figure 85:
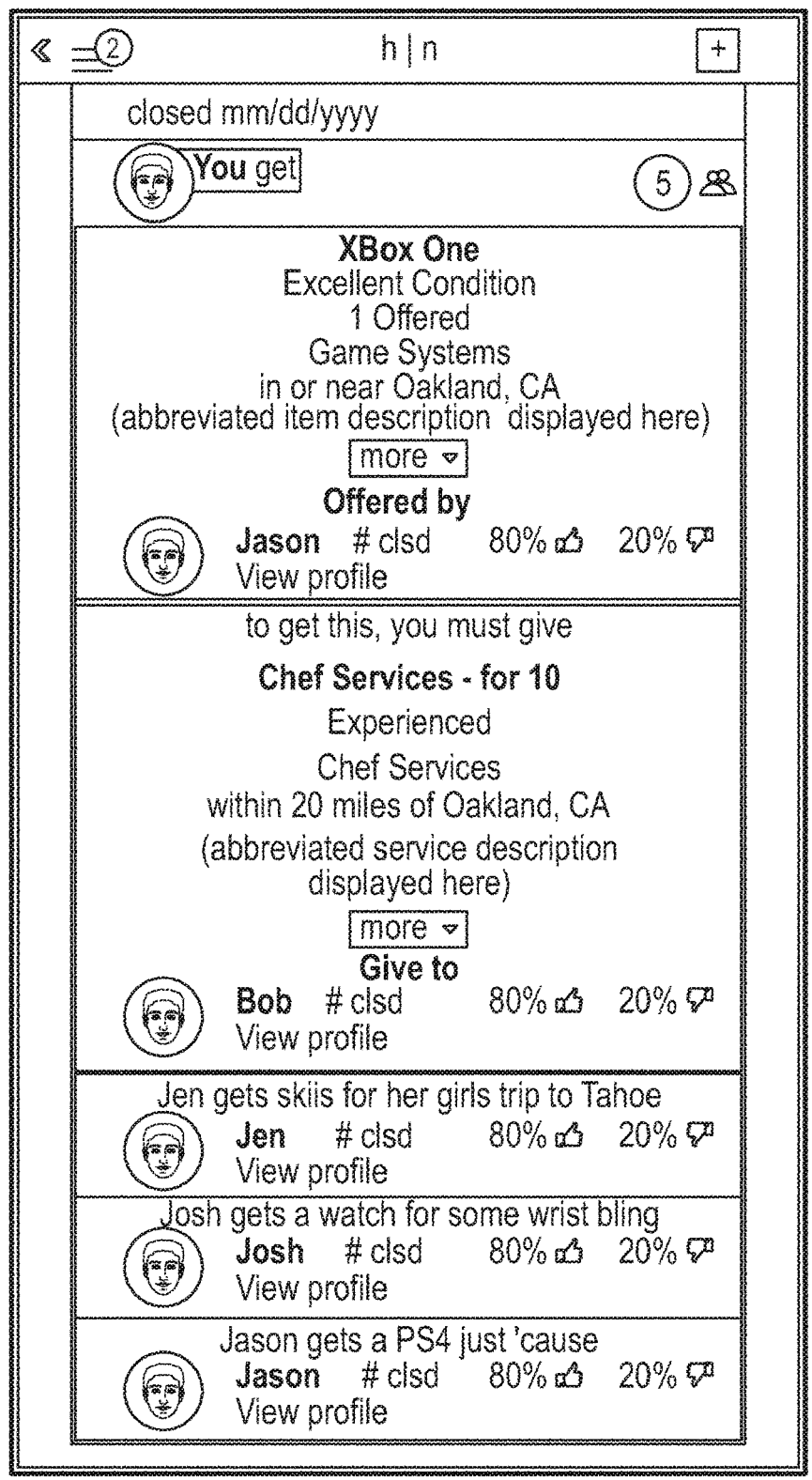
FIG. 85 illustrates a User's Closed Loop Details page in the multi-party dynamic bartering network.
Figure 86:
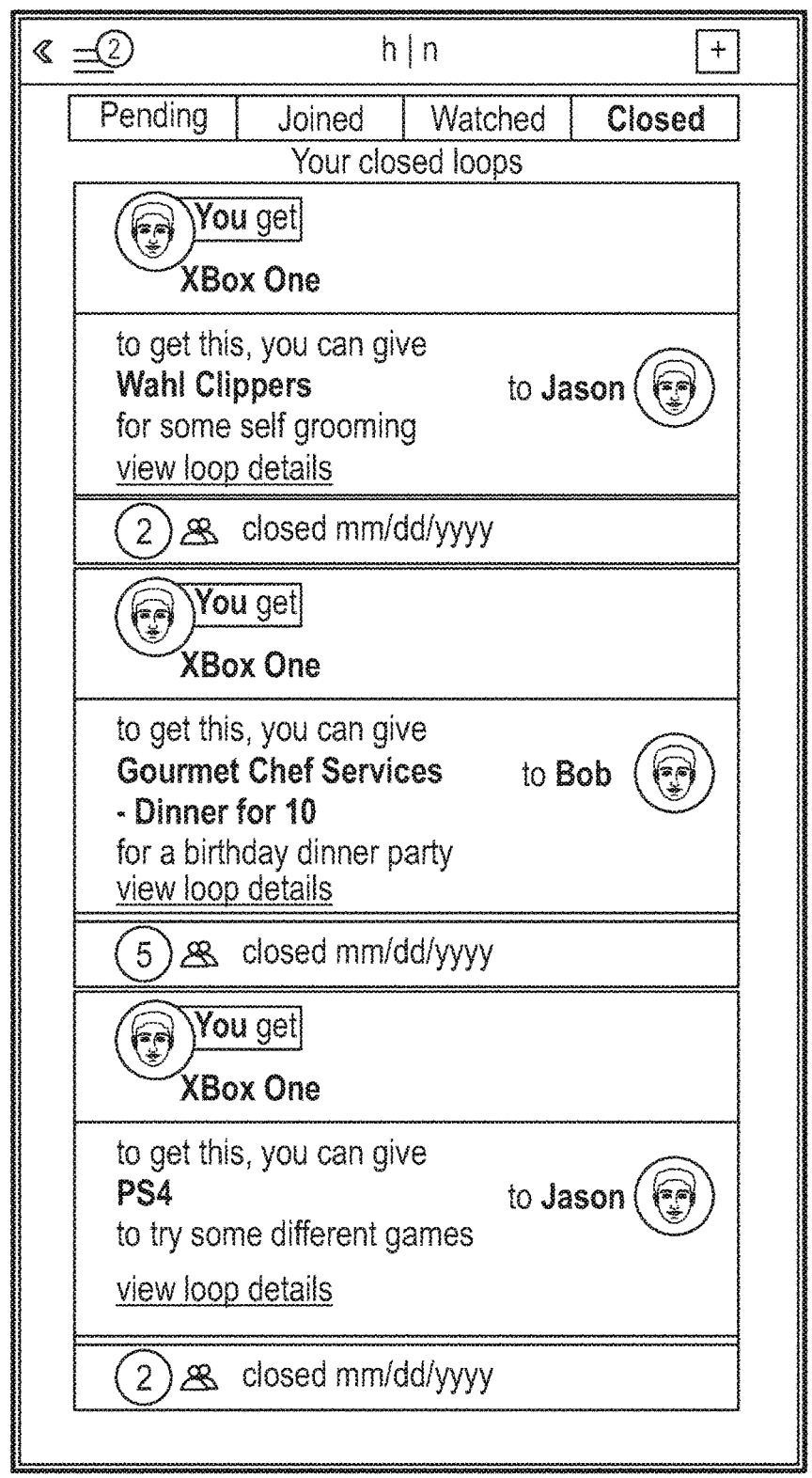
FIG. 86 illustrates a User's "My Loops—Closed" page in the multi-party dynamic bartering network.
Figure 87:
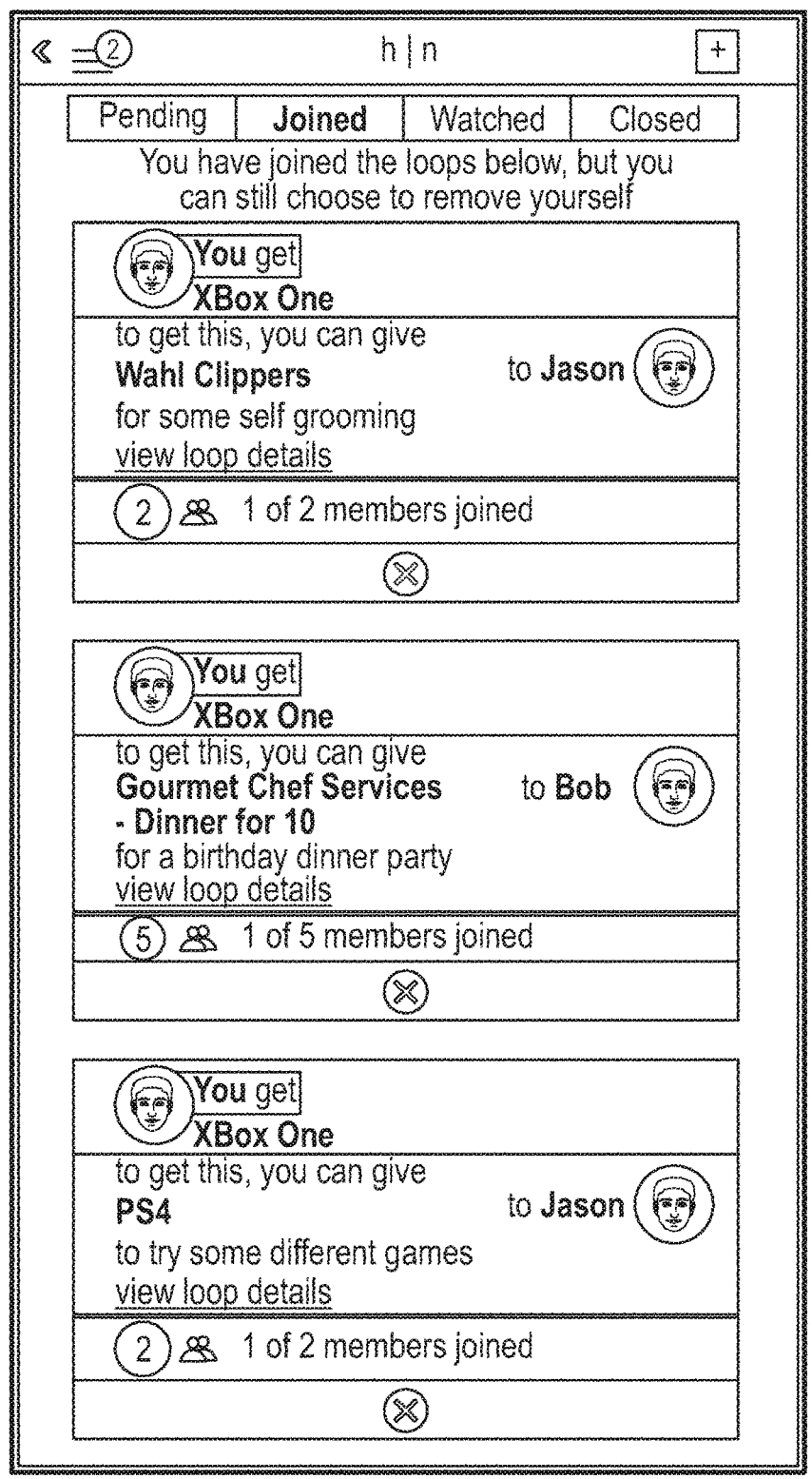
FIG. 87 illustrates a User's "My Loops—Joined" page in the multi-party dynamic bartering network.
Figure 88:
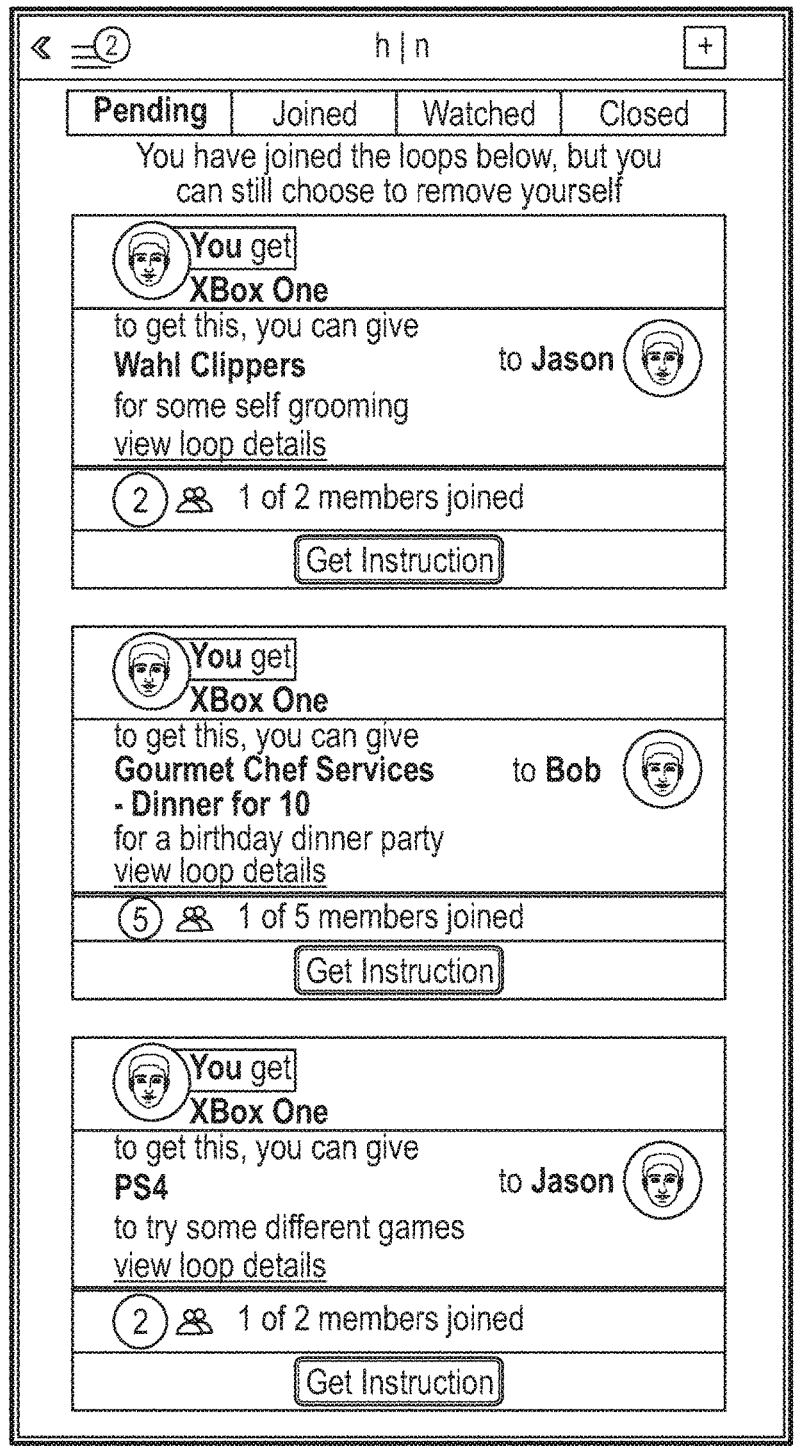
FIG. 88 illustrates a User's "My Loops—Pending" page in the multi-party dynamic bartering network.
Figure 89:
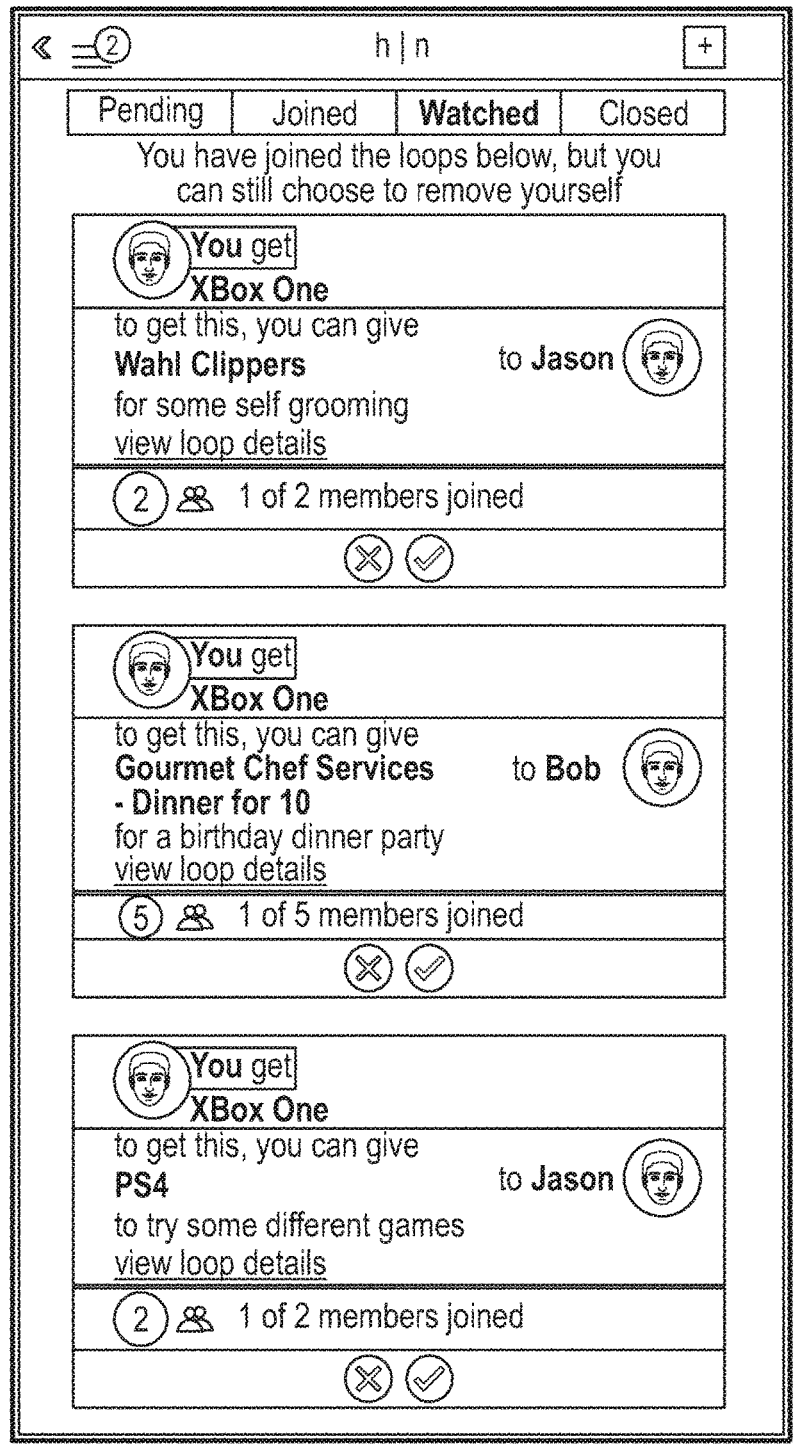
FIG. 89 illustrates a User's "My Loops—Watched" page in the multi-party dynamic bartering network.

In some embodiments of the multi-party dynamic bartering network, various instructions page are provided to Users that are in the Loops. For example, FIG. 81 shows a Shipping Address Request page that may be presented to appropriate Loop members. FIG. 82 presents details on a User's Pending Loop page. FIG. 83 presents details on a User's Joined Loop page. FIG. 84 presents details on a User's Watched Loop page. FIG. 85 presents details on a User's Closed Loop page. FIG. 86 presents details on a User's "My Loops—Closed" page. FIG. 87 presents details on a User's "My Loops—Joined" page. FIG. 88 presents details on a User's "My Loops—Pending" page. FIG. 89 presents details on a User's "My Loops—Watched" page.

Figure 90:
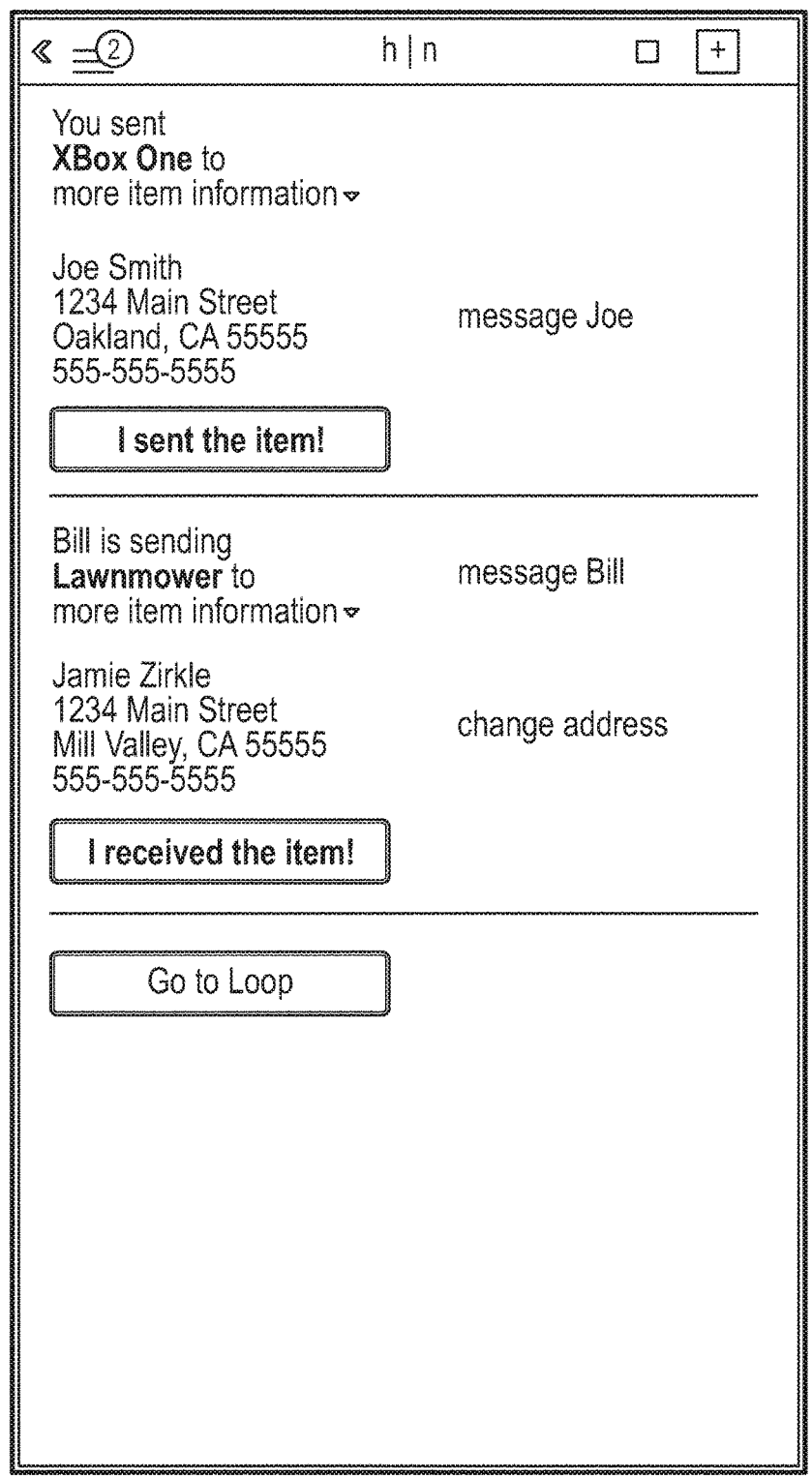
FIG. 90 illustrates an Item Instructions page from a closed loop in the multi-party dynamic bartering network.
Figure 91:
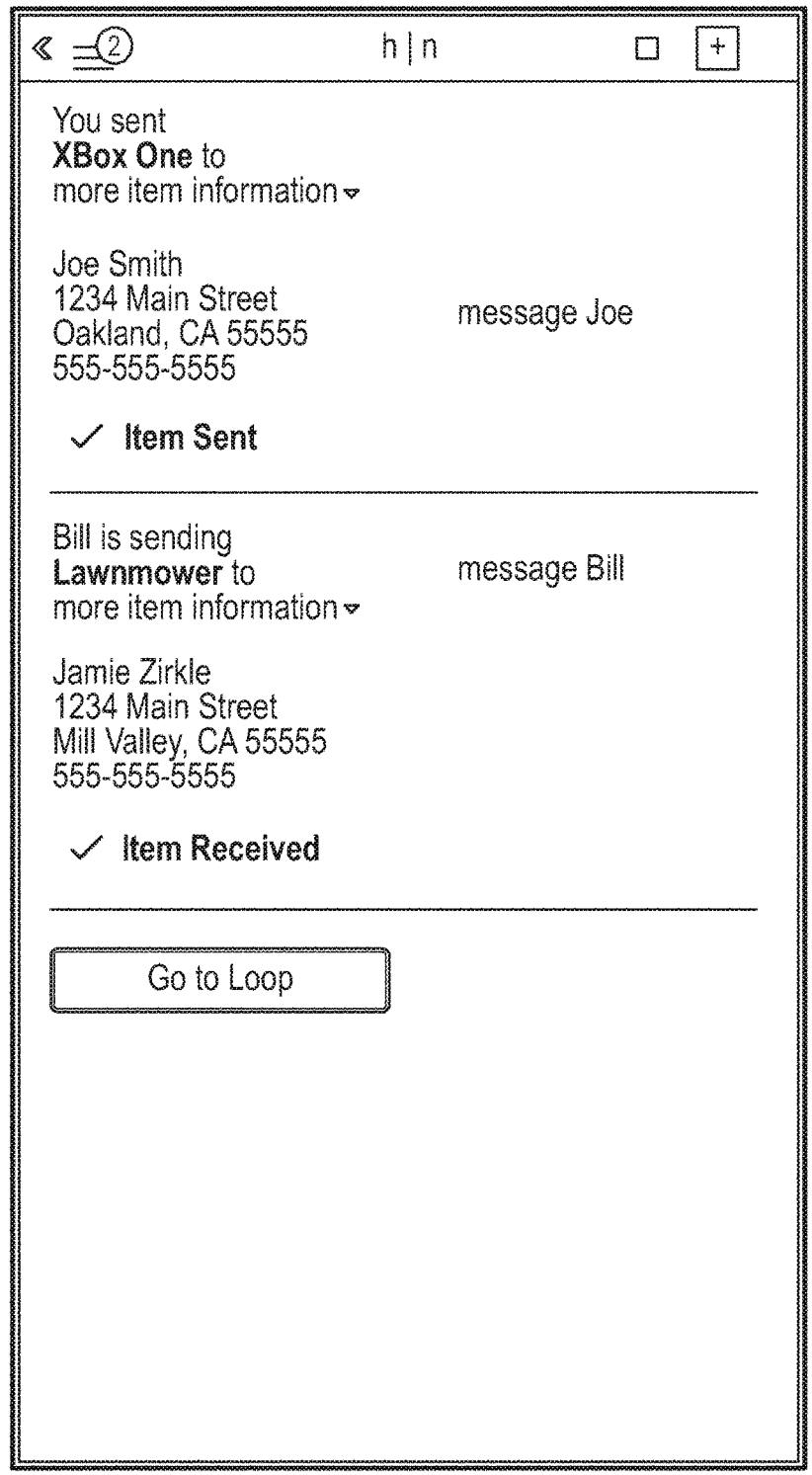
FIG. 91 illustrates a Completed Item page from a closed loop in the multi-party dynamic bartering network.
Figure 92:
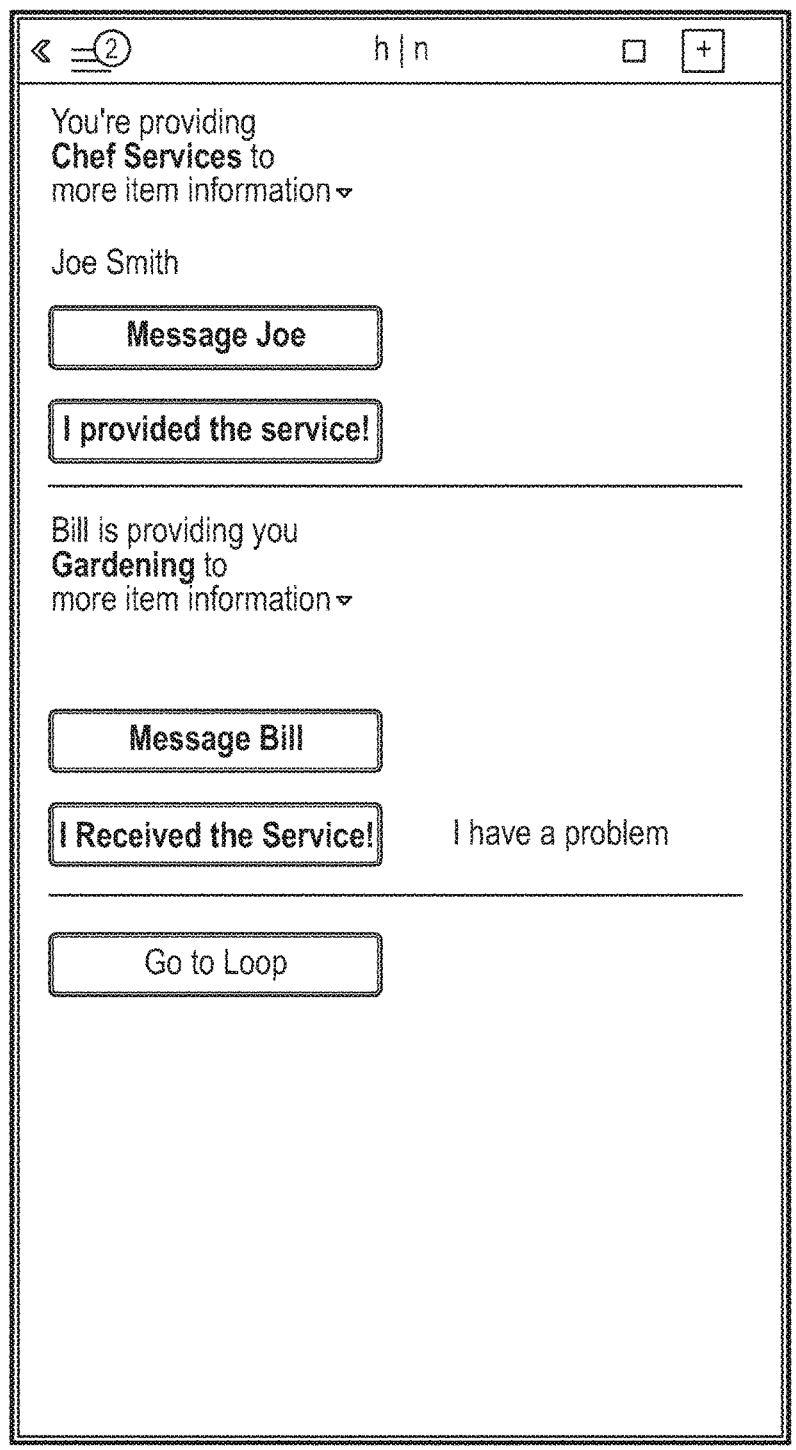
FIG. 92 illustrates a Service Instructions page from a closed loop in the multi-party dynamic bartering network.
Figure 93:
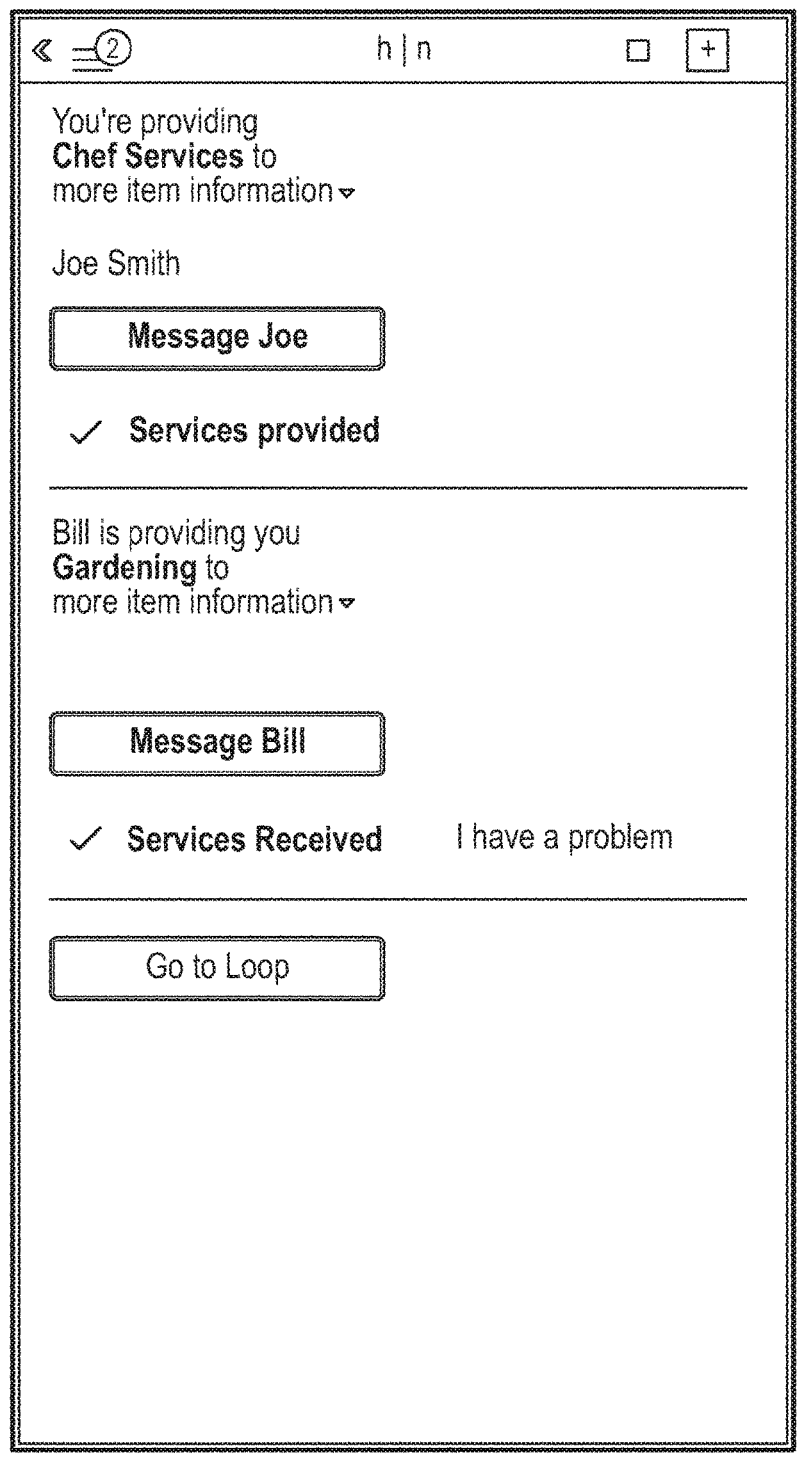
FIG. 93 illustrates a Completed Service page from a closed loop in the multi-party dynamic bartering network.

In some embodiments of the multi-party dynamic bartering network, various instructions page are provided to Users that are in closed Loops. For example, in FIG. 90 an Item Instructions page from a closed loop in one embodiment of the multi-party dynamic bartering network is illustrated. FIG. 91 shows a completed Item page from a closed loop. FIG. 92 shows a Service Instructions page from a closed loop. FIG. 93 shows a completed Service page from a closed loop.

Figure 94:
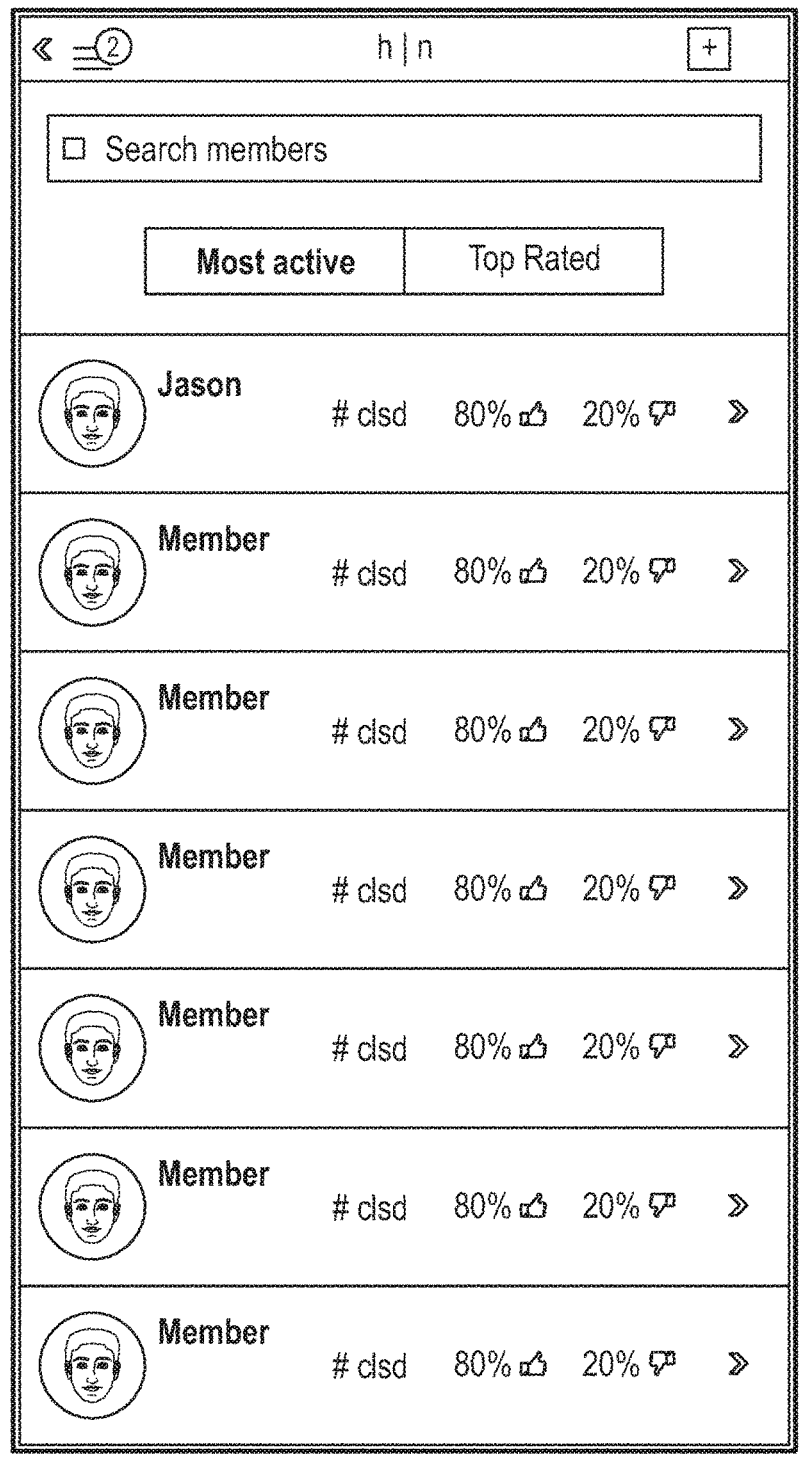
FIG. 94 illustrates a User Community page (showing member searching and member search results as filtered by "Most Active" and "Top Rated") in the multi-party dynamic bartering network.
Figure 95:
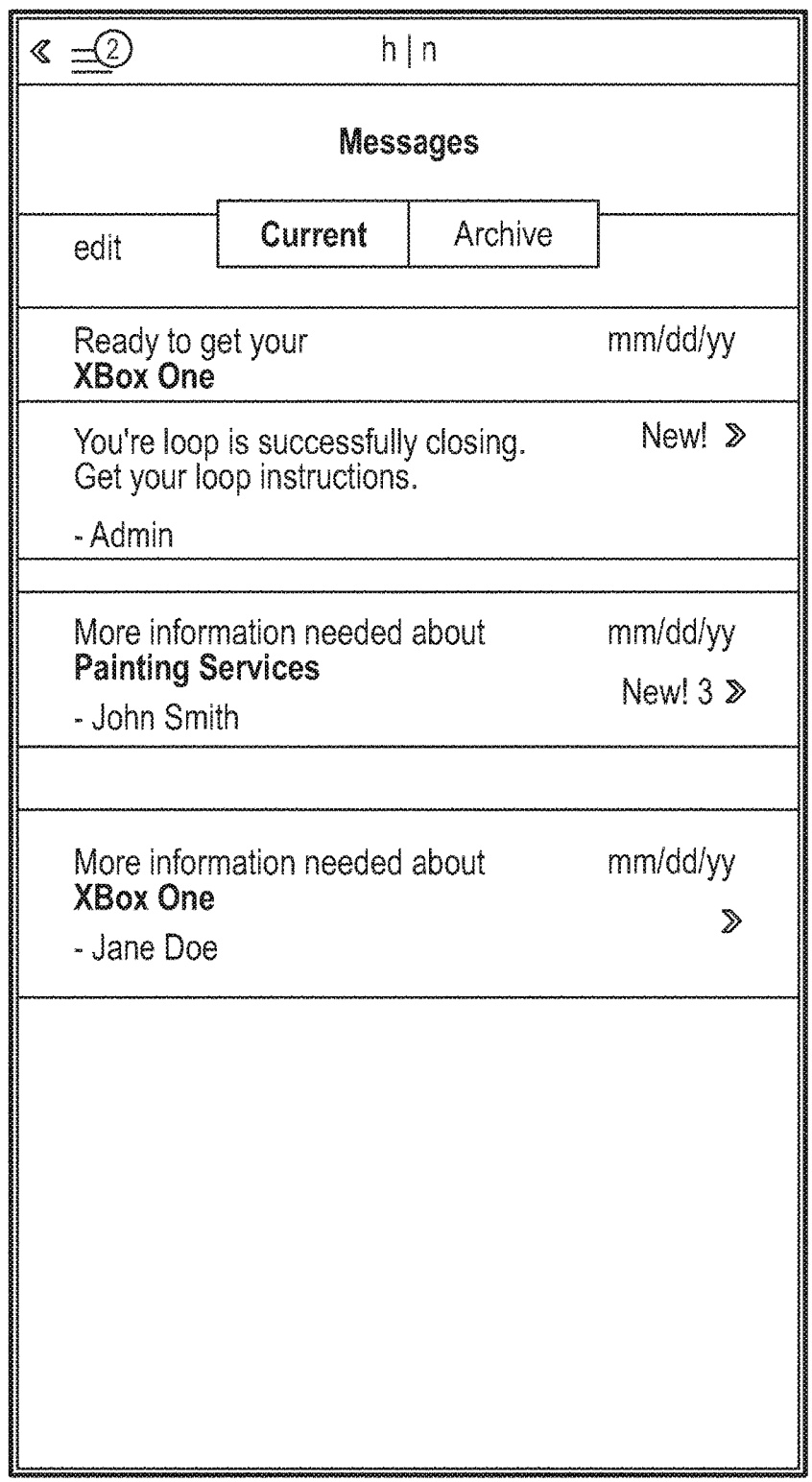
FIG. 95 illustrates a User Messages page in the multi-party dynamic bartering network.
Figure 97:
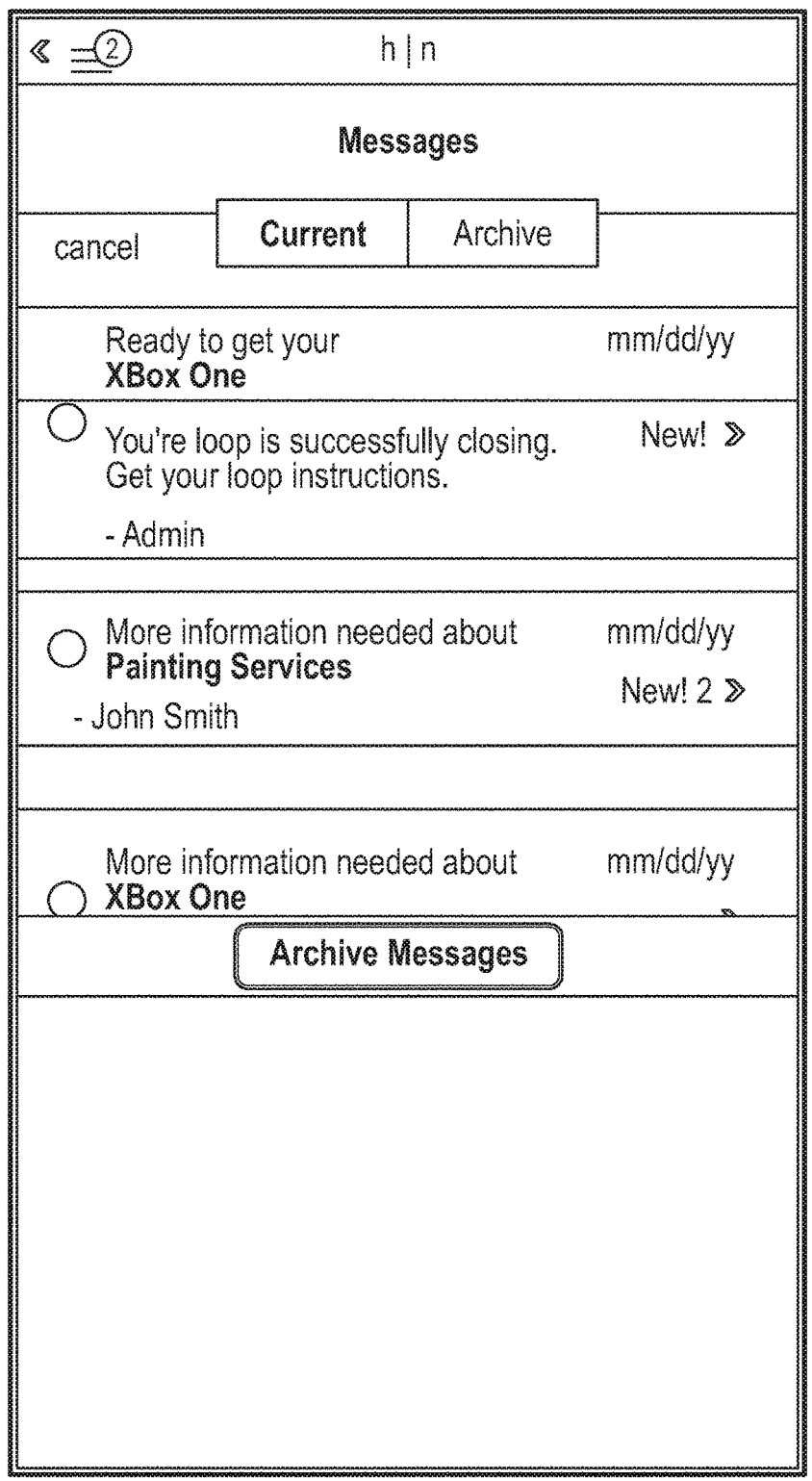
FIG. 97 illustrates a User Messages edit page in the multi-party dynamic bartering network.
Figure 98:
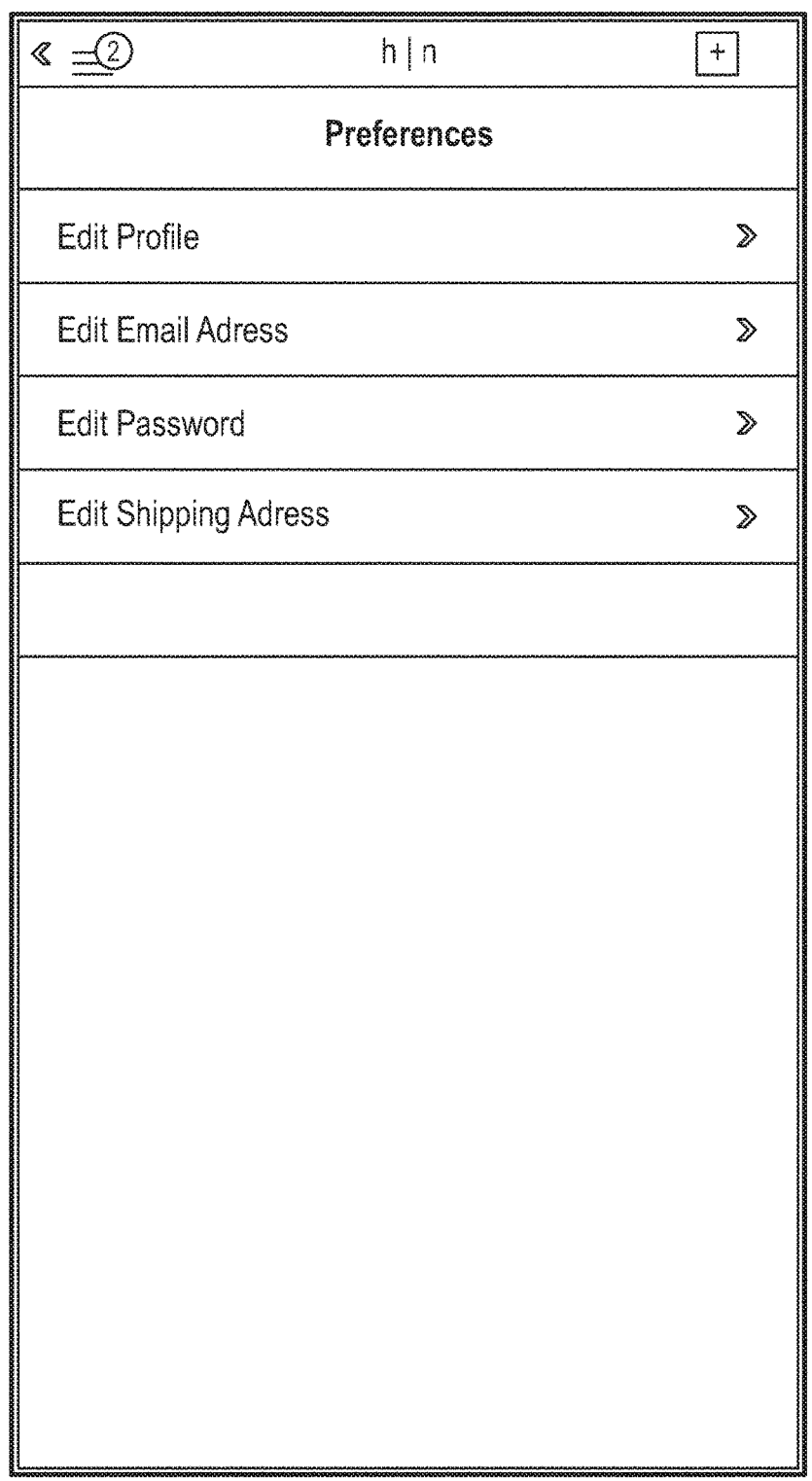
FIG. 98 illustrates a User preferences page in the multi-party dynamic bartering network.

Referring now to FIG. 94, a User Community page (showing member searching and member search results as filtered by "Most Active" and "Top Rated") is shown. FIG. 95 shows a User Messages page in the multi-party dynamic bartering network. FIG. 96 shows a User Messages details page in the multi-party dynamic bartering network. FIG. 97 shows a User Messages edit page in the multi-party dynamic bartering network. FIG. 98 shows a User preferences page in the multi-party dynamic bartering network.

Figure 99:
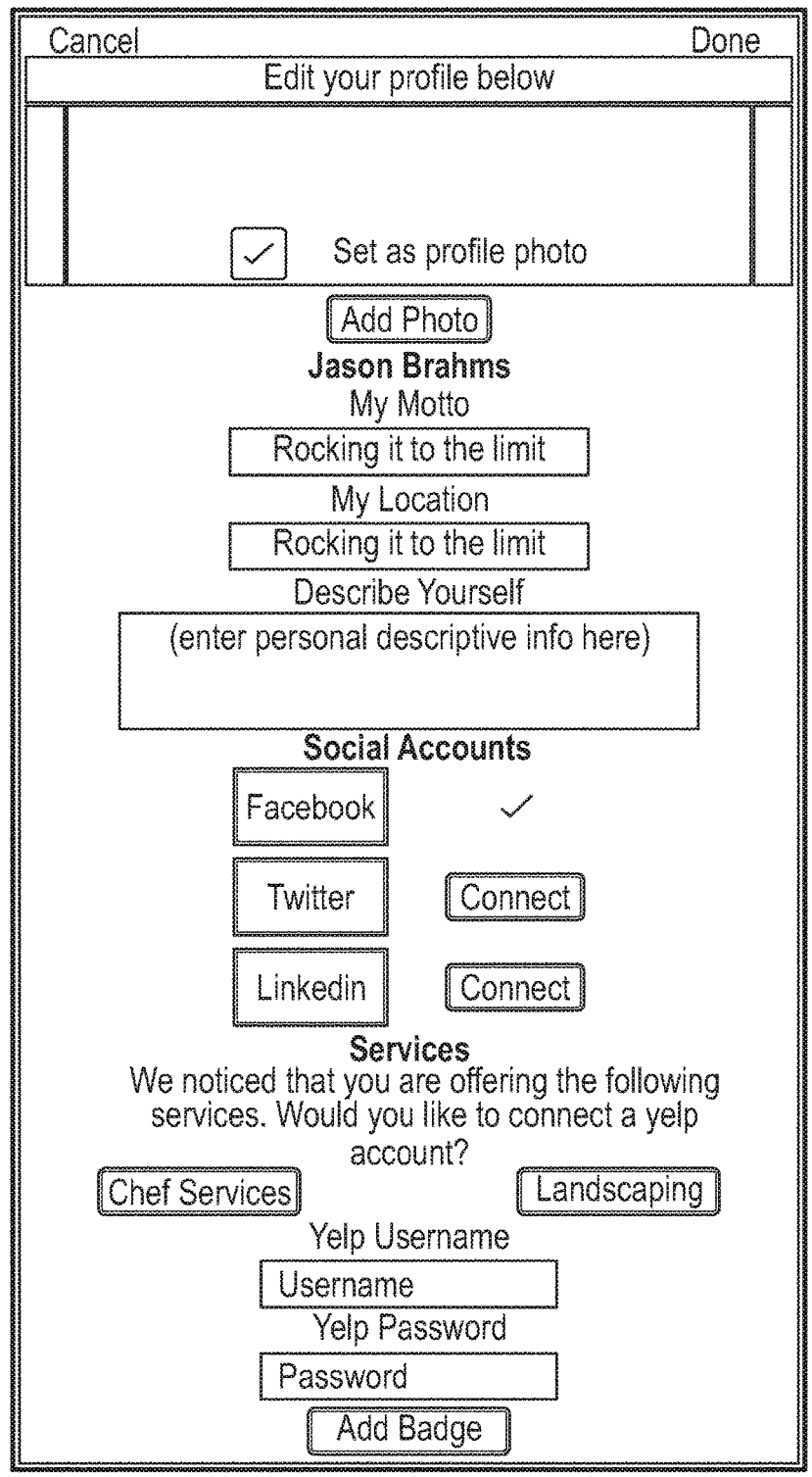
FIG. 99 illustrates a User profile edit page with services prompt in the multi-party dynamic bartering network.
Figure 100:
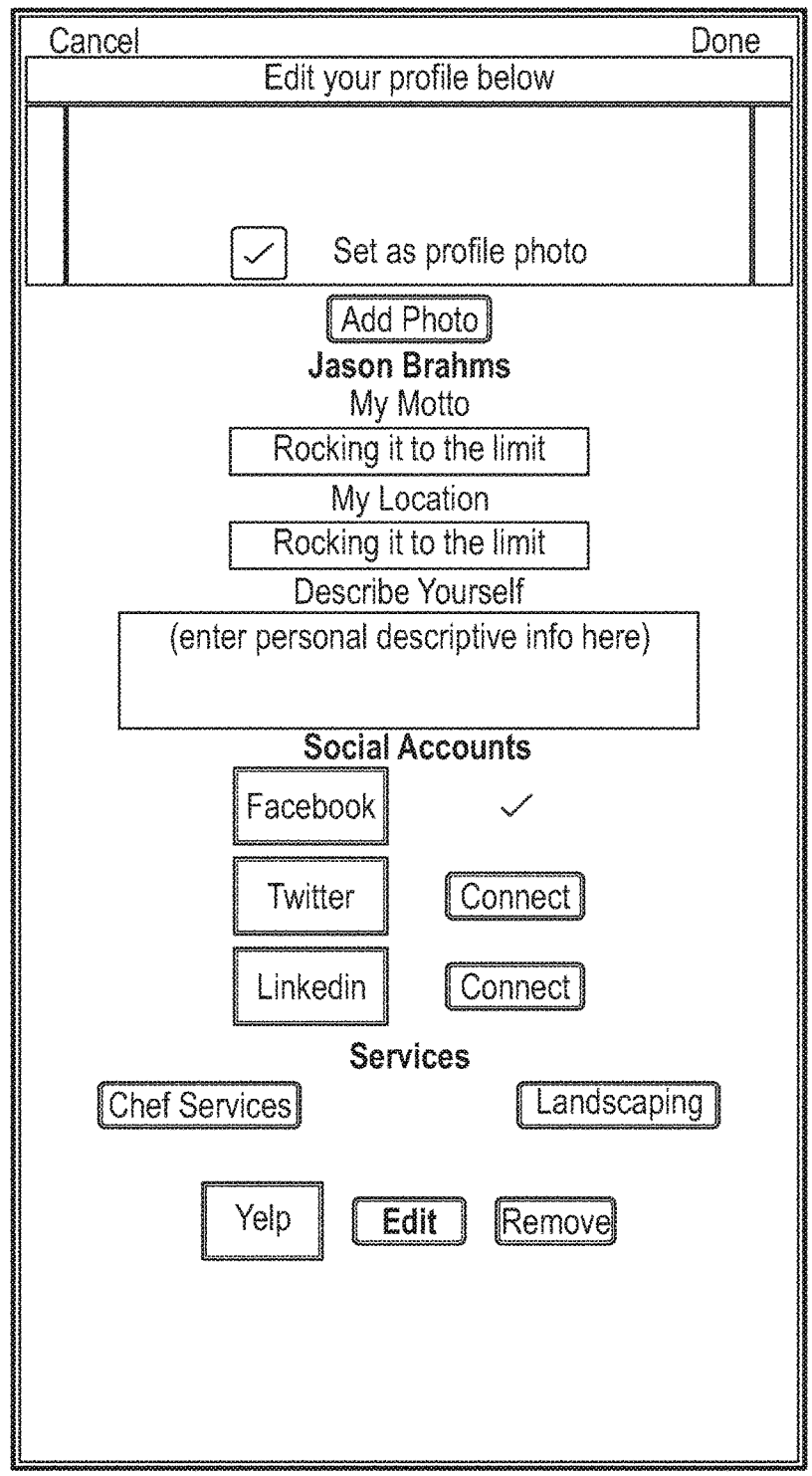
FIG. 100 illustrates a User profile edit page with Yelp rating in the multi-party dynamic bartering network.
Figure 101:
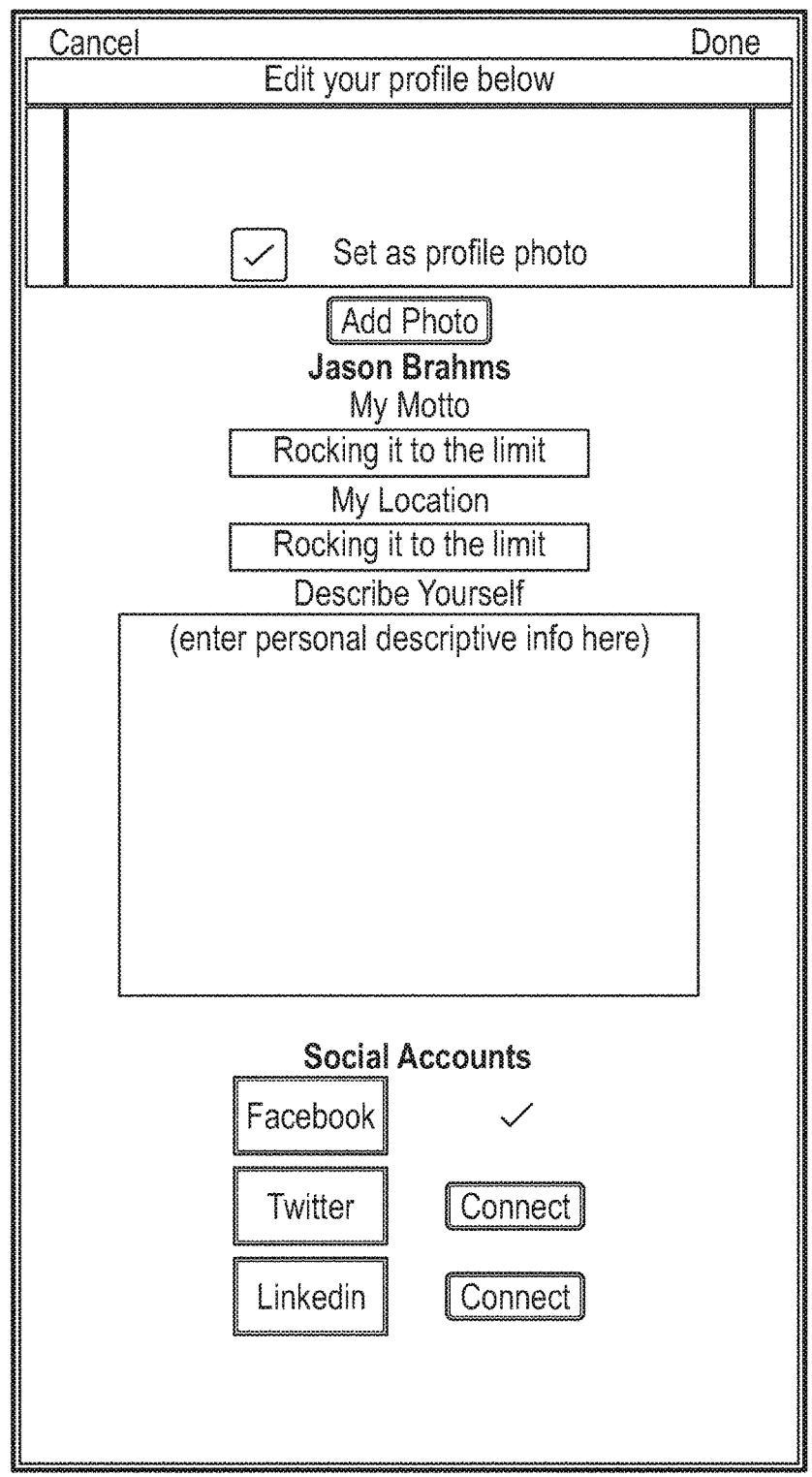
FIG. 101 illustrates a User profile edit page in the multi-party dynamic bartering network.
Figure 102:
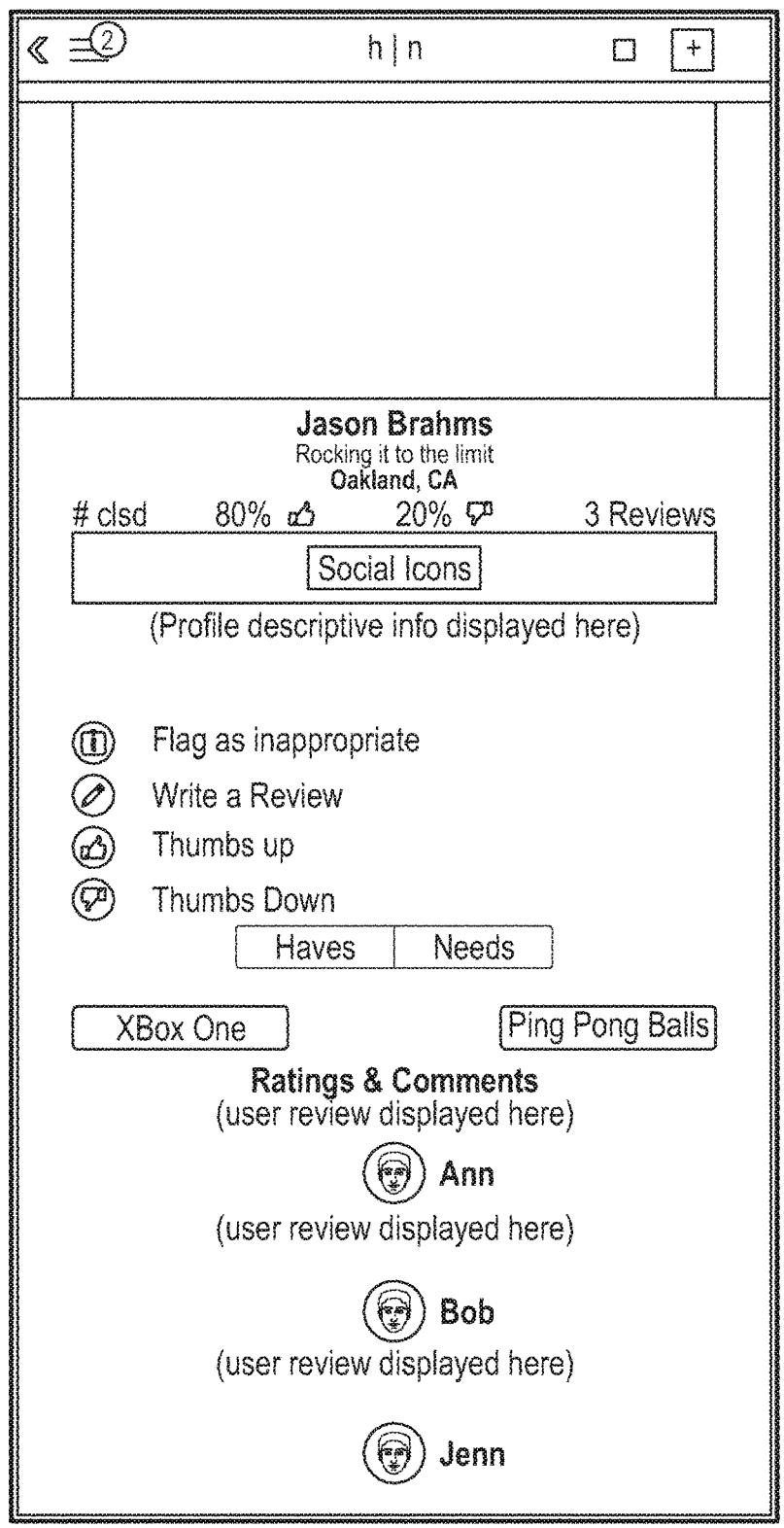
FIG. 102 illustrates a simple User Profile page in the multi-party dynamic bartering network.
Figure 103:
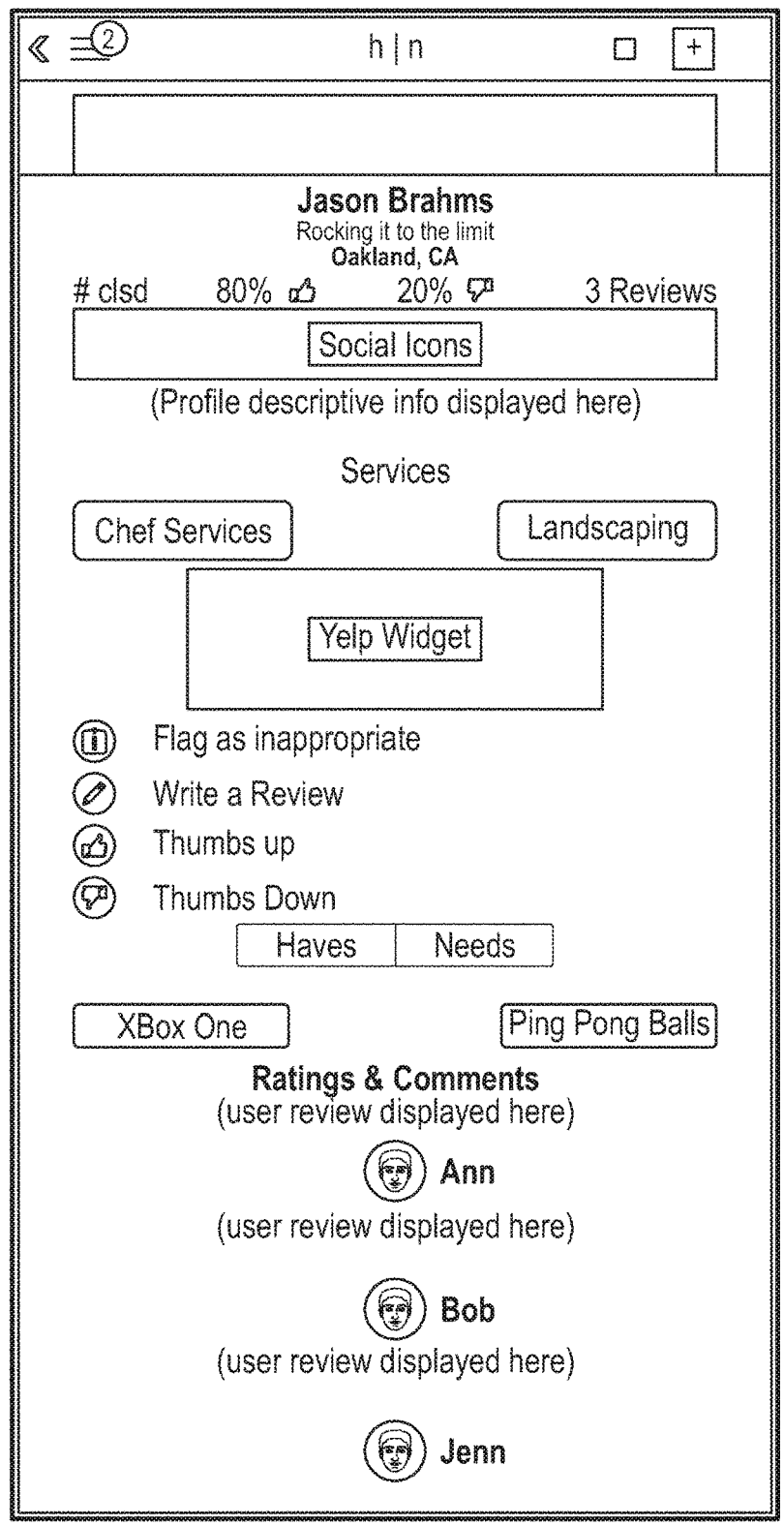
FIG. 103 illustrates a User Profile—professional services page in the multi-party dynamic bartering network.

In some embodiments of the multi-party dynamic bartering network, various instructions page are provided to enable Users to edit their profiles. For example, in FIG. 99 a User profile edit page with a services prompt is illustrated. FIG. 100 shows a User profile edit page with Yelp rating editing capabilities. FIG. 101 shows a User profile edit page in the multi-party dynamic bartering network. FIG. 102 shows a simple User Profile page. FIG. 103 shows a User Profile professional services page.

Figure 104:
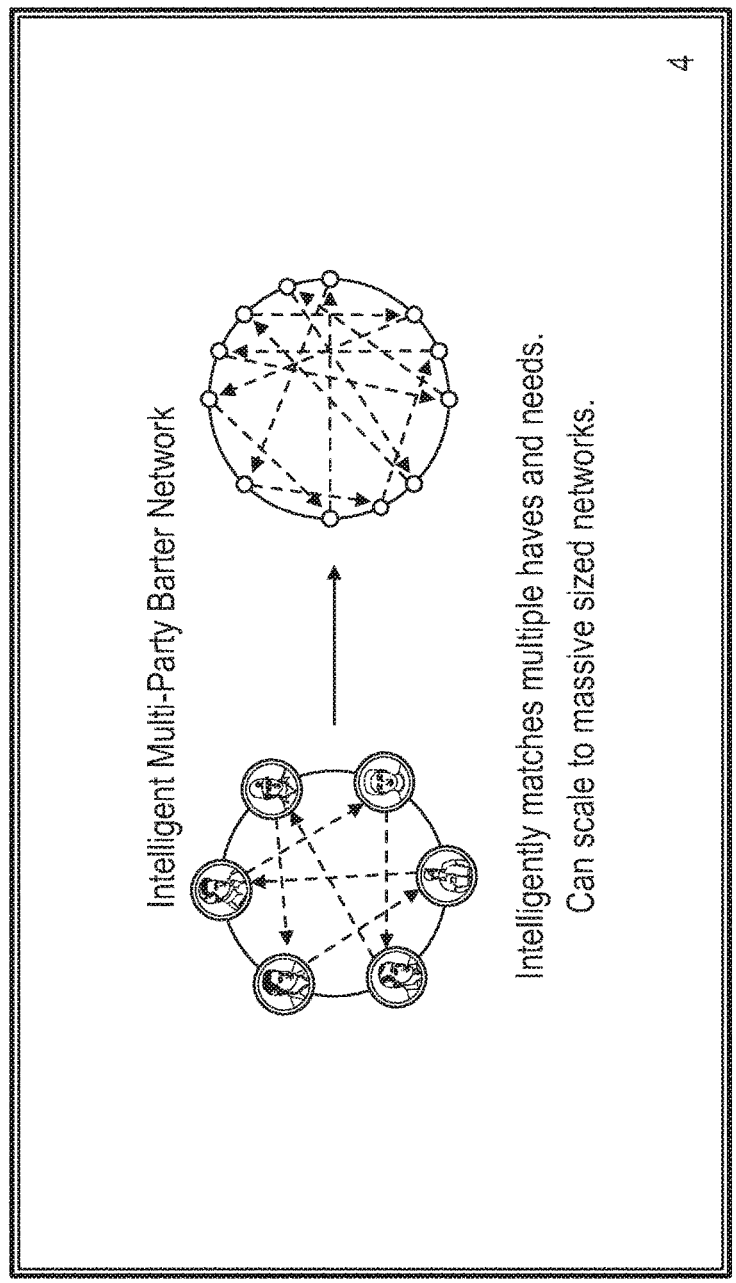
FIG. 104 illustrates a user connection diagram of the intelligent, multi-party dynamic bartering network.
Figure 105:
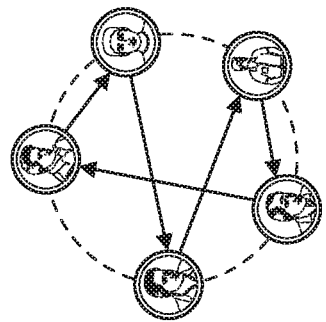
FIG. 105 illustrates the solution provided by the intelligent, multi-party dynamic bartering network.
Figure 106:
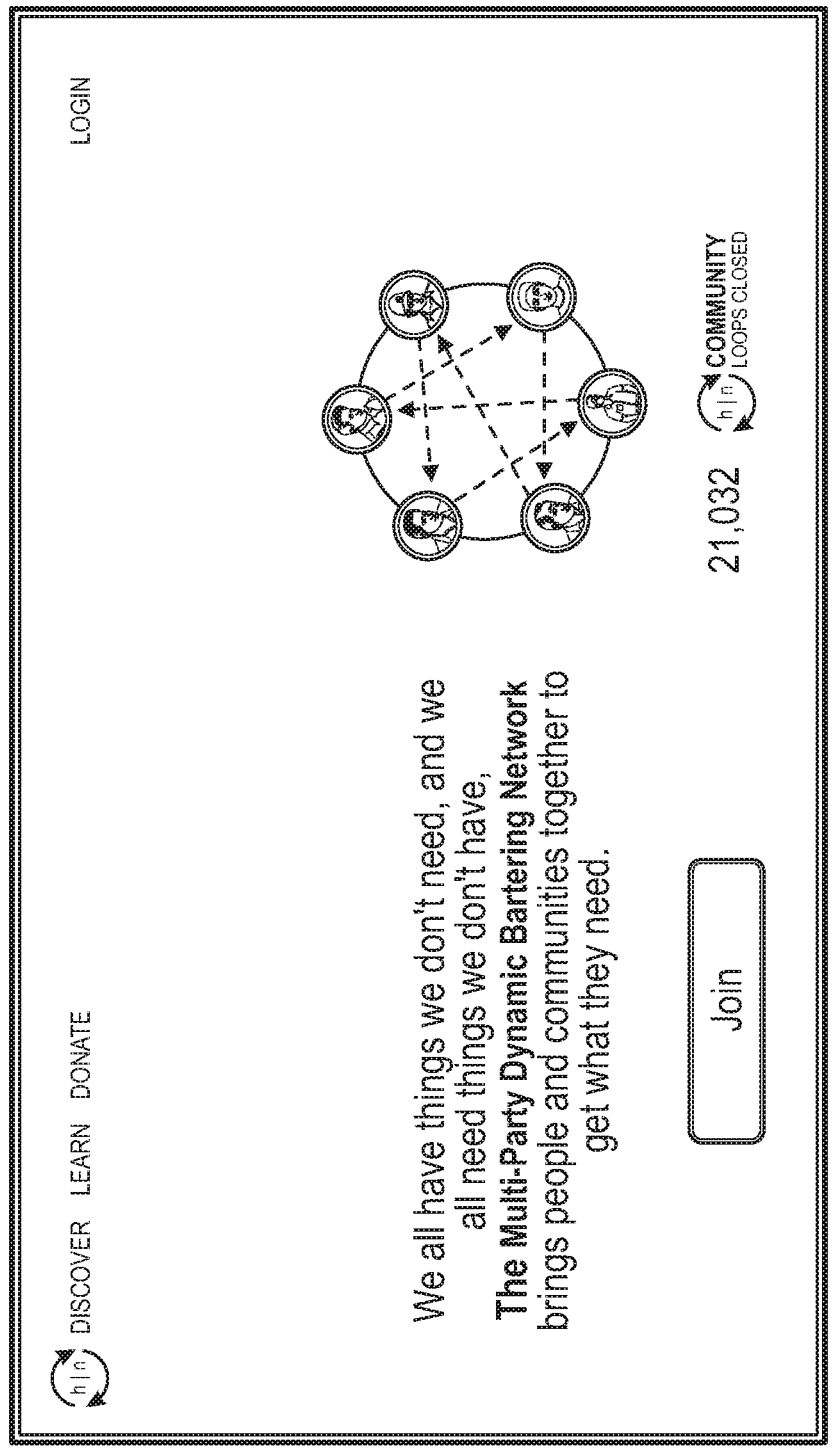
FIG. 106 illustrates a "User Interface Landing Page" for the intelligent, multi-party dynamic bartering network.
Figure 107:
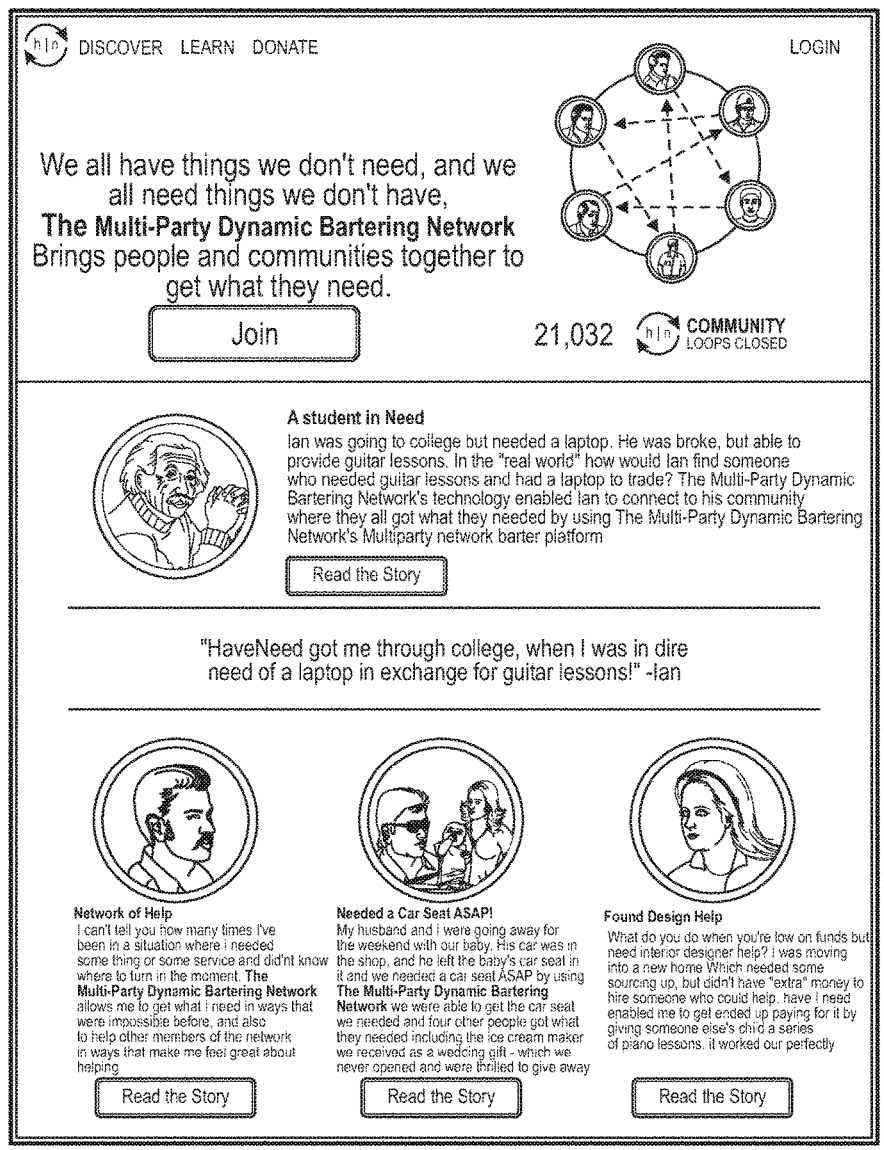
FIG. 107 illustrates a "User Stories" webpage for the intelligent, multi-party dynamic bartering network.

Referring now to another embodiment of a computer-based, multi-party dynamic bartering network, a user connection diagram is illustrated in FIG. 104. A solution provided by this computer-based, multi-party dynamic bartering network is displayed in FIG. 105. In one such embodiment of the network, a User Interface Landing Page displayed (See FIG. 106). Referring now to FIG. 107, in some embodiments, a "User Stories" webpage is displayed.

Figure 108:
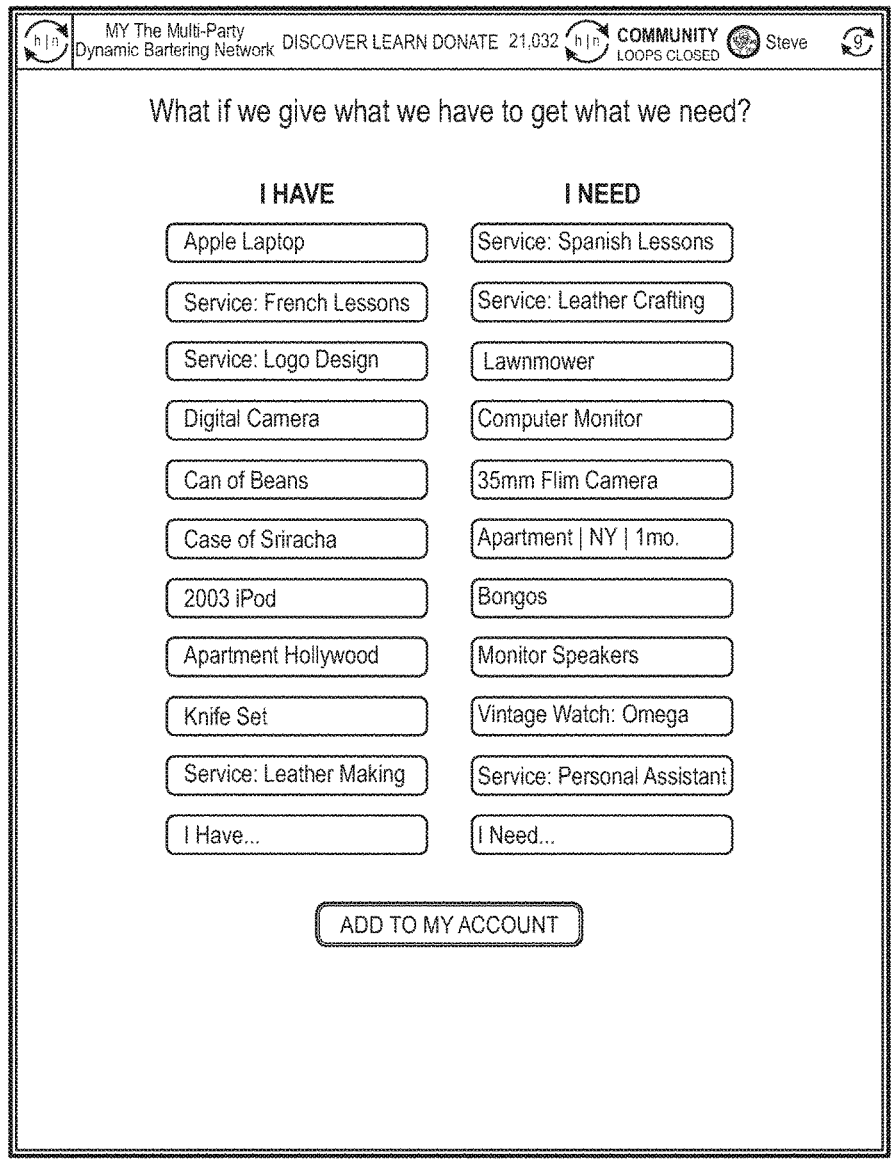
FIG. 108, illustrates an "I Have—I Need" Data Inputs webpage for the intelligent, multi-party dynamic bartering network.
Figure 109:
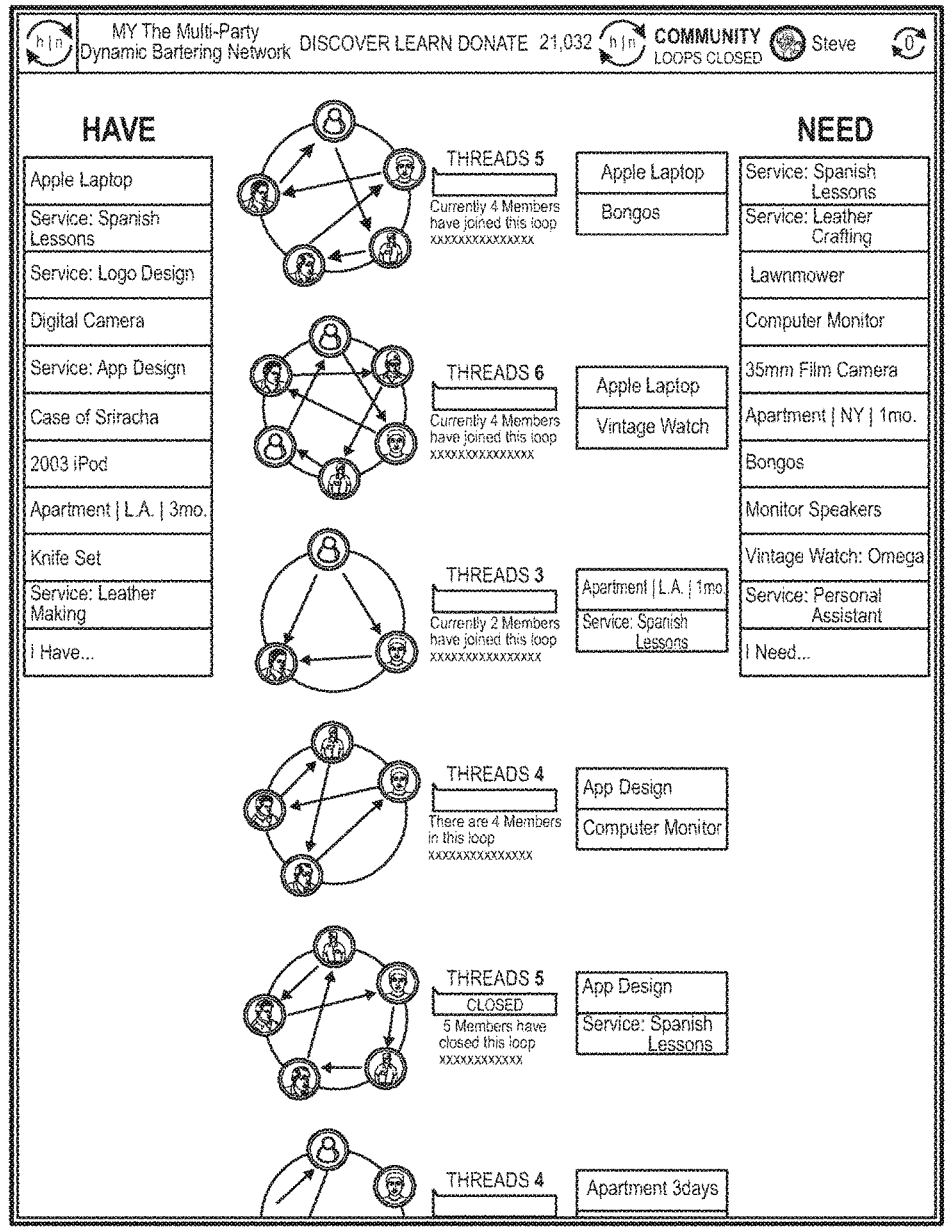
FIG. 109 illustrates a "Matching Results Landing Page" for the intelligent, multi-party dynamic bartering network.

As shown in FIG. 108, some embodiments of the multi-party dynamic bartering network present an "I Have—I Need" Data Inputs webpage. On this webpage, users are able to update their account with items that they Have and items that they Need. In another aspect shown in FIG. 109, a "Matching Results Landing Page" for the computer-based, multi-party dynamic bartering network is displayed. On this webpage, users are able to see matched results (e.g., numerous different loops that are open, closed, or active; the number of threads in the loops; and the number of members that have joined the loop).

Figure 110:
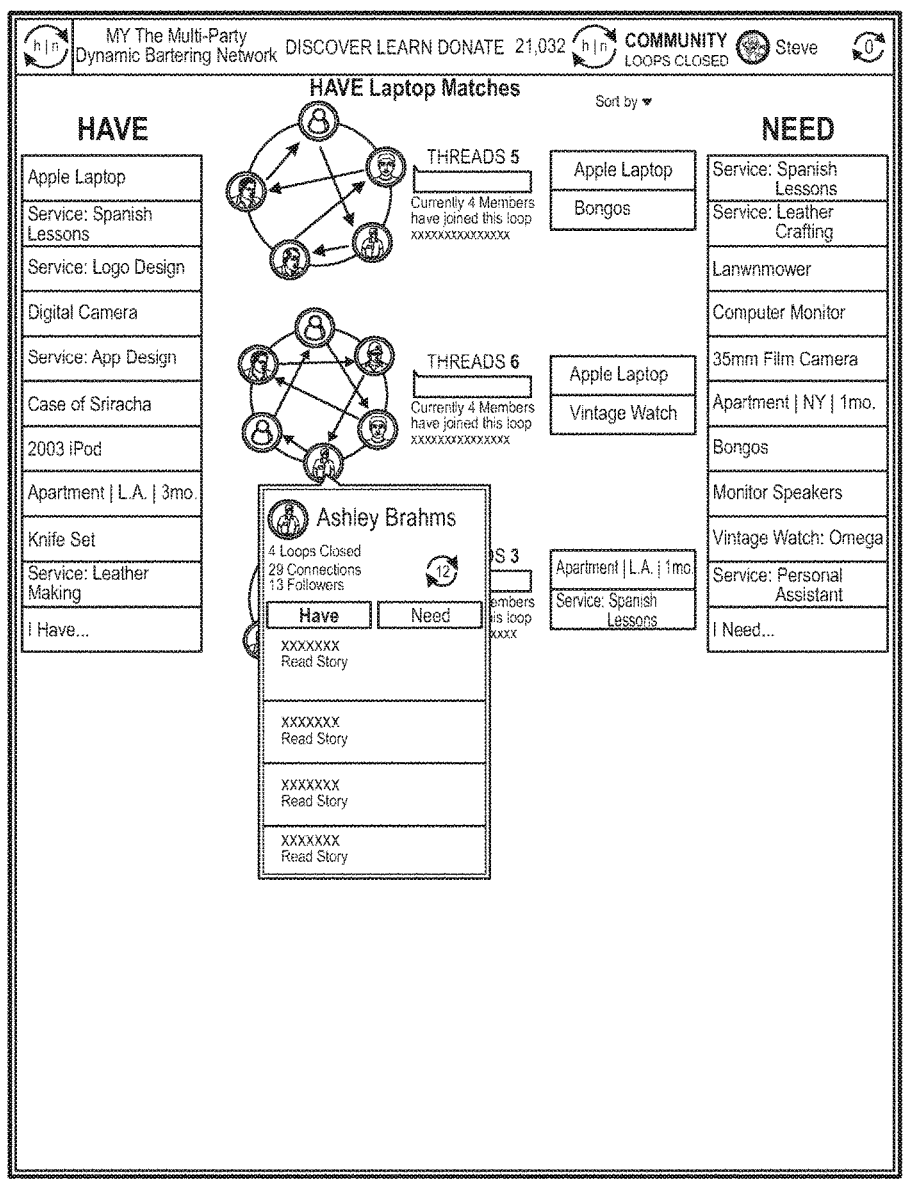
FIG. 110 illustrates a "Filtered Results & Member Card" for the intelligent, multi-party dynamic bartering network.

Referring now to FIG. 110, a "Filtered Results & Member Card" for the computer-based, multi-party dynamic bartering network is illustrated. On this webpage, users are able to see matched results (e.g., numerous different loops that are open, closed, or active; the number of threads in the loops; and the number of members that have joined the loop) that have been filtered or sorted using various different criteria. Users may also see the "Member card" of a member that is in one of the loops in the matched results by selecting one of the users.

Figure 111:
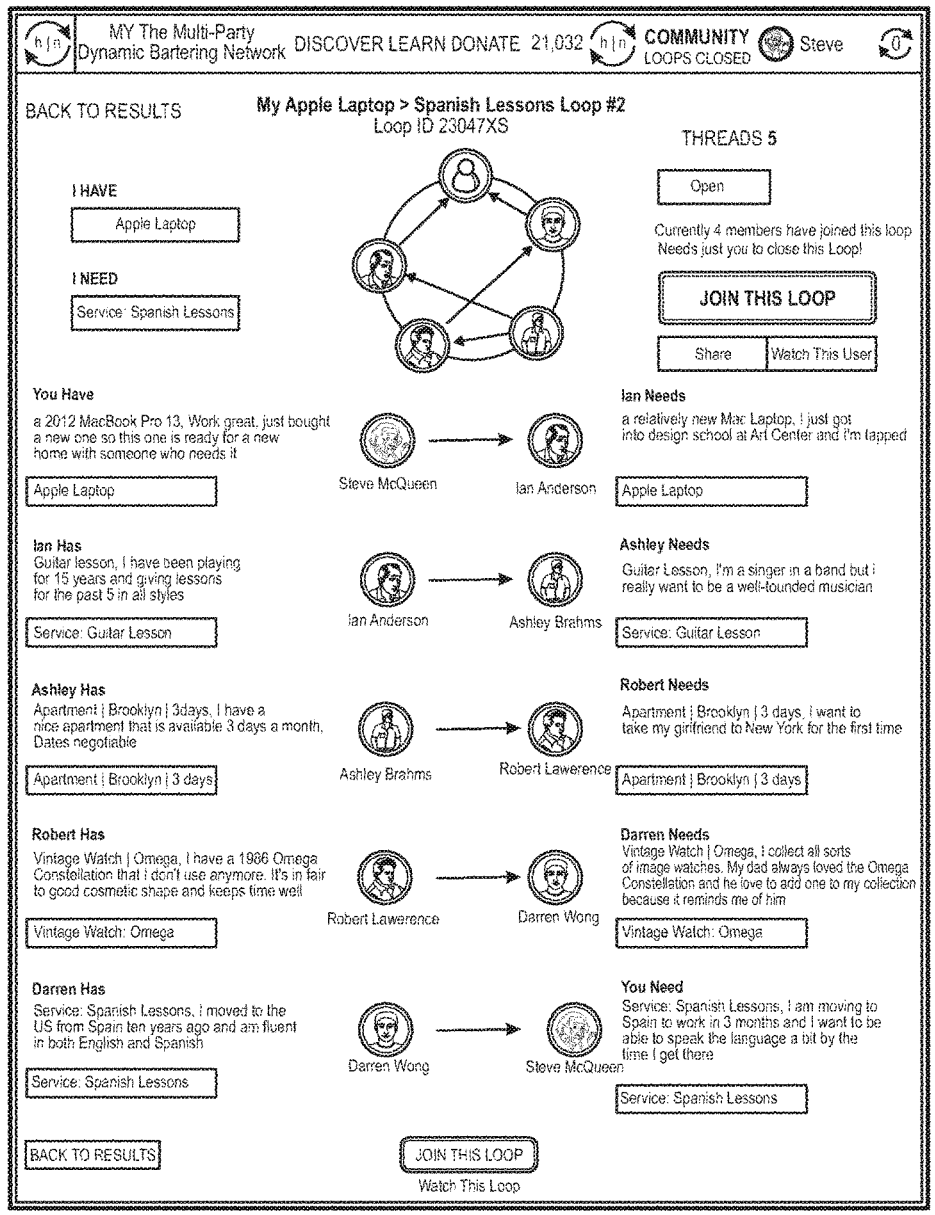
FIG. 111 illustrates a "Loop Expansion & Thread Stories" for the intelligent, multi-party dynamic bartering network.
Figure 112:
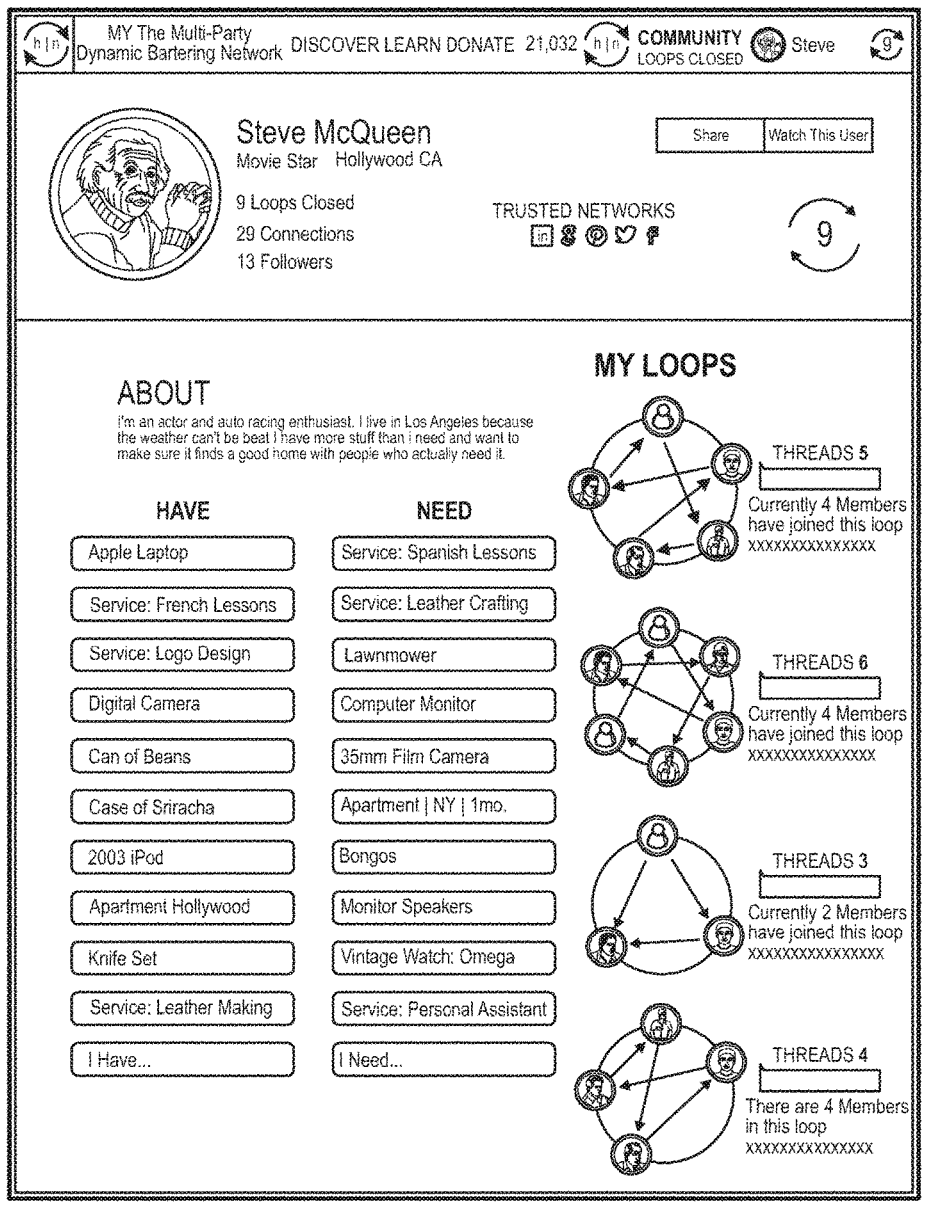
FIG. 112 illustrates a "User Profile Page" for the intelligent, multi-party dynamic bartering network.

As shown in FIG. 111, some embodiments of the multi-party dynamic bartering network present a "Loop Expansion & Thread Stories." On this webpage, users are able to see the Haves and Needs of various other members. Users are also able to select additional loops to join from this page. Continuing, FIG. 112 presents a "User Profile Page" for the computer-based, multi-party dynamic bartering network. On this webpage, users are able to view their own Haves and Needs, as well as the Loops in which the User is included. This page may also show information such as Loops Closed, Connections, Followers, or Ratings information.

Figure 113:
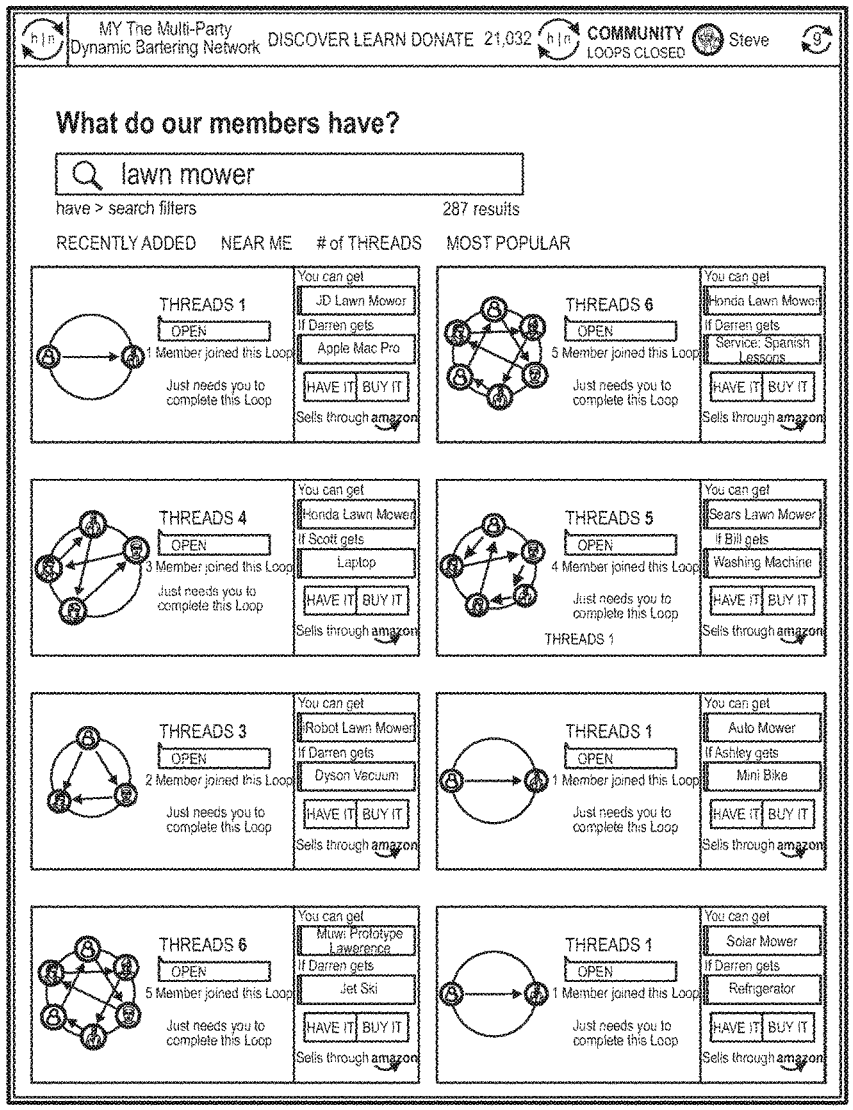
FIG. 113 illustrates a "Search & Browse Haves (with $3^{rd}$ Party Retailer Fulfillment)" for the intelligent, multi-party dynamic bartering network.
Figure 114:
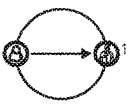
FIG. 114 illustrates a "Search & Browse Needs (with $3^{rd}$ Party Retailer Fulfillment)" for the intelligent, multi-party dynamic bartering network.
Figure 115:
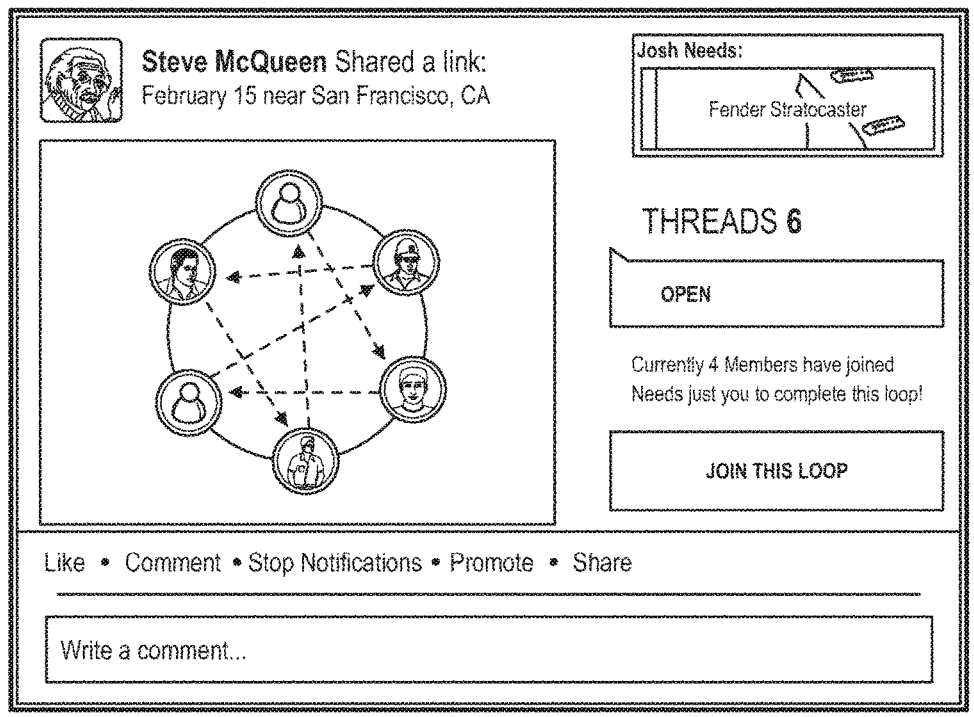
FIG. 115 illustrates a "Social Networking Integration (e.g., FACEBOOK)" for the intelligent, multi-party dynamic bartering network.
Figure 116:
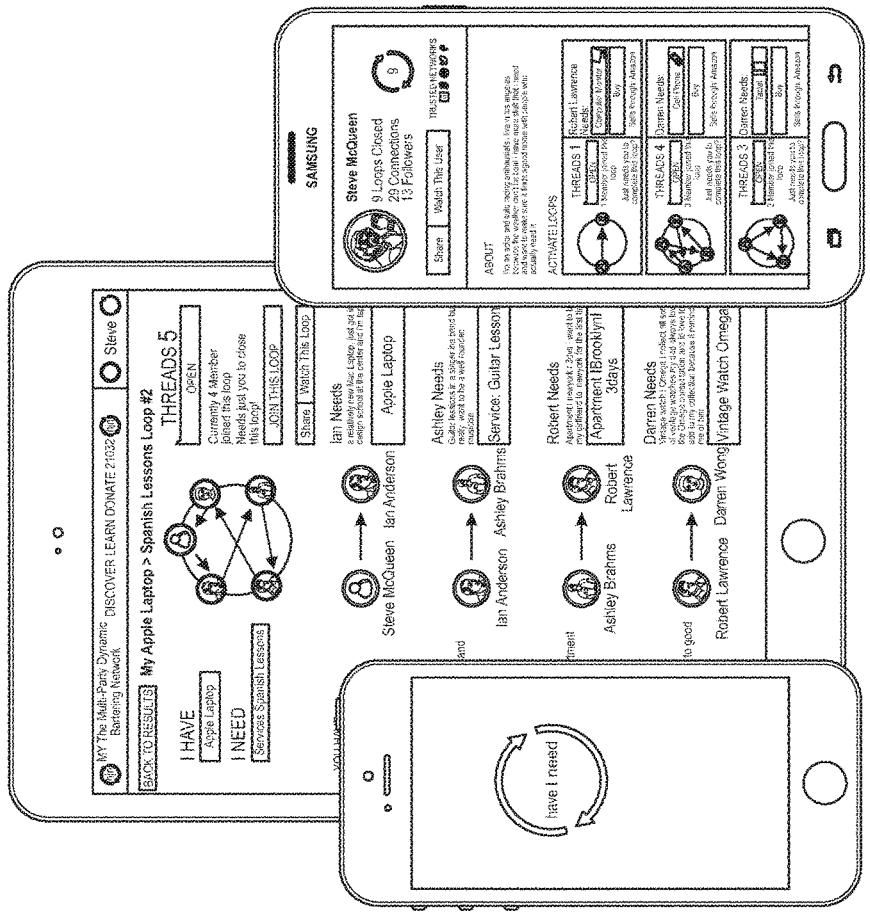
FIG. 116 illustrates a "Mobile User Interface" for the intelligent, multi-party dynamic bartering network.
Figure 117:
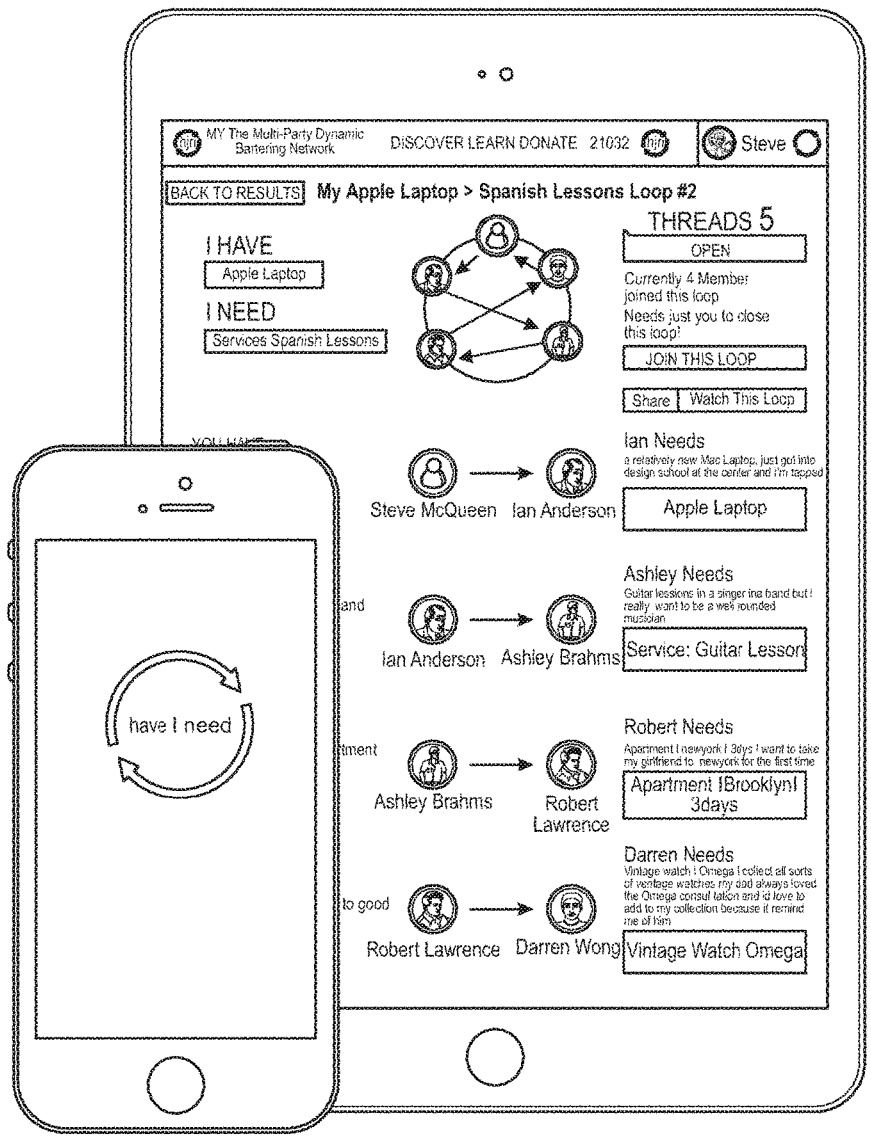
FIG. 117 illustrates another "Mobile User Interface" for the intelligent, multi-party dynamic bartering network.
Figure 118:
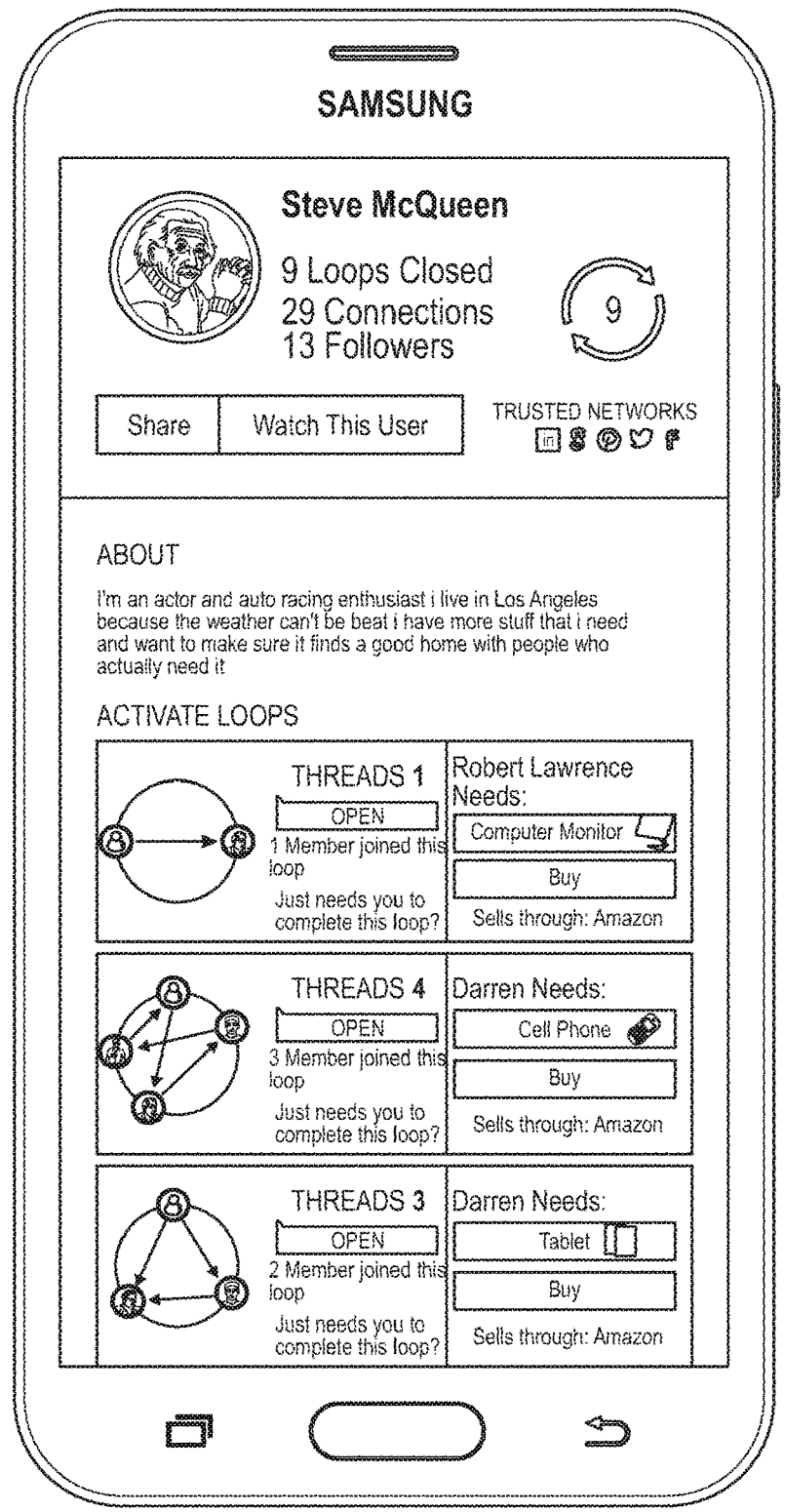
FIG. 118 illustrates yet another "Mobile User Interface" for the intelligent, multi-party dynamic bartering network.

Referring now to FIG. 113, a "Search & Browse Haves (with $3^{rd}$ Party Retailer Fulfillment)" for the computer-based, multi-party dynamic bartering network is illustrated. On this webpage, users are able to search/view the Haves of other members. This page may also show sorting functions such as Recently Added, Near Me, Number of Threads, or Most Popular. Continuing, FIG. 114 presents a "Search & Browse Needs (with $3^{rd}$ Party Retailer Fulfillment)" for the computer-based, multi-party dynamic bartering network is displayed. On this webpage, users are able to search/view the Needs of other members. This page may also show sorting functions such as Recently Added, Near Me, Number of Threads, or Most Popular. FIG. 115 shows a "Social Networking Integration (e.g., FACEBOOK)" for the system. On this webpage, users are able to post comments and use other social networking functionality. FIGS. 116-118 show several "Mobile User Interfaces" for the computer-based, multi-party dynamic bartering network.

Sample System Requirements (e.g., these specifications and models are given as examples and not absolute requirements).

Back End:
    Windows Server 2012+ and Linux 2.4+ operating systems in 32-bit or 64-bit modes.
    MySQL Database
    2 gigahertz (GHz) or faster 32-bit (x86) or 64-bit (x64) processor
    4 gigabyte (GB) RAM (32-bit) or 8 GB RAM (64-bit)
    32 GB available hard disk space (32-bit) or 64 GB (64-bit)
    Broadband Internet Connection
End User:
    Personal Computers:
    a. Windows:
      i. General Requirements:
        1. Windows 7 or later
        2. 1 gigahertz (GHz) or faster 32-bit (x86) or 64-bit (x64) processor 3. 1 gigabyte (GB) RAM (32-bit) or 2 GB RAM (64-bit)
4. 16 GB available hard disk space (32-bit) or 20 GB (64-bit)
5. Chrome, Firefox or Safari Browser
6. Broadband Internet Connection
  ii. Supported Models:
Any system Intel-based personal computer with 1 gigahertz (GHz) or faster 32-bit (x86) or 64-bit (x64) processor
b. Macintosh:
  i. General Requirements:
    1. OS X v10.6.8 or later
    2. 2 GB of memory
    3. 8 GB of available space
    4. Chrome, Firefox or Safari Browser
    5. Broadband Internet connection
  ii. Supported Models:
    1. iMac (Mid 2007 or newer)
    2. MacBook (late 2008 Aluminum, or early 2009 or newer)
    3. MacBook Pro (mid/late 2007 or newer)
Mobile Devices:
a. iOS (v7+)
  i. iPhone 5 or later
  ii. iPad 3 or later
b. Android (v4+)
  i. Samsung Galaxy S3 or later
c. Windows Phone (v8+)
  i. Nokia Lumia Icon or later Various aspects of the systems, methods, functions, steps, features and the like corresponding thereto disclosed herein may be implemented on one or more computer systems using hardware, software, firmware, circuits, or combinations thereof. Hardware, software, firmware, and circuits respectively refer to any hardware, software, firmware, or circuit component. Computer systems referred to herein may refer to any computing device and vice versa (e.g., smart phone, mobile computing device, personal data assistant, tablet computer, laptop computer, desktop computer, other computing device, and the like). For example, each computer system or computing device in the systems described herein or any embodiment of a system disclosed herein may utilize one or more of the following components: a single-core or multi-core hardware processor (e.g., central processing unit or graphics processing unit) on which software instructions are executed (e.g., instructions corresponding to an operating system, an application program, an interpreter such as a virtual machine, or a compiler); a memory associated with and in connection with the hardware processor such as cache or other system memory that stores software instructions or other data that the hardware processor may access for processing; an input device (e.g., mouse, keyboard, touchscreen, and the like); an output device (e.g., display, touchscreen, printer, and the like); a network or communication interface that enables the computer system to communicate over a network or communication protocol; an application program having corresponding software instructions that are executable by a hardware processor. Connections between different computer systems and connections between different computer system components may be wired or wireless.

Virtualization computing techniques, cloud computing techniques, web application/website computing techniques, traditional and adaptive streaming techniques, and other computing techniques may be implemented by any embodiment of a system disclosed herein to enable and/or enhance the teachings described herein. For example, in a cloud computing embodiment, one or more servers (i.e., one or more computer systems) may store and execute software instructions corresponding to an application program based on input data received from client devices. In response to the input data received, the application program is executed accordingly, which results in graphical data being processed and output to the client devices for display on a display such as a touch screen on a smart phone or tablet computer.

As another example, in a web application or website embodiment, data representative of a user input may be transmitted to a server (i.e., a computer system) hosting the website for processing and storage in memory. In an application program embodiment, the application may be stored and executed locally on a user's computer system. In other embodiments, one or more components of the application program may be stored and executed on a server and the user's computer system. For example, a user may download the application program from an app store for an Android computing device, Blackberry computing device, Apple computing device, Windows computing device, Samsung computing device, other computing device, and the like. Execution of the application program on the user's computing device may require that the device transmit and receive data to and from one or more computing devices such as a server or other user's computing device. For example, an application may be downloaded from a server to a mobile device. Upon installation, the mobile device may communicate with a server.

One or more embodiments of the systems disclosed herein may utilize streaming technology. Streaming data enables data to be presented to the user of the client device while the client device receives data from the server. Streaming data from servers to client devices (e.g., computing devices operated by users) over a network is typically limited by the bandwidth of the network, or alternatively, the physical layer net bitrate. Traditional streaming protocols, such as RTSP (Real-Time Streaming Protocol), MS-WMSP (Windows Media HTTP Streaming Protocol), and RTMP (Real-Time Messaging Protocol) may be implemented, which essentially send data in small packets from the server to the client device in real-time at the encoded bitrate of the data. Adaptive streaming may also be implemented. Adaptive streaming almost exclusively relies on HTTP for the transport protocol. Similar to traditional streaming, data is encoded into discrete packets of a particular size; however, the source data is encoded at multiple bitrates rather than a single bitrate. The data packets corresponding to the same data encoded at different bitrates are then indexed based on the bitrate in memory. This streaming method works by measuring, in real-time, the available bandwidth and computer capacity of the client device, and adjusts which indexed data packet to transfer based on the encoded bitrate.

One or more aspects of the systems disclosed herein may be located on (i.e., processed, stored, executed, or the like; or include one or more hardware or software components) a single computer system or may be distributed among a plurality of computer systems attached by one or more communication networks (e.g., internet, intranet, a telecommunications network, and the like). One or more components of a computer system may be distributed across one or more computer systems in communication with the computer system over a communication network. For example, in some embodiments, the systems disclosed herein may utilize one or more servers (i.e., one or more computer systems dedicated for a particular purpose in the system) that may be dedicated to serve the needs of one or more other computer systems or components across a communication network and/or system bus. The one or more servers may provide a central processing location for one or more aspects of the systems disclosed herein.

Again, various aspects of the systems, methods, function, and steps corresponding thereto disclosed herein may be implemented on one or more computer systems using hardware, software, firmware, or combinations thereof. Those of ordinary skill in the art will appreciate that one or more circuits and/or software may be used to implement the system and methods described herein. Circuits refer to any circuit, whether integrated or external to a processing unit such as a hardware processor. Software refers to code or instructions executable by a computing device using any hardware component such as a processor to achieve the desired result. This software may be stored locally on a processing unit or stored remotely and accessed over a communication network.

As disclosed herein, a processor or hardware processor may refer to any hardware processor or software processor. A software processor may include or otherwise constitute an interpreter that is executed by a corresponding hardware processor. A computer system according to any embodiment disclosed herein is configured to perform any of the described functions related to the various embodiments of the systems disclosed herein.

As disclosed herein, any method, function, step, feature, or result may be considered a module that may include software instructions that cause, when executed by a computing device, the desired method, function, step, feature, or result. Executed by a computing device includes execution by any hardware component (e.g., CPU, GPU, network interface, integrated circuits, other hardware components, and the like) of the computing device such as a hardware processor. Any module may be executed by a computing device (e.g., by a processor of the computing device). Any method, function, step, feature, result, and the like disclosed herein may be implemented by one or more software modules whether explicitly described or not. Individual components within a computing device may work together to accomplish a desired method, function, step, feature, or result. For example, a computing device may receive data and process the data. A simple example would be that a network interface receives the data and transmits the data over a bus to a processor.

Various aspects of the systems disclosed herein may be implemented as software executing in a computer system. The computer system may include a central processing unit (i.e., a hardware processor) connected to one or more memory devices, a graphical processing unit, input devices such as a mouse and keyboard, output devices such as speakers and a display, a network interface to connect to one or more other computer systems (e.g., one or more computer systems configured to provide a service such that function as a database), an operating system, a compiler, an interpreter (i.e., a virtual machine), and the like. The memory may be used to store executable programs and data during operation of the computer system. The executable programs may be written in a high-level computer programming language, such as Java or C++. Of course, other programming languages may be used since this disclosure is not limited to a specific programming language or computer system. Further, it is to be appreciated that the systems and methods disclosed herein are not limited to being executed on any particular computer system or group of computer systems.

Some methods, functions, steps, or features have been described as being executed by corresponding software by a processor. It is understood than any methods, functions, steps, features, or anything related to the systems disclosed herein may be implemented by hardware, software (e.g., firmware), or circuits despite certain methods, functions, steps, or features having been described herein with reference to software corresponding thereto that is executable by a processor to achieve the desired method, function, or step. It is understood that software instructions may reside on a non-transitory medium such as one or more memories accessible to one or more processors in the systems disclosed herein. For example, where a computing device receives data, it is understood that the computing device processes that data whether processing the data is affirmatively stated or not. Processing the data may include storing the received data, analyzing the received data, and/or processing the data to achieve the desired result, function, method, or step. It is further understood that input data from one computing device or system may be considered output data from another computing device or system, and vice versa. It is yet further understood that any methods, functions, steps, features, results, or anything related to the systems disclosed herein may be represented by data that may be stored on one or more memories, processed by one or more computing devices, received by one or more computing devices, transmitted by one or more computing devices, and the like.

The various embodiments and examples described herein are provided by way of illustration only and should not be construed to limit the claimed invention, nor the scope of the various embodiments and examples. Those skilled in the art will readily recognize various modifications and changes that may be made to the claimed invention without following the example embodiments and applications illustrated and described herein, and without departing from the true spirit and scope of the claimed invention, which is set forth in the following claims. In addition, various embodiments may be combined. Therefore, reference to an embodiment, one embodiment, in some embodiments, in other embodiments, and the like does not preclude one or more methods, functions, steps, features, results, hardware implementations, or software implementations of different embodiments from being combined. Further, reference to an embodiment, one embodiment, in some embodiments, in other embodiments, examples, and the like provides various aspects that may or may not be combined with those of one or more different embodiments and/or examples.

What is claimed:

1. A method of generating a display interface that presents multiple simultaneous multi-party barter options for a user in a multi-party dynamic bartering network system, the method comprising:

storing a plurality of user profiles in a plurality of processor-based, non-transitory memory storage devices that have display interfaces, each user profile including (1) supply information regarding items, services, or items and services that the user owns and is willing to offer as part of an exchange, (2) demand information regarding items, services, or items and services that the user would like to acquire in an exchange, or (3) a combination of supply information and demand information, each of the plurality of processor-based, non-transitory memory storage devices including a display, user input device, and network connection, wherein the plurality of processor-based, non-transitory memory storage devices are located at disparate locations without geographic restrictions;

connecting the plurality of processor-based, non-transitory memory storage devices over a computer network using the network connections of the plurality of processor-based, non-transitory memory storage devices;

analyzing the supply information and demand information in the plurality of user profiles stored in the plurality of processor-based, non-transitory memory storage devices for instances of coincidence between the supply information and demand information that form a closed multi-party barter loop or an open multi-party barter loop, wherein a closed multi-party barter loop includes all loop connections needed to complete the multi-party barter loop upon a searching user joining, and an open multi-party barter loop includes less than all of the loop connections needed to complete the multi-party barter loop upon the searching user joining;

establishing relative value for goods and services in the supply information and demand information in the plurality of user profiles using the multi-party dynamic bartering network system;

generating numerous multi-party barter loop options from the plurality of user profiles stored in the plurality of processor-based, non-transitory memory storage devices, via one or more processors, in response to a search request by the searching user, wherein the numerous multi-party barter loop options include closed multi-party barter loops, open multi-party barter loops, or both;

presenting a limited match list of supply information and demand information connected by relative value on the display interface of a processor-based, non-transitory memory storage device that is associated with the supply information or the demand information of the searching user, the limited match list including numerous multi-party barter loop options to the searching user over the computer network for the searching user to join;

receiving input from the searching user to join a single closed multi-party barter loop or concurrently join a large number of open multi-party barter loops over the computer network, wherein the searching user stays joined in the large number of open multi-party barter loops over time until a first multi-party barter loop closes, and wherein the large number of open multi-party barter loops comprise four or more parties;

receiving confirmation from the searching user over the computer network that the searching user selected a multi-party barter loop option from among the numerous multi-party barter loop options;

determining if the joining by the searching user of the selected multi-party barter loop is sufficient to complete a multi-party barter loop or if additional parties are required to complete all of the large number of multi-party barter loop options selected by the searching user;

if additional parties are required to complete all of the large number of multi-party barter loop options, proposing one or more of the large number of multi-party barter loop options to one or more additional parties over the computer network and enabling the searching user to continue joining the numerous open multi-party barter loops;

monitoring all of the large number of multi-party barter loop options and watching for the first multi-party barter loop to close when an additional party joins the first multi-party barter loop; and if additional parties are not required to complete a first multi-party barter loop, facilitating real-time execution of the first multi-party barter loop.

2. The method of claim 1, wherein at least one of the proposed multi-party barter loop options does not include all of the loop connections needed to complete the multi-party barter loop upon the searching user joining the multi-party barter loop, but wherein the system generates virtual loop connections needed to complete the multi-party barter loop in addition to the searching user joining the multi-party barter loop.

3. The method of claim 2, wherein the system enables the searching user to select more than one proposed multi-party barter loop that is not complete but rather includes virtual loop connections, from the proposed multi-party barter loop options.

4. The method of claim 3, wherein the first not complete multi-party barter loop that subsequently becomes complete after the searching user joins the more than one incomplete multi-party barter loops is the loop that secures the searching user's loop connection, and wherein the searching user's loop connection is removed from the other incomplete multi-party barter loops that the searching user joined.

5. The method of claim 1, wherein at least one of the multi-party barter loops includes five or more parties.

6. The method of claim 1, wherein the system enables the searching user to select to watch multi-party barter loops that the searching user may or may not later join.

7. The method of claim 1, wherein the system enables the searching user to select to filter the proposed one or more multi-party barter loop options using various criteria.

8. The method of claim 1, wherein the system enables the searching user to view information about other users in proposed multi-party barter loop options to assist the searching user to select a proposed multi-party barter loop to join.

9. The method of claim 8, wherein the system enables the searching user to view information about other users in proposed multi-party barter loop options for a linked social media network.

10. A system for generating a display interface that presents multiple simultaneous multi-party barter options for a user in a multi-party dynamic bartering network system, the method comprising:

a processor-based, server device having one or more non-transitory memory storage devices, one or more processors, and a network connection, the one or more processor-based, non-transitory memory storage devices having display interfaces and storing a set of instructions that when executed by the one or more processors, cause the one or more processors to:

store a plurality of user profiles in a plurality of processor-based, non-transitory memory storage devices, each user profile including (1) supply information regarding items, services, or items and services that the user owns and is willing to offer as part of an exchange, (2) demand information regarding items, services, or items and services that the user would like to acquire in an exchange, or (3) a combination of supply information and demand information, each of the plurality of processor-based, non-transitory memory storage devices including a display, user input device, and network connection, wherein the plurality of processor-based, non-transitory memory storage devices are located at disparate locations without geographic restrictions;

connect the plurality of processor-based, non-transitory memory storage devices over a computer network using the network connections of the plurality of processor-based, non-transitory memory storage devices;

analyze the supply information and demand information in the plurality of user profiles stored in the plurality of processor-based, non-transitory memory storage devices for instances of coincidence between the supply information and demand information that form a closed multi-party barter loop or an open multi-party barter loop, wherein a closed multi-party barter loop includes all loop connections needed to complete the multi-party barter loop upon a searching user joining, and an open multi-party barter loop includes less than all of the loop connections needed to complete the multi-party barter loop upon the searching user joining;

establish relative value for goods and services in the supply information and demand information in the plurality of user profiles using the multi-party dynamic bartering network system;

generate numerous multi-party barter loop options from the plurality of user profiles stored in the plurality of processor-based, non-transitory memory storage devices, via one or more processors, in response to the search request by the searching user, wherein the numerous multi-party barter loop options include closed multi-party barter loops, open multi-party barter loops, or both;

presenting a limited match list of supply information and demand information connected by relative value on the display interface of a processor-based, non-transitory memory storage device that is associated with the supply information or the demand information of the searching user, the limited match list including numerous multi-party barter loop options to the searching user over the computer network for the searching user to join, wherein the system generates virtual loop connections needed to complete the multi-party barter loop in addition to the searching user joining the multi-party barter loop;

receive input from the searching user to join a single closed multi-party barter loop or concurrently join a large number of open multi-party barter loops over the computer network, wherein the searching user stays joined in the large number of open multi-party barter loops over time until a first multi-party barter loop closes, and wherein the large number of open multi-party barter loops comprise four or more parties;

receive confirmation from the searching user over the computer network that the searching user selected a multi-party barter loop option from among the numerous multi-party barter loop options;

determine if the joining by the searching user of the selected multi-party barter loop is sufficient to complete a multi-party barter loop or if additional parties are required to complete all of the large number of multi-party barter loop options selected by the searching user;

if additional parties are required to complete all of the large number of multi-party barter loop options, propose one or more of the large number of multi-party barter loop options to one or more additional parties over the computer network and enabling the searching user to continue joining the numerous open multi-party barter loops;

monitor all of the large number of multi-party barter loop options and watch for a first multi-party barter loop to close when an additional party joins the first multi-party barter loop; and if additional parties are not required to complete a first multi-party barter loop, facilitate real-time execution of the first multi-party barter loop, wherein facilitating real-time execution of the first multi-party barter loop includes third party fulfilment of items in the closed multi-party barter loop.

11. The system of claim 10, enabling the searching user to select more than one proposed multi-party barter loop that is not complete but rather includes virtual loop connections, from the proposed multi-party barter loop options.

12. The system of claim 11, wherein the first incomplete multi-party barter loop that subsequently becomes complete after the searching user joins the more than one incomplete multi-party barter loops is the loop that secures the searching user's loop connection, and wherein the searching user's loop connection is removed from the other incomplete multi-party barter loops that the searching user joined.

13. The system of claim 10, wherein the proposing of one or more multi-party barter loop options to the searching user over the computer network for the searching user to join uses the user's smartphone, tablet, or computer device.

14. The system of claim 10, wherein the receiving of confirmation from the searching user over the computer network that the searching user selected a multi-party barter loop from among the one or more multi-party barter loop options uses a user's smartphone, tablet, or computer device.

15. The system of claim 10, wherein at least one of the multi-party barter loops includes five or more parties.

16. The system of claim 10, wherein the system enables the searching user to select to watch multi-party barter loops that the searching user may or may not later join.

17. The system of claim 10, wherein the system enables the searching user to select to filter the proposed one or more multi-party barter loop options using various criteria.

18. The system of claim 10, wherein the system enables the searching user to view information about other users in proposed multi-party barter loop options to assist the searching user to select a proposed multi-party barter loop to join.

19. The system of claim 18, wherein the system enables the searching user to view information about other users in proposed multi-party barter loop options for a linked social media network.

20. A method of generating a display interface that presents multi-party barter options for a user in a multi-party dynamic bartering network, the method comprising:

storing a plurality of user profiles in a plurality of processor-based, non-transitory memory storage devices, each user profile including (1) supply information regarding items, services, or items and services that the user owns and is willing to offer as part of an exchange, (2) demand information regarding items, services, or items and services that the user would like to acquire in an exchange, or (3) a combination of supply information and demand information, each of the plurality of processor-based, non-transitory memory storage devices including a display interface, user input device, and network connection, wherein the plurality of processor-based, non-transitory memory storage devices are located at disparate locations without geographic restrictions;

connecting the plurality of processor-based, non-transitory memory storage devices over a computer network using the network connections of the plurality of processor-based, non-transitory memory storage devices;
analyzing the supply information and demand information in the plurality of user profiles stored in the plurality of processor-based, non-transitory memory storage devices for instances of coincidence between the supply information and demand information that form a closed multi-party barter loop or an open multi-party barter loop, wherein a closed multi-party barter loop includes all loop connections needed to complete the multi-party barter loop upon a searching user joining, and wherein an open multi-party barter loop includes less than all of the loop connections needed to complete the multi-party barter loop upon the searching user joining;
establishing relative value for goods and services in the supply information and demand information in the plurality of user profiles using the multi-party dynamic bartering network system;
generating a plurality of multi-party barter loop options from the plurality of user profiles stored in the plurality of processor-based, non-transitory memory storage devices, via one or more processors, in response to a search request by the searching user, wherein the plurality of multi-party barter loop options include closed multi-party barter loops, open multi-party barter loops, or both;
presenting a limited match list of supply information and demand information connected by relative value on the display interface of a processor-based, non-transitory memory storage device that is associated with the supply information or the demand information of the searching user, the limited match list including plurality of multi-party barter loop options to the searching user over the computer network for the searching user to join;
receiving input from the searching user to join a single closed multi-party barter loop or concurrently join two or more open multi-party barter loops over the computer network, wherein the searching user stays joined in the two or more open multi-party barter loops over time until a first multi-party barter loop closes, wherein the multi-party dynamic bartering network supports four or more concurrent open multi-party barter loops, and wherein the open multi-party barter loops comprise four or more parties;
receiving confirmation from the searching user over the computer network that the searching user selected a multi-party barter loop option;
determining if the joining by the searching user of the selected multi-party barter loop is sufficient to complete a multi-party barter loop or if additional parties are required to complete all of the two or more multi-party barter loop options selected by the searching user;
if additional parties are required to complete all of the plurality of multi-party barter loop options, proposing one or more of the plurality of multi-party barter loop options to one or more additional parties over the computer network and enabling the searching user to continue joining the plurality of open multi-party barter loops;
monitoring all of the plurality of multi-party barter loop options and watching for a first multi-party barter loop to close when an additional party joins the first multi-party barter loop; and
if additional parties are not required to complete a first multi-party barter loop, facilitating real-time execution of the first multi-party barter loop.

* * * * *